United States Patent
Ryoo et al.

(10) Patent No.: US 11,809,013 B2
(45) Date of Patent: *Nov. 7, 2023

(54) OPTICAL SYSTEM

(71) Applicant: TDK TAIWAN CORP., Taoyuan (TW)

(72) Inventors: Jungsuck Ryoo, Taoyuan (TW);
Pai-Jui Cheng, Taoyuan (TW);
Chao-Chang Hu, Taoyuan (TW);
Min-Hsiu Tsai, Taoyuan (TW);
Shu-Shan Chen, Taoyuan (TW);
Chieh-An Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 627 days.

This patent is subject to a terminal disclaimer.

(21) Appl. No.: 16/900,002

(22) Filed: Jun. 12, 2020

(65) Prior Publication Data
US 2020/0393637 A1 Dec. 17, 2020

Related U.S. Application Data

(60) Provisional application No. 62/986,039, filed on Mar. 6, 2020, provisional application No. 62/929,280, filed on Nov. 1, 2019, provisional application No. 62/899,423, filed on Sep. 12, 2019, provisional application No. 62/882,165, filed on Aug. 2, 2019, provisional application No. 62/879,190, filed on Jul. 26, 2019, provisional application No. 62/861,440, filed on Jun. 14, 2019.

(51) Int. Cl.
*G02B 7/04* (2021.01)
*G02B 27/64* (2006.01)
*G03B 5/00* (2021.01)
*G03B 13/36* (2021.01)
*H02N 2/10* (2006.01)
*H02N 2/14* (2006.01)

(52) U.S. Cl.
CPC ............. *G02B 7/04* (2013.01); *G02B 27/646* (2013.01); *G03B 5/00* (2013.01); *G03B 13/36* (2013.01); *H02N 2/103* (2013.01); *H02N 2/142* (2013.01); *G03B 2205/0007* (2013.01); *G03B 2205/0061* (2013.01)

(58) Field of Classification Search
CPC .......... G02B 7/04; G02B 27/646; G03B 5/00; G03B 13/36; G03B 2205/0007; G03B 2205/0061
See application file for complete search history.

(56) References Cited

U.S. PATENT DOCUMENTS

2001/0004420 A1* 6/2001 Kuwana ............... G02B 27/646
359/557

FOREIGN PATENT DOCUMENTS

CN 108873236 A 11/2018

\* cited by examiner

*Primary Examiner* — Minh Q Phan
(74) *Attorney, Agent, or Firm* — Muncy, Geissler, Olds & Lowe, P.C.

(57) ABSTRACT

An optical system is provided. The optical system includes a first optical module. The first optical module includes a fixed portion, a movable portion, a driving assembly, and a circuit assembly. The movable portion is movably connected to the fixed portion, and the movable portion is used to connect to an optical element. The driving assembly is used to drive the movable portion to move relative to the fixed portion. The circuit assembly is electrically connected to the driving assembly.

18 Claims, 96 Drawing Sheets

4-40

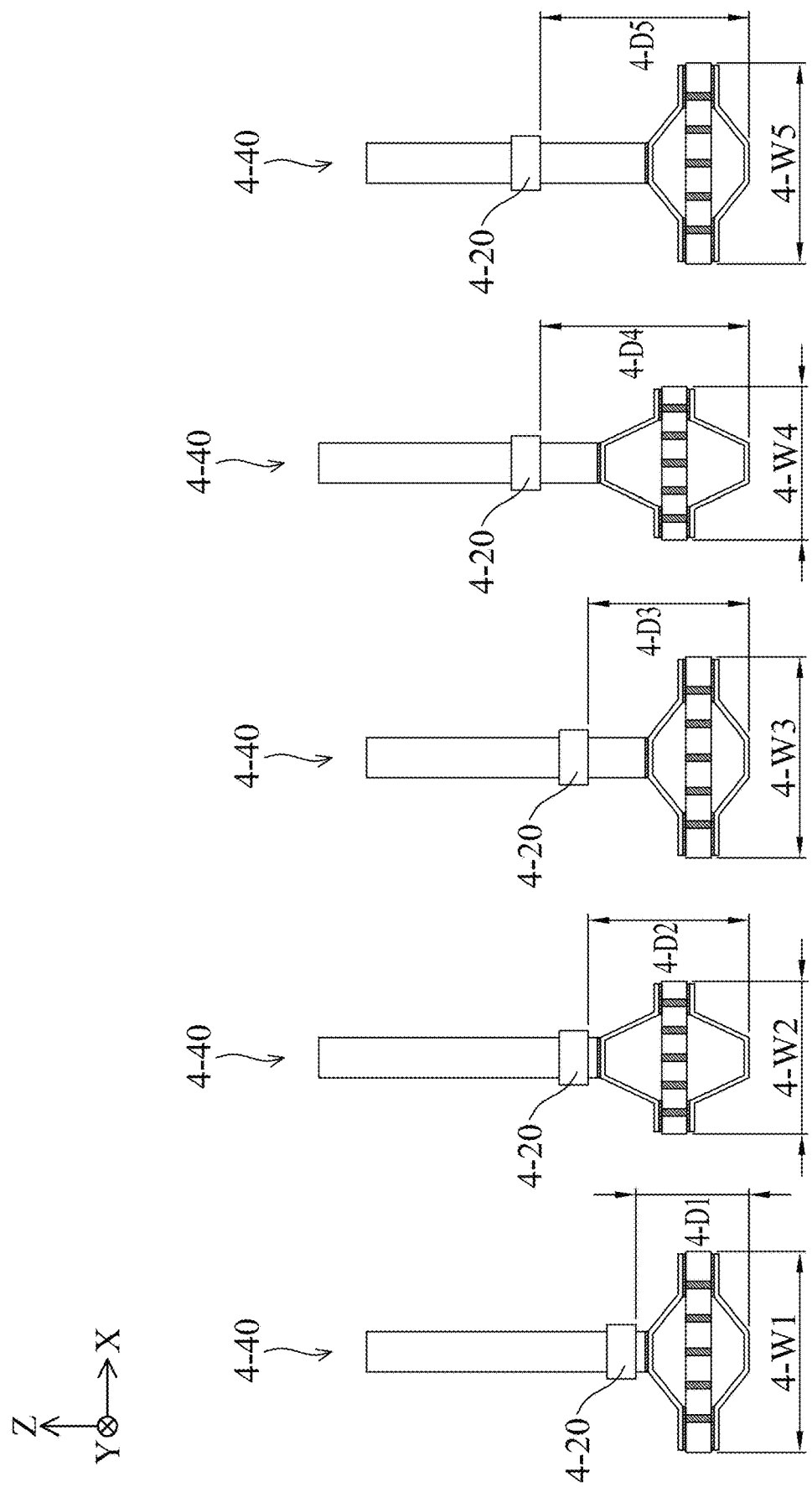

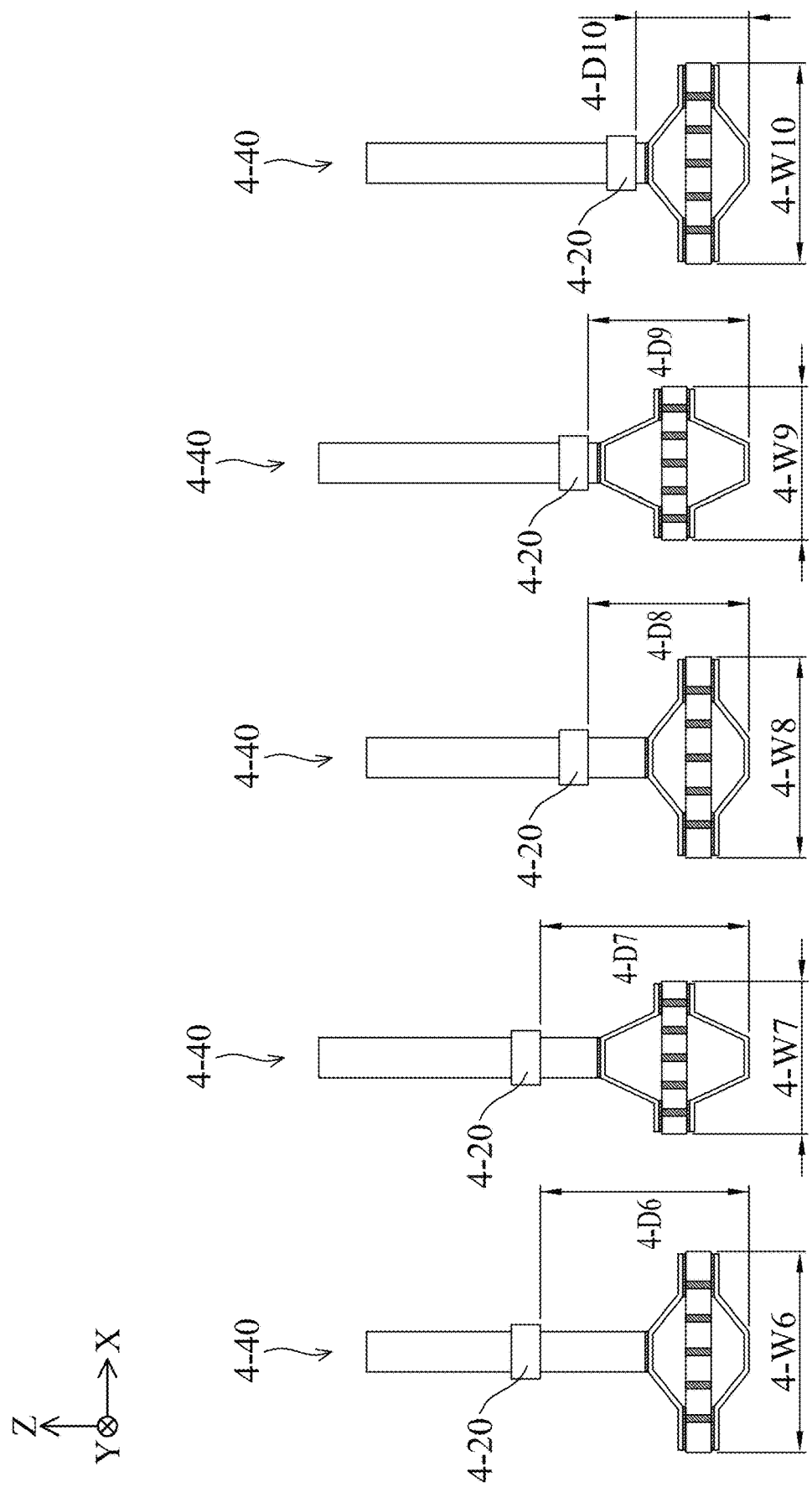

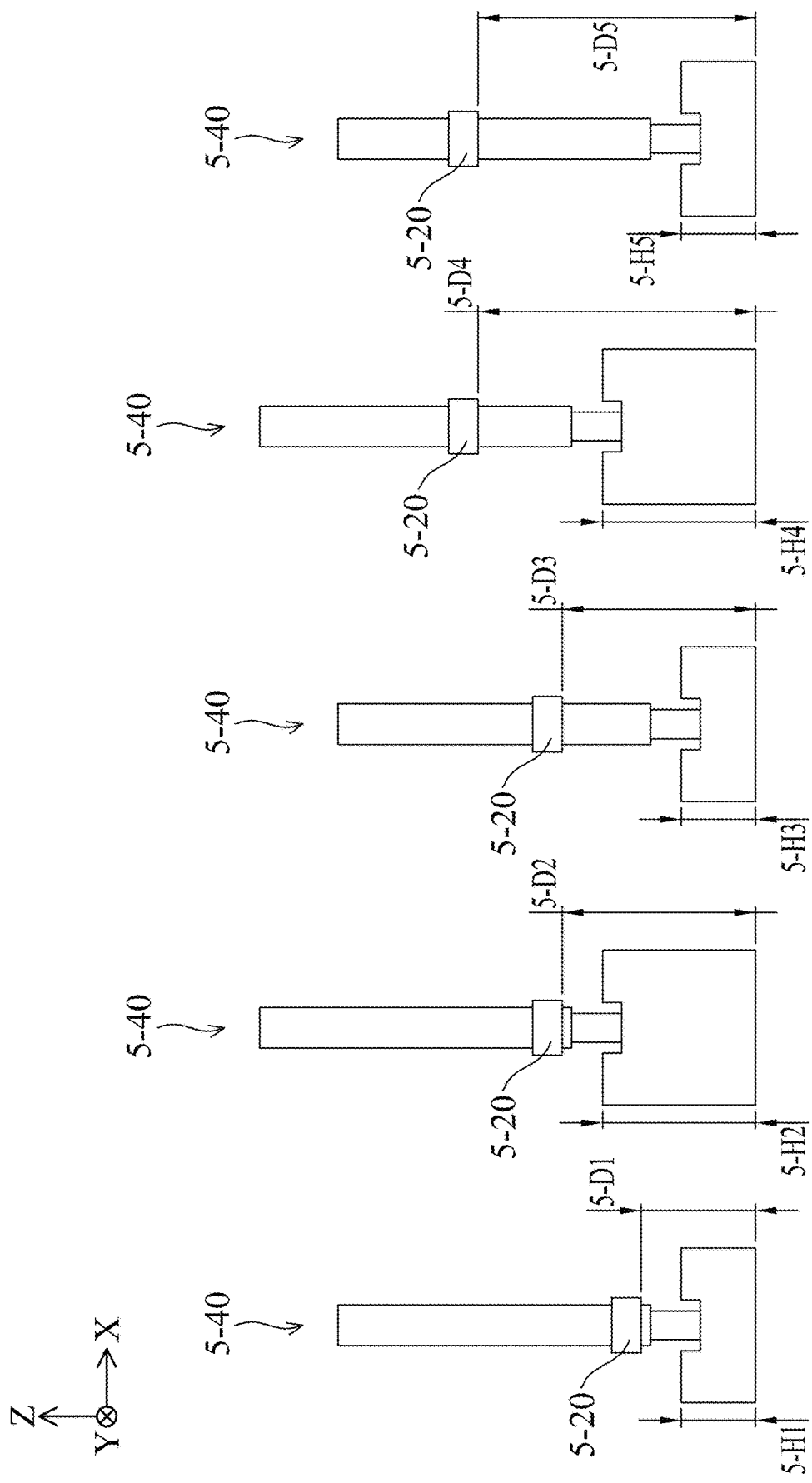

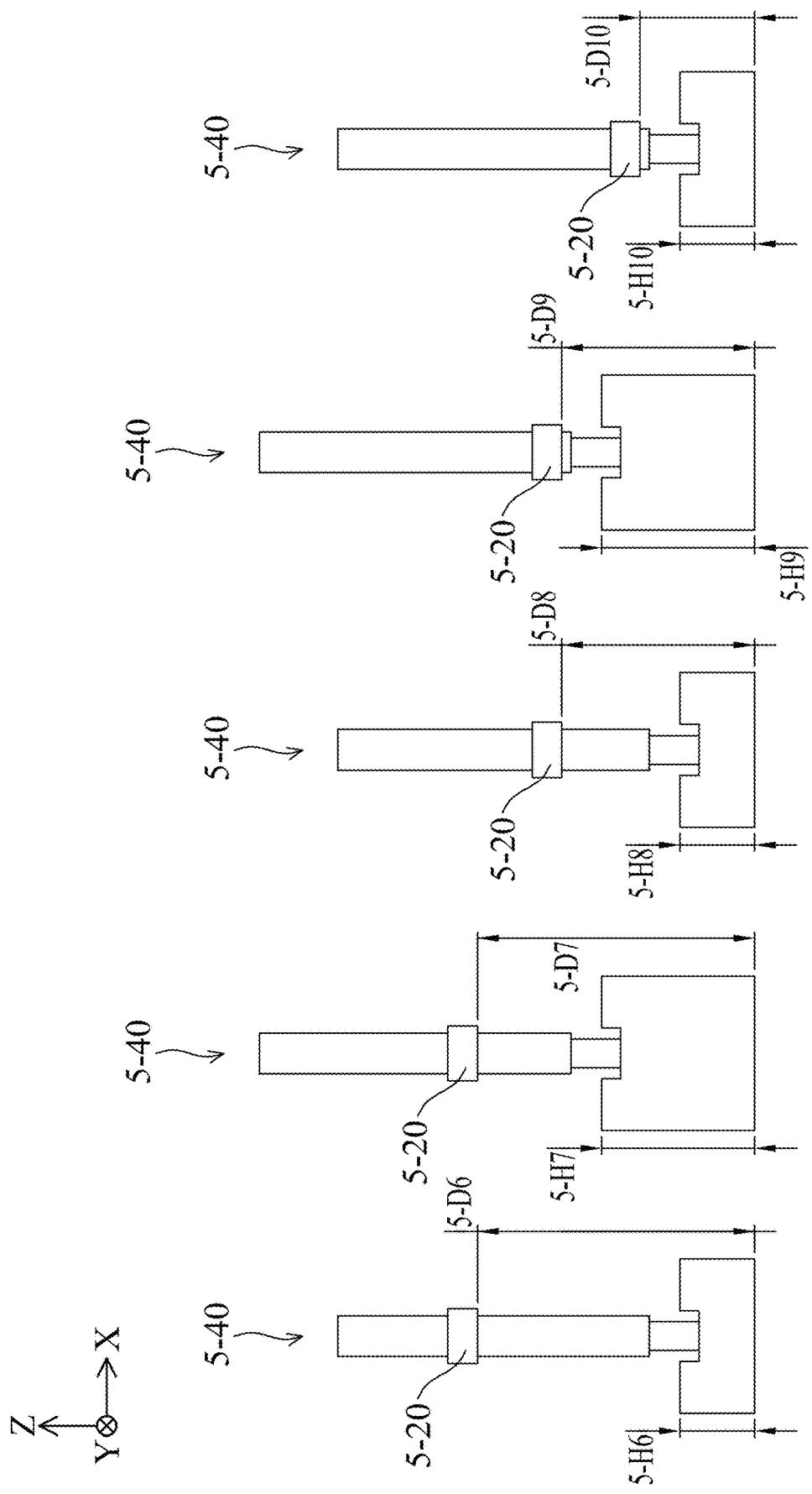

OPTICAL SYSTEM

CROSS REFERENCE TO RELATED APPLICATIONS

The present application claims priority to U.S. Provisional Patent Application No. 62/861,440, filed on Jun. 14, 2019, No. 62/879,190, filed on Jul. 26, 2019, No. 62/882,165, filed on Aug. 2, 2019, No. 62/899,423, filed on Sep. 12, 2019, No. 62/929,280, filed on Nov. 1, 2019, No. 62/986,039, filed on Mar. 6, 2020, which are incorporated by reference herein in their entirety.

BACKGROUND OF THE DISCLOSURE

Field of the Disclosure

The present disclosure relates to an optical system, and, in particular, to an optical system having piezoelectric driving assembly.

Description of the Related Art

As technology has developed, it has become more common to include image capturing or recording functions into many types of modern electronic devices, such as smartphones and digital cameras. These electronic devices are used more and more often, and new models have been developed that are convenient, thin, and lightweight, and provide consumers with more choice.

Electronic devices that have image capturing or recording functions normally include a driving mechanism to drive an optical element (e.g. a lens) to move along its optical axis, thereby achieving auto focus (AF) or optical image stabilization (OIS). Light may pass through the optical element and may form an image on an optical sensor. However, the current trend in modern mobile devices is to have a smaller size and a higher durability. As a result, how to effectively reduce the size of the driving mechanism and how to increase its durability has become an important issue. Furthermore, producing an electronic device that can capture images from different directions is also an important issue in the industry.

BRIEF SUMMARY OF THE DISCLOSURE

An optical system is provided. The optical system includes a first optical module. The first optical module includes a fixed portion, a movable portion, a driving assembly, and a circuit assembly. The movable portion is movably connected to the fixed portion, and the movable portion is used to connect to an optical element. The driving assembly is used to drive the movable portion to move relative to the fixed portion. The circuit assembly is electrically connected to the driving assembly.

In some embodiments, the driving assembly is used for rotating the movable portion relative to the fixed portion. The rotational axis of the movable portion extends in the first direction. The driving assembly includes a driving source for generating a first driving force. The driving source includes a first piezoelectric element, a resilient element disposed on the first piezoelectric element, and a transmission element for transmitting the first driving force. The transmission element has an elongated shape and extends in a second direction, and the first direction and the second direction are not parallel.

In some embodiments, the first optical module further includes a pressing assembly for applying pressure to the driving assembly. The driving assembly and the movable portion are arranged in the direction of the pressure, and the direction of the pressure is not parallel to the first direction.

In some embodiments, the pressing assembly includes a pressing element having resilient structure, and an adjusting element for adjusting the value or the direction of the pressure. The adjusting element includes a thread structure.

In some embodiments, the first optical module further includes a frame, the driving assembly is disposed on the frame. The frame includes a main body, a first leaning portion disposed on the main body and corresponding to the pressure assembly, a second leaning portion disposed on the main body and corresponding to the pressure assembly, a first through hole positioned on the first leaning portion, and a second through hole positioned on the second leaning portion. At least a portion of the transmission element is accommodated in the first through hole.

In some embodiments, at least a portion of the transmission element is accommodated in the second through hole, and the first leaning portion and the second leaning portion are arranged in a direction that is parallel to the second direction.

In some embodiments, the frame is movably connected to the fixed portion. The frame includes a protruding structure and an accommodating structure. The protruding structure is disposed on the main body. At least a portion of the protruding structure is accommodated in the accommodating structure.

In some embodiments, a gap is formed between the protruding structure and the accommodating structure. The accommodating structure, the gap, and the protruding structure are arranged in the direction of the pressure.

In some embodiments, the first optical module further includes a first bonding element, a second bonding element, and a third bonding element. The transmission element is connected to the driving source via the first bonding element. The resilient element is connected to the first piezoelectric element via the second bonding element. The transmission element is connected to the frame via the third bonding element.

In some embodiments, the Young's modulus of the first bonding element is greater than the Young's modulus of the second bonding element. The Young's modulus of the first bonding element is greater than the Young's modulus of the third bonding element.

In some embodiments, the Young's modulus of the second bonding element is greater than the Young's modulus of the third bonding element.

In some embodiments, the first optical module further includes a position sensing assembly for detecting the movement of the movable portion relative to the fixed portion. The position sensing assembly at least partially disposed on the circuit assembly.

In some embodiments, the circuit assembly includes a first circuit element electrically connected to the driving assembly and a second circuit element. The first circuit element and the second circuit element are arranged in the first direction.

In some embodiments, the circuit assembly further includes a control element, a power source, a wireless communication element, a passive element, a first spacer, and an interference-suppressing element. The control element is disposed on the second circuit element. The control element is used for controlling the driving assembly. The power source is disposed on the second circuit element, wherein the power source is used for providing power. The wireless communication element is disposed on the second circuit element, wherein the wireless communication element is used for emitting a signal to an external apparatus. The passive element is disposed on the second circuit element. The first spacer is disposed between the first circuit element and the second circuit element. The interference-suppressing element is disposed between the position sensing assembly and the second circuit element, and disposed between the first circuit element and the second circuit element.

In some embodiments, wherein the first circuit element and the second circuit element are plate-shaped and parallel to each other, a gap is formed between the first circuit element and the second circuit element, and the first circuit element is closer to the movable portion than the second circuit element.

In some embodiments, wherein the fixed portion includes a blocking plate, a first case, and a second case. The blocking plate is disposed between the optical element and the driving assembly. The movable portion includes a rotational axis penetrating the blocking plate. The first case surrounds the circuit assembly. The second case surrounds the optical element. The second case includes transparent material, the optical element is used for adjusting the direction of the optical axis of incident light from the incident direction to the exit direction, and the incident direction is not parallel to the exit direction.

In some embodiments, the optical system further includes a second optical module corresponding to the first optical module. The second optical module includes a lens and a photosensitive element corresponding to the lens. The lens and the photosensitive element are arranged in the exit direction, and the exit direction is parallel to the first direction.

In some embodiments, the optical element is positioned between the second optical module and the driving assembly, and the driving assembly is positioned between the second optical module and the circuit assembly.

In some embodiments, the second case does not overlap the second optical module when viewed in a direction that is perpendicular to the first direction.

In some embodiments, the second optical module is electrically connected to an external circuit, the second optical module is electrically isolated from the circuit assembly, and the second optical module is electrically isolated from the power source.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 32A to FIG. 32E are schematic views of a method in which the movable portion is driven by the driving assembly in Y direction.

FIG. 33A to FIG. 33E are schematic views of a method in which the movable portion is driven by the driving assembly in -Y direction.

FIG. 56A to FIG. 56E are schematic views of a method in which the driving assembly drives the movable portion to move in the Y direction.

FIG. 57A to FIG. 57E are schematic views of a method in which the driving assembly drives the movable portion to move in the -Y direction.

DETAILED DESCRIPTION OF THE DISCLOSURE

Figure 1:
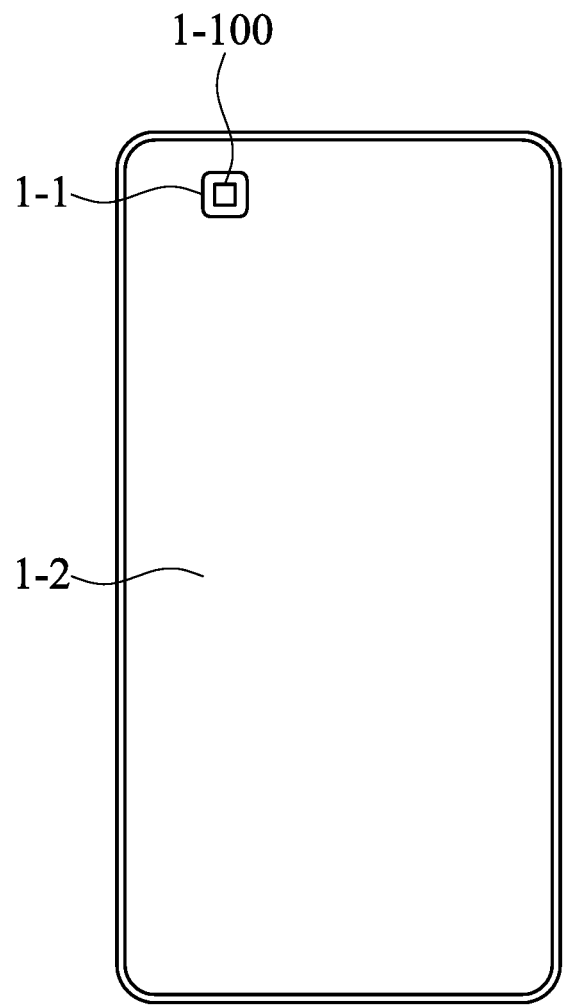
FIG. 1 shows an electronic device having a driving assembly mounted within an optical element driving mechanism, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

Firstly, please refer to FIG. 1, an driving assembly 1-100 of an embodiment of the present disclosure may be mounted in an optical element driving mechanism 1-1 for driving an optical element. Moreover, the optical element driving mechanism 1-1 may be mounted within an electrical device 1-2 for taking photos or videos, wherein the aforementioned electrical device 1-2 may, for example, be a smartphone or a digital camera, but the present disclosure is not limited to these. It should be noted that the position and the size between the driving assembly 1-100, the optical element driving mechanism 1-1 and the electrical device 1-2 shown in FIG. 1 are only an example, which is not for limiting the position and the size between the driving assembly 1-100, the optical element driving mechanism 1-1 and the electrical device 1-2. In fact, according to different needs, the driving assembly 1-100 may be mounted at different positions in the optical element driving mechanism 1-1, and the optical element driving mechanism 1-1 may be mounted at different positions in the electrical device 1-2.

Figure 2:
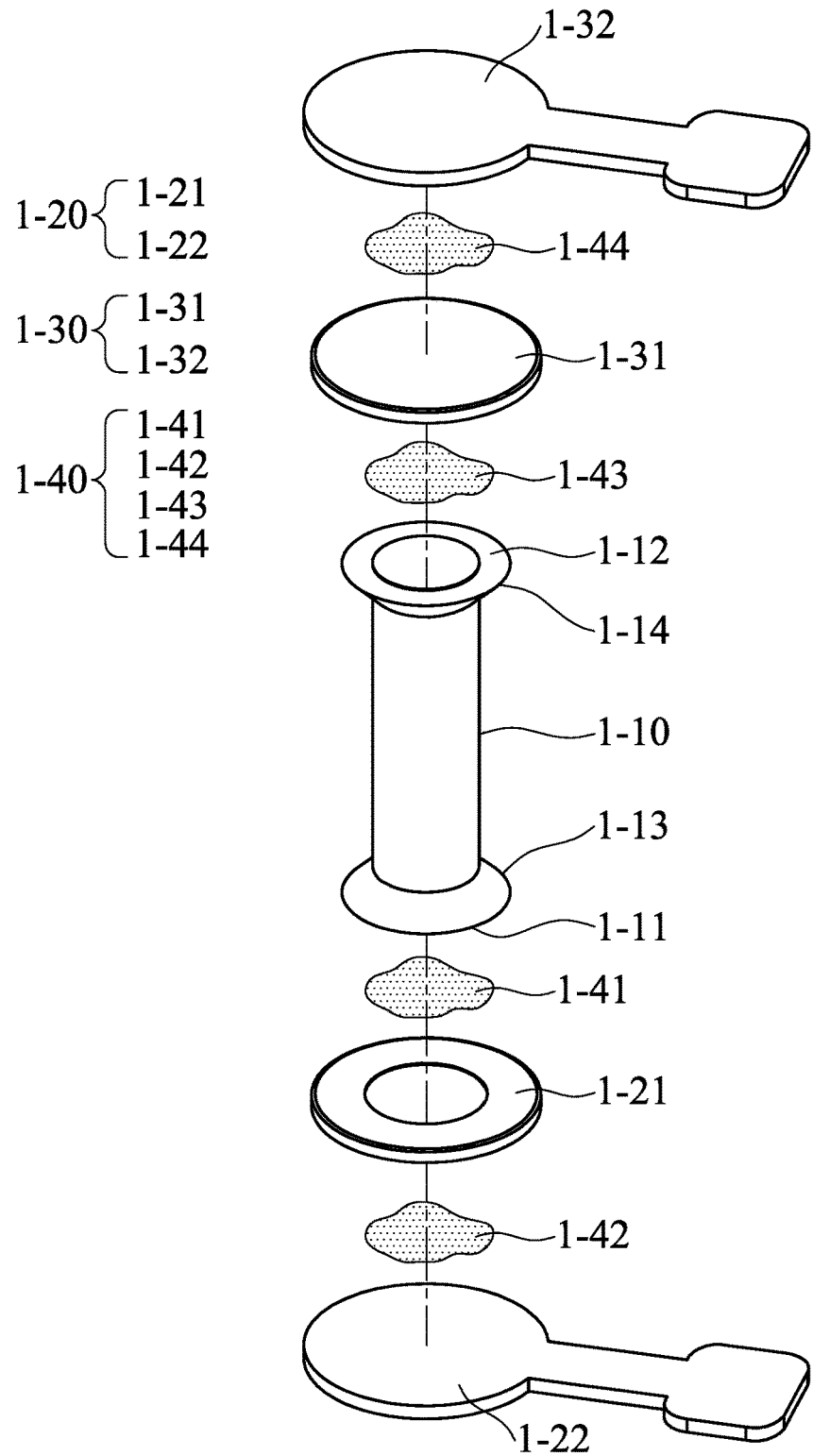
FIG. 2 is an exploded view of the driving assembly according to an embodiment of the present disclosure.

Please refer to FIG. 2, the driving assembly 1-100 includes a transmission element 1-10, a first driving source 1-20, a second driving source 1-30 and an adhesive element 1-40. The transmission element 1-10 has a first end 1-11, a second end 1-12, a first connection point 1-13 and a second connection point 1-14. The first driving source 1-20 includes a first piezoelectric element 1-21 and a first elastic element 1-22. The second driving source 1-30 includes a second piezoelectric element 1-31 and a second elastic element 1-32. The adhesive element 1-40 include a first adhesive element 1-41, a second adhesive element 1-42, a third adhesive element 1-43, and a fourth adhesive element 1-44.

Figure 3:
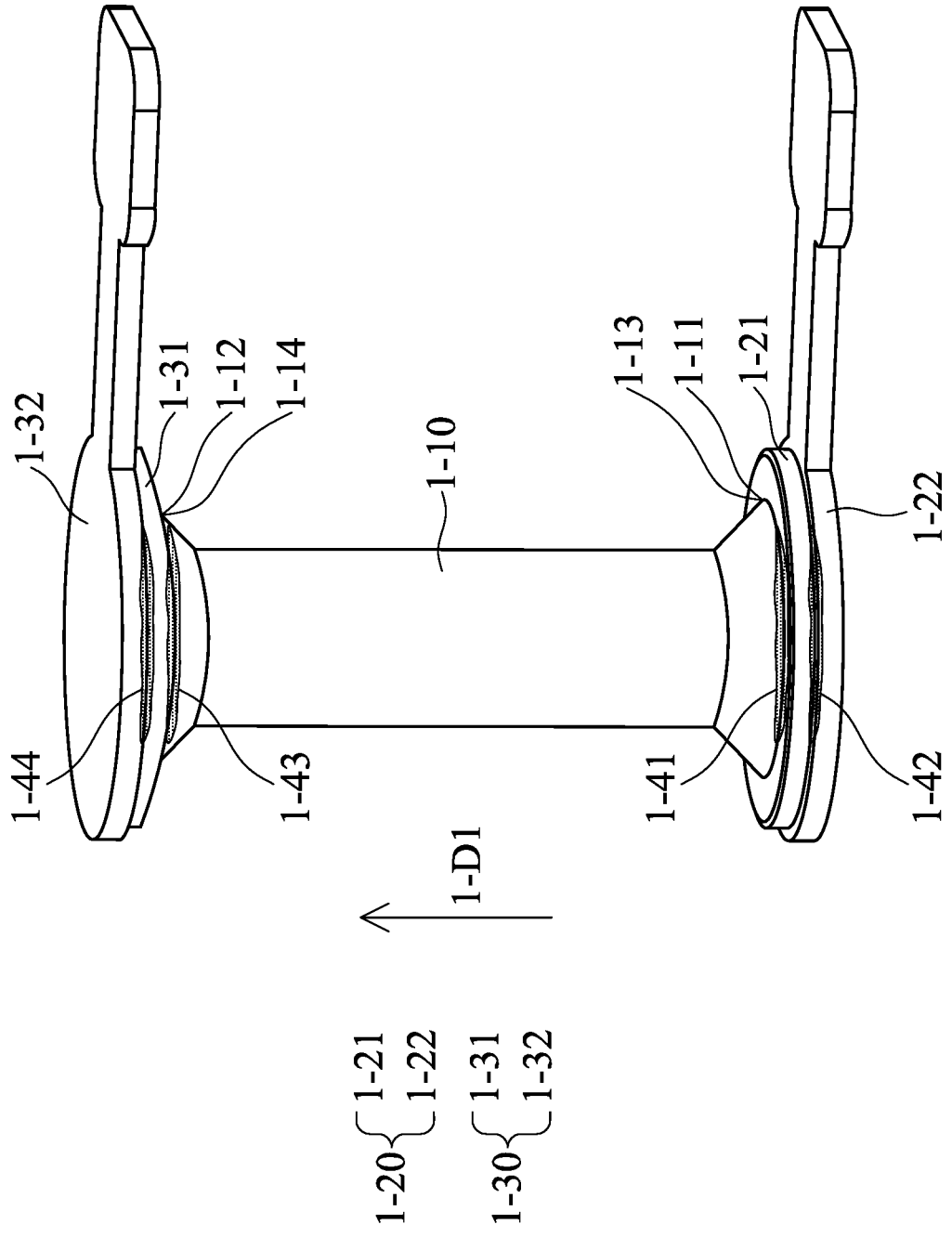
FIG. 3 is a perspective view of the driving assembly according to an embodiment of the present disclosure.

Please refer to FIG. 3, the transmission element 1-10 has an elongated structure, and the transmission element 1-10 extends in a first direction 1-D1. The first connection point 1-13 is adjacent to the first end 1-11, and the second connection point 1-14 is adjacent to the second end 1-12. In other words, the shortest distance between the first connection point 1-13 and the first end 1-11 is smaller than the shortest distance between the first connection point 1-13 and the second end 1-12; moreover, the shortest distance between the second connection point 1-14 and the first end 1-11 is greater than the shortest distance between the second connection point 1-14 and the second end 1-12. The first driving source 1-20 is at least partially fixedly connected to the transmission element 1-10 at the first connection point 1-13 to output a first driving force to the transmission element 1-10. The second driving source 1-30 is at least partially fixedly connected to the transmission element 1-10 at the second connection point 1-14 to output a second driving force to the transmission element 1-10. It should be noted that the first driving source 1-20 is not directly connected to the second driving source 1-30. In fact, the first driving source 1-20 is at least partially fixedly connected to the second driving source 1-30 via the transmission element 1-10. Moreover, the first driving source 1-20 and the second driving source 1-30 are respectively located on opposite sides of the transmission element 1-10. The first driving source 1-20 and the second driving source 1-30 are arranged along the first direction 1-D1. In other words, the first driving source 1-20, the second driving source 1-30 and the transmission element 1-10 at least partially overlap when viewed from the first direction 1-D1 along which the first driving source 1-20 and the second driving source 1-30 are arranged.

In the embodiment shown in FIG. 3, the first piezoelectric element 1-21 is disposed on the first elastic element 1-22, and the second elastic element 1-32 is disposed on the second piezoelectric element 1-31. That is, the first piezoelectric element 1-21 is located between the transmission element 1-10 and the first elastic element 1-22, and the second piezoelectric element 1-31 is located between the transmission element 1-10 and the second elastic element 1-32.

However, in other embodiments (not shown), the first elastic element 1-22 may be disposed on the first piezoelectric element 1-21, and the second piezoelectric element 1-31 may be disposed on the second the elastic element 1-32. In other words, the first elastic element 1-22 may be located between the transmission element 1-10 and the first piezoelectric element 1-21, and the second elastic element 1-32 may be located between the transmission element 1-10 and the second piezoelectric element 1-31.

Please refer to FIG. 3, the transmission element 1-10 is connected to the first driving source 1-20 via the first adhesive element 1-41. The first piezoelectric element 1-21 is connected to the first elastic element 1-22 via the second adhesive element 1-42. The transmission element 1-10 is also connected to the second driving source 1-30 via a third adhesive element 1-43. The second piezoelectric element 1-31 is connected to the second elastic element 1-32 via a fourth adhesive element 1-44.

A first rigidity of the first adhesive element 1-41 is different from a second rigidity of the second adhesive element 1-42, and a third rigidity of the third adhesive element 1-43 is different from a fourth rigidity of the fourth adhesive element 1-44. More specifically, the first rigidity is greater than the second rigidity, the first rigidity is greater than the fourth rigidity, the third rigidity is greater than the second rigidity, the third rigidity is greater than the fourth rigidity, the first rigidity is substantially equal to the third rigidity, and the second rigidity is substantially equal to the fourth rigidity. It should be noted that the first rigidity, the second rigidity, the third rigidity, and the fourth rigidity discussed herein may be the strain coefficients of the adhesive elements.

Figure 4:
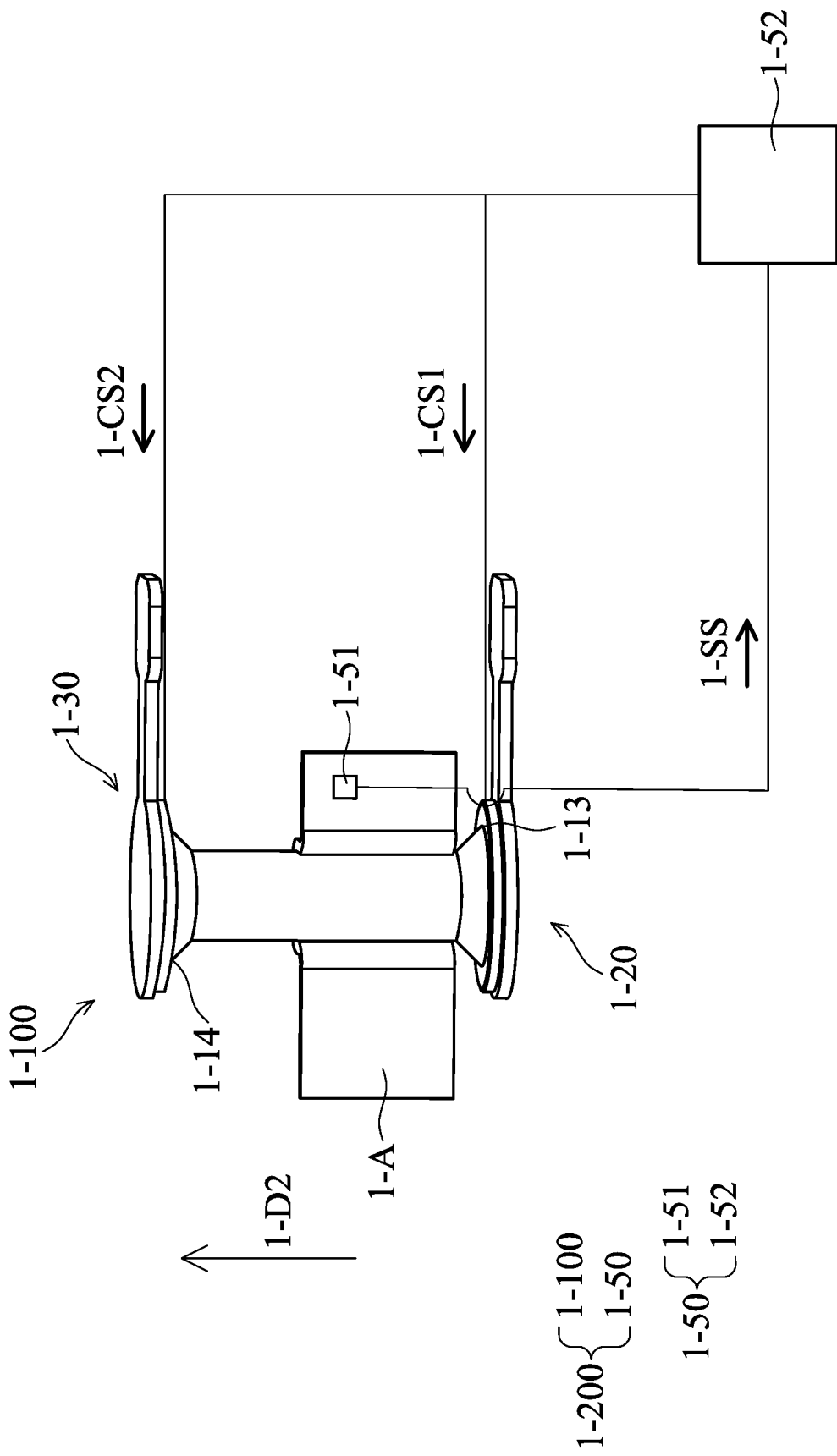
FIG. 4 is a perspective view of a driving system according to an embodiment of the present disclosure.

Please refer to FIG. 4, a driving system 1-200 of one embodiment of the present disclosure includes the driving assembly 1-100 and a control system 1-50. The control system 1-50 includes a sensing element 1-51 and a control unit 1-52.

The driving assembly 1-100 is matched with the control system 1-50. The sensing element 1-51 of the control system 1-50 may be disposed on an external element 1-A (the external element 1-A may be connected to the optical element) connected to the transmission member 1-10, to sense the displacement of the external element 1-A, and the sensing element 1-51 outputs a sensing signal 1-SS (shown as an arrow) to the control unit 1-52. The control unit 1-52 outputs a first control signal 1-CS1 (shown as an arrow) to the first driving source 1-20 and outputs a second control signal 1-CS2 (shown as an arrow) to the second driving source 1-30 after receiving the sensing signal 1-SS. The first control signal 1-CS1 and the second control signal 1-CS2 discussed herein may be voltage signals.

The first driving source 1-20 drives the first connection point 1-13 to move after the first driving source 1-20 receives the first control signal 1-CS1. The second driving source 1-30 drives the second connection point 1-14 to move after the second driving source 1-30 receives the second control signal 1-CS2. Furthermore, at the same time point, a first moving direction of the movement of the first connection point 1-13 driven by the first driving source 1-20 is not opposite to a second moving direction of the movement of the second connection point 1-14 driven by the second driving source 1-30. In other words, at a first time point, the first moving direction is not opposite to the second moving direction. More specifically, in the embodiment shown in FIG. 4, at the first time point, the first driving source 1-20 drives the first connection point 1-13 to move in a second direction 1-D2 after receiving the first control signal 1-CS1; moreover, at the first time point, the second driving source 1-30 drives the second connection point 1-14 to move along the second direction 1-D2 after receiving the second control signal 1-CS2.

The driving assembly 1-100 has a resonance frequency. The first driving source 1-20 has a first resonance frequency, and the second driving source 1-30 has a second resonance frequency. The first resonance frequency is different from the second resonance frequency. The first control signal 1-CS1 has a first frequency, the second control signal 1-CS2 has a second frequency, and the first frequency is different from the second frequency.

In one embodiment, the first frequency is lower than the first resonance frequency, and the second frequency is lower than the second resonance frequency. Therefore, the first control signal 1-CS1 and the second control signal 1-CS2 may enable the first driving source 1-20 and the second driving source 1-30 to drive the transmission element 1-10 more efficiently.

In one embodiment, the first frequency is lower than the resonance frequency, and the second frequency is lower than the resonance frequency. Therefore, the first control signal 1-CS1 and the second control signal 1-CS2 may enable the first driving source 1-20 and the second driving source 1-30 to drive the transmission element 1-10 more efficiently.

Figure 5:
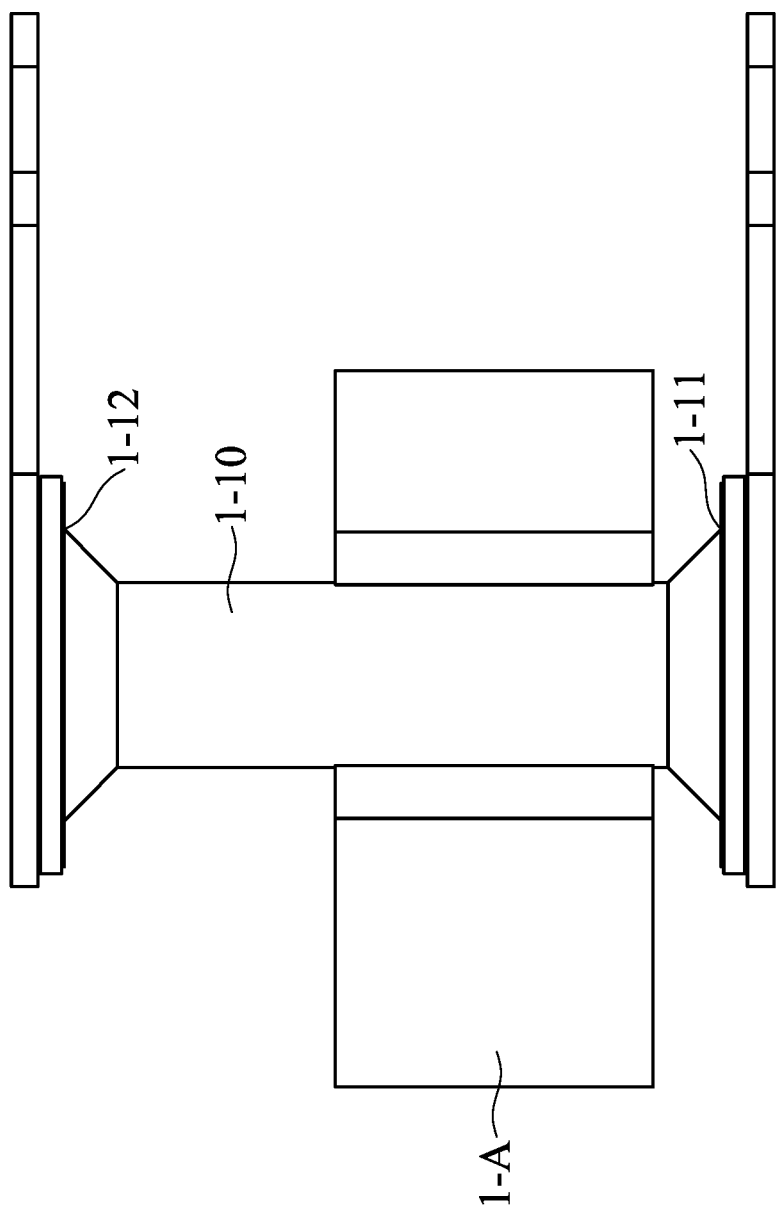
FIG. 5 shows the driving assembly in a first mode according to an embodiment of the present disclosure.
Figure 6:
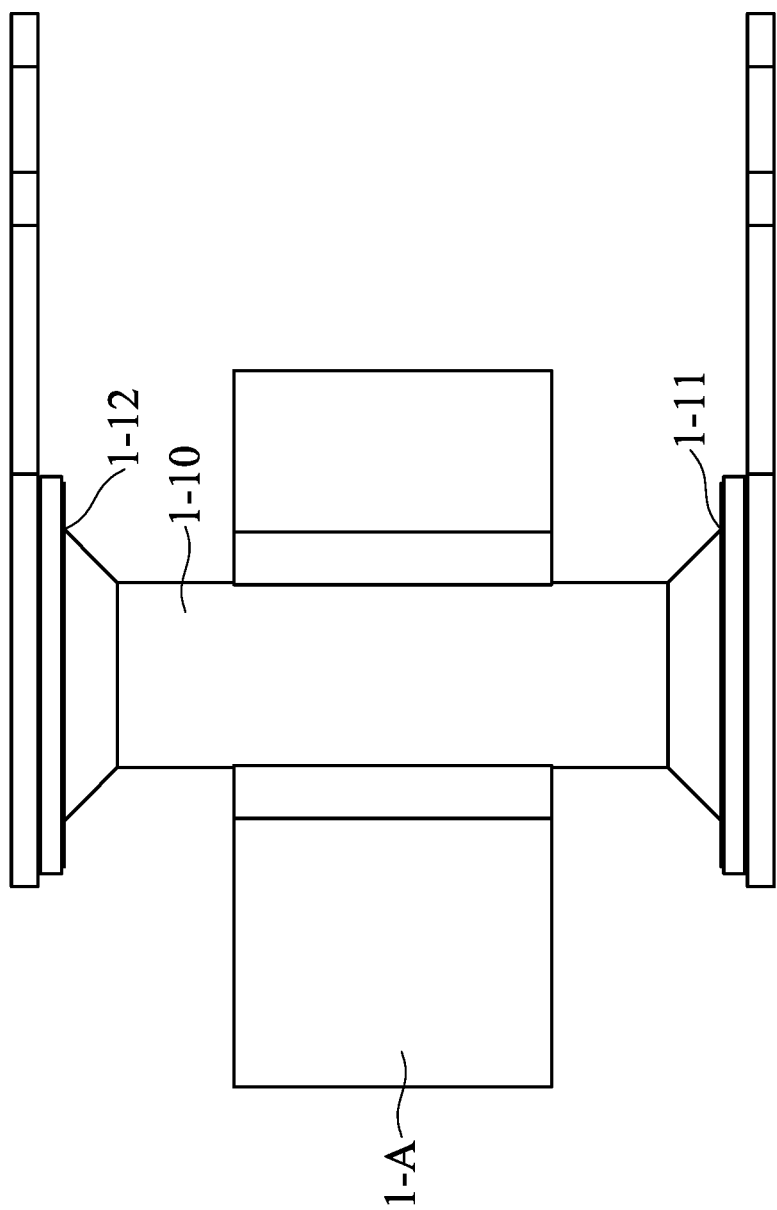
FIG. 6 shows the driving assembly in a second mode according to an embodiment of the present disclosure.
Figure 7:
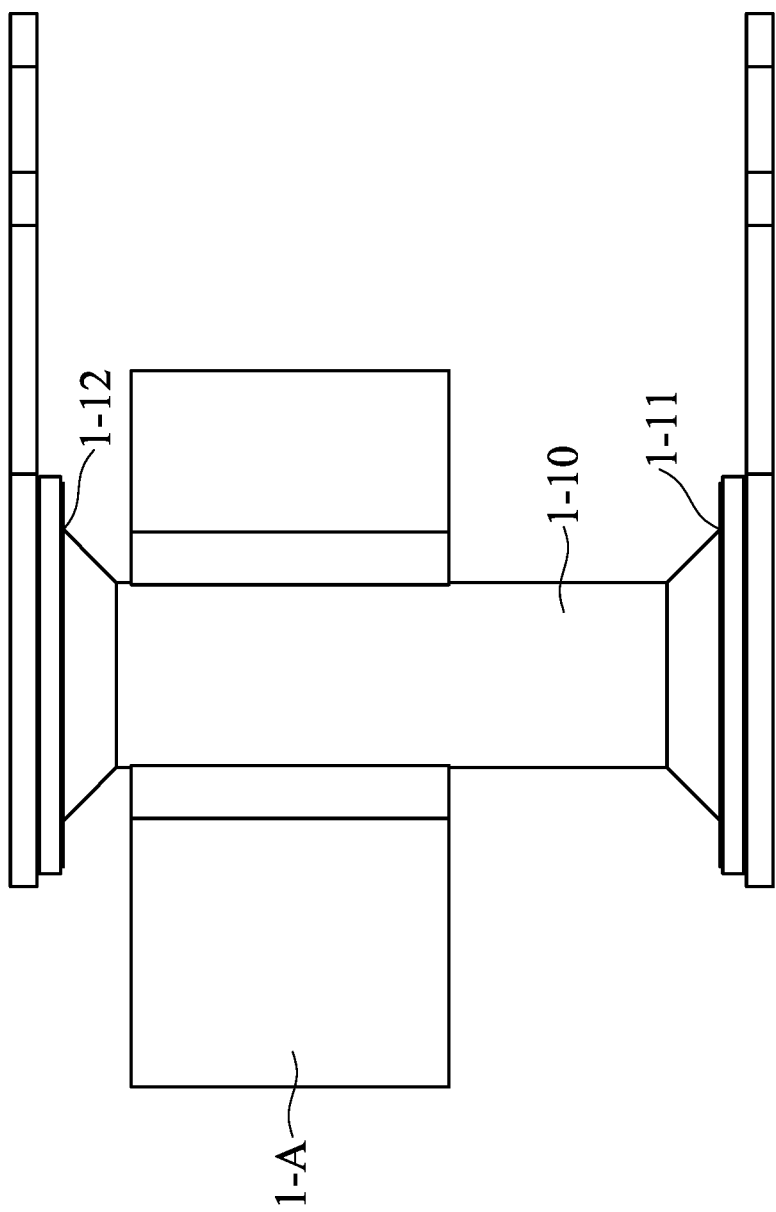
FIG. 7 shows the driving assembly in a third mode according to an embodiment of the present disclosure.

Please refer to FIG. 5 to FIG. 7, the driving system 1-200 further includes a first mode, a second mode, and a third mode.

Please refer to FIG. 5, in the first mode, the external element 1-A connected to the transmission element 1-10 is adjacent to the first end 1-11 of the transmission element 1-10 (the distance between the external element 1-A and the first end 1-11 is smaller than the distance between the external element 1-A and the second end 1-12).

Please refer to FIG. 6, in the second mode, the external element 1-A connected to the transmission element 1-10 is substantially located in the middle of the transmission element 1-10 (the distance between the external element 1-A and the first end 1-11 is substantially equal to the distance between the external element 1-A and the second end 1-12).

Please refer to FIG. 7, in the third mode, the external element 1-A connected to the transmission element 1-10 is adjacent to the second end 1-12 of the transmission element 1-10 (the distance between the external element 1-A and the first end 1-11 is greater than the distance between the external element 1-A and the second end 1-12).

In one embodiment, in the first mode, a first power of the first control signal 1-CS1 is lower than a second power of the second control signal 1-CS2. In the second mode, the first power of the first control signal 1-CS1 is substantially equal to the second power of the second control signal 1-CS2. In the third mode, the first power of the first control signal 1-CS1 is greater than the second power of the second control signal 1-CS2. Therefore, the transmission element 1-10 may be controlled with more efficiency, and the transmission element 1-10 may extend more efficiently to drive the optical element.

In one embodiment, in the first mode, the absolute value of the maximum value of a first voltage of the first control signal 1-CS1 is smaller than the absolute value of the maximum value of a second voltage of the second control signal 1-CS2. In the second mode, the absolute value of the maximum value of the first voltage of the first control signal 1-CS1 is substantially equal to the absolute value of the maximum value of the second voltage of the second control signal 1-CS2. In the third mode, the absolute value of the maximum value of the first voltage of the first control signal 1-CS1 is greater than the absolute value of the maximum value of the second voltage of the second control signal 1-CS2. Therefore, the transmission element 1-10 may be controlled with more efficiency, and the transmission element 1-10 may extend with more efficiency to drive the optical element.

In one embodiment, in the first mode, the maximum value of the first frequency of the first control signal 1-CS1 is smaller than the maximum value of the second frequency of the second control signal 1-CS2. In the second mode, the maximum value of the first frequency of the first control signal 1-CS1 is substantially equal to the maximum value of the second frequency of the second control signal 1-CS2. In the third mode, the maximum value of the first frequency of the first control signal 1-CS1 is greater than the maximum value of the second frequency of the second control signal 1-CS2. Therefore, the transmission element 1-10 may be controlled with more efficiency, and the transmission element 1-10 may extend with more efficiency to drive the optical element.

In summary, the driving assemblies and the driving systems disclosed in the embodiments of the present disclosure may control the transmission element with more efficiency by providing control signals with different power, voltage or frequencies to the first driving source or the second driving source. Furthermore, compared to the conventional driving assemblies and driving systems, the driving assemblies and the driving systems disclosed in the embodiments of the present disclosure may drive external elements or optical elements more quickly, and may move external elements or optical elements to desire positions more precisely.

Figure 8:
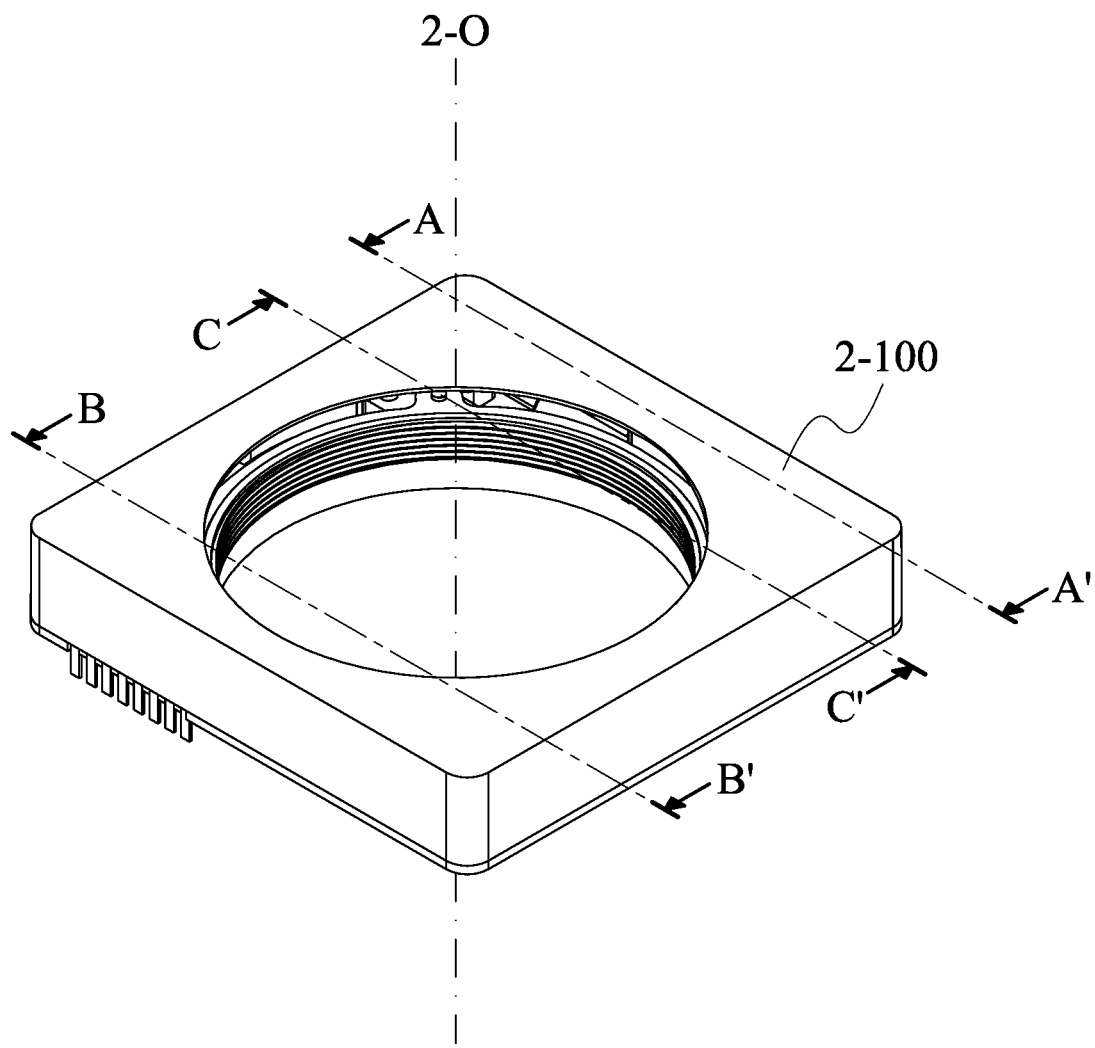
FIG. 8 is a perspective view of an optical element driving mechanism according to an embodiment of the present disclosure.
Figure 9:
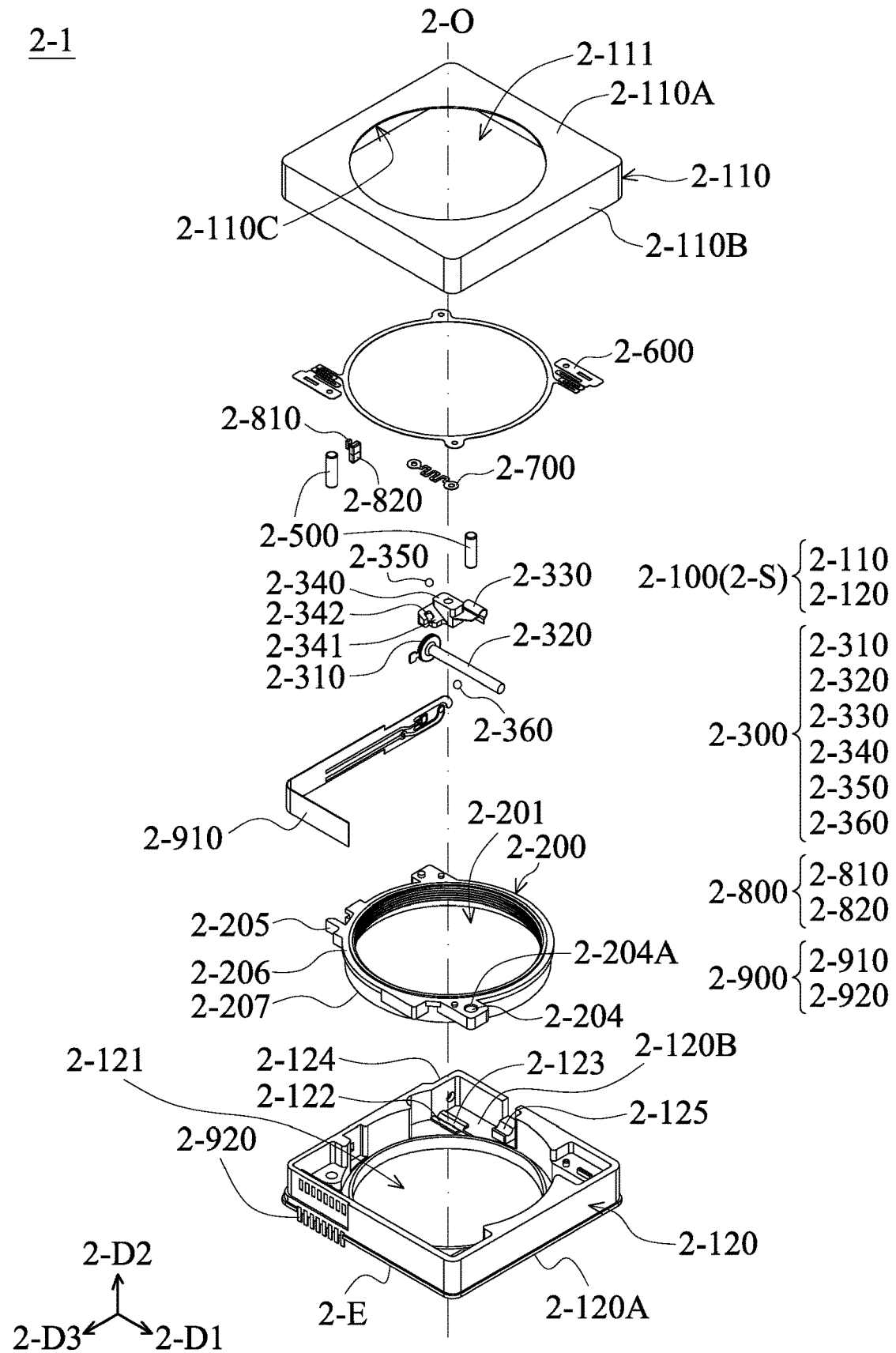
FIG. 9 is an exploded view of an optical element driving mechanism according to an embodiment of the present disclosure.

Refer to FIG. 8 to FIG. 9. FIG. 8 is a perspective view of the optical element driving mechanism 2-1 according to an embodiment of the present disclosure. FIG. 9 is an exploded view of the optical element driving mechanism 2-1 according to an embodiment of the present disclosure. The optical element driving mechanism 2-1 has an optical axis 2-0, and includes a fixed portion 2-100, a movable portion 2-200, a driving assembly 2-300, and a bonding element 2-400 (refer to FIG. 14), two guiding elements 2-500, a first elastic element 2-600, a second elastic element 2-700, a position sensing assembly 2-800, and a circuit assembly 2-900, wherein the driving element 2-300 is moved along a first direction 2-D1 to move the movable portion 2-200 along a second direction 2-D2. The first direction 2-D1 is different from the second direction 2-D2. In this embodiment, the first direction 2-D1 is perpendicular to the second direction 2-D2, and the second direction 2-D2 is parallel to the optical axis 2-0. In this embodiment, the optical element driving mechanism 2-1 has an auto focusing (AF) function, but is not limited to this. In some embodiments, the optical element driving mechanism 2-1 can also have auto focusing and optical image stabilization (OIS) functions.

The fixed portion 2-100 is a housing 2-S, including a top case 2-110 and a base 2-120. The top case 2-110 includes an outer top wall 2-110A, four side walls 2-110B, an inner top wall 2-110C, and a top case opening 2-111. The base 2-120 includes an outer bottom wall 2-120A, an inner bottom wall 2-120B, a base opening 2-121, a fixed-portion-sliding surface 2-122, a fixed-portion-sliding rail 2-123, a first connecting surface 2-124, and a second connecting surface 2-125. The top case 2-110 has a hollow structure, and can be combined with the base 2-120 to form a housing 2-S of the optical element driving mechanisms 2-1, wherein the top case 2-110 constitutes the outer top wall 2-110A and four side walls 2-110B of the housing 2-S, and the base 2-120 constitute the outer bottom wall 2-120A of the housing 2-S. It should be understood that the top case 2-110 and the base 2-120 are formed with a top case opening 2-111 and a base opening 2-121, respectively. The center of the top case opening 2-111 corresponds to the optical axis 2-0, and the base opening 2-121 corresponds to an image-sensing element (not shown in the figures) disposed outside the optical element driving mechanism 2-1. External light may enter the top case 2-110 through the top case opening 2-111, and is received by the image-sensing element (not shown in the figures) after passing through an optical element (not shown in the figures) and the base opening 2-121, so as to generate a digital image signal.

The movable portion 2-200 may be connected to the optical element, and moves relative to the fixed portion 2-100. In this embodiment, the movable portion 2-200 is a holder 2-200, which has a through hole 2-201, a movable-portion-sliding surface 2-202 (refer to FIG. 12), and a movable-portion-sliding rail 2-203 (refer to FIG. 12), a first chute 2-204, a second chute 2-205, a top surface 2-206, and a bottom surface 2-207, wherein the through hole 2-201 forms a threaded structure corresponding to another threaded structure on the outer peripheral surface of the optical element, so that the optical element may be secured in the through hole 2-201.

Figure 10:
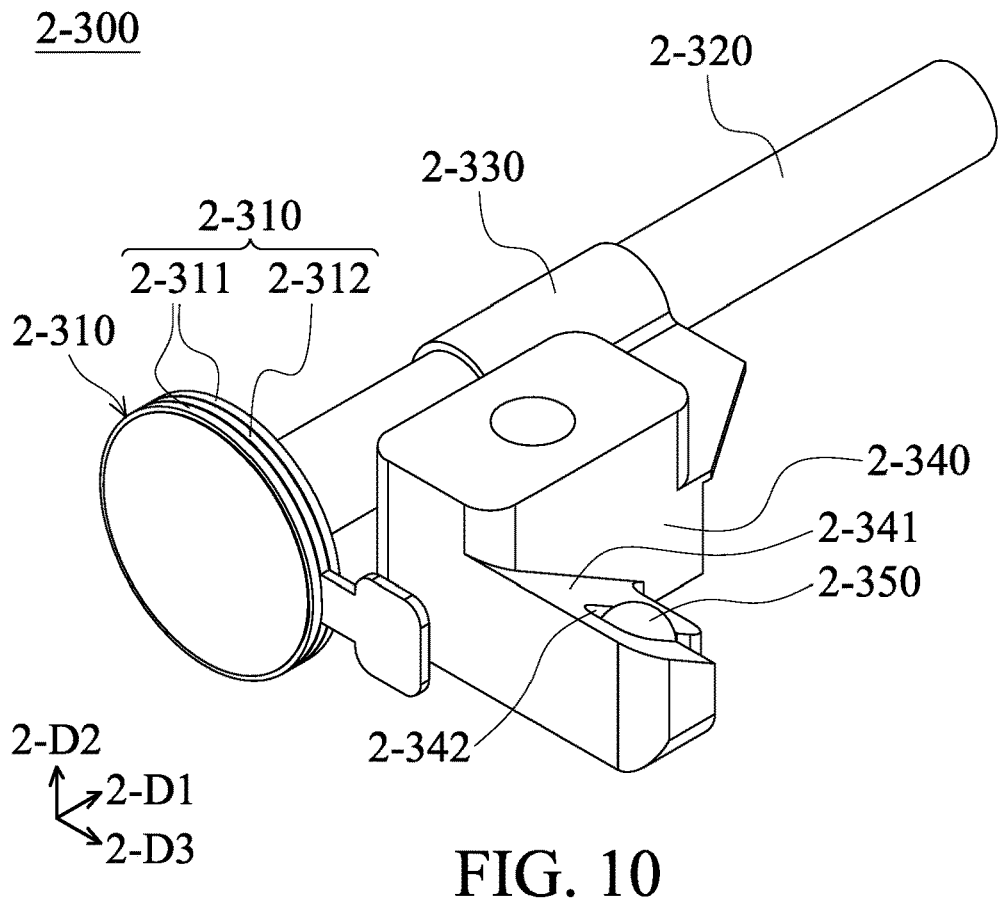
FIG. 10 is a schematic diagram of a driving assembly according to an embodiment of the present disclosure.
Figure 11:
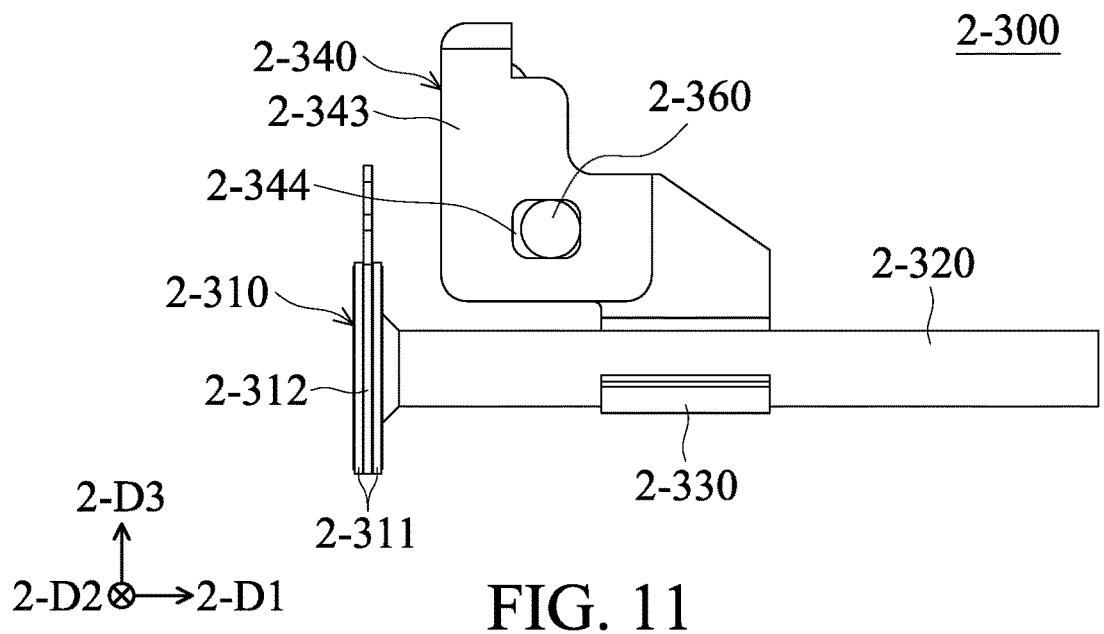
FIG. 11 is a schematic diagram of a different angle of a driving assembly according to an embodiment of the present disclosure.
Figure 12:
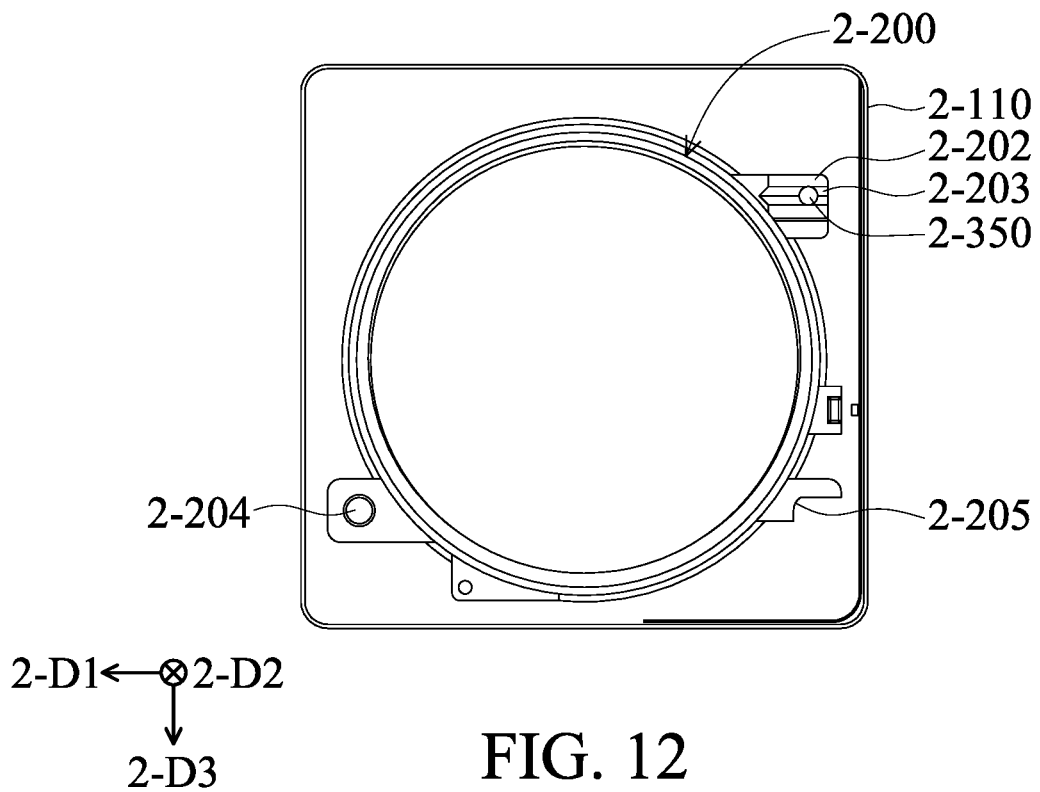
FIG. 12 is a bottom view of a partial structure of an optical element driving mechanism according to an embodiment of the present disclosure.
Figure 13:
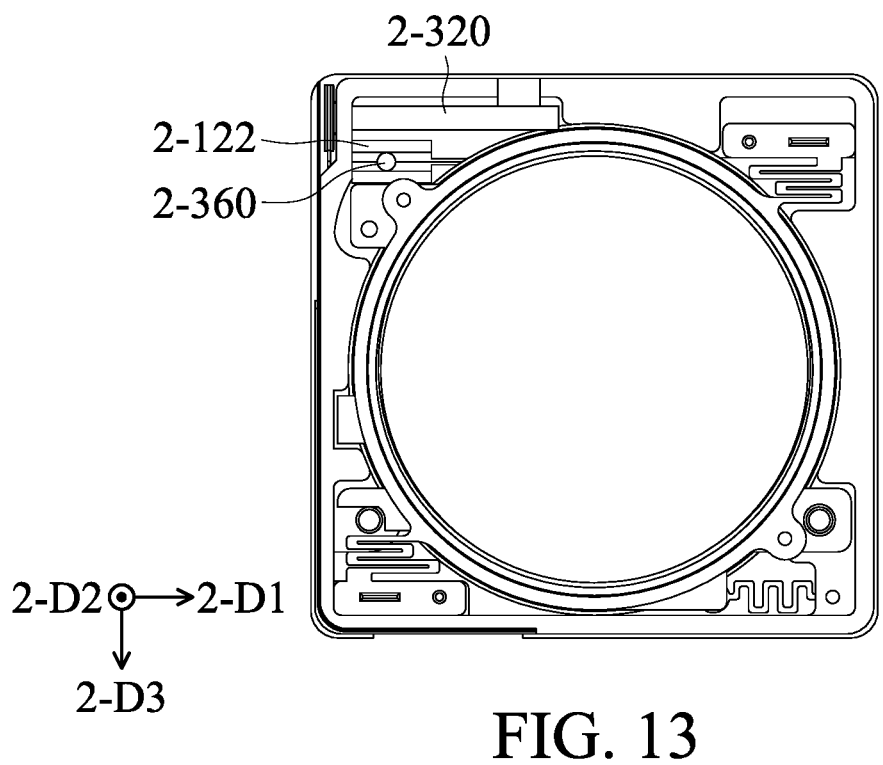
FIG. 13 is a top view of a partial structure of an optical element driving mechanism according to an embodiment of the present disclosure.

Refer to FIG. 9 to FIG. 13. FIG. 10 is a schematic diagram of the driving assembly 2-300 according to an embodiment of the present disclosure. FIG. 11 is schematic diagram of a different angle of the driving assembly 2-300 according to an embodiment of the present disclosure. FIG. 12 is a bottom view of a partial structure of the optical element driving mechanism 2-1 according to an embodiment of the present disclosure. FIG. 13 is a top view of a partial structure of the optical element driving mechanism 2-1 according to an embodiment of the present disclosure. The driving assembly 2-300 includes a piezoelectric element 2-310, a transmission element 2-320, a clamping element 2-330, a conversion element 2-340, a first intermediary element 2-350, and a second intermediary element 2-360. In this embodiment, the piezoelectric element 2-310 has a circular plate shape extending along a third direction 2-D3, the third direction 2-D3 is perpendicular to the first direction 2-D1, and the third direction 2-D3 is perpendicular to the second direction 2-D2. The piezoelectric element 2-310 includes two piezoelectric ceramic plates 2-311 and an elastic material sheet 2-312, and the elastic material sheet 2-312 is disposed between the two piezoelectric ceramic plates 2-311. The transmission element 2-320 is connected to the piezoelectric element 2-310. More specifically, the transmission element 2-320 is fixed to the center of the piezoelectric ceramic plate 2-311. The transmission element 2-320 is a long shaft with a cylindrical shape, and the direction of the long shaft is parallel to the first direction 2-D1. The clamping element 2-330 is disposed on the transmission element 2-320. The clamping element 2-330 uses an elastic material and has an arc shape. The arc shape matches the shape of the long shaft (the transmission element 2-320), so that the long shaft may pass through the clamping element 2-330, and the clamping element 2-330 may be clamped on the long shaft.

As shown in FIG. 10 and FIG. 11, the conversion element 2-340 is connected to the clamping element 2-330. More specifically, the clamping element 2-330 is formed in the conversion element 2-340 by inserting molding, but not limited to this. In some embodiments, the conversion element 2-340 and the clamping element 2-330 are integrally formed. The conversion element 2-340 has a conversion-element-first-sliding surface 2-341 and a conversion-element-second-sliding surface 2-343. The conversion-element-first-sliding surface 2-341 faces the movable-portion-sliding surface 2-202 (the movable-portion-sliding surface 2-202 is shown in FIG. 12), and the conversion-element-first-sliding surface 2-341 and the movable-portion-sliding surface 2-202 are not perpendicular or parallel to the first direction 2-D1, the second direction 2-D2, and the third direction 2-D3. The conversion-element-second-sliding surface 2-343 faces the fixed-portion-sliding surface 2-122 (the fixed-portion-sliding surface 2-122 is shown in FIG. 13), and the conversion-element-second-sliding surface 2-343 and the fixed-portion-sliding surface 2-122 are parallel to the first direction 2-D1.

The conversion-element-first-sliding surface 2-341 has a first groove 2-342, the movable-portion-sliding surface 2-202 has a movable-portion-sliding rail 2-203, and the extending direction of the movable-portion-sliding rail 2-203 is parallel to the movable-portion-sliding surface 2-202. The first groove 2-342 and the movable-portion-sliding rail 2-203 accommodate part of the first intermediary element 2-350 respectively. In other words, the first intermediary element 2-350 connects the conversion element 2-340 and the movable portion 2-200. In this embodiment, the first intermediary element 2-350 is a spherical metal or ceramic material, which is movably disposed between the first groove 2-342 and the movable-portion-sliding rail 2-203. The first groove 2-342 restricts the range of movement of the first intermediary element 2-350, and by the first intermediary element 2-350 moving in the movable-portion-sliding rail 2-203 may reduce the friction between the conversion-element-first-sliding surface 2-341 and the movable-portion-sliding surface 2-202. However, it is not limited to this. In some embodiments, the first intermediary element 2-350 may not be provided, and the friction between the two sliding surfaces may be reduced by changing the material of the sliding surfaces. In some embodiments, the first intermediary element 2-350 is fixedly disposed on the movable portion 2-200 or the conversion element 2-340. In addition, the positions of the groove and the sliding rail may be interchanged as required, or both the conversion element 2-340 and the movable portion 2-200 are designed with the sliding rails.

The second intermediary element 2-360 is disposed between the conversion element 2-340 and the fixed portion 2-100. More specifically, the conversion-element-second-sliding surface 2-343 has a second groove 2-344, and the fixed-portion-sliding surface 2-122 has a fixed-portion-sliding rail 2-123 extending along the first direction 2-D1. The second groove 2-344 and the fixed-portion-sliding rail 2-123 accommodate part of the second intermediary element 2-360 respectively. Similar to the first intermediary element 2-350, the second intermediary element 2-360 is movably disposed between the second groove 2-344 and the fixed-portion-sliding rail 2-123, and the second groove 2-344 restricts the range of movement of the second intermediary element 2-360, and by the second intermediary element 2-360 moving in the fixed-portion-sliding rail 2-123 may reduce the friction between the conversion-element-second-sliding surface 2-343 and the fixed-portion-sliding surface 2-122.

Figure 14:
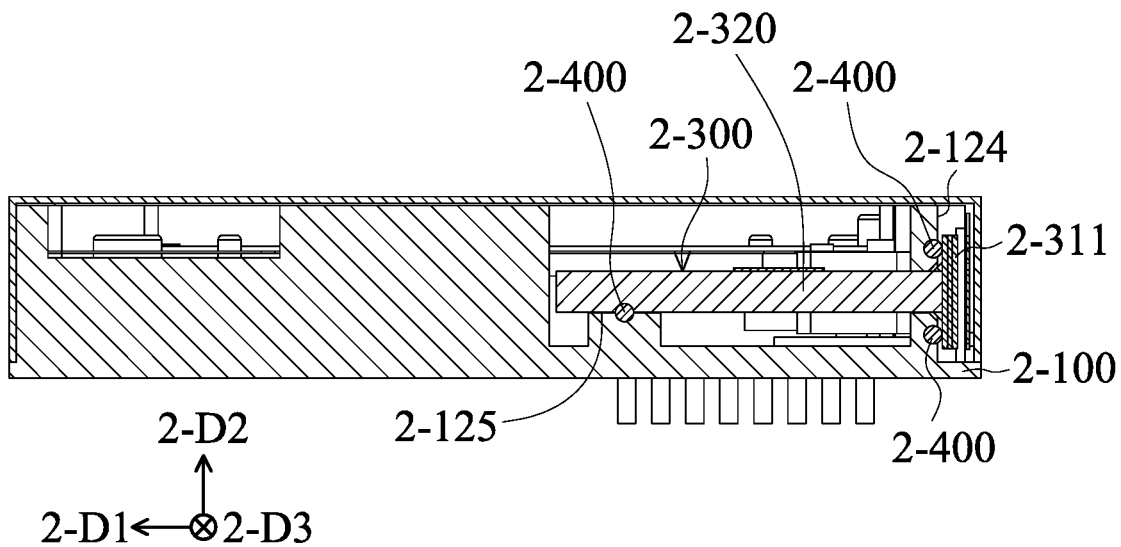
FIG. 14 is a cross-sectional view of the optical element driving mechanism taken along line A-A' in FIG. 8.
Figure 15:
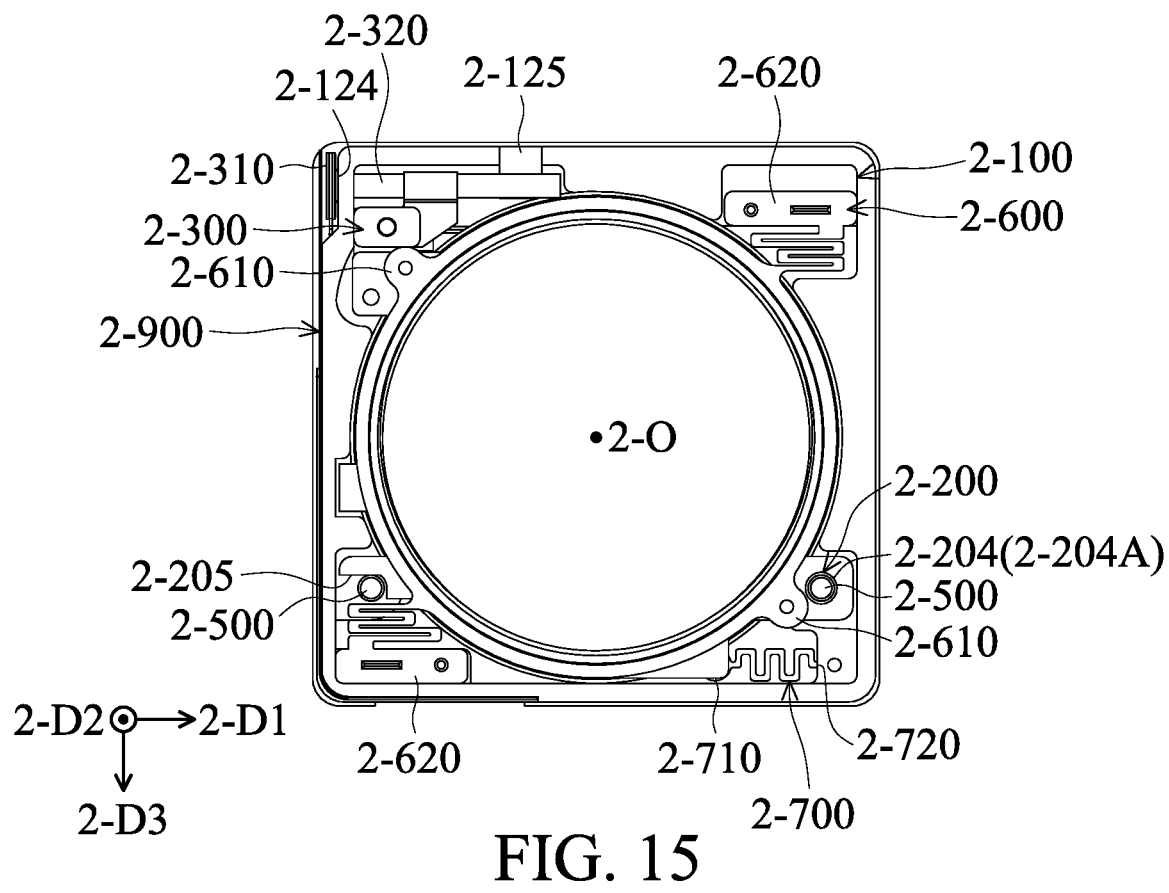
FIG. 15 is a top view of a partial structure of an optical element driving mechanism according to an embodiment of the present disclosure.

Refer to FIG. 14 and FIG. 15. FIG. 14 is a cross-sectional view of the optical element driving mechanism 2-1 taken along line A-A' in FIG. 8, and FIG. 15 is a top view of a partial structure of the optical element driving mechanism 2-1 according to an embodiment of the present disclosure. The driving element 2-300 may be connected to the fixed portion 2-100 by using the bonding element 2-400. More specifically, the base 2-120 has a first connecting surface 2-124 parallel to the second direction 2-D2, and the first connecting surface 2-124 faces the piezoelectric ceramic plate 2-311 of the piezoelectric element 2-310, and the bonding element 2-400 may be disposed between the piezoelectric ceramic plate 2-311 and the first connecting surface 2-124. When viewed along the second direction 2-D2, the first connecting surface 2-124 at least partially overlaps the transmission element 2-320.

The base 2-120 also has a second connecting surface 2-125 perpendicular to the second direction 2-D2, the second connecting surface 2-125 faces the transmission element 2-320, and the bonding element 2-400 may be disposed between the transmission element 2 -320 and the second connecting surface 2-125. When viewed along the second direction 2-D2, the second connecting surface 2-125 at least partially overlaps the transmission element 2-320. In this embodiment, the bonding element 2-400 is a soft adhesive, which connects the driving assembly 2-300 and the fixed portion 2-100, and the soft adhesive enables the piezoelectric element 2-310 and the transmission element 2-320 moving in a specific range relative to the base 2-120 in the first direction 2-D1.

Figure 16:
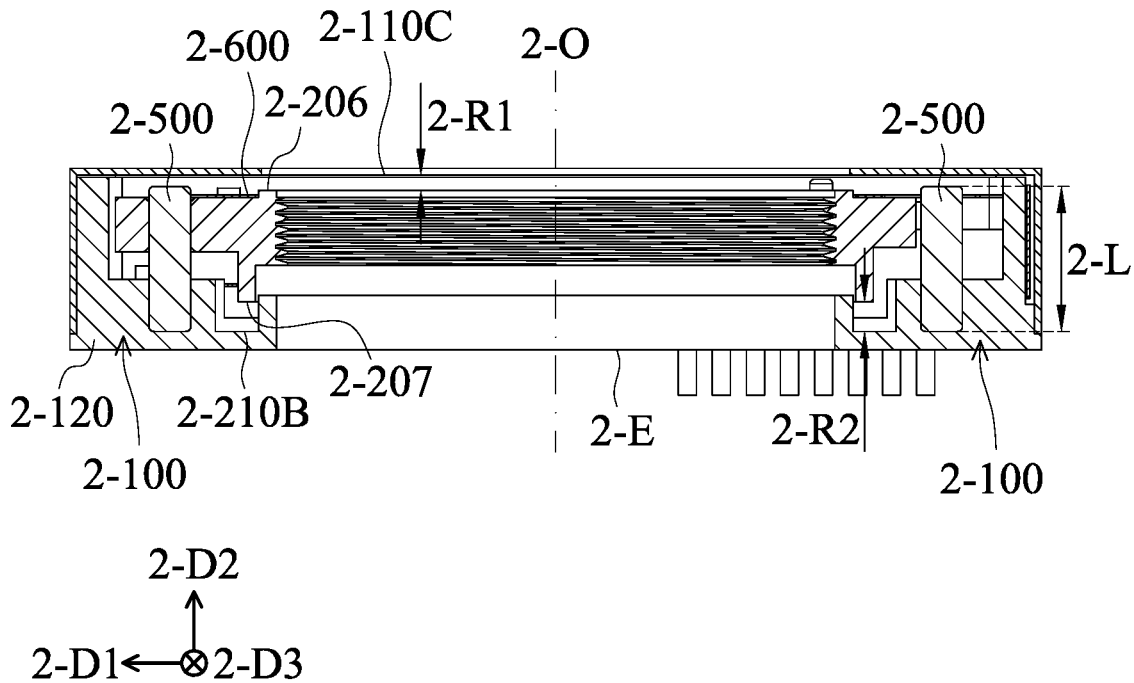
FIG. 16 is a cross-sectional view of the optical element driving mechanism taken along line B-B' in FIG. 8.
Figure 17:
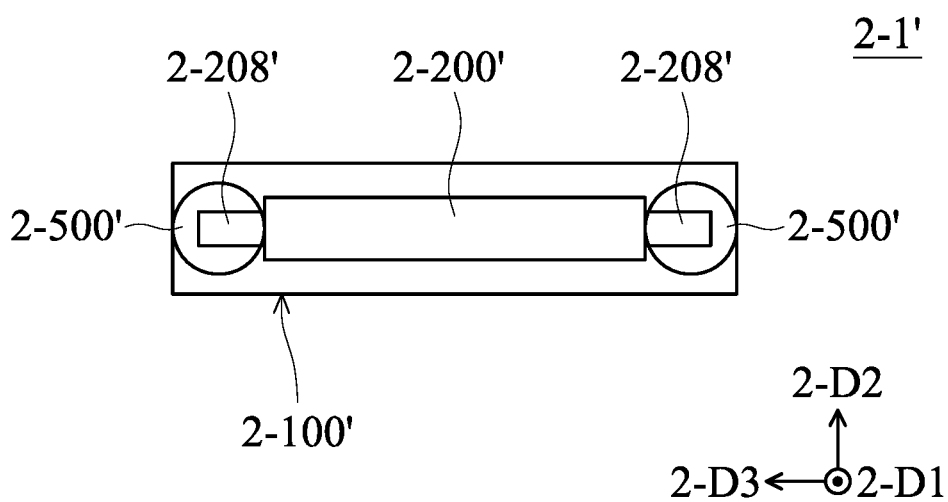
FIG. 17 is a schematic diagram of a partial structure of an optical element driving mechanism according to another embodiment of the present disclosure.

Refer to FIG. 15 to FIG. 17, FIG. 16 is a cross-sectional view of the optical element driving mechanism 2-1 taken along line B-B' in FIG. 8, and FIG. 17 is a schematic diagram of a partial structure of the optical element driving mechanism 2-1 according to another embodiment of the present disclosure. As shown in FIG. 8, the two cylindrical guiding elements 2-500 are fixedly disposed on the base 2-120 of the fixed portion 2-100, and pass through the first chute 2-204 and the second chute 2-205 of the movable portion 2-200 respectively. An inner wall 2-204A of the first chute 2-204 is covered with a coating to reduce the friction between the guiding element 2-500 and the first chute 2-204 when the movable portion 2-200 is moved. In this embodiment, the optical element driving mechanism 2-1 has a rectangular structure. When viewed along the second direction 2-D2, the first chute 2-204 and the driving assembly 2-300 are arranged diagonally, and the second chute 2-205 is disposed at a corner different from the first chute 2-204 and the driving assembly 2-300. When viewed along the third direction 2-D3, the guiding element 2-500 at least partially overlaps the conversion element 2-340, the guiding element 2-500 at least partially overlaps the transmission element 2-320, and the guiding element 2-500, the conversion element 2-340 and the transmission element 2-320 at least partially overlap.

In addition, the first chute 2-204 is a closed type, that is, as shown in FIG. 15, the first chute 2-204 surrounds the guiding element 2-500. On the other hand, the second chute 2-205 is a non-closed type, as shown in FIG. 15, the guiding element 2-500 is not completely surrounded by the second chute 2-205. Compared this designed structure to a structure with only one chute which is a closed type, the first chute 2-204 which is closed type may make the movable portion 2-200 to move completely along the chute, while the second chute 2-205 which is a non-closed type may assist the movement of the movable portion 2-200 in the second direction 2-D2. In addition, compared to a structure with two chutes which are closed types, the second chute 2-205 which is a non-closed type may reduce the probability that the guiding element 2-500 cannot pass through the chute during assembly due to manufacturing tolerances, and thus improve the assembly success rate of the optical element driving mechanism 2-1.

As shown in FIG. 16, the top surface 2-206 of the movable portion 2-200 faces the inner top wall 2-110C of the top case 2-110, and the bottom surface 2-207 of the movable portion 2-200 faces the inner bottom wall 2-120B of the base 2-120. The top surface 2-206, the bottom surface 2-207, the inner top wall 2-110C, and the inner bottom wall 2-120B are perpendicular to the second direction 2-D2. When viewed along the third direction 2-D3, a first distance 2-R1 between the top surface 2-206 and the inner top wall 2-110C is shorter than a length 2-L of the guiding element 2-500 in the second direction 2-D2, and a second distance 2-R2 between the bottom surface 2-207 and the inner bottom wall 2-120B is shorter than the length 2-L of the guiding element 2-500 in the second direction 2-D2. That is, since the guiding element 2-500 is long enough, even if the movable portion 2-200 reaches the maximum movement range, it will not separate from the guiding element 2-500.

However, the guiding element 2-500 and the chute are not limited to the above structure, and the form and number of the guiding element 2-500 and the chute may be changed according to requirements. For example, as shown in FIG. 17, in some other embodiments, an optical element driving mechanism 2-1' has a structure and elements similar to the optical driving mechanism 2-1, wherein the guiding element 2-500' is a spherical structure and is fixed on both sides of the fixed portion 2-100'. The movable portion 2-200' has a chute 2-208', and at least part of the guiding element 2-500' is located in the slide slot 2-208', which can make the movable portion 2-200' move in the second direction 2-D2 and avoid the occurrence of offsets.

Refer to FIG. 15 and FIG. 16, the first elastic element 2-600 is elastically connected to the movable portion 2-200 and the fixed portion 2-100. The first elastic element 2-600 has two first movable connecting portions 2-610 connected to the movable portions 2-200 and two first fixed connecting portions 2-620 connected to the fixed portion 2-100. Two first movable connecting portions 2-610 are arranged diagonally in the rectangular structure, and two first fixed connecting portions 2-620 are also arranged diagonally in the rectangular structure. When viewed along the second direction 2-D2, the first movable connecting portion 2-610 and the first fixed connecting portion 2-620 do not overlap. When the movable portion 2-200 is moved along the second direction 2-D2 away from a light emitting surface 2-E, the first elastic element 2-600 may apply a force to the movable portion 2-200 in the opposite direction to prevent the movable portion 2-200 from moving beyond a certain range.

The second elastic element 2-700 is elastically connected to the movable portion 2-200 and the fixed portion 2-100. The second elastic element 2-700 is disposed closer to the light emitting surface 2-E than the first elastic element 2-600, and the second elastic element 2-700 and the driving assembly 2-300 are arranged diagonally in a rectangular structure. The overall structure of the optical element driving mechanism 2-1 may be more balanced by this design. When the movable portion 2-200 is moved along the second direction 2-D2 close to the light emitting surface 2-E, the second elastic element 2-700 may apply a force to the movable portion 2-200 in the opposite direction to prevent the movable portion 2-200 from moving beyond a certain range. The second elastic element 2-700 has a second movable connecting portion 2-710 connected to the movable portion 2-200 and a second fixed connecting portion 2-720 connected to the fixed portion 2-100. The second movable connecting portion 2-710 and the second fixed connecting portion 2-720 are located at the same corner of the rectangular structure.

When viewed along the second direction 2-D2, the first elastic element 2-600 and the second elastic element 2-700 do not overlap, the driving assembly 2-300 and the first elastic element 2-600 partially overlap, and the driving assembly 2-300 and the second elastic element 2-700 do not overlap, and one of the second movable connecting portion 2-710 and the first movable connecting portion 2-610 are located at the same corner of the rectangular structure.

Figure 18:
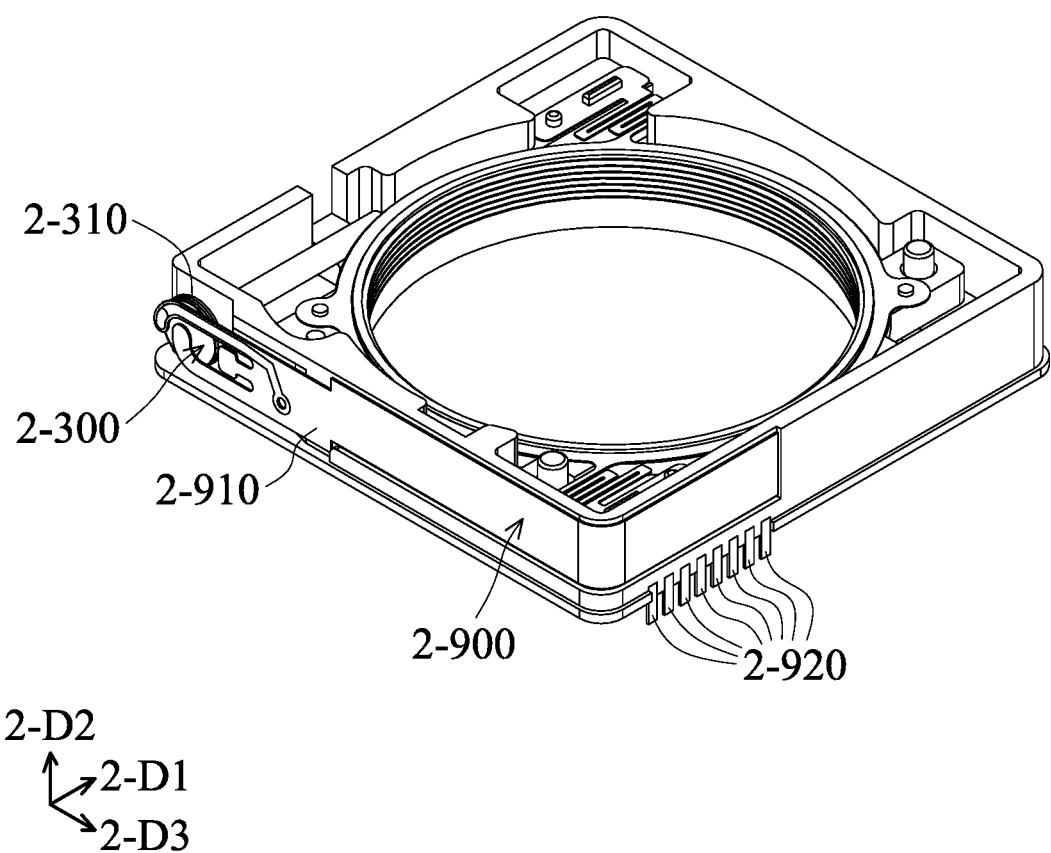
FIG. 18 is a schematic diagram of a partial structure of an optical element driving mechanism according to an embodiment of the present disclosure.

Next, refer to FIG. 15 and FIG. 18, FIG. 18 is a schematic diagram of a partial structure of the optical element driving mechanism 2-1 according to an embodiment of the present disclosure. The circuit assembly 2-900 is electrically connected to the driving assembly 2-300. When viewed along the second direction 2-D2, the circuit assembly 2-900 is disposed on at least two sides of the rectangular structure. In this embodiment, the circuit assembly 2-900 includes an internal circuit element 2-910 and an external circuit element 2-920. The internal circuit element 2-910 is a flexible printed circuit board (FPC) with a shape that is close to a rectangle. The internal circuit element 2-910 is bent at a corner of the rectangular structure to form a L-shaped structure, and is disposed on two sides of the rectangular structure. The internal circuit element 2-910 is connected to the piezoelectric element 2-310 on one side, and extends to the other side, and then is connected to the external circuit element 2-920. When viewed along the second direction 2-D2, the circuit assembly 2-900, the first elastic element 2-600, and the second elastic element 2-700 do not overlap. When viewed along the third direction 2-D3, the circuit assembly 2-900 and the second elastic element 2-700 do not overlap. With such a design, the miniaturization of the optical element driving mechanism 2-1 may be achieved.

Back to FIG. 9, the position sensing assembly 2-800 is used to sense the movement of the movable portion 2-200 relative to the fixed portion 2-100. At least part of the position sensing assembly 2-800 is disposed on the movable portion 2-200, and at least another part of the position sensing assembly 2-800 is disposed on the fixed portion 2-100. In this embodiment, the position sensing assembly 2-800 includes a sensing element 810 and a sensing magnetic element 820. The sensing element 810 is disposed on the base 2-120 of the fixed portion 2-100, and the sensing magnetic element 820 is disposed on the movable portion 2-200. More specifically, the sensing element 810 may be, for example, a Hall effect sensor, a MR sensor, or a Fluxgate, etc., disposed to sense a magnetic field of the sensing magnetic element 820 on the holder 2-200 to obtain the position of the holder 2-200 relative to the base 2-120, but it is not limited to this. In some embodiments, the sensing element 810 is disposed on the movable portion 2-200, and the sensing magnetic element 820 is disposed on the fixed portion 2-100. In some embodiments, the sensing element 810 is disposed on the circuit assembly 2-900, and the sensing magnetic element 820 is disposed on the movable portion 2-200.

Figure 19:
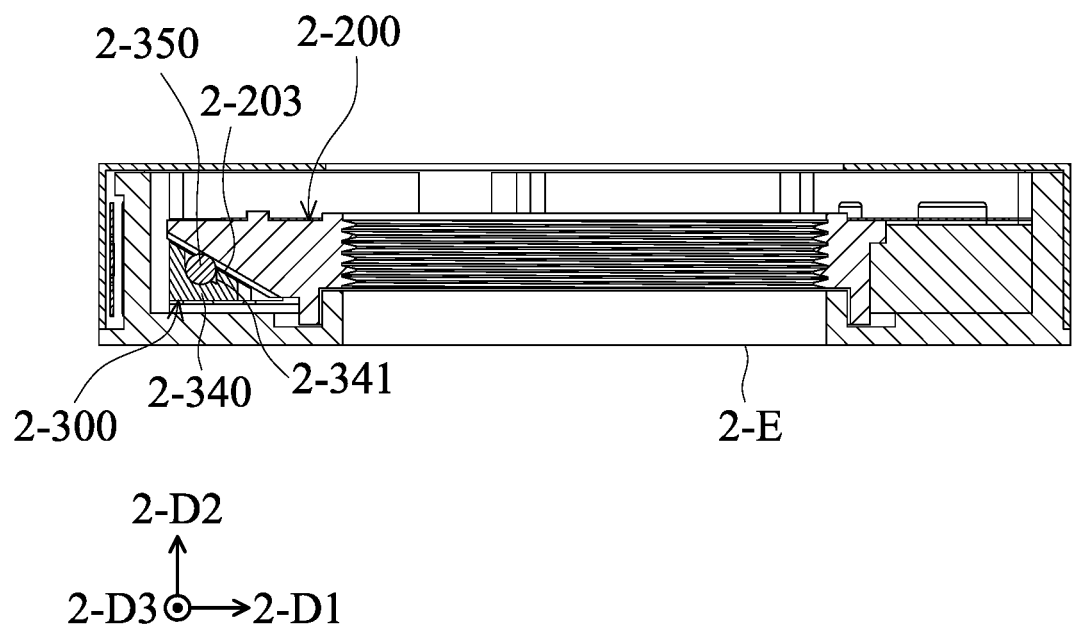
FIG. 19 is a cross-sectional view of the optical element driving mechanism taken along line C-C' in FIG. 8.
Figure 20:
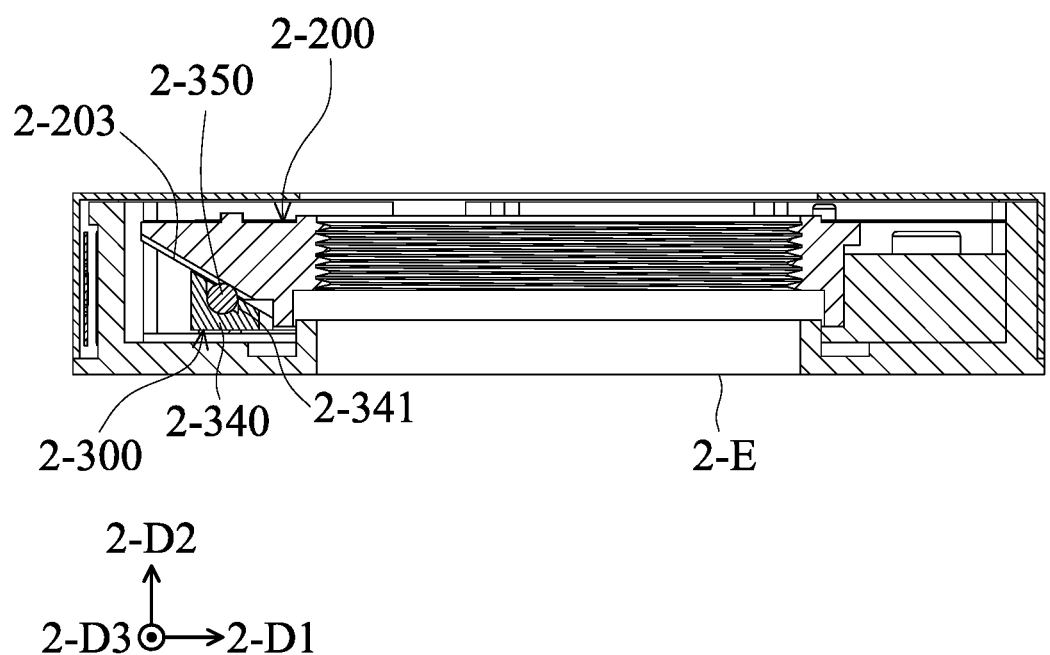
FIG. 20 is a cross-sectional view of the optical element driving mechanism taken along line C-C' in FIG. 8.

Next, the operation of the optical element driving mechanism 2-1 will be described with reference to FIG. 9, FIG. 19, and FIG. 20. FIG. 19 and FIG. 20 are cross-sectional views of the optical element driving mechanism 2-1 taken along line C-C' in FIG. 8, FIG. 19 is before the driving assembly 2-300 drives the movable portion 2-200, and FIG. 20 is after the driving assembly 2-300 drives the movable portion 2-200. When a voltage is applied externally and then transmitted to the driving assembly 2-300 via the circuit assembly 2-900, the circular-plate-shaped piezoelectric element 2-310 is deformed, for example, slowly bent outward (the periphery of the piezoelectric element 2-310 is closer to the side wall 2-110B than the center of the piezoelectric element 2-310), and then the transmission element 2-320 is moved in the first direction 2-D1 that is away from the piezoelectric element 2-310. At this time, there is a static friction between the transmission element 2-320 and the clamping element 2-330, so there is no relative movement between the transmission element 2-320 and the clamping element 2-330. Then, the voltage is controlled so that the piezoelectric element 2-310 bends inward rapidly (the center of the piezoelectric element 2-310 is closer to the side wall 2-110B than the periphery of the piezoelectric element 2-310), and the transmission element 2-320 is therefore moved rapidly in the first direction 2-D1 that is close to the piezoelectric element 2-310, and the static friction between the transmission element 2-320 and the clamping element 2-330 is overcome, thereby making the clamping element 2-330 move relative to the transmission element 2-320 in the first direction 2-D1 that is away from the piezoelectric element 2-310. Therefore, the movement of the clamping element 2-330 in the first direction 2-D1 may be controlled by repeating the above steps.

As shown in FIG. 9, FIG. 19, and FIG. 20, when the clamping element 2-330 is controlled to move in the first direction 2-D1 that is away from the piezoelectric element 2-310, the conversion element 2-340 connected to the clamping element 2-330 is moved in the same direction, and the first intermediary element 2-350 disposed in the first groove 2-341 of the conversion element 2-340 is moved in the movable-portion-sliding rail 2-203 of the movable portion 2-200, so that the movable portion 2-200 is moved along the guiding element 2-500 in the second direction 2-D2 toward the direction away from the light emitting surface 2-E, and the position of the movable portion 2-200 relative to the fixed portion 2-100 may be obtained by the position sensing assembly 2-800. Therefore, it is possible to control the movement of the movable portion 2-200 in the second direction 2-D2 by controlling the movement of the driving assembly 2-300 in the first direction 2-D1.

In a conventional optical element driving mechanism, a driving assembly and a movable portion are moved in the same direction. That is, a long shaft of a transmission element is disposed parallel to an optical axis. If a range of movement of the movable portion is expected to be wider, a length of the transmission element must be increased, which causes the overall size of the optical element driving mechanism to be larger. In this embodiment with the different structural design, the transmission element 2-320 (the long shaft) is horizontally disposed in the optical element driving mechanism 2-1 (perpendicular to the optical axis 2-0), compared to the configuration of the conventional optical element driving mechanism, the transmission element 2-320 may be designed to be longer without affecting the overall size of the optical element driving mechanism 2-1. The movable portion 2-200 may therefore have a larger range of movement, or the movable portion 2-200 may have the same range of movement as the conventional movable portion, but a smaller optical element driving mechanism 2-1 may be provided.

As described above, the embodiment of present disclosure provides an optical element driving mechanism, including a fixed portion, a movable portion, and a driving assembly. The movable portion is movably disposed on the fixed portion. The driving assembly is disposed on the fixed portion, and drives the movable portion to move relative to the fixed portion. Thereby, a smaller optical element driving mechanism that can control the movement of the movable portion in the second direction by controlling the movement of the driving assembly in the first direction may be provided.

Figure 21:
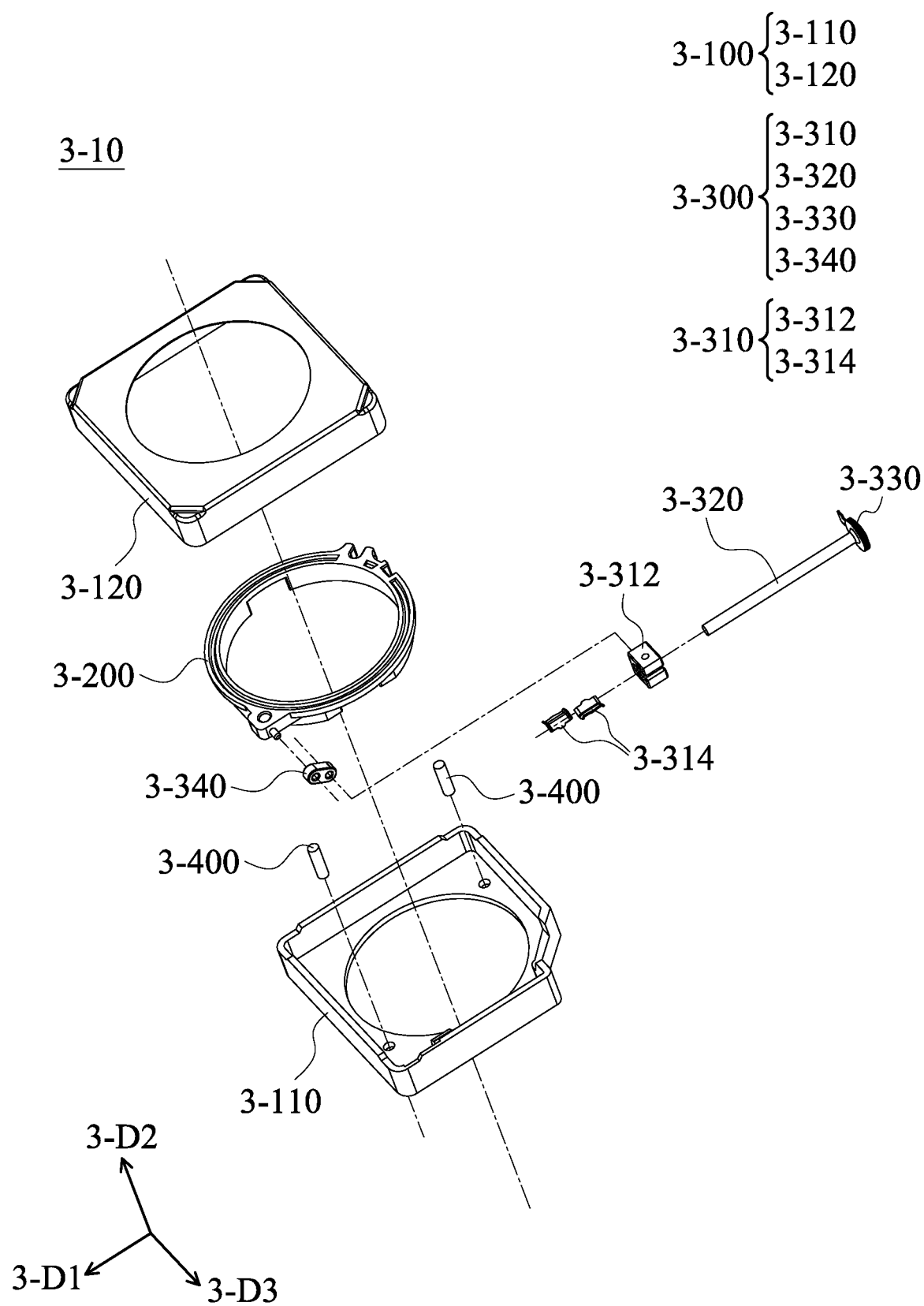
FIG. 21 is an exploded view of the optical element driving mechanism, according to some embodiments of the present disclosure.

First, referring to FIG. 21, FIG. 21 is an exploded view of the optical element driving mechanism 3-10, according to some embodiments of the present disclosure. As shown in FIG. 21, in some embodiments, the optical element driving mechanism 3-10 mainly includes a fixed portion 3-100, a movable portion 3-200, a driving assembly 3-300, and a guiding component 3-400. The fixed portion 3-100 includes a bottom 3-110, and a case 3-120. The movable portion 3-200 is disposed between the bottom 3-110 and the case 3-120. The movable portion 3-200 may move relative to the fixed portion 3-100. The fixed portion 3-100 and the movable portion 3-200 have corresponding holes, which accommodate an optical element, such as a lens (not shown). The optical element may be connected to the movable portion, thereby may move along an optical axis, achieving the effect of optical image stabilization.

The driving assembly 3-300 includes a gripping element 3-310, a transmission element 3-320, a piezoelectric element 3-330, and a pivot element 3-340. The gripping element 3-310, the transmission element 3-320 and the piezoelectric element 3-330 are arranged along the first direction 3-D1. The gripping element 3-310 includes a resilient body 3-312 and a metal element 3-314. The metal element 3-314 is fixedly connected to the resilient body 3-312. The metal element 3-314 movably grips the transmission element 3-320 by an inward resilient force of the resilient body 3-312. The transmission element 3-320 is fixedly connected to the piezoelectric element 3-330. When the piezoelectric element 3-330 is electrified, the piezoelectric element 3-330 deforms in the first direction 3-D1, which drives the transmission element 3-320 to move in the first direction 3-D1, so that the gripping element 3-310 may move in the first direction 3-D1.

The pivot element 3-340 that has a bar structure is located between the gripping element 3-310 and the movable portion 3-200. Through being pivoted to the gripping element 3-310 of the driving assembly 3-300 and to the movable portion 3-200, the pivot element 3-340 transfers the force provided by the driving assembly 3-300 from the first direction to the second direction, so that the movable portion 3-200 may move in the second direction 3-D2. In accordance with some embodiments of the present disclosure, the first direction 3-D1 is different from the second direction 3-D2. The first direction 3-D1 may be perpendicular to the second direction 3-D2. As a result, the size of the driving assembly 3-300 would not be limited by the height of the optical element driving mechanism 3-10 (in the second direction 3-D2).

In some embodiments, the guiding component 3-400 has a bar structure, extending in the second direction 3-D2, and disposed between the bottom 3-110 of the fixed portion 3-100 and the movable portion 3-200, according to the present disclosure. In some embodiments, the guiding component 3-400 may be fixedly connected to the fixed portion 3-100, and movably connected to the movable portion 3-200. In some other embodiments, the guiding component 3-400 may be movably connected to the fixed portion 3-100, and fixedly connected to the movable portion 3-200. The guiding component 3-400 is used for positioning the movable portion 3-200, so that the movable portion 3-200 does not oblique or deviate during the movement, providing a better stability. In some other embodiments, the guiding component 3-400 may be a ball structure, disposed between the fixed portion 3-100 and the movable portion 3-200, accomplishing a similar positioning function.

Figure 22:
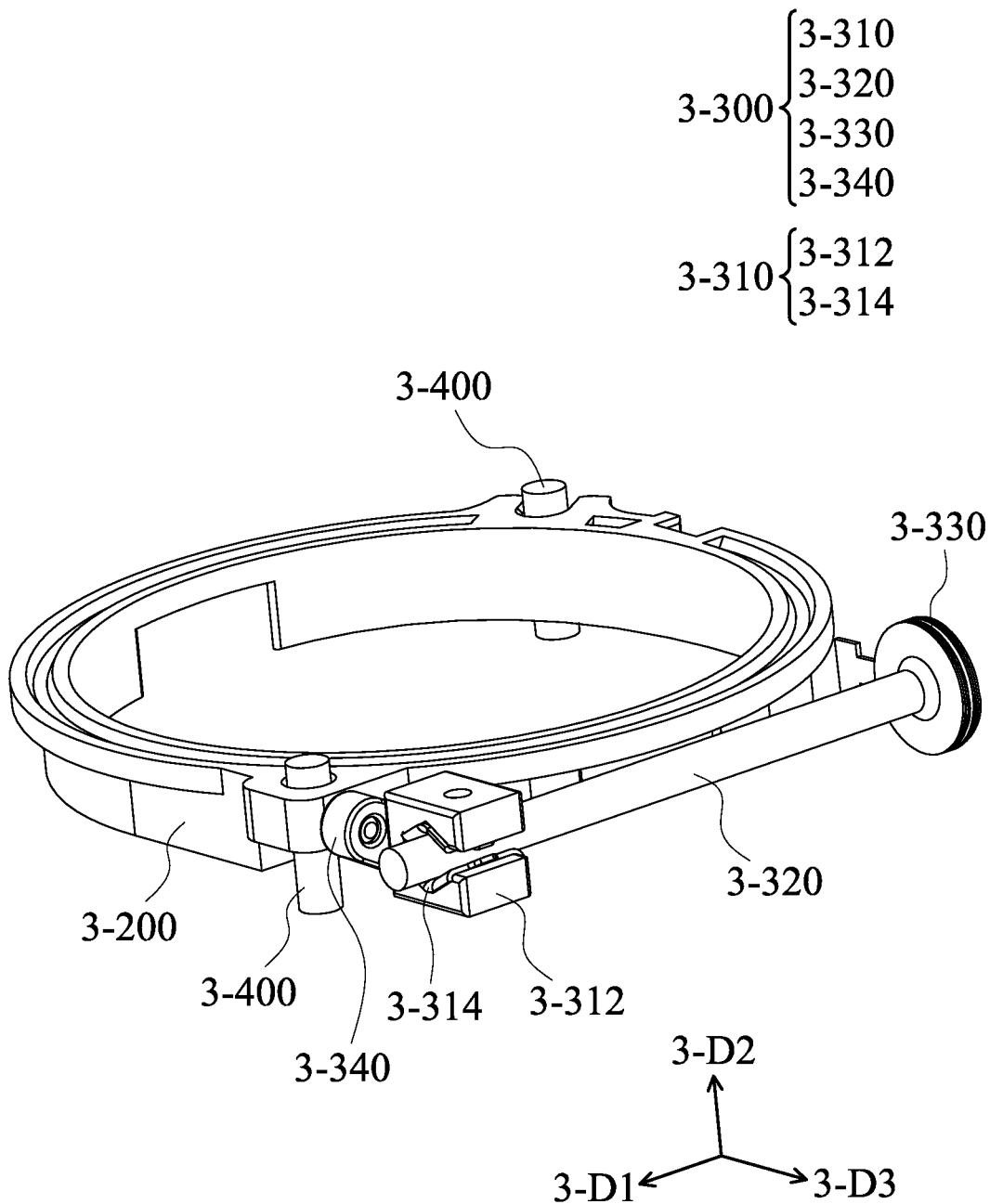
FIG. 22 is a perspective view of the movable portion and the driving assembly, according to some embodiments of the present disclosure.

Referring to FIG. 22, FIG. 22 is a perspective view of the movable portion 3-200 and the driving assembly 3-300, according to some embodiments of the present disclosure. As shown in FIG. 22, the gripping element 3-310 of the driving assembly 3-300 grips the transmission element 3-320. Since the resilient body 3-312 of the gripping element 3-310 is connected to the pivot element 3-340 that is connected to the movable portion 3-200, when the gripping element 3-310 moves, the movable portion 3-200 may move in the second direction 3-D2. Because the gripping element 3-310 movably grips the transmission element 3-320, when the frictional force between the metal element 3-314 of the gripping element 3-310 and the transmission element 3-320 is smaller than the maximum static frictional force therebetween, the gripping element 3-310 may be driven by the transmission element 3-320 (with the inertia force between the gripping element 3-310 and the transmission element 3-320), moving in the first direction 3-D1. When the frictional force between the metal element 3-314 and the transmission element 3-320 is larger than the maximum static frictional force therebetween, the motion of the transmission element 3-320 would not affect the gripping element 3-310. In other words, if the moving velocity of the transmission element 3-320 is big enough, the frictional force between the metal element 3-314 and the transmission element 3-320 would overcome the maximum static frictional force, then the gripping element 3-310 would not move. Therefore, the gripping element 3-310 may be effectively moved to various different positions by adjusting the velocity of the transmission element 3-320 that is driven by the piezoelectric element 3-330. Thus, the movement of the gripping element 3-310 (and therefore the movement of the movable portion 3-200) would not be affected by the size of the transmission element 3-320 or the piezoelectric element 3-330. For example, in some embodiments, the moving range of the gripping element 3-310 may be greater than the displacement of the piezoelectric element 3-330. The effect of optical image stabilization may be achieved or be even better without increasing the volume of the driving assembly 3-300, according to some embodiments of the present disclosure.

In some embodiments, the resilient body 3-312 of the gripping element 3-310 may be made of plastic or any suitable resilient material, in order to provide the resilient force for gripping the transmission element 3-320. In some embodiments, the metal element 3-314 and the transmission element 3-320 are both made of metal. The metal element 3-314 has the characteristics of high wear resistance and high durability, so that the metal element 3-314 would not be worn easily when gripping the transmission element 3-320.

Figure 23A:
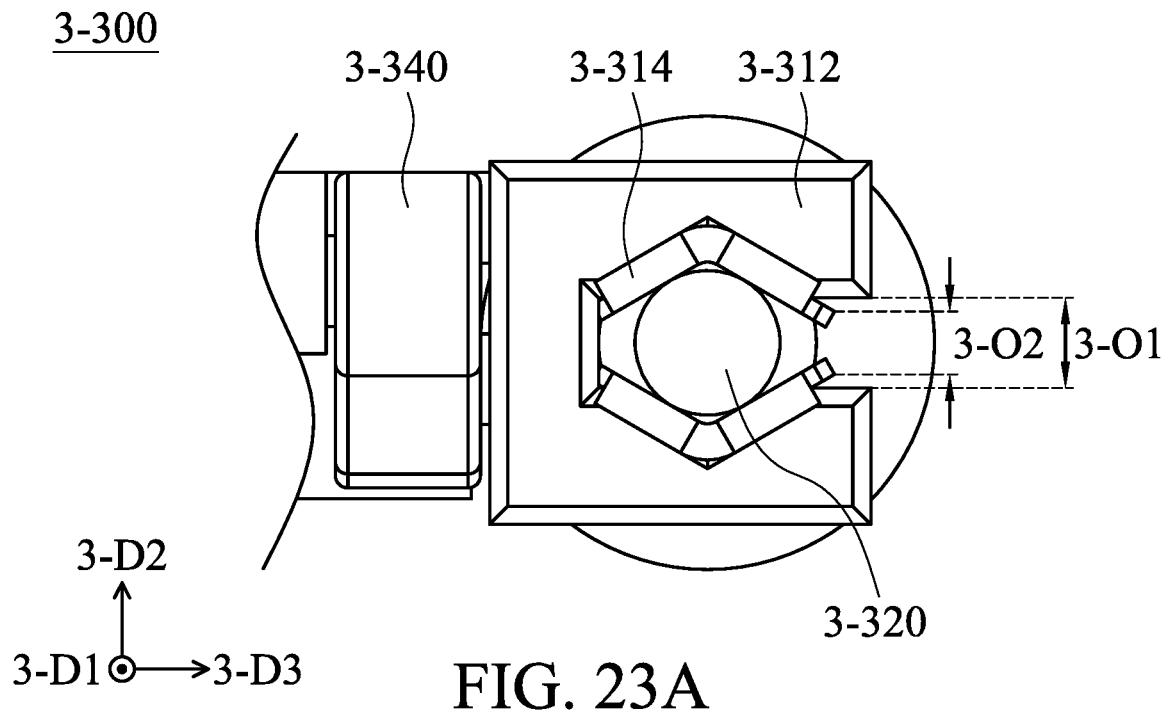
FIG. 23A is a side view of the driving assembly, according to some embodiments of the present disclosure.

Referring to FIG. 23A, FIG. 23A is a side view of the driving assembly 3-300, according to some embodiments of the present disclosure. In some embodiments, when viewed in the first direction 3-D1, the resilient body 3-312 of the gripping element 3-310 has a C-shaped structure. The resilient body 3-312 has a first opening 3-01. To ensure that the transmission element 3-320 would not depart from the gripping element 3-310, the length of the first opening 3-01 in the second direction 3-D2 is shorter than the diameter of the transmission element 3-320. In some embodiments of the present disclosure, the metal element 3-314 includes two metal sheets, gripping the transmission element 3-320 in the second direction 3-D2. A second opening 3-02 is formed between the two metal sheets of the metal element 3-314. Based on a similar reason, the length of the second opening 3-02 in the second direction 3-D2 is shorter than the diameter of the transmission element 3-320. In addition, the second opening 3-02 is smaller than the first opening 3-01, as shown in FIG. 23A.

Figure 23B:
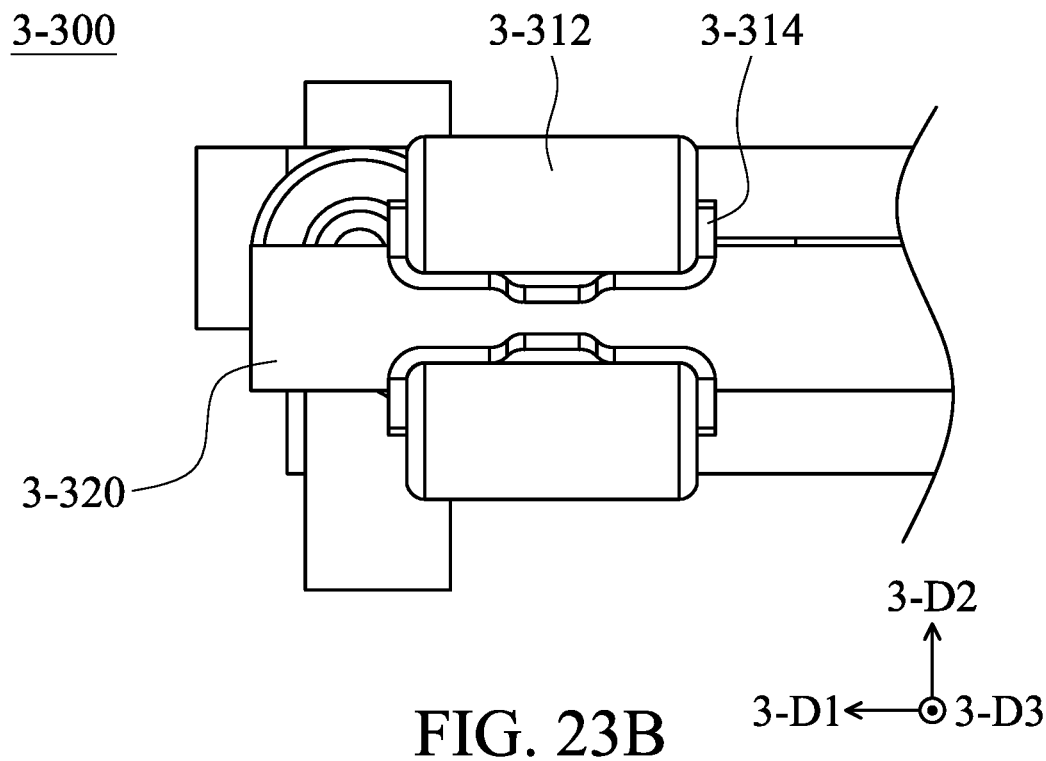
FIG. 23B is a front view of the driving assembly, according to some embodiments of the present disclosure.

Referring to FIG. 23B, FIG. 23B is a front view of the driving assembly 3-300, according to some embodiments of the present disclosure. In some embodiments, when viewed in the third direction 3-D3, the metal element 3-314 protrudes from the two opposite sides of the resilient body 3-312. In some embodiments of the present disclosure, when viewed in the third direction 3-D3, the transmission element 3-320 protrudes from the two opposite sides of the resilient body 3-312, in order to prevent the transmission element 3-320 from departing from the gripping element 3-310.

Figure 24A:
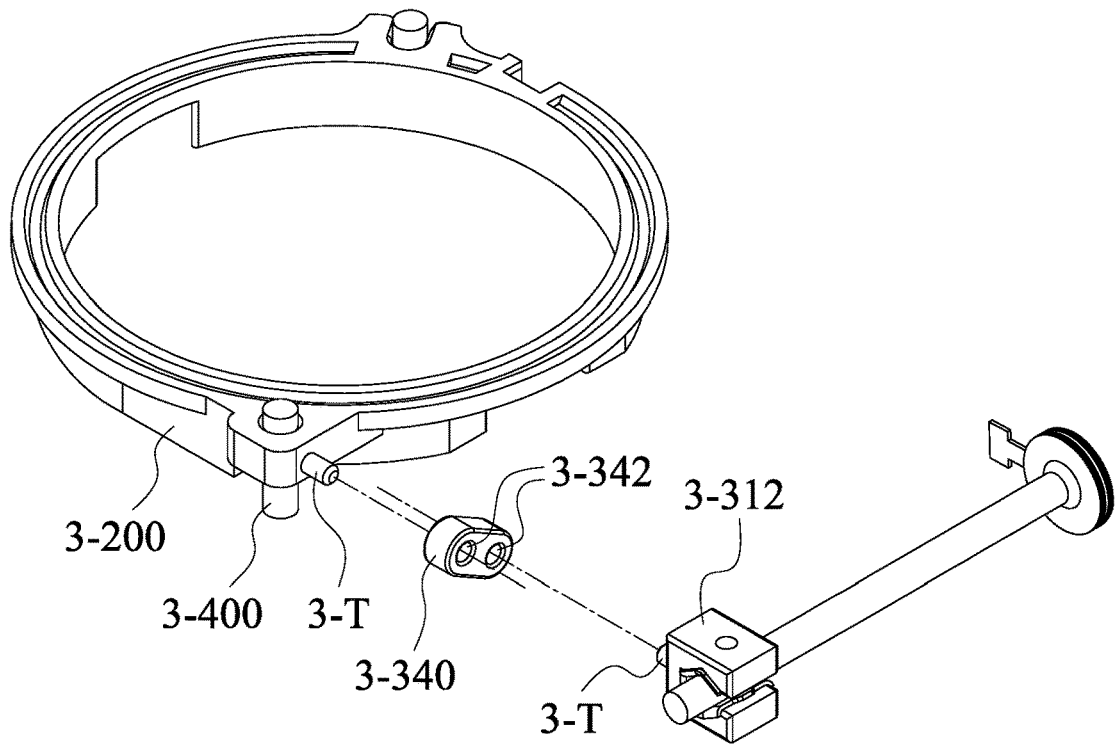
FIG. 24A is a schematic view of the connection between the movable portion and the driving assembly, according to some embodiments of the present disclosure.

Referring to FIG. 24A, FIG. 24A is a schematic view of the connection between the movable portion 3-200 and the driving assembly 3-300, according to some embodiments of the present disclosure. As shown in FIG. 24A, the movable portion 3-200 has a pivot pillar 3-T, the resilient body 3-312 of the gripping element 3-310 also has a pivot pillar 3-T, and the pivoting element 3-340 has two pivot holes 3-342. The two pivot pillars of the movable portion 3-200 and the resilient body 3-312 are respectively pivoted to each pivot hole 3-342. In some embodiments, the pivot pillar 3-T of the movable portion 3-200 is parallel to the pivot pillar 3-T of the resilient body 3-312, so that the pivot element 3-340 may transfer the force to a different direction. In some embodiments, the pivot element 3-340 may be made of plastic or metal. In some embodiments, the interior surfaces of the pivot holes 3-342 of the pivot element 3-340 may have a coating thereon. The coated surfaces lessens the friction of the pivot holes 3-342, reducing the obstruction of the relative motion between the pivot pillars 3-T and the pivot holes 3-342. The coating may be PTFE (Polytetrafluoroethylene), or other suitable material.

Figure 24B:
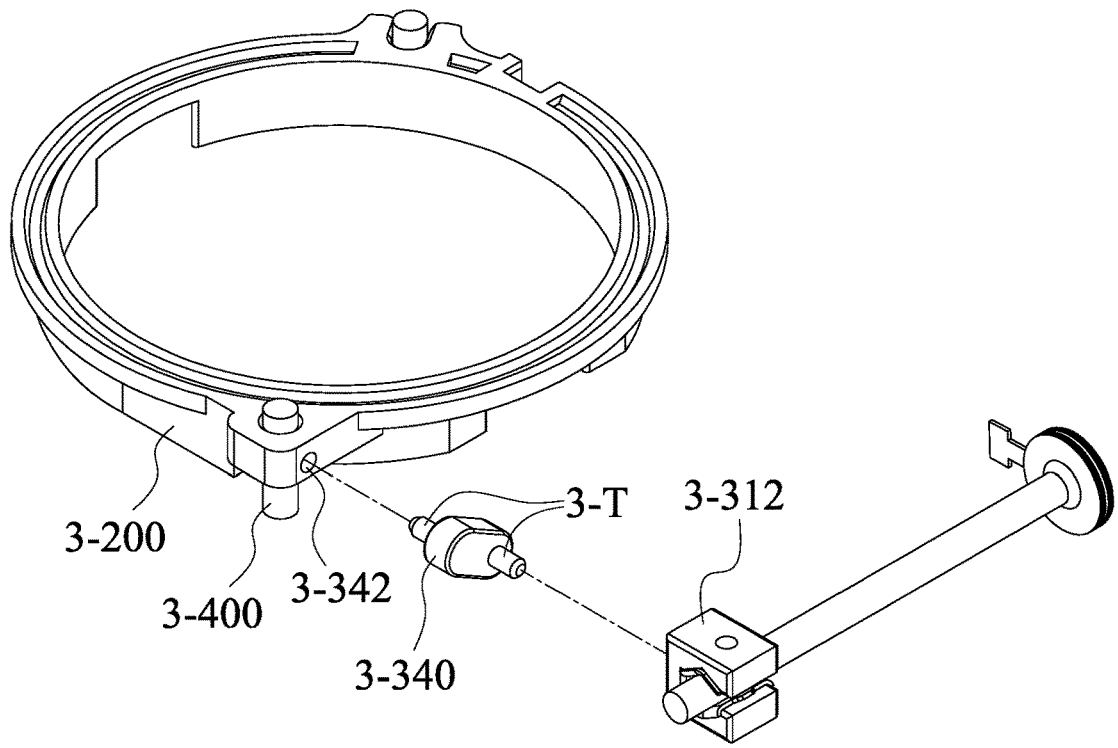
FIG. 24B is a schematic view of the connection between the movable portion and the driving assembly, according to some other embodiments of the present disclosure.

In addition, FIG. 24B is a schematic view of the connection between the movable portion 3-200 and the driving assembly 3-300, according to some other embodiments of the present disclosure. The movable portion 3-200 and the driving assembly 3-300 in FIG. 24B are similar to those in FIG. 24A. The difference between the two figures is the position of the pivot pillars 3-T and the pivot holes 3-342. In FIG. 24B, the movable portion 3-200 and the resilient body 3-312 each has a pivot hole 3-342, and the pivot element 3-340 has two pivot pillars 3-T. The pivot pillars 3-T of the pivot element 3-340 are parallel to each other, and the pivot pillars 3-T are respectively connected to a pivot hole 3-342 of the movable portion 3-200 and a pivot hole 3-342 of the resilient body 3-312.

Figure 25A:
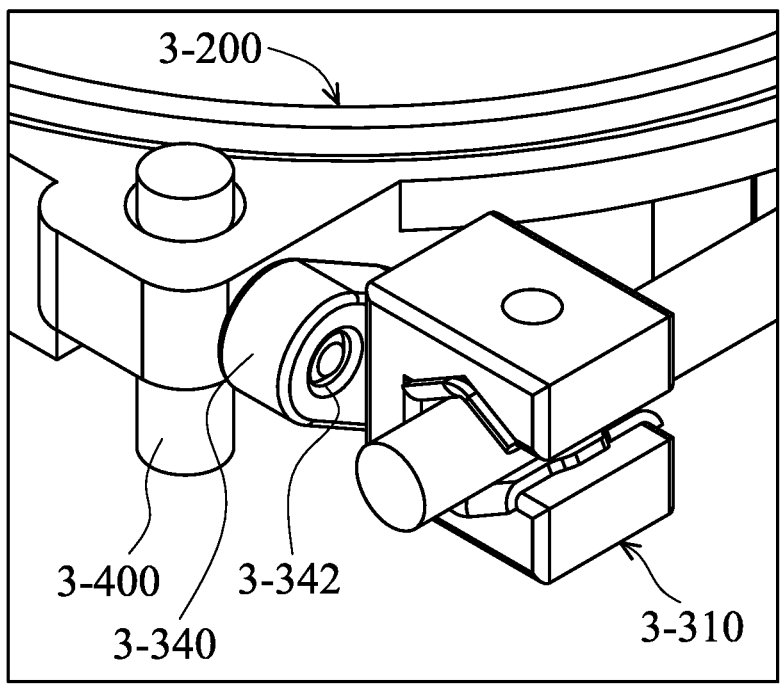
FIG. 25A is a schematic view of the optical element driving mechanism located at the first terminal position, according to some embodiments of the present disclosure.
Figure 25B:
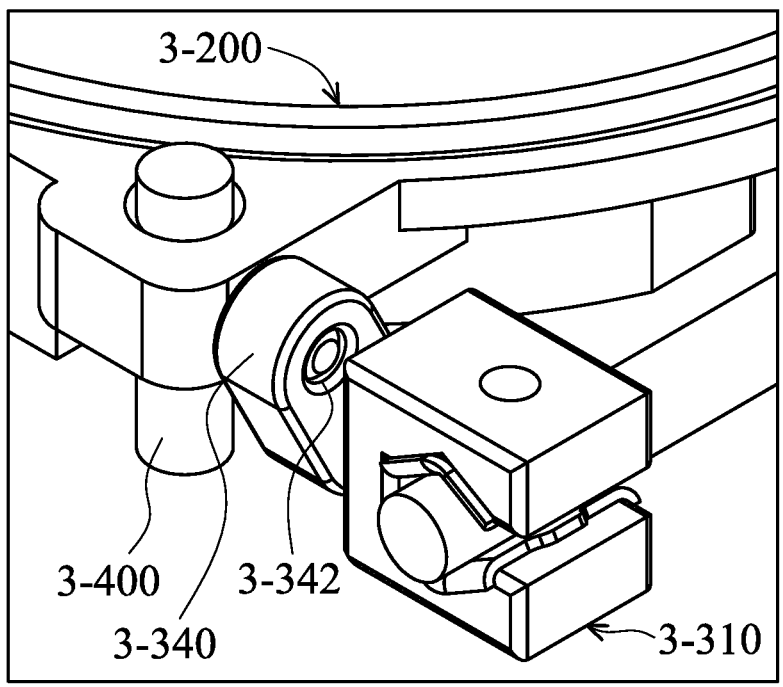
FIG. 25B is a schematic view of the optical element driving mechanism located at the second terminal position, according to some embodiments of the present disclosure.

Referring to FIG. 25A and FIG. 25B, FIG. 25A and FIG. 25B are schematic views of the optical element driving mechanism 3-10 located at the first terminal position and the second terminal position, according to some embodiments of the present disclosure, respectively. The movable portion 3-200 and the driving assembly 3-300 in FIG. 25A and FIG. 25B are similar to those in FIG. 24A. As shown in FIG. 25A, when the movable portion 3-200 is at the first terminal position, the pivot element 3-340 is close to being horizontal. When viewed in the moving direction of the movable portion 3-200, the two pivot holes 3-342 of the pivot element 3-340 do not overlap each other. On the other hand, when the gripping element 3-310 moves in the first direction 3-D1 and the movable portion 3-200 reaches the second terminal position, the two pivot holes 3-342 of the pivot element 3-340 at least partially overlap each other when viewed in the moving direction of the movable portion 3-200, as shown in FIG. 25B. The movable portion 3-200 may move to or stop at any position between the first and second terminal positions, achieving optical image stabilization. It is noted that the "first" and "second" are used herein for ease of description and are not intended to imply an ordering or to be limited.

Figure 26:
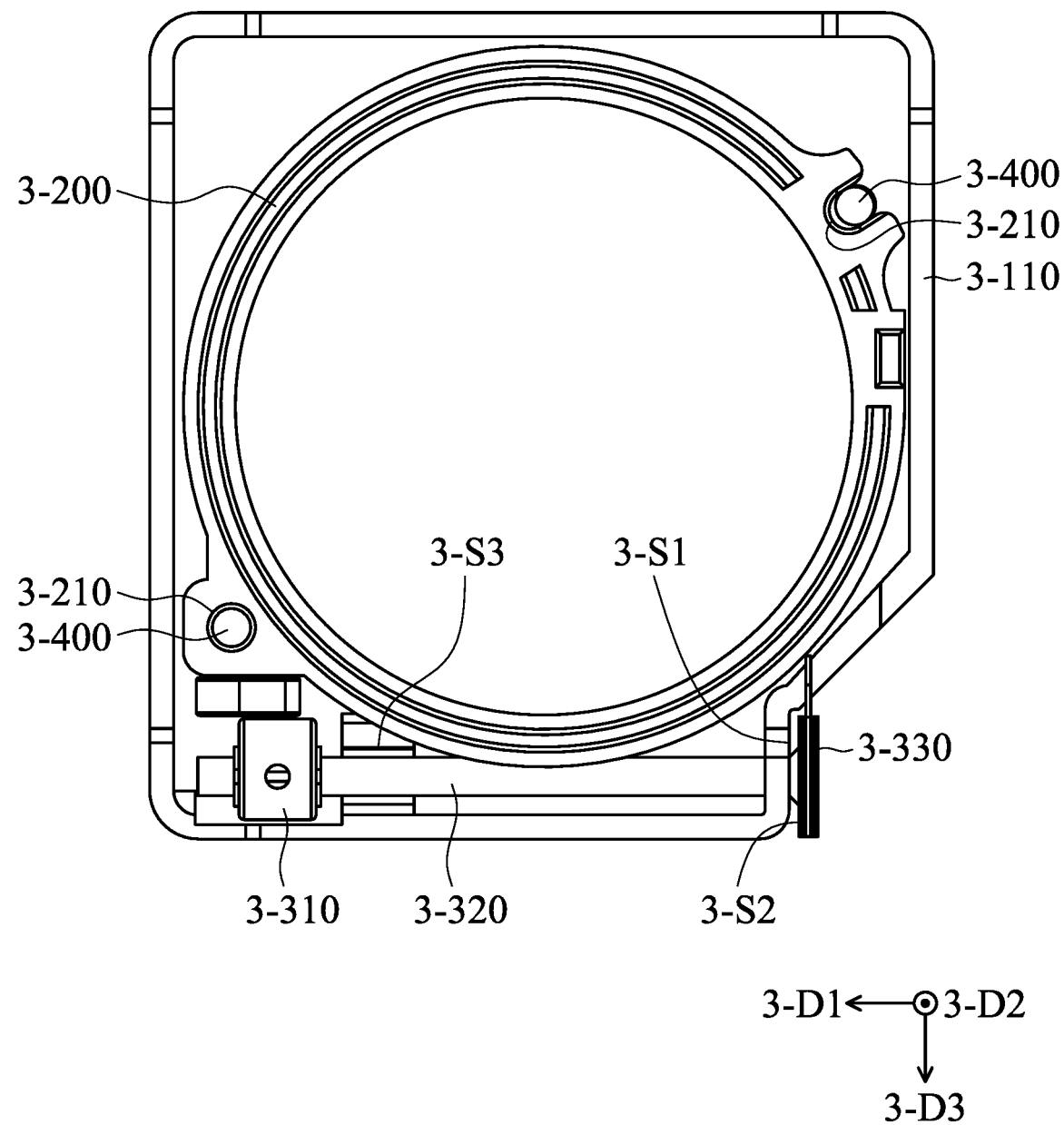
FIG. 26 is a top view of the optical element driving mechanism, according to some embodiments of the present disclosure.
Figure 27:
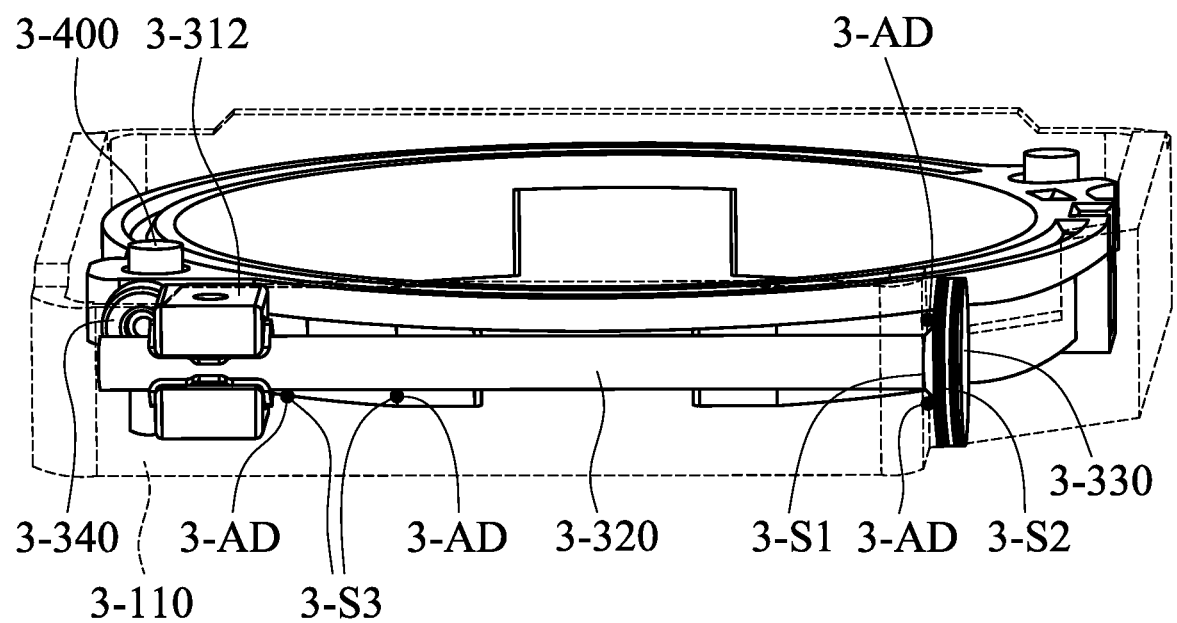
FIG. 27 is a front view of the optical element driving mechanism, according to some embodiments of the present disclosure.
Figure 27:
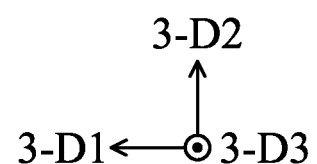

Referring to FIG. 26 and FIG. 27, FIG. 26 and FIG. 27 are a top view and a front view of the optical element driving mechanism 3-10, according to some embodiments of the present disclosure, respectively. The case 3-120 of the fixed portion 3-100 is not shown for ease of description. In some embodiments, the bottom 3-110 has a first connection surface 3-S1, and the driving assembly 3-300 has a second connection surface 3-S2. The first connection surface 3-S1 is parallel to the second direction 3-D2, facing the second connection surface 3-S2. The adhesive element 3-AD for connecting the fixed portion 3-100 and the driving assembly 3-300 is disposed between the first connection surface 3-S1 and the second connection surface 3-S2, as shown in FIG. 27. In some embodiments, the second connection surface 3-S2 is located on the piezoelectric element 3-330. It should be understood that the second connection surface 3-S2 may also be disposed on other parts of the driving assembly 3-300, connecting the fixed portion 3-100.

In some embodiments, the bottom 3-110 of the fixed portion 3-100 may also include a third connection surface 3-S3. In some embodiments of the present disclosure, when viewed in the second direction 3-D2, the third connection surface 3-S3 may be disposed between the piezoelectric element 3-330 and the gripping element 3-310. The third connection surface 3-S3 faces the transmission element 3-320. The adhesive element 3-AD may be disposed between the third connection surface 3-S3 and the transmission element 3-320.

In the embodiment of the present disclosure, the adhesive element 3-AD may be a flexible adhesive. Although the driving assembly 3-300 is secured onto the fixed portion 3-100 via the adhesive element 3-AD, the movement of the driving assembly 3-300 would not be affected due to the deformability of the adhesive element 3-AD. In other words, the adhesive element 3-AD does not affect the deformation of the piezoelectric element 3-300, nor the movement of the transmission element 3-320.

In some embodiments of the present disclosure, the piezoelectric element 3-330 of the driving assembly 3-300 is exposed from the fixed portion 3-100. In the embodiment shown in FIG. 26, the piezoelectric element 3-330 of the driving assembly 3-300 is exposed from the bottom 3-110 of the fixed portion 3-100. In some embodiments, when viewed in the second direction 3-D2, the first connection surface 3-S1 of the bottom 3-110 at least partially overlaps the transmission element 3-320 of the driving assembly 3-300.

In some embodiments of the present disclosure, the movable portion 3-200 may have a slot 3-210. The guiding component 3-400 is movably disposed in the slot 3-210, so that the movable portion 3-200 may move along the slot 3-210. The slot 3-210 fits with the shape of the guiding component 3-400 to prevent the movable portion 3-200 from deviation and tilting during moving in the second direction 3-D2. In the embodiment shown in FIG. 26, the movable portion 3-200 has two slots 3-210. One of the slot 3-210 is an open slot, exposing the guiding component 3-400 therein. In such cases, an error during the assembly process of the bottom 3-110 and the case 3-120 may be allowed. It should be understood that the amount and the configuration of the slots 3-210 and the guiding components 3-400 herein are not intended to be limited, any suitable amount and configuration may be employed.

In some embodiments, the interior surfaces of the slots 3-210 may have a coating thereon. The coated surfaces lessens the friction of the slots 3-210, reducing the obstruction of the relative motion between the slots 3-210 and the guiding components 3-400. The coating may be PTFE (Polytetrafluoroethylene), or other suitable material. In some embodiments, the guiding components 3-400 are made of metal, or other materials with small coefficient of friction, such as stainless steel, etc.

In the embodiment shown in FIG. 27, when viewed in the third direction 3-D3, the guiding component 3-400 may at least partially overlap one, two, or all of the pivot element 3-340, transmission element 3-320, or the gripping element 3-310. This shows the achievement of substantial miniaturization of the optical element driving mechanism 3-10 in the present disclosure.

Figure 28:
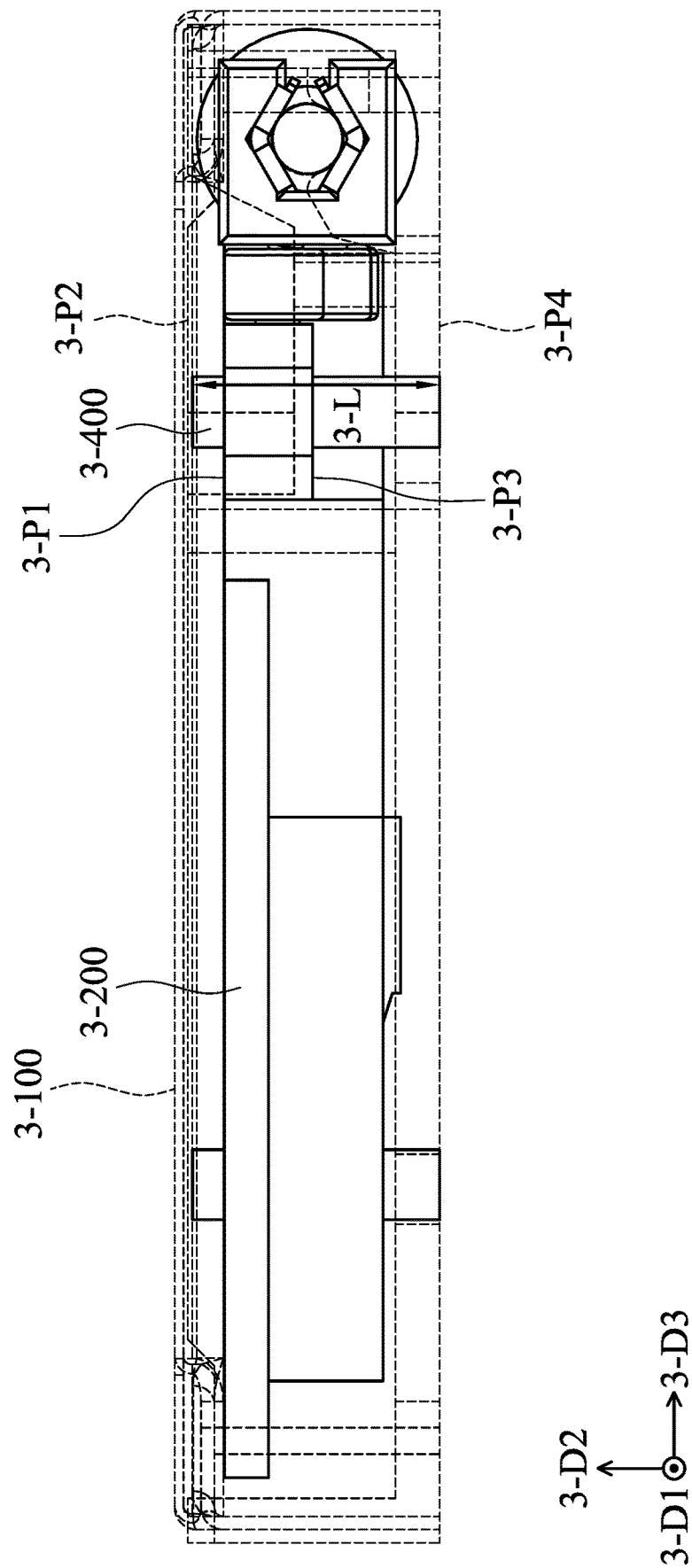
FIG. 28 is a side view of the optical element driving mechanism, according to some embodiments of the present disclosure.

Referring to FIG. 28, FIG. 28 is a side view of the optical element driving mechanism 3-10, according to some embodiments of the present disclosure. As shown in FIG. 28, the movable portion 3-200 has a first surface 3-P1 and a third surface 3-P3. The fixed portion 3-100 has a second surface 3-P2 and a fourth surface 3-P4. All of the first, second, third and fourth surfaces 3-P1, 3-P2, 3-P3 and 3-P4 are perpendicular to the second direction 3-D2. In some embodiments of the present disclosure, in the second direction 3-D2, the distance between the first surface 3-P1 and the second surface 3-P2 is smaller than the length 3-L of the guiding component 3-400. The distance between the third surface 3-P3 and the fourth surface 3-P4 is also smaller than the length 3-L of the guiding component 3-400. As a result, it is ensured that the movable portion 3-200 would not deviate from the guiding component 3-400 when the movable portion 3-200 moves, which causes undesirable displacements or rotation.

Figure 29:
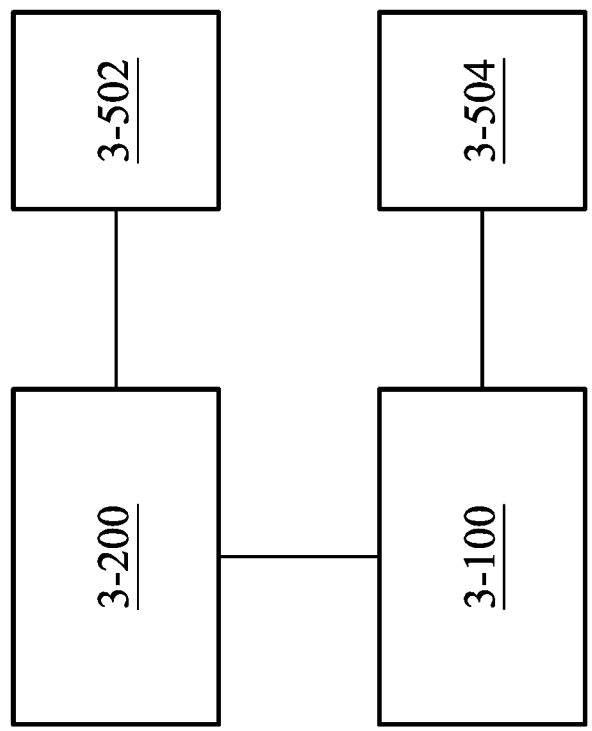
FIG. 29 is a schematic view of the connection of the position sensing assembly, according to some embodiments of the present disclosure.

Referring to FIG. 29, FIG. 29 is a schematic view of the connection of the position sensing assembly 3-500, according to some embodiments of the present disclosure. In some embodiments, the optical element driving mechanism 3-10 may further include a position sensing assembly 3-500. The position sensing assembly 3-500 may include a sensing element 3-502 and a sensing magnetic element 3-504. In some embodiments, the sensing element 3-502 may be disposed or connected to the movable portion 3-200, while the sensing magnetic element 3-504 is disposed or connected to the fixed portion 3-100. In some other embodiments, the sensing element 3-502 may be disposed or connected to the fixed portion 3-100, while the sensing magnetic element 3-504 is disposed or connected to the movable portion 3-200. The position sensing assembly 3-500 may be a Hall sensor, a MR sensor, a fluxgate, an optical position sensor, an optical encoder, or the like. The position sensing assembly 3-500 detects the amount of displacement of the optical element to perform optical image stabilization.

In summary, in the optical element driving mechanism 3-10 of the present disclosure, a movable portion 3-200, driven by a driving assembly 3-300 moving in the first direction 3-D1, moves in the second direction 3-D2. Consequently, the optical element driving mechanism 3-10 may perform the optical image stabilization with a smaller volume. Moreover, a guiding component 3-400 is disposed to prevent the deviation and tilting during movements, achieving a more steady optical image stabilization and miniaturization.

Figure 30:
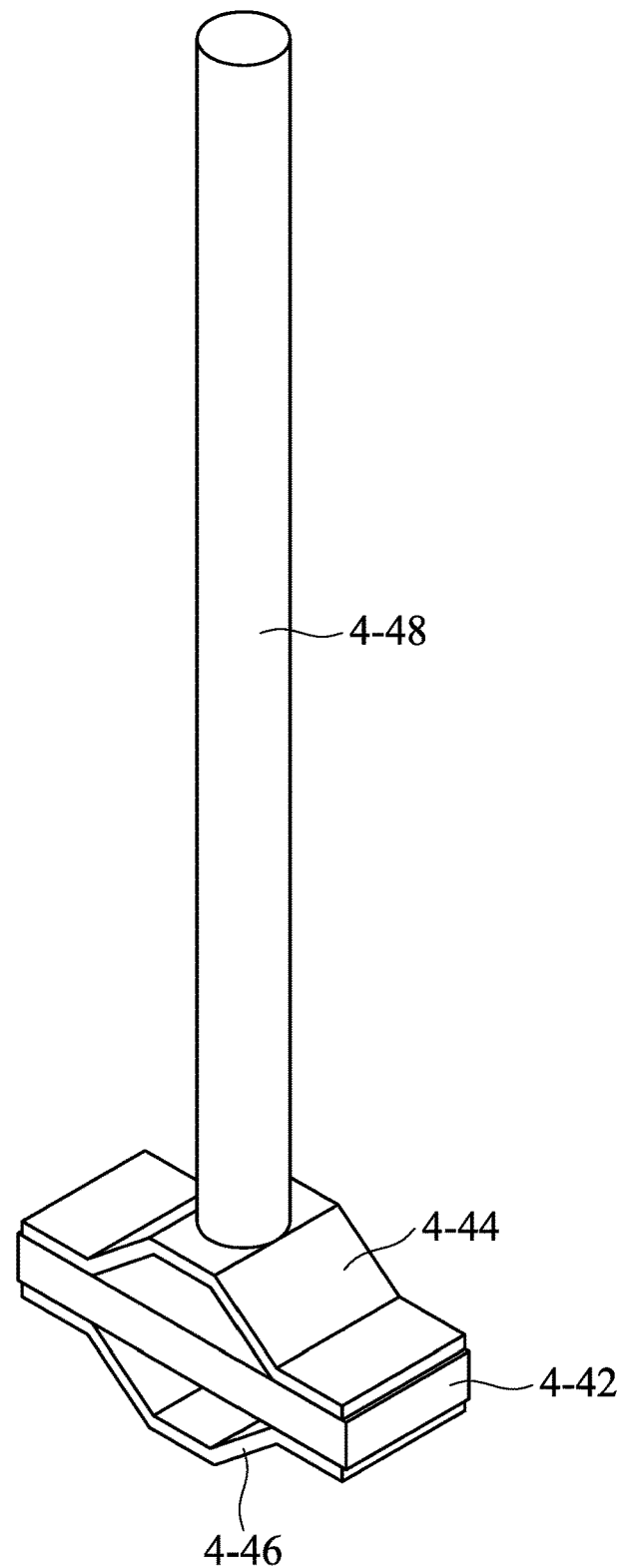
FIG. 30 and FIG. 31 are a perspective view and a side view of a driving assembly in some embodiments of the present disclosure, respectively.
Figure 31:
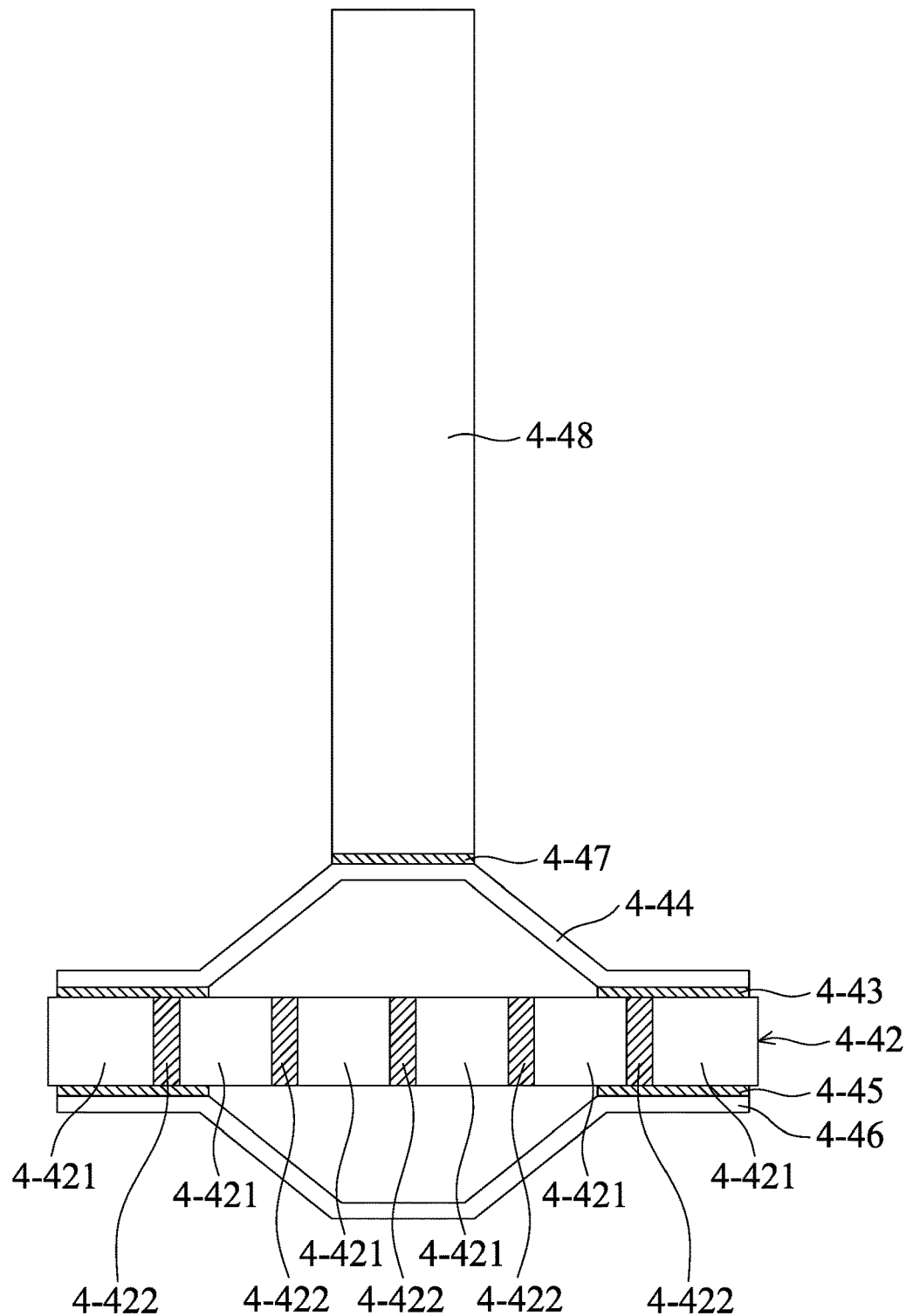

Refer to FIG. 30 and FIG. 31. FIG. 30 and FIG. 31 are a perspective view and a side view of a driving assembly 4-40 in some embodiments of the present disclosure, respectively. The driving assembly 4-40 mainly includes a driving element 4-42, a first resilient element 4-44, a second resilient element 4-46, and a transmission element 4-48. The driving element 4-42 is disposed between the first resilient element 4-44 and the second resilient element 4-46, and the transmission element 4-48 is connected to the driving element 4-42. In other words, both ends of the first resilient element 4-44 and the second resilient element 4-46 may be affixed to the driving element 4-42, and the middle of the first resilient element 4-44 and the second resilient element 4-46 are not directly connected to the driving element 4-42. In addition, the first resilient element 4-44 and the second resilient element 4-46 may be disposed on different sides of the driving element 4-42, respectively.

For example, a first bonding element 4-43 may be disposed between the driving element 4-42 and the first resilient element 4-44 to connect the driving element 4-42 and the first resilient element 4-44. In addition, a second connecting element 4-45 may be provided between the driving element 4-42 and the second resilient element 4-46 to connect the driving element 4-42 and the second resilient element 4-46. Furthermore, a third connecting element 4-47 may be provided between the driving element 4-42 and the transmission element 4-48 to connect the driving element 4-42 and the transmission element 4-48.

It should be noted that in the present disclosure, the extending direction of the transmission element 4-48 (or other transmission elements described below) is defined as the "first direction", and The deformation direction of the driving element 4-42 (or other driving elements described below) is defined as the "second direction".

In some embodiments, the first bonding element 4-43 and the second bonding element 4-45 may have similar materials, and the third bonding element 4-47 may have a different material. For example, the strain of the first bonding element 4-43 or the second bonding element 4-45 may be greater than the strain of the third bonding element 4-47. In other words, when subjected to stress, the deformation amount of the first bonding element 4-43 or the second bonding element 4-45 may be greater than the deformation amount of the third bonding element 4-47.

In some embodiments, the driving element 4-42 may include a plurality of piezoelectric units 4-421 (e.g., at least two piezoelectric units 4-421), and the piezoelectric units 4-421 may be connected by adhering elements 4-422. The piezoelectric units 4-421 may electrically connect to each other. For example, the piezoelectric units 4-421 may connect in series or in parallel to each other, depending on design requirements.

In some embodiments, the piezoelectric units 4-421 of the driving element 4-42 may form of piezoelectric materials. That is to say, when an electric field (voltage) is applied to the surface of the driving element 4-42, the electric dipole moment of the driving element 4-42 may be elongated, and the driving element 4-42 is resistant to changes and will extend along the electric field direction. Therefore, electrical energy may convert into mechanical energy. In some embodiments, an electric field in the X direction (second direction) may be applied to the driving element 4-42, so that the length of the driving element 4-42 in the X direction may be changed (e.g., elongated or shortened).

The first resilient element 4-44 and the second resilient element 4-46 may include a material that is deformable when subjected to force, so the first resilient element 4-44 and the second resilient element 4-46 may be deformed by the driving element 4-42 when the driving element 4-42 is deformed in the X direction. For example, the dimensions of the first resilient element 4-44 and the second resilient element 4-46 in the X direction and the Y direction may be changed. In some embodiments, the deformation amounts of the first resilient element 4-44 and the second resilient element 4-46 in the X direction are substantially the same.

In some embodiments, the materials of the first resilient element 4-44 and the second resilient element 4-46 may include metal materials, but they are not limited thereto. In addition, the transmission element 4-48 may include a material with a smooth surface, such as carbon (e.g., graphite), but it is not limited thereto.

In some embodiments, as shown in FIG. 31, the length of the driving element 4-42 in the X direction may be greater than the length of the first resilient element 4-44 or the second resilient element 4-46 in the X direction. As a result, the first resilient element 4-44 and the second resilient element 4-46 may have sufficient contact area with the driving element 4-42 to improve their bonding strength.

Figure 32F:
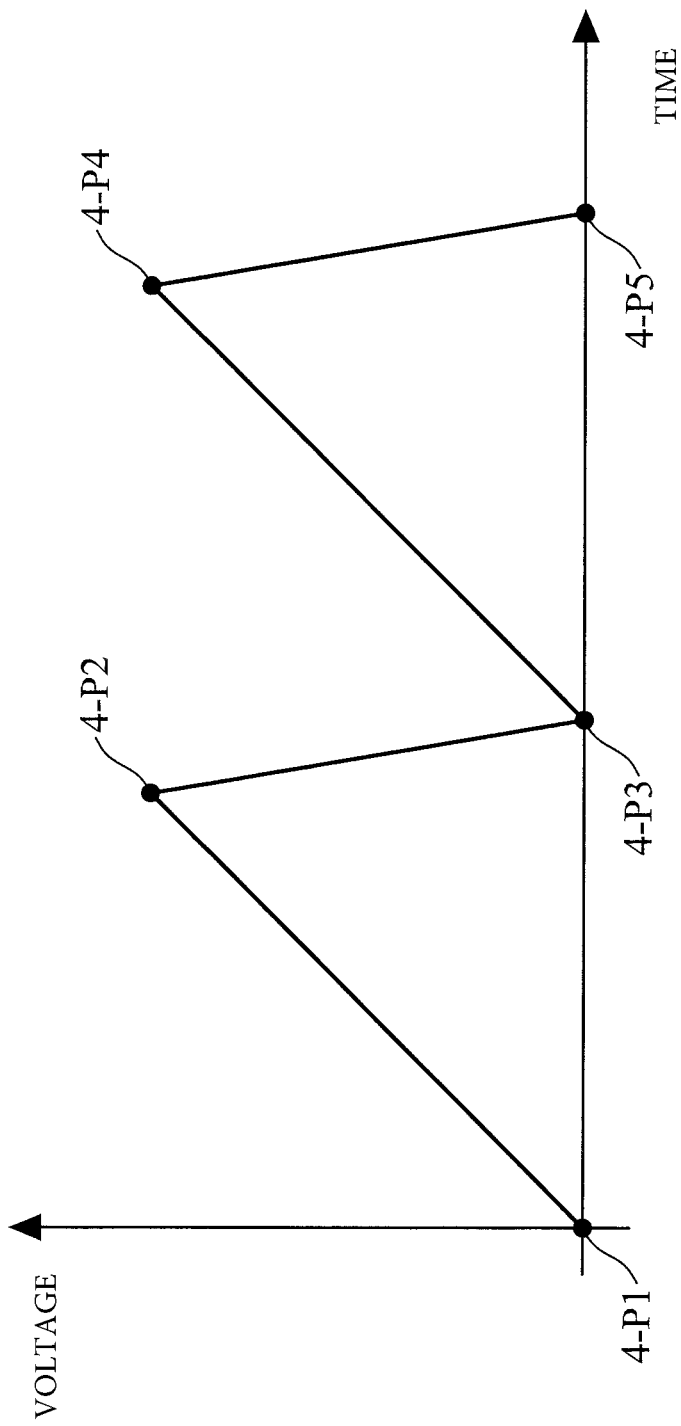
FIG. 32F is a schematic view of the relationship between the voltage applied to the driving assembly and time in this method.

FIG. 32A to FIG. 32E are schematic views of a method in which the movable portion 4-20 is driven by the driving assembly 4-40 in Y direction (first direction), and FIG. 32F is a schematic view of the relationship between the voltage applied to the driving assembly 4-40 and time in this method. As shown in FIG. 32A, the movable portion 4-20 is movably disposed on the transmission element 4-48 of the driving assembly 4-40. It may be disposed on the transmission element 4-48 by frictional contact, for example. If the force applied on the transmission element 4-48 is greater than the maximum static friction between the movable portion 4-20 and the transmission element 4-48, the movable portion 4-20 may be moved relative to the transmission element 4-48 in the extending direction of the transmission element 4-48 (the first direction, such as the Y direction in FIG. 32A to FIG. 32E).

The state of FIG. 32A corresponds to the point 4-P1 in FIG. 32F, in which no voltage is applied to the driving assembly 4-40. The movable portion 4-20 is at a starting position at this time, the distance between the movable portion 4-20 and the bottom of the second resilient element 4-46 is 4-D1, and the length of the driving element 4-42 in the X direction at this time is 4-W1.

Next, as shown in FIG. 32B, a voltage is applied to the driving assembly 4-40 to shorten the length of the driving element 4-42 in the X direction to the length 4-W2. In other words, the length 4-W1 is greater than the length 4-W2. At this time, since both ends of the first resilient element 4-44 and the second resilient element 4-46 are affixed to the driving element 4-42, the first resilient element 4-44 and the second resilient element 4-46 may also be moved by the driving element 4-42, which is deformed in the X direction (second direction). As a result, the size of the first resilient element 4-44 and the second resilient element 4-46 in the X direction may be reduced as well, thereby increasing the sizes of the first resilient element 4-44 and the second resilient element 4-46 in the Y direction. Therefore, the transmission element 4-48 disposed on the first resilient element 4-44 may be also driven together and move in the Y direction.

Since the movable portion 4-20 is disposed on the transmission element 4-48 by frictional contact, a voltage with a slower increasing speed may be applied to the driving assembly 4-40 to make the force received by the movable portion 4-20 less than the maximum static friction between the movable portion 4-20 and the transmission element 4-48, to allow the movable portion 4-20 and the transmission element 4-48 to move together in the Y direction. At this time, the distance between the movable portion 4-20 and the bottom of the second resilient element 4-46 is 4-D2, and the distance 4-D2 is greater than the distance 4-D1. The state at this time corresponds to the point 4-P2 in FIG. 32F.

Next, as shown in FIG. 32C, another voltage is applied to the driving assembly 4-40 to increase the length of the driving element 4-42 in the X direction to the length 4-W3, and the corresponding state at this time is the point 4-P3 in FIG. 32F. It should be noted that the changing direction of the applied voltage at this time is opposite the changing direction of the applied voltage in the state of FIG. 32B, and the absolute value of the applied current in FIG. 32C (the differential of voltage with respect to time at this time, which is the slope between the point 4-P2 and the point 4-P3 in FIG. 32F) is greater than the absolute value of the applied current in FIG. 32B (the slope between the point 4-P1 and the point 4-P2 in FIG. 32F). In other words, the absolute value of the rate of change of the length of the driving element 4-42 at this time is greater than that in FIG. 32B, that is, the force received by the movable portion 4-20 will be greater than that in the state of FIG. 32B.

By designing the force applied on the movable portion 4-20 in the state of FIG. 32C to be greater than the maximum static friction force between the movable portion 4-20 and the transmission element 4-48, the movable portion 4-20 may be allowed to move relative to the transmission elements 4-48. For example, at this time, the distance between the movable portion 4-20 and the bottom of the second resilient element 4-46 is 4-D3, and the distance 4-D3 is greater than the distance 4-D1 in FIG. 32A, and is substantially equal to the distance 4-D2 in FIG. 32B. Thereby, the movable portion 4-20 may move in the Y direction (first direction).

FIG. 32D and FIG. 32E are similar to the states of FIG. 32B and FIG. 32C, wherein another voltage is applied to the driving assembly 4-40 in the state of FIG. 32D, so that the length of the driving element 4-42 in the X direction is reduced to the length 4-W4. In the state of FIG. 32E, another voltage is applied to the driving assembly 4-40 to increase the length of the driving element 4-42 in the X direction to the length 4-W5, wherein the length 4-W4 is less than the length 4-W3, and the length 4-W5 is greater than the length 4-W4. The state of FIG. 32D corresponds to the point 4-P4 in FIG. 32F, and the state of FIG. 32E corresponds to the point 4-P5 in FIG. 32F. The absolute value of the applied current in FIG. 32D is less than the absolute value of the applied current in FIG. 32E, that is, the absolute value of the slope between points 4-P3 and 4-P4 is less than the absolute value of the slope between points 4-P4 and 4-P5. In this way, the distance between the movable portion 4-20 and the bottom of the second resilient element 4-46 may be changed to the distance 4-D4 (FIG. 32D) and the distance 4-D5 (FIG. 32E) in a similar manner as shown in FIG. 32B and FIG. 32C. The distance 4-D4 is greater than the distance 4-D3 in FIG. 32C, and the distance 4-D5 is substantially equal to the distance 4-D4. As a result, the movable portion 4-20 may further move in the Y direction.

Figure 33F:
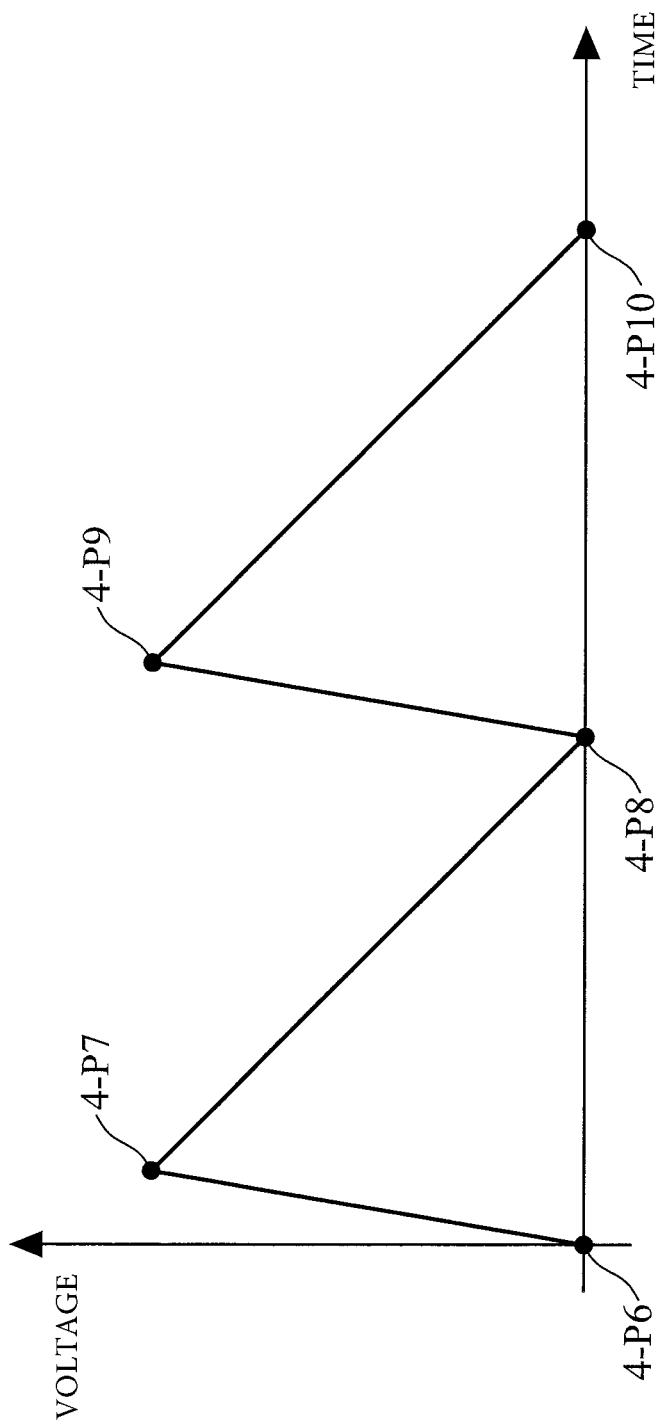
FIG. 33F is a schematic view of the relationship between the voltage applied to the driving assembly and time in this method.

FIG. 33A to FIG. 33E are schematic views of a method in which the movable portion 4-20 is driven by the driving assembly 4-40 in the -Y direction, and FIG. 33F is a schematic view of the relationship between the voltage applied to the driving assembly 4-40 and time in this method. As shown in FIG. 33A, the movable portion 4-20 is movably disposed on the transmission element 4-48 of the driving assembly 4-40. It may be disposed on the transmission element 4-48 by frictional contact, for example. If the force applied on the transmission element 4-48 is greater than the maximum static friction between the movable portion 4-20 and the transmission element 4-48, the movable portion 4-20 may be moved relative to the transmission element 4-48 in the extending direction of the transmission element 4-48 (the first direction, such as the -Y direction in FIG. 33A to FIG. 33E).

The state of FIG. 33A corresponds to the point 4-P6 in FIG. 33F, in which no voltage is applied to the driving assembly 4-40. The movable portion 4-20 is at a starting position at this time, the distance between the movable portion 4-20 and the bottom of the second resilient element 4-46 is 4-D6, and the length of the driving element 4-42 in the X direction at this time is 4-W6.

Next, as shown in FIG. 33B, a voltage is applied to the driving assembly 4-40 to shorten the length of the driving element 4-42 in the X direction to the length 4-W7. In other words, the length 4-W6 is greater than the length 4-W7. At this time, since both ends of the first resilient element 4-44 and the second resilient element 4-46 are affixed to the driving element 4-42, the first resilient element 4-44 and the second resilient element 4-46 may also be moved by the driving element 4-42, which is deformed in the X direction (second direction). As a result, the size of the first resilient element 4-44 and the second resilient element 4-46 in the X direction may be reduced as well, thereby increasing the sizes of the first resilient element 4-44 and the second resilient element 4-46 in the Y direction. Therefore, the transmission element 4-48 disposed on the first resilient element 4-44 may be also driven together and move in the Y direction (first direction).

Since the movable portion 4-20 is disposed on the transmission element 4-48 by frictional contact, a more severe voltage may be applied to the driving assembly 4-40 to make the force received by the movable portion 4-20 greater than the maximum static friction between the movable portion 4-20 and the transmission element 4-48, to allow the movable portion 4-20 move relative to the transmission element 4-48 in the Y direction. At this time, the distance between the movable portion 4-20 and the bottom of the second resilient element 4-46 is 4-D7, and the distance 4-D7 is substantially equal to the distance 4-D6. The state at this time corresponds to the point 4-P7 in FIG. 33F.

Next, as shown in FIG. 33C, another voltage is applied to the driving assembly 4-40 to increase the length of the driving element 4-42 in the X direction to the length 4-W8, and the corresponding state at this time is the point 4-P8 in FIG. 33F. It should be noted that the changing direction of the applied voltage at this time is opposite the changing direction of the applied voltage in the state of FIG. 33B, and the absolute value of the applied current in FIG. 33C (the differential of voltage with respect to time at this time, which is the slope between the point 4-P7 and the point 4-P8 in FIG. 33F) is less than the absolute value of the applied current in FIG. 33B (the slope between the point 4-P6 and the point 4-P7 in FIG. 33F). In other words, the absolute value of the rate of change of the length of the driving element 4-42 at this time is less than that in FIG. 33B, that is, the force received by the movable portion 4-20 will be less than that in the state of FIG. 33B.

By designing the force applied on the movable portion 4-20 in the state of FIG. 33C to be less than the maximum static friction force between the movable portion 4-20 and the transmission element 4-48, the movable portion 4-20 may be allowed to move together with the transmission elements 4-48. For example, at this time, the distance between the movable portion 4-20 and the bottom of the second resilient element 4-46 is 4-D8, and the distance 4-D8 is less than the distance 4-D6 in FIG. 33A and the distance 4-D7 in FIG. 33B. Thereby, the movable portion 4-20 may move in the −Y direction (first direction).

FIG. 33D and FIG. 33E are similar to the states of FIG. 33B and FIG. 33C, wherein another voltage is applied to the driving assembly 4-40 in the state of FIG. 33D, so that the length of the driving element 4-42 in the X direction is reduced to the length 4-W9. In the state of FIG. 33E, another voltage is applied to the driving assembly 4-40 to increase the length of the driving element 4-42 in the X direction to the length 4-W10, wherein the length 4-W9 is less than the length 4-W8, and the length 4-W10 is greater than the length 4-W9. The state of FIG. 33D corresponds to the point 4-P9 in FIG. 33F, and the state of FIG. 33E corresponds to the point 4-P10 in FIG. 33F. The absolute value of the applied current in FIG. 33D is greater than the absolute value of the applied current in FIG. 33E, that is, the absolute value of the slope between points 4-P8 and 4-P9 is greater than the absolute value of the slope between points 4-P9 and 4-P10. In this way, the distance between the movable portion 4-20 and the bottom of the second resilient element 4-46 may be changed to the distance 4-D9 (FIG. 33D) and the distance 4-D10 (FIG. 33E) in a similar manner as shown in FIG. 33B and FIG. 33C. The distance 4-D9 is substantially equal to the distance 4-D8 in FIG. 33C, and the distance 4-D10 is less than the distance 4-D9. As a result, the movable portion 4-20 may further move in the −Y direction.

The absolute value of the slope between the point 4-P1 and the point 4-P2, the absolute value of the slope between the point 4-P3 and the point 4-P4, the absolute value of the slope between the point 4-P6 and the point 4-P7, and the absolute value of the slope between the point 4-P8 and the point 4-P9 may be substantially identical. The absolute value of the slope between the point 4-P2 and the point 4-P3, the absolute value of the slope between the point 4-P4 and the point 4-P5, the absolute value of the slope between the point 4-P7 and the point 4-P8, and the absolute value of the slope between the point 4-P9 and the point 4-P10 may also be substantially identical. Therefore, the design of the optical element driving mechanism 4-100 may be simplified.

In some embodiments, the voltage on the Y axis in FIG. 32F or FIG. 33F may also be changed to current, that is, the drive components 4-40 also may be operated in the foregoing manner by changing the current, depending on design requirements.

By repeating the states of FIG. 32A to FIG. 32E or the states of FIG. 33A to FIG. 33E, the movable portion 4-20 may be moved to a specific position, thereby controlling the position of the movable portion 4-20 in the Y direction. In some embodiments, the position of the movable portion 4-20 in the Y direction may be sensed by a sensing element (not shown), and the driving assembly 4-40 may be controlled by the sensed position signal to stop driving the driving assembly 4-40 when the movable portion 4-20 reaching the desired position. The aforementioned sensing element may include a Hall sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate sensor.

Figure 34:
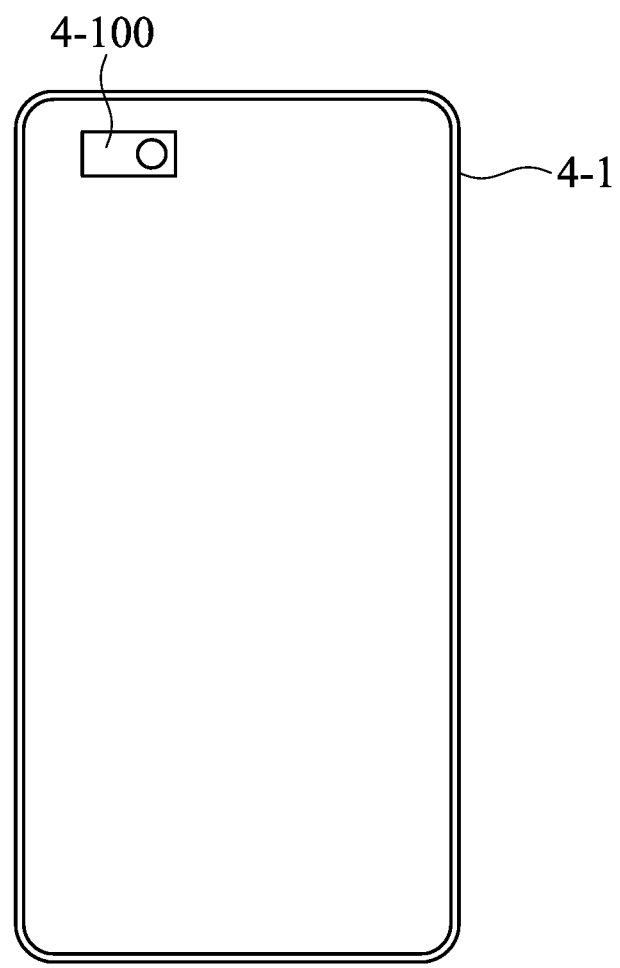
FIG. 34 is a schematic view of an electronic device in some embodiments of the present disclosure.

FIG. 34 is a schematic view of an electronic device 4-1 according to some embodiments of the present disclosure. The electronic device 4-1 may be, for example, a mobile electronic device (e.g. mobile phone, tablet, notebook computer, etc.), and the electronic device 4-1 may have an optical element driving mechanism 4-100 to allow the electronic device 4-1 taking a photo.

Figure 35A:
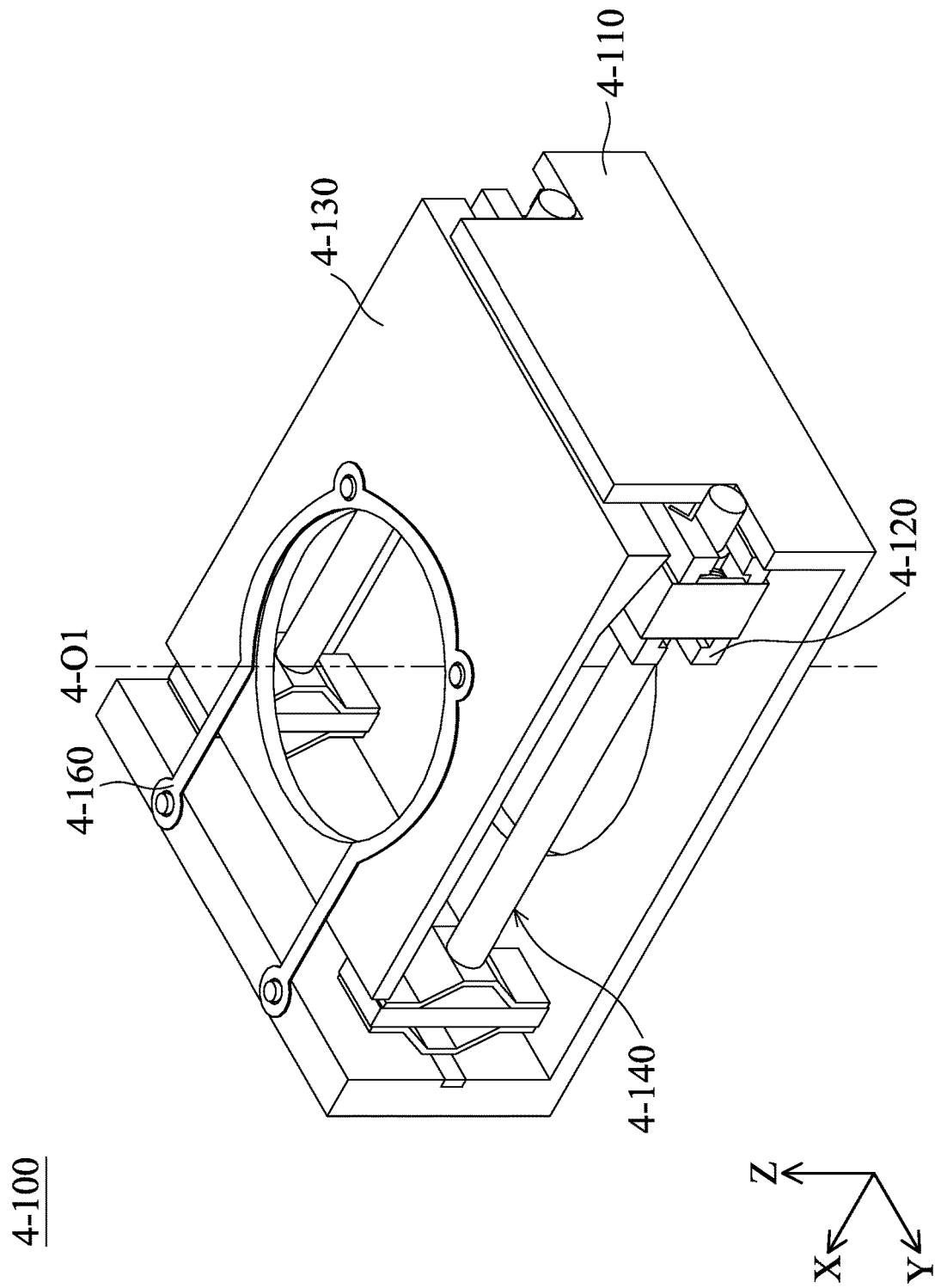
FIG. 35A is a schematic view of an optical element driving mechanism in some embodiments of the present disclosure.
Figure 35B:
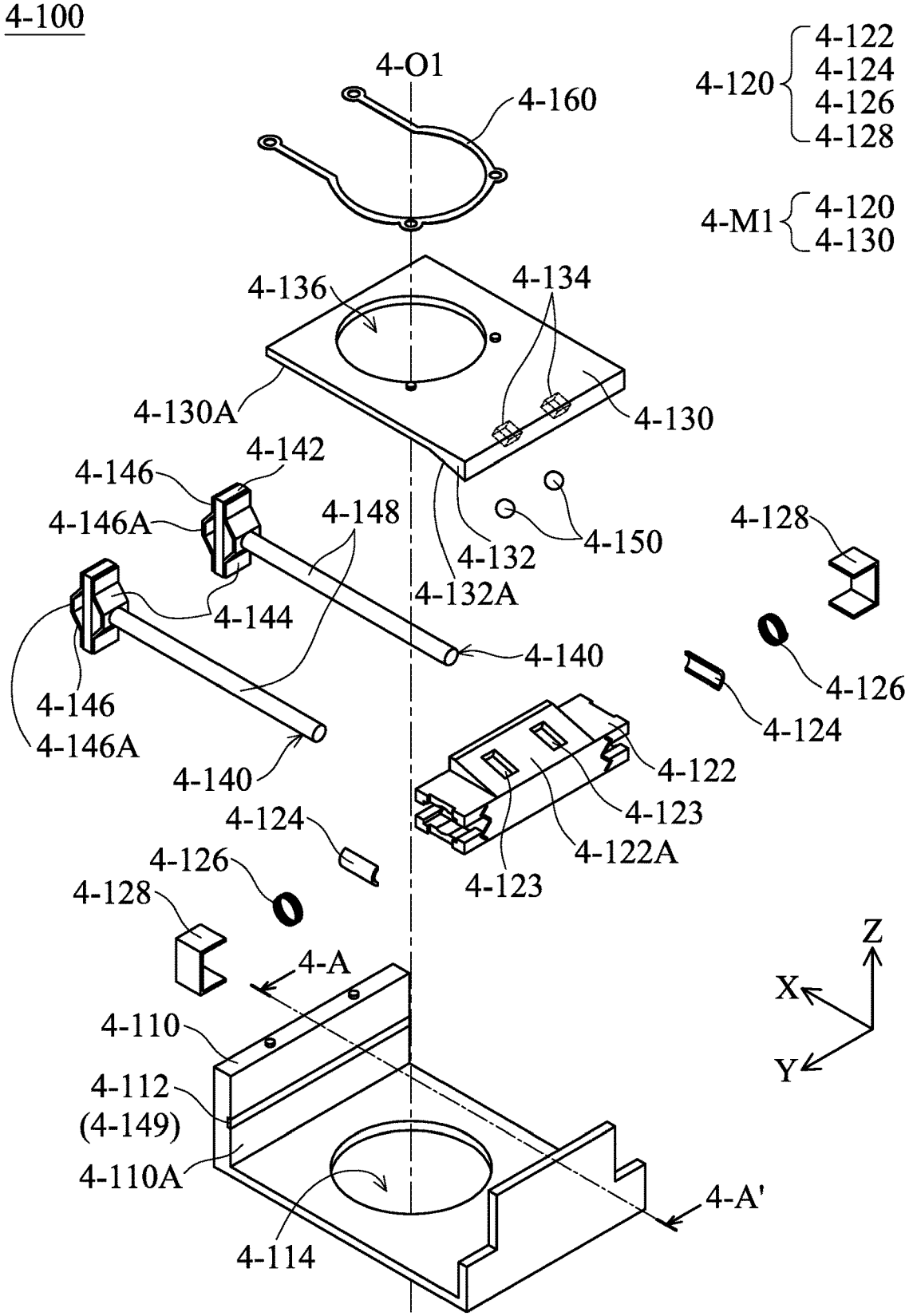
FIG. 35B is an exploded view of the optical element driving mechanism.
Figure 36A:
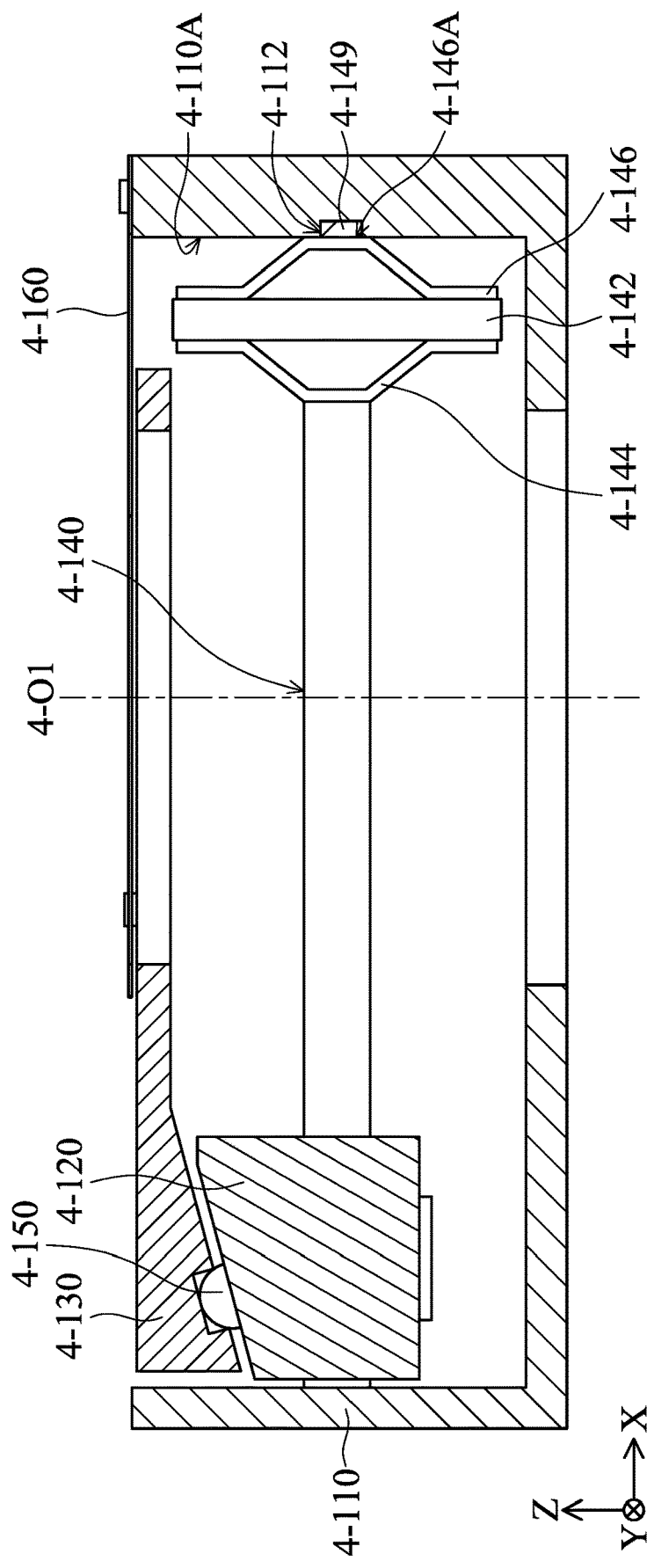
FIG. 36A is a schematic view of the optical element driving mechanism when viewed in the Y direction in FIG. 35A.
Figure 36B:
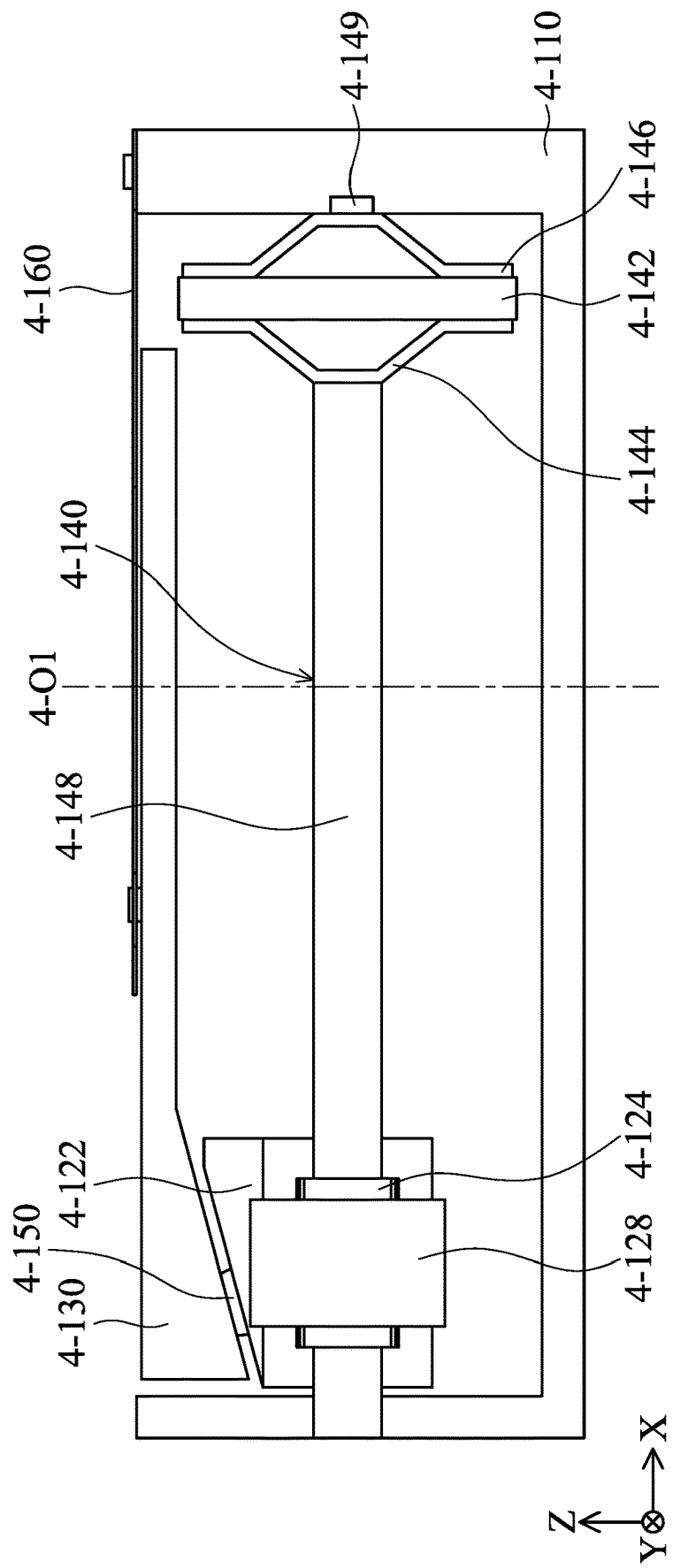
FIG. 36B is a cross-sectional view of the optical element driving mechanism illustrated along the line 4-A-4-A' in FIG. 35A.

FIG. 35A is a schematic view of an optical element driving mechanism 4-100 of some embodiments of the present disclosure. FIG. 35B is an exploded view of the optical element driving mechanism 4-100. FIG. 36A is a schematic view of the optical element driving mechanism 4-100 viewed in the Y direction of FIG. 35A. FIG. 36B is a cross-sectional view of the optical element driving mechanism 4-100 illustrated along a line 4-A-4-A' in FIG. 35A. As shown in FIG. 35A to FIG. 36B, the optical element driving mechanism 4-100 may mainly include a base 4-110 (or fixed portion 4-110) and a movable portion 4-M1 (which includes a first movable portion 4-120 and a second movable portion 4-130), two driving assemblies 4-140, two intermediate elements 4-150, and a third resilient element 4-160 arranged on a main axis 4-01. It should be noted that the coordinate axis of the following embodiments is different from the previous embodiments.

In some embodiments, the driving assembly 4-140 may include a driving element 4-142, a first resilient element 4-144, a second resilient element 4-146, and a transmission element 4-148, and the materials and functions of which are similar to that of the driving element 4-42, the first resilient element 4-44, the second resilient element 4-46, and the transmission element 4-48 of the driving assembly 4-40, which will not be repeated here. In addition, the first bonding element 4-43, the second bonding element 4-45, and the third bonding element 4-47 in FIG. 35A to FIG. 36B are omitted in the driving assembly 4-140 for brevity. It should be understood that the driving assembly 4-140 may also have similar elements.

The base 4-110 may have a first connecting surface 4-110A, and the second resilient element 4-146 of the driving assembly 4-140 may have a second connecting surface 4-146A. The first connecting surface 4-110A is opposite the second connecting surface 4-146A, that is, the first connecting surface 4-110A faces the second connecting surface 4-146A. A bonding element 4-149 may be provided between the first connecting surface 4-110A and the second connecting surface 4-146A, such as in a recess 4-112 on the first connecting surface 4-110, so that the driving assembly 4-140 may be affixed to the base 4-110. It should be noted that the first connecting surface 4-110A and the second connecting surface 4-146A are parallel to the deformation direction of the driving element 4-142 (the second direction, such as the Z direction in FIG. 35A to FIG. 36B). In addition, the base 4-110 may also have an opening 4-114, which allows light to pass through the opening 4-114 and reach a light sensing element (not shown) to receive the image signal passing through the opening 4-114.

Figure 36C:
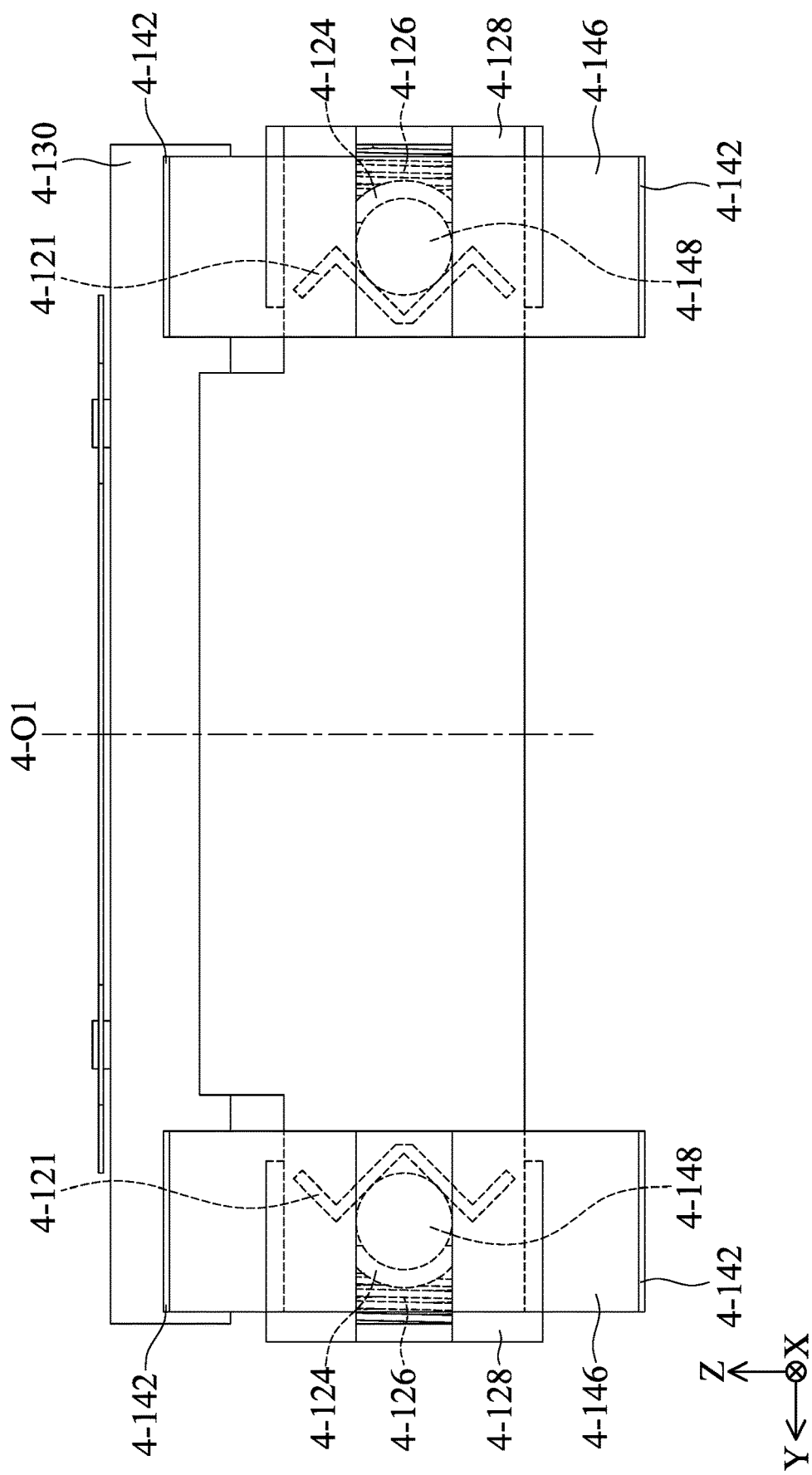
FIG. 36C is a schematic view of the optical element driving mechanism when viewed in the X direction.
Figure 37A:
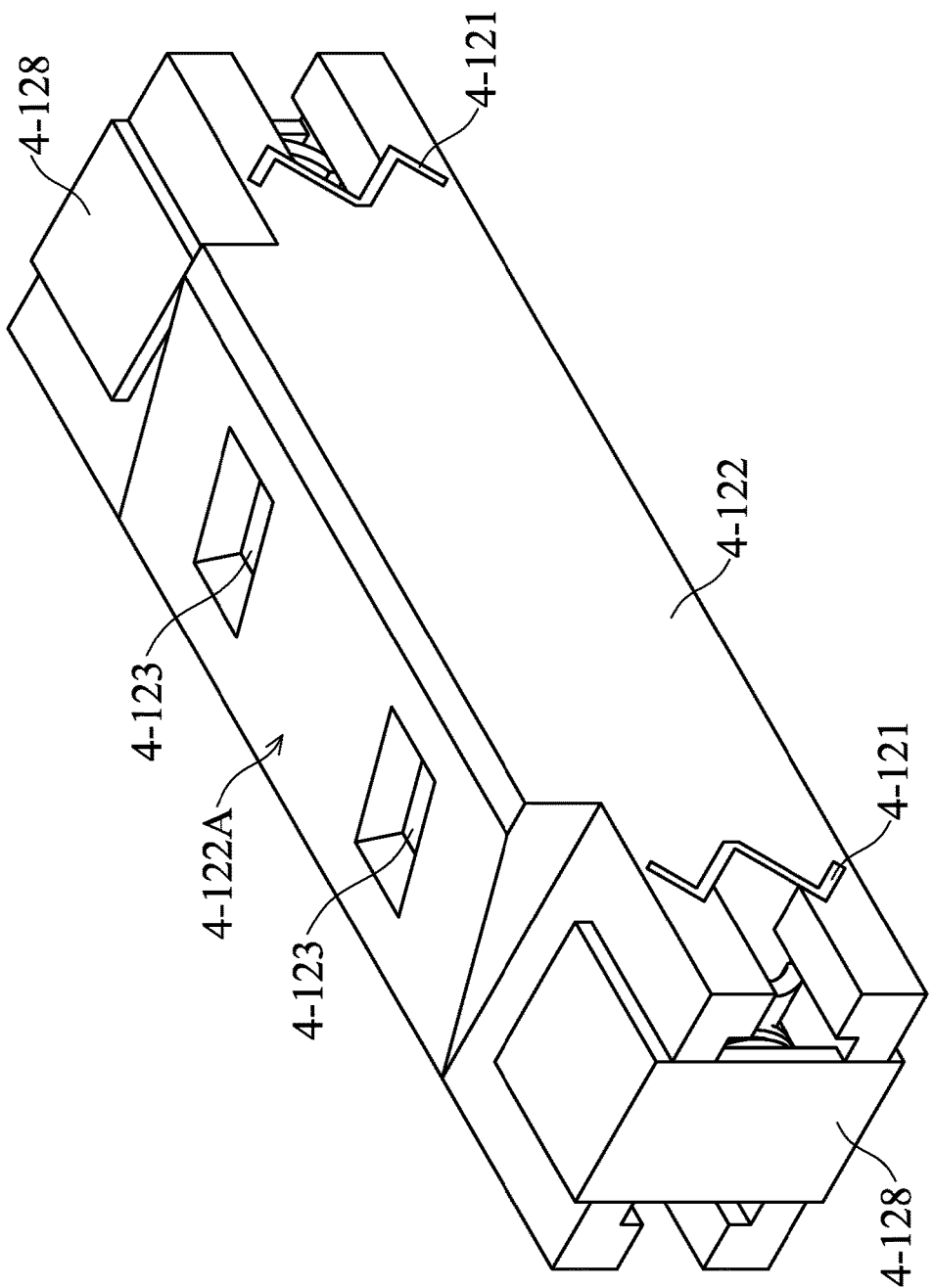
FIG. 37A is a perspective view of the first movable portion.
Figure 37C:
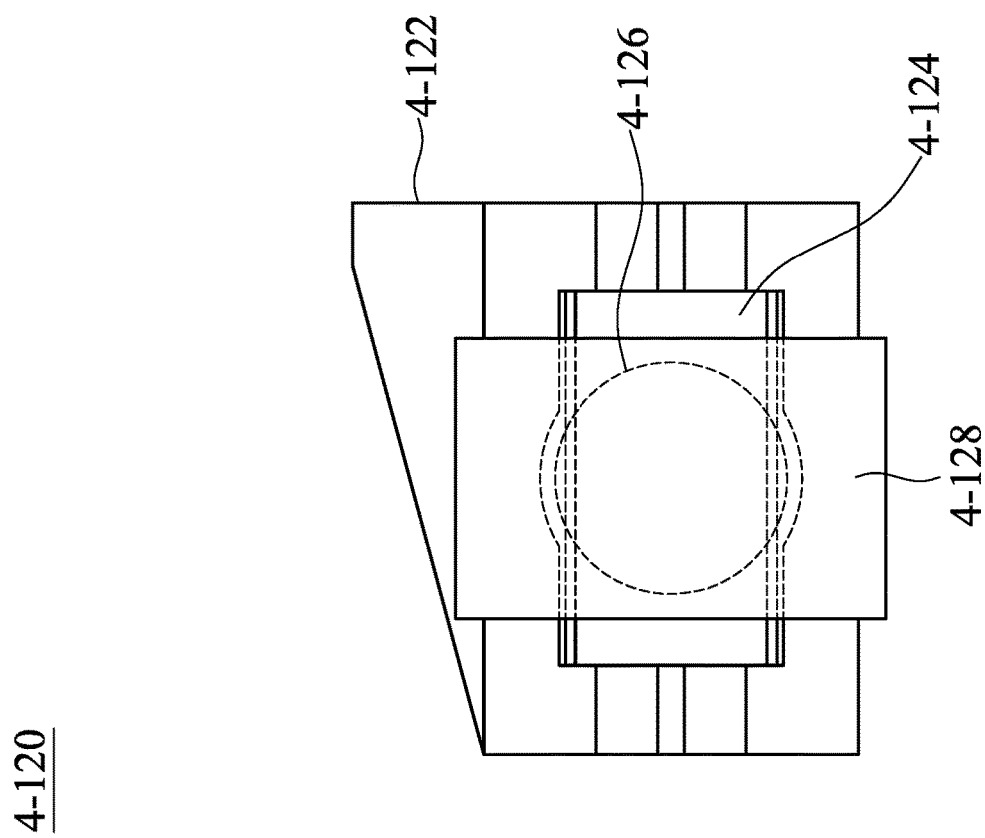
FIG. 37C is a side view of the first movable portion.
Figure 37B:
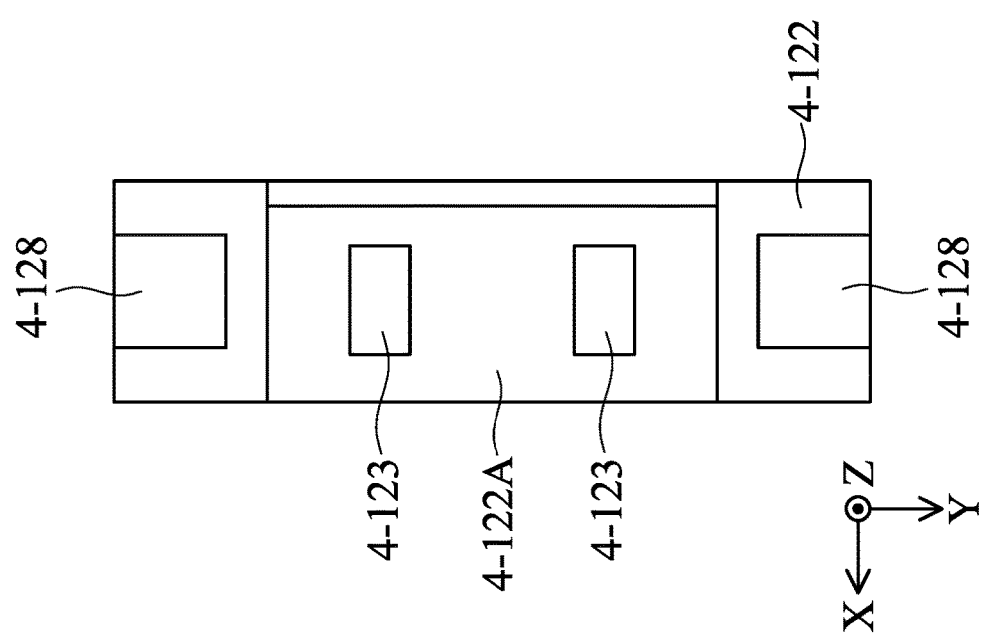
FIG. 37B is a top view of the first movable portion.

FIG. 36C is a schematic view of the optical element driving mechanism 4-100 when viewed from the X direction, in which the base 4-110 is omitted for simplicity. FIG. 37A is a perspective view of the first movable portion 4-120, FIG. 37B is a top view of the first movable portion 4-120, and FIG. 37C is a side view of the first movable portion 4-120. The first movable portion 4-120 of the movable portion 4-M1 may include a body 4-122, a contact unit 4-124, a pressing element 4-126, and a tightening element 4-128. The transmission element 4-148 may be disposed between the body 4-122 and the contact unit 4-124, and the pressing element 4-126 may be disposed between the contact unit 4-124 and the tightening element 4-128. The tightening element 4-128 may be disposed on the body 4-122. In addition, another contact unit 4-121 may be embedded in the body 4-122.

In some embodiments, the body 4-122 of the first movable portion 4-120 may have a first sliding surface 4-122A, and the first sliding surface 4-122A may have a first recess 4-123. The first sliding surface 4-122A may be parallel to the third direction (Y direction), and neither parallel nor perpendicular to the first direction (Z direction) and the second direction (X direction).

In some embodiments, the pressing element 4-126 may be, for example, a spring, and may press the transmission element 4-148 in a pressing direction (e.g., Y direction) through the contact unit 4-124. Therefore, the transmission element 4-148 abuts the contact unit 4-121 disposed on the body 4-122 of the first movable portion 4-120, wherein the pressing direction (for example, Y direction) is different from the first direction (for example, Z direction). In addition, the tightening element 4-128 may also be used to apply pressure to the pressing element 4-126 in the pressing direction. As shown in FIG. 36B, when viewed in the Y direction that is perpendicular to the first direction (e.g., the Z direction), the pressing element 4-126 at least partially overlaps the tightening element 4-128. In addition, in the Y direction, the transmission element 4-148, the pressing element 4-126, and the contact unit 4-124 at least partially overlap with each other. Thereby, the size of the movable portion 4-120 in a specific direction may be reduced to achieve miniaturization.

By providing the contact unit 4-124, the pressing element 4-126, and the tightening element 4-128 on the first movable portion 4-120, the transmission element 4-148 may be forced to abut the main body 4-122 of the first movable portion 4-120, and the transmission element 4-148 may be disposed on the first movable portion 4-120 in frictional contact. After that, the first movable portion 4-120 may be moved along the extending direction (first direction/Z direction) of the transmission element 4-148 by the principle of the foregoing embodiments.

In some embodiments, a third resilient element 4-160 may be disposed on the second movable portion 4-130 to limit the movable range of the second movable portion 4-130. The third resilient element 4-160 may be, for example, a spring sheet, and may movably connect the fixed portion 4-110 and the second movable portion 4-130. The second movable portion 4-130 is positioned between the third resilient element 4-160 and the transmission element 4-148.

Figures 38A, 38B:
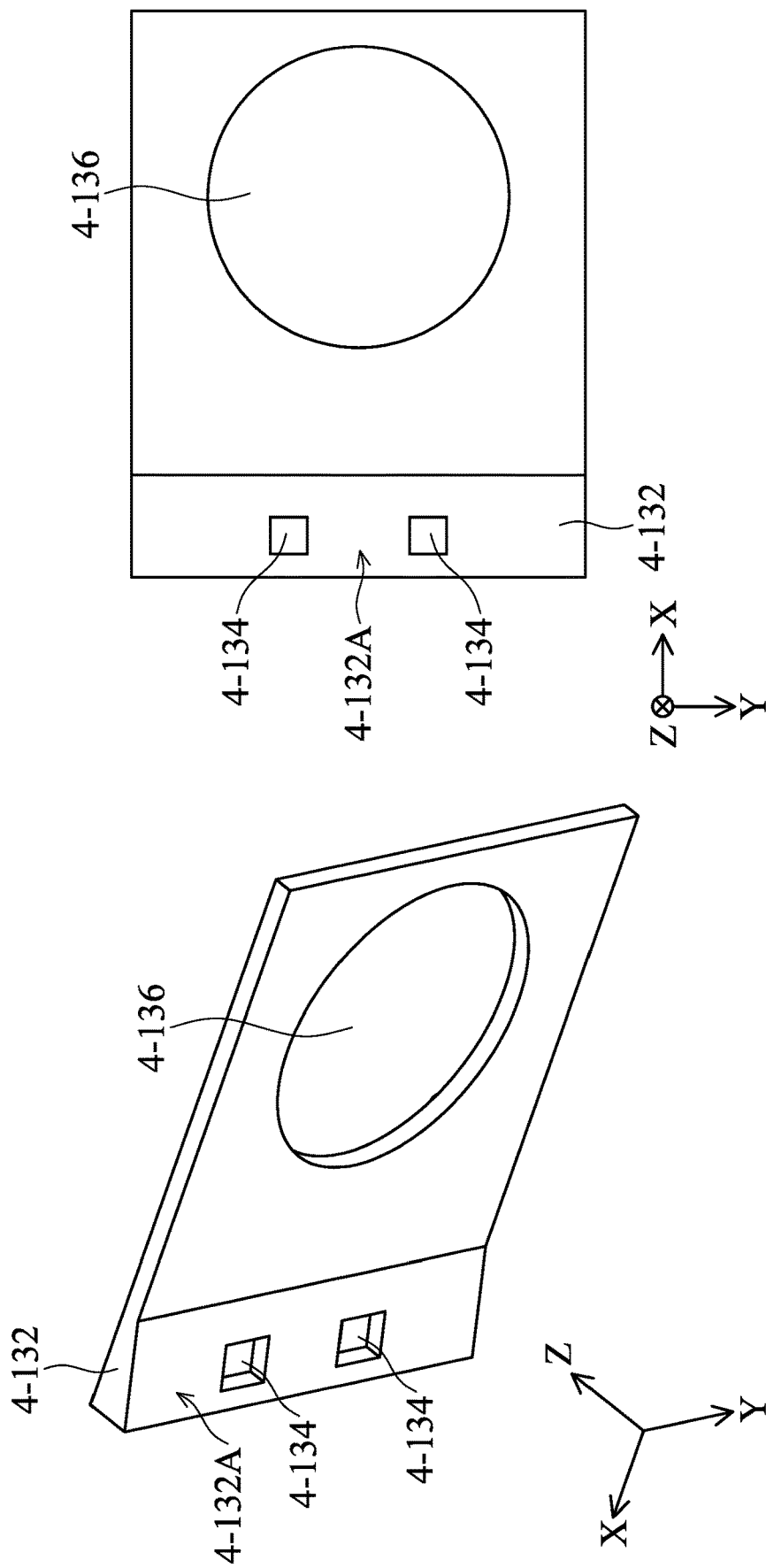
FIG. 38A is a schematic view of the second movable portion.
FIG. 38B is a bottom view of the second movable portion.

FIG. 38A is a schematic view of the second movable portion 4-130, and FIG. 38B is a bottom view of the second movable portion 4-130. The lower surface 4-130A of the second movable portion 4-130 has an inclined portion 4-132, and the inclined portion 4-132 has a second sliding surface 4-132A. The second sliding surface 4-132A may have a second recess 4-134. Both the first recess 4-123 and the second recess 4-134 extend in the first direction (X direction).

Figure 39A:
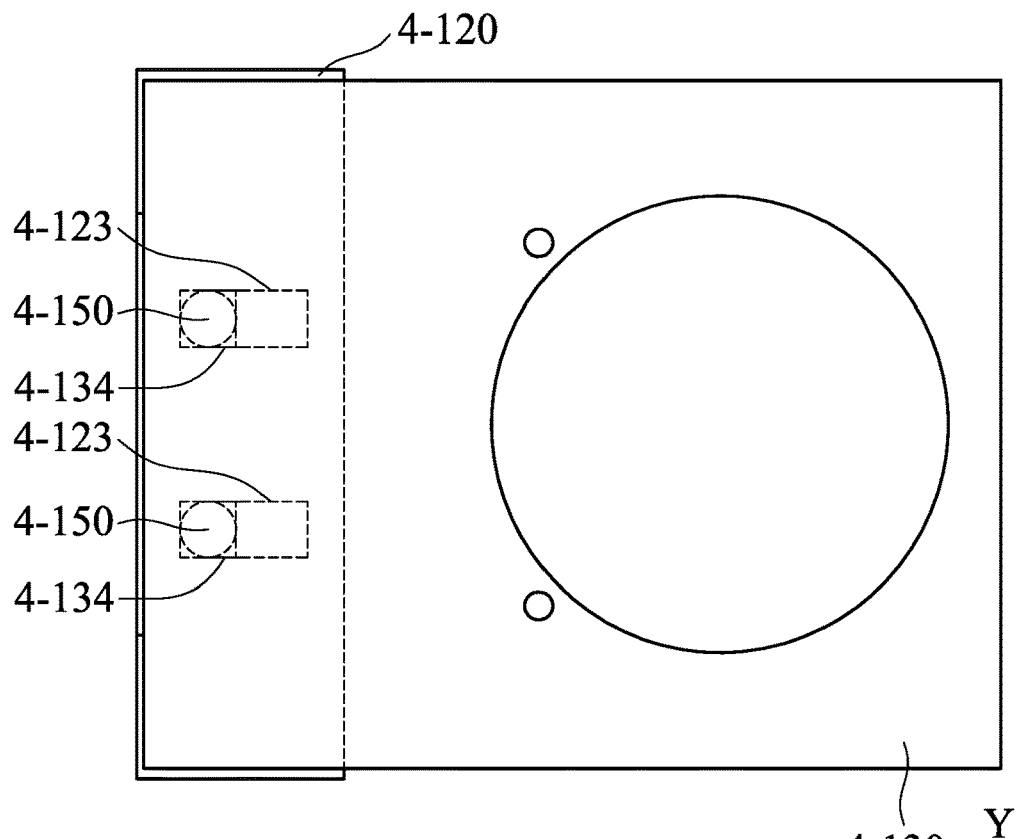
FIG. 39A is a top view of the first movable portion, the second movable portion, and the intermediate element.
Figure 39B:
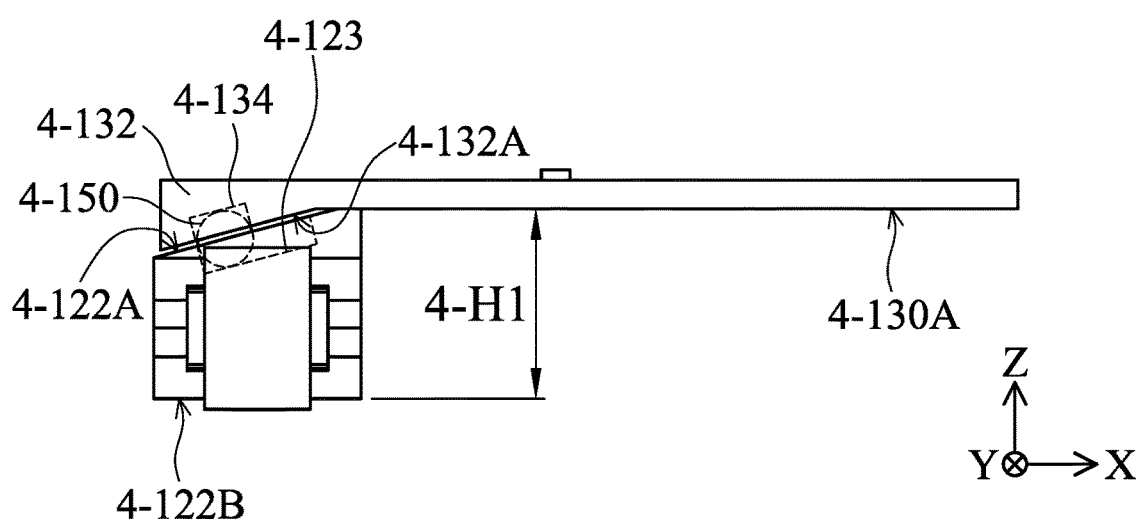
FIG. 39B is a side view of the first movable portion, the second movable portion, and the intermediate element.

An intermediate element 4-150 may be disposed between the first movable portion 4-120 and the second movable portion 4-130, and partially accommodated in the first recess 4-123 and the second recess 4-134. The intermediate element 4-150 may have a spherical shape, and may be movably disposed in the first recess 4-123 and the second recess 4-134 to roll, thereby reducing the frictional force between the first sliding surface 4-122A and the second sliding surface 4-132A to allow the second movable portion 4-130 move relative to the first movable portion 4-120. For example, FIG. 39A is a top view of the first movable portion 4-120, the second movable portion 4-130, and the intermediate element 4-150 in a state, and FIG. 39B is a side view the first movable portion 4-120, the second movable portion 4-130, and the intermediate element 4-150 in this state. At this time, the distance between the bottom surface 4-130A of the second movable portion 4-130 and an extension line of the bottom surface 4-122B of the body 4-122 of the first movable portion 4-120 in the Y direction is the distance 4-H1.

Figure 40A:
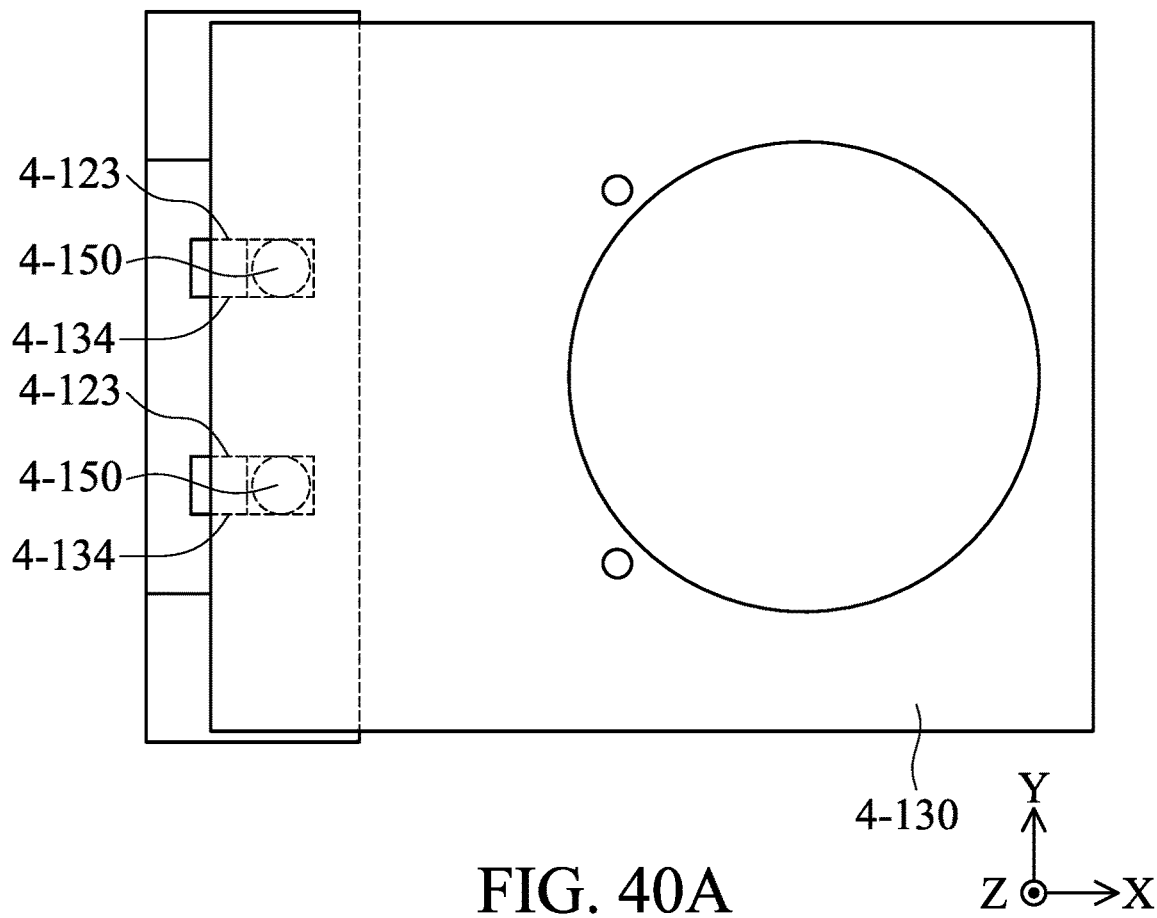
FIG. 40A is a top view of the first movable portion, the second movable portion, and the intermediate element.
Figure 40B:
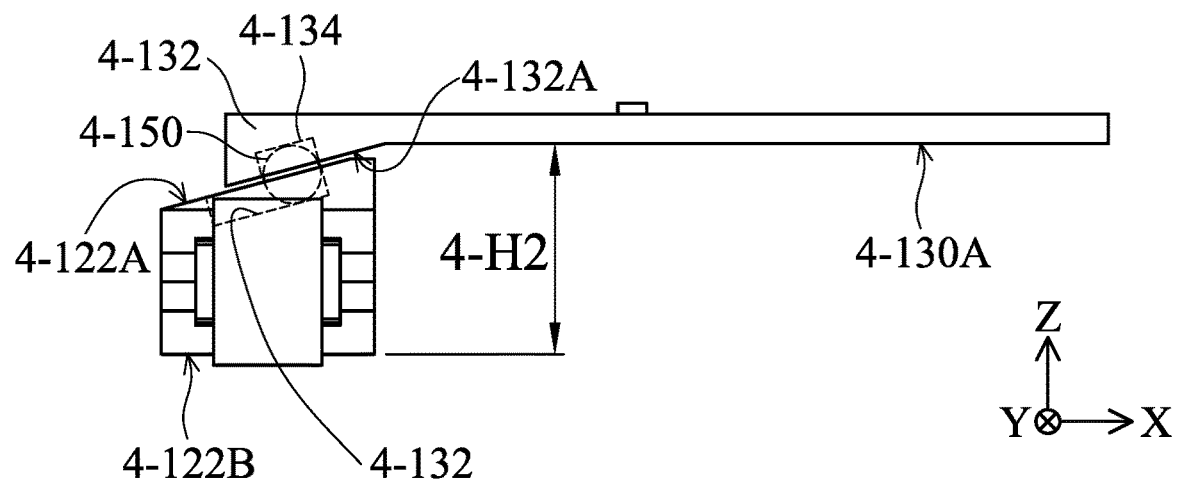
FIG. 40B is a side view of the first movable portion, the second movable portion, and the intermediate element.

Next, FIG. 40A is a top view of the first movable portion 4-120, the second movable portion 4-130, and the intermediate element 4-150 in another state, and FIG. 40B is a side view of the first movable portion 4-120, the second movable portion 4-130, and the intermediate element 4-150 in this state. At this time, the first movable portion 4-120 is driven by the driving assembly 4-140 (not shown) to move in the X direction, and the second movable portion 4-130 is also moved by the first movable portion 4-120 in the Y direction. In this state, the distance between the bottom surface 4-130A of the second movable portion 4-130 and the extension line of the bottom surface 4-122B of the body 4-122 of the first movable portion 4-120 in the Y direction is 4-H2, and the distance 4-H2 is greater than distance 4-H1. Therefore, the second movable portion 4-130 may move in the Z direction.

An optical element (not shown) may be disposed on the second movable portion 4-130 to move the optical element in the Z direction. For example, the optical element may be disposed in the opening 4-136 of the second movable portion 4-130, for example, it may be fixed by means of locking, bonding, or snapping. The aforementioned optical element may be, for example, a lens, a mirror, a prism, a beam splitter, an aperture, a camera module, or a depth sensor, etc. Thereby, the optical element driving mechanism 4-100 may drive the optical element to move in the Z direction, and thus achieving auto focus (AF).

Figure 41A:
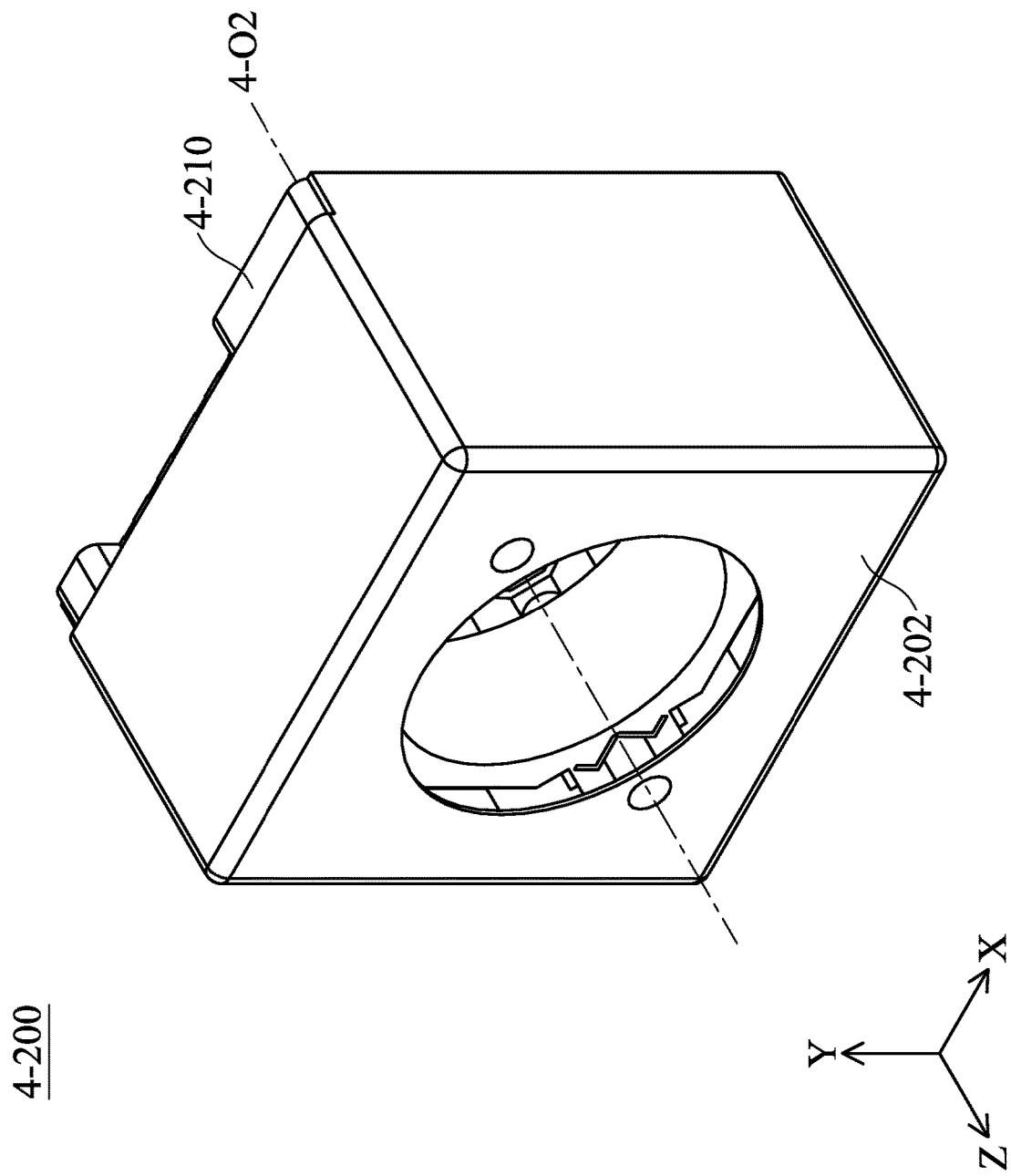
FIG. 41A is a schematic view of the optical element driving mechanism in some embodiments of the present disclosure.
Figure 41B:
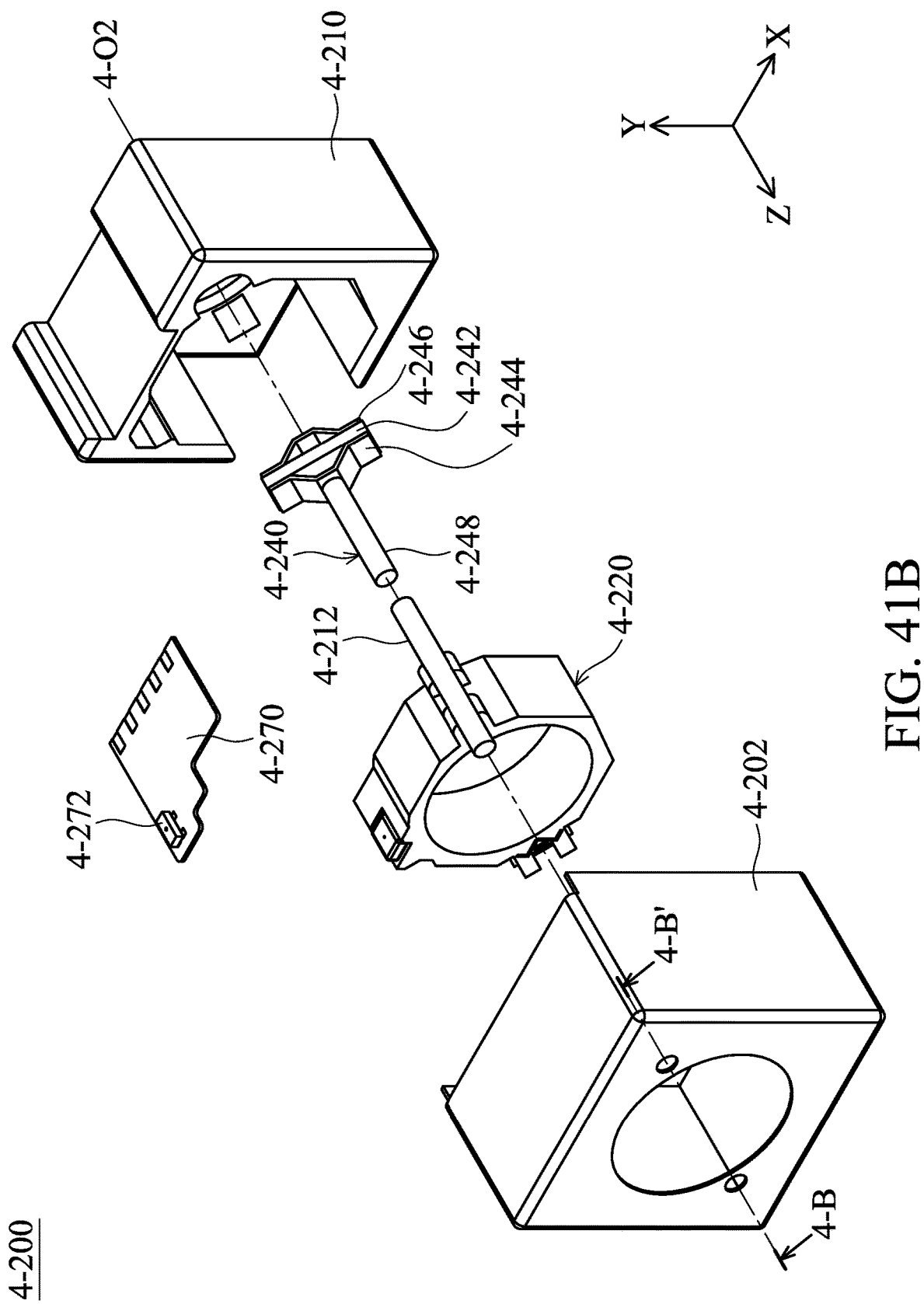
FIG. 41B is an exploded view of the optical element driving mechanism.
Figure 41C:
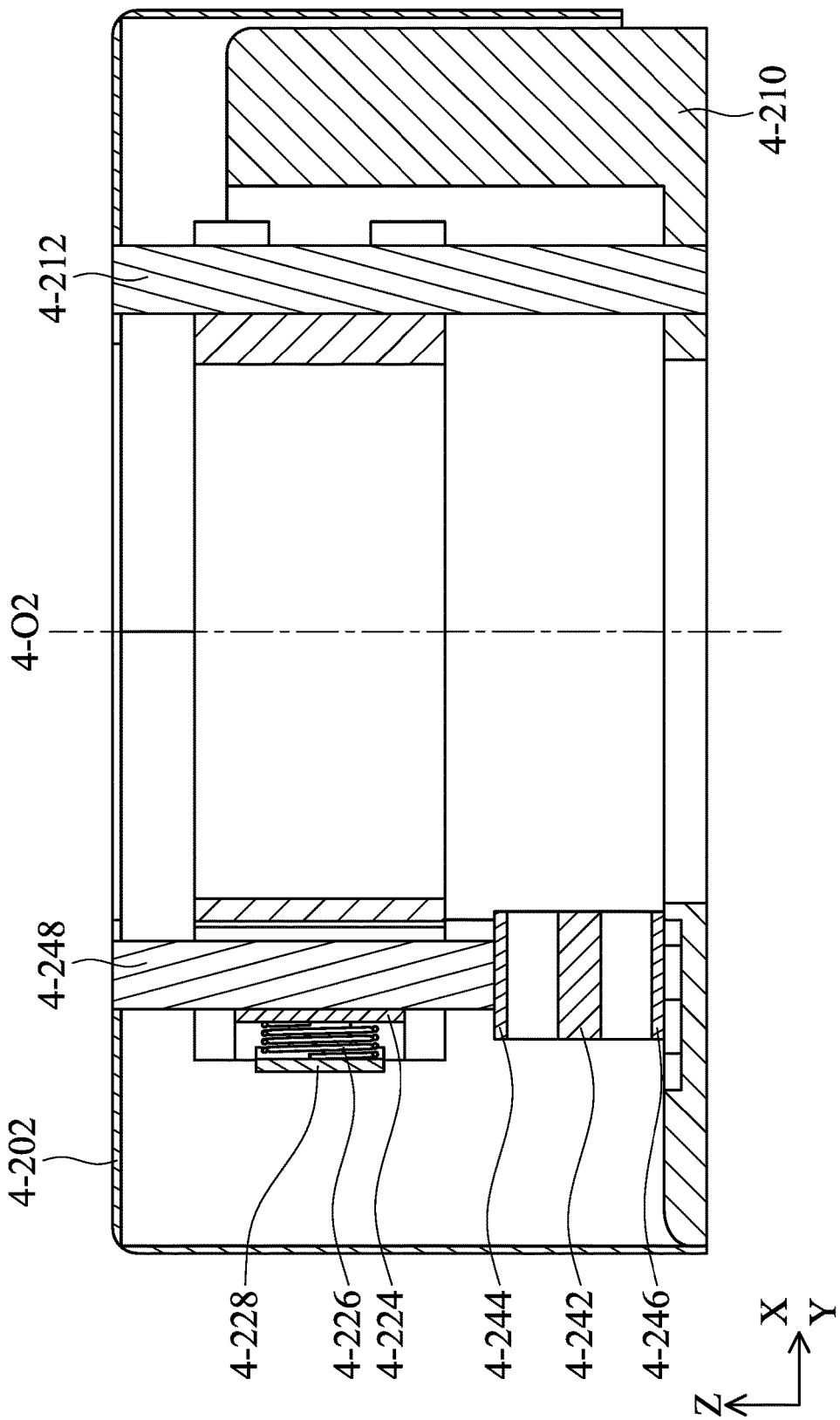
FIG. 41C is a cross-sectional view illustrated along the line 4-B-4-B' in FIG. 41A.

FIG. 41A is a schematic view of an optical element driving mechanism 4-200 in some embodiments of the present disclosure, FIG. 41B is an exploded view of the optical element driving mechanism 4-200, and FIG. 41C is a cross-sectional view of the optical element driving mechanism 4-200 illustrated along the line 4-B-4-B' in FIG. 41A. The optical element driving mechanism 4-200 mainly includes a top case 4-202, a base 4-210, a movable portion 4-220, a driving assembly 4-240, and a circuit board 4-270 arranged along a main axis 4-O2.

In some embodiments, the driving assembly 4-240 may include a driving element 4-242, a first resilient element 4-244, a second resilient element 4-246, and a transmission element 4-248. The materials and functions of these elements are similar to that of the driving element 4-42, the first resilient element 4-44, the second resilient element 4-46, and the transmission element 4-48 of the foregoing driving assembly 4-40, which will not be repeated here. In addition, the aforementioned first bonding element 4-43, the second bonding element 4-45, and the third bonding element 4-47 are omitted in the driving assembly 4-240 for simplicity, and it should be understood that the driving assembly 4-240 may also have similar elements.

In some embodiments, the top case 4-202 and the base 4-210 may be combined with each other to form a housing of the optical element driving mechanism 4-200. In addition, the top case 4-202 and the base 4-210 may be referred to as a fixed portion 4-F2. The movable portion 4-220 may be disposed in the space between the top case 4-202 and the base 4-210, and an optical element (not shown) may be disposed on the movable portion 4-220, such as fixed on the movable portion 4-220 by locking, bonding, or snapping. The aforementioned optical element may be, for example, a lens, a mirror, a prism, a beam splitter, an aperture, or may be a camera module or a depth sensor. Thereby, the optical element driving mechanism 4-200 may drive the optical element to move in the Z direction, and thus may achieve auto focus (AF). The driving assembly 4-240 may be affixed to the fixed portion 4-F2, for example, on the base 4-210. In addition, the top case 4-202 and the base 4-210 may have a fixing shaft 4-212 for affixing the relative position between the top case 4-202 and the base 4-210.

Figure 42:
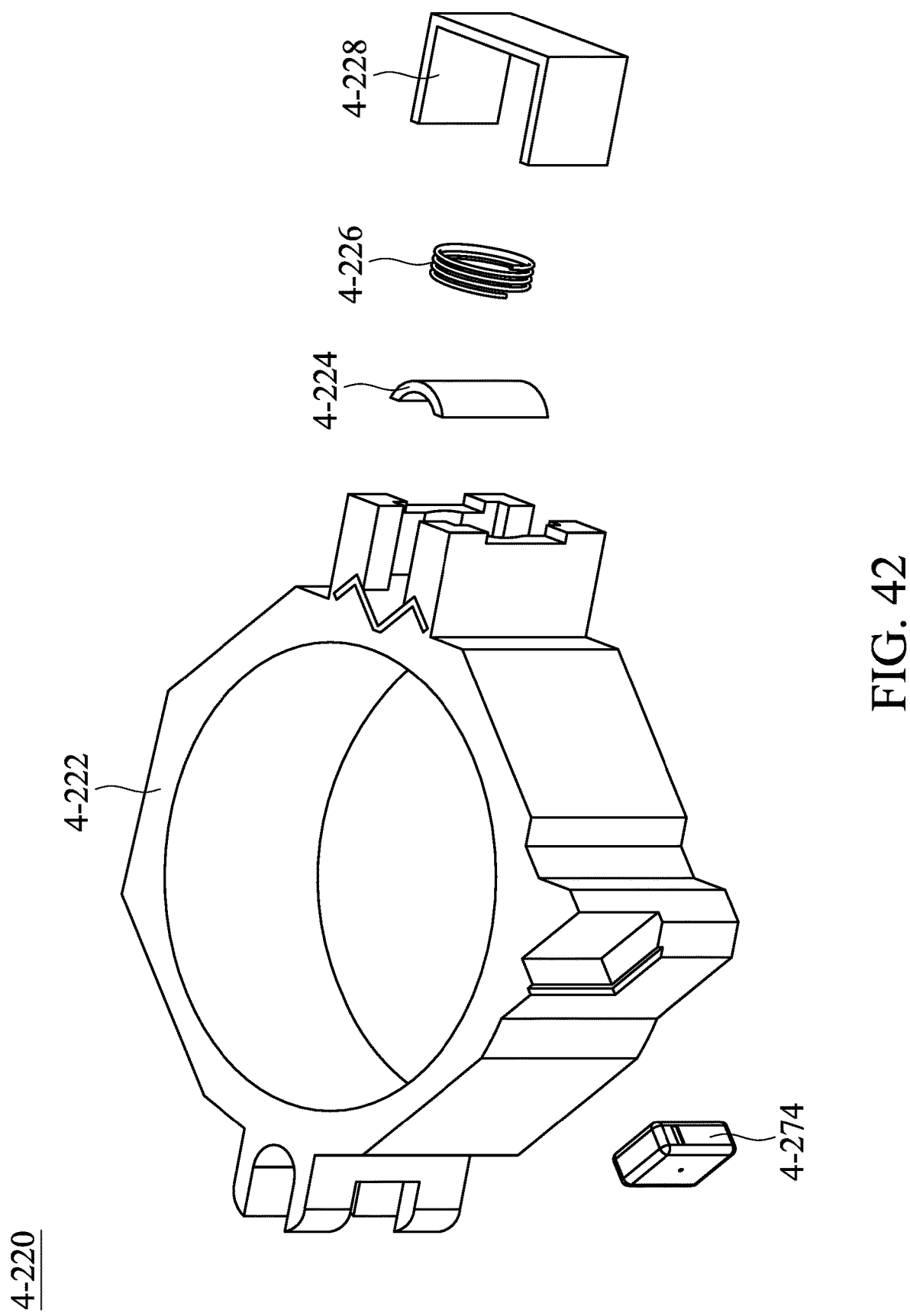
FIG. 42 is an exploded view of the movable portion.
Figure 43:
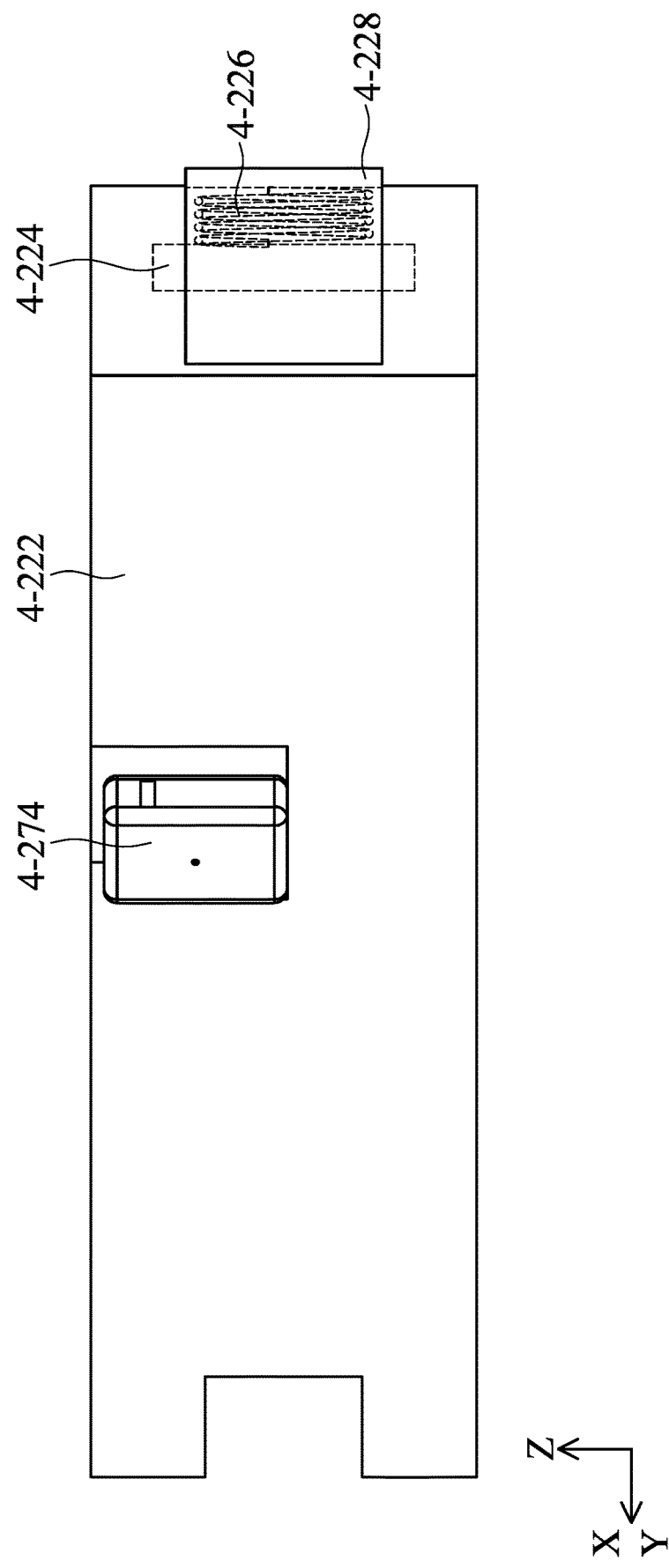
FIG. 43 is a schematic view of the movable portion when viewed in the Y direction.
Figure 44:
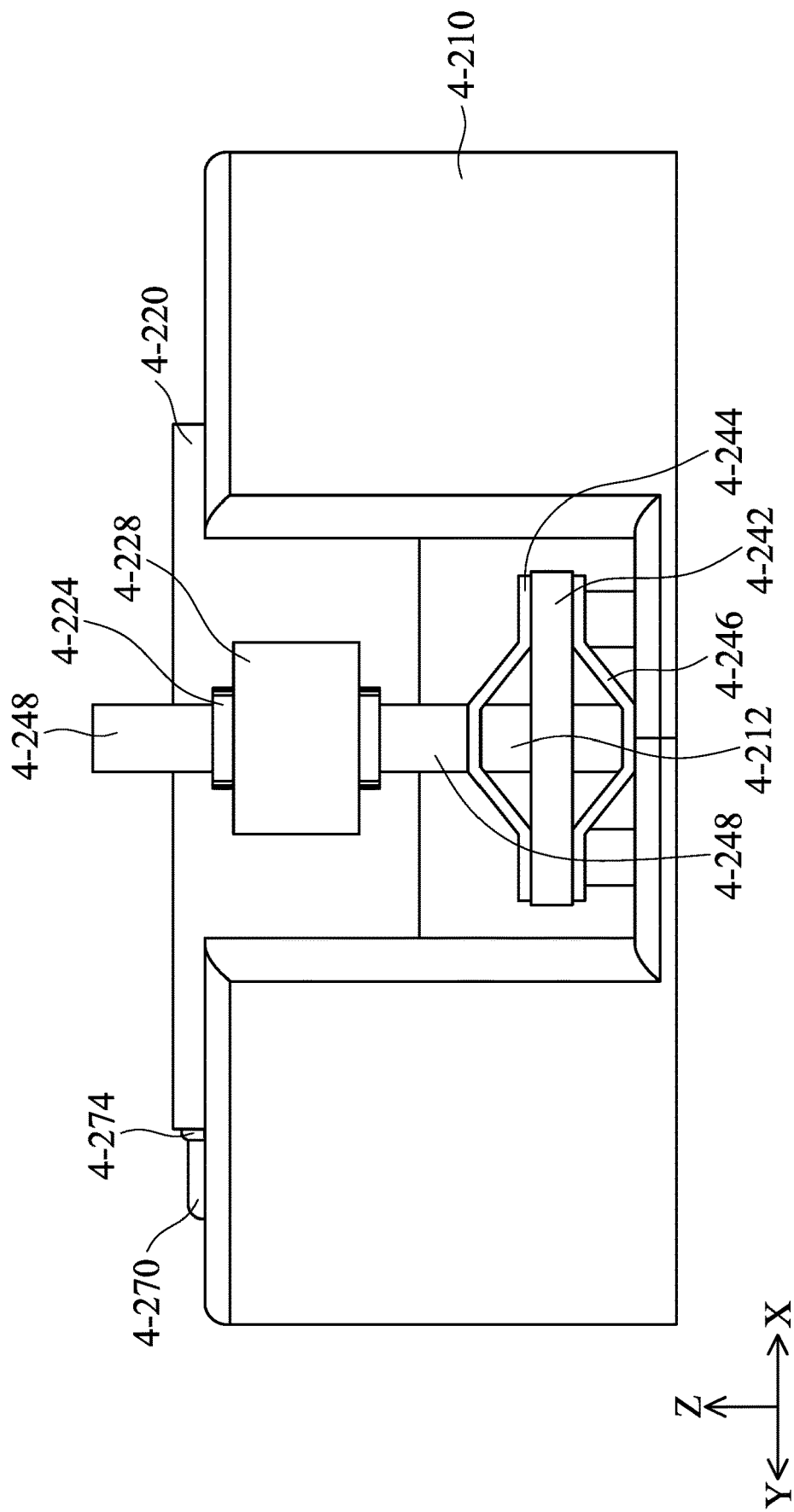
FIG. 44 is a schematic view of the optical element driving mechanism.

FIG. 42 is an exploded view of the movable portion 4-220, and FIG. 43 is a schematic view when the movable portion 4-220 is viewed from the Y direction. FIG. 44 is a schematic view of the optical element driving mechanism 4-200 when viewed from another direction, in which the top case 4-202 is omitted in FIG. 44. The movable portion 4-220 may mainly include a body 4-222, a contact unit 4-224, a pressing element 4-226, and a tightening element 4-228. The transmission element 4-248 may be disposed between the body 4-222 and the contact unit 4-224, and the pressing element 4-226 may be disposed between the contact unit 4-224 and the tightening element 4-228. The tightening element 4-228 may be disposed on the body 4-222.

In some embodiments, the pressing element 4-226 may be, for example, a spring, which may press the transmission element 4-248 through the contact unit 4-224 in a pressing direction, so that the transmission element 4-248 may abut the body 4-222 of the movable portion 4-220. The pressing direction is different from the first direction (for example, Z direction) in which the transmission element 4-248 extends. In addition, the tightening element 4-228 may also be used to pressurize the pressing element 4-226 in the pressing direction. As shown in FIG. 43, when viewed in the Y direction perpendicular to the first direction (for example, the Z direction), the pressing element 4-226 at least partially overlaps the tightening element 4-228. In addition, in the Y direction, the transmission element 4-248, the pressing element 4-226, and the contact unit 4-224 at least partially overlap with each other. Thereby, the size of the movable portion 4-220 in specific directions may be reduced to achieve miniaturization.

By providing the contact unit 4-224, the pressing element 4-226, and the tightening element 4-228 on the movable portion 4-220, the transmission element 4-248 may be forced to abut the body 4-222 of the movable portion 4-220, and the transmission element 4-248 may be disposed on the first movable portion 4-220 in frictional contact. After that, according to the principle of the foregoing embodiment, the movable portion 4-220 may be moved along the extending direction of the transmission element 4-248 (first direction/Z direction).

In addition, the circuit board 4-270 may be affixed to the fixed portion 4-F2, and a sensing element 4-272 may be disposed on the circuit board 4-270, and a sensing magnetic element 4-274 may be disposed on the movable portion 4-220. The sensing element 4-272 may include a Hall sensor, a Magnetoresistance Effect sensor (MR sensor), a Giant Magnetoresistance Effect sensor (GMR sensor), a Tunneling Magnetoresistance Effect sensor (TMR sensor), or a Fluxgate sensor. For example, the sensing magnetic element 4-274 may be a magnet. When the movable portion 4-220 moves relative to the fixed portion 4-F, the sensing element 4-272 may sense the magnetic field change of the sensing magnetic element 4-274 to obtain the portion of the movable portion 4-220 relative to the fixed portion 4-F. Afterwards, a control signal is provided to the driving assembly 4-240 to determine whether the driving assembly 4-240 should keep driving the movable portion 4-220.

Figure 45:
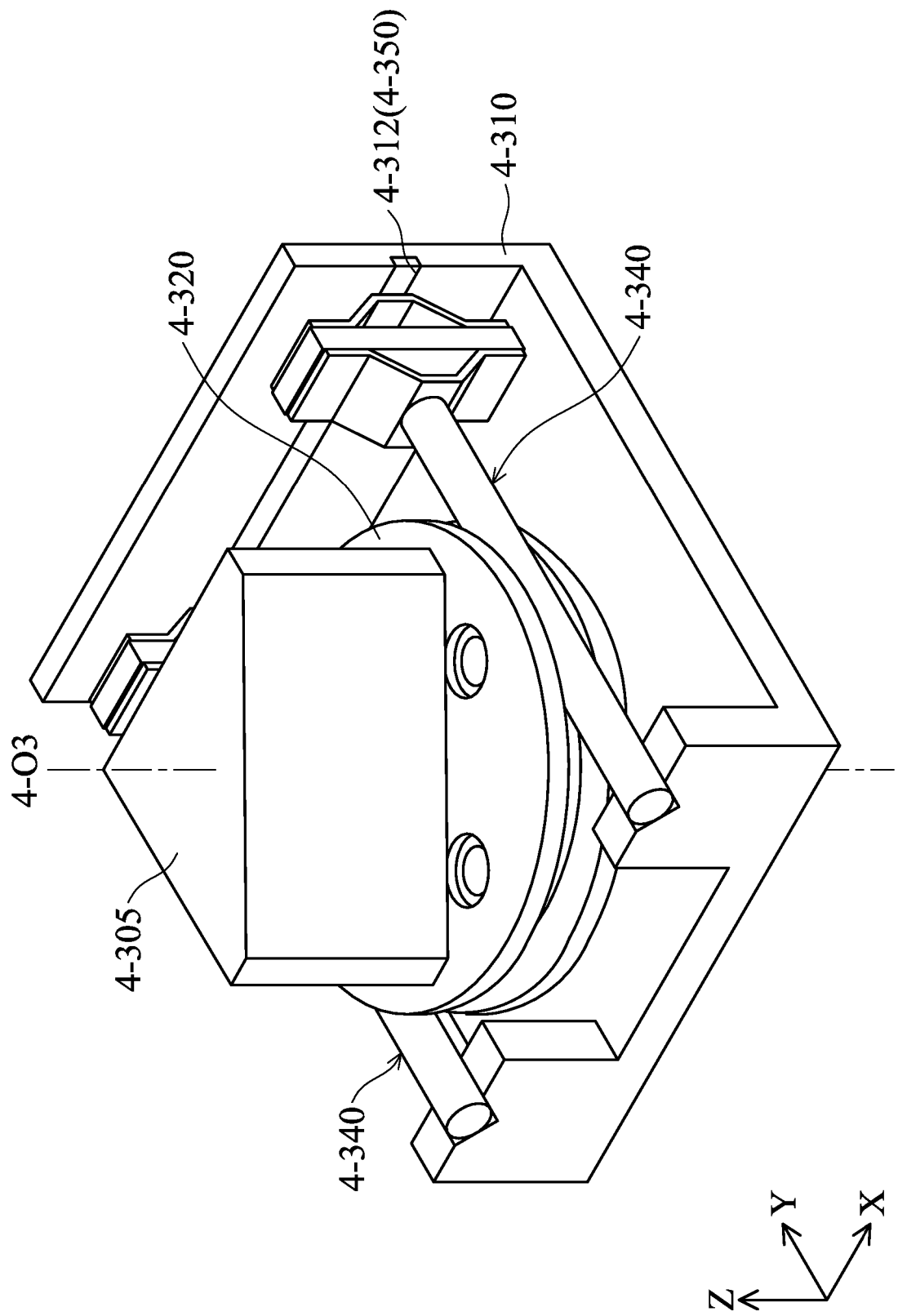
FIG. 45 is a schematic view of the optical element driving mechanism.
Figure 46:
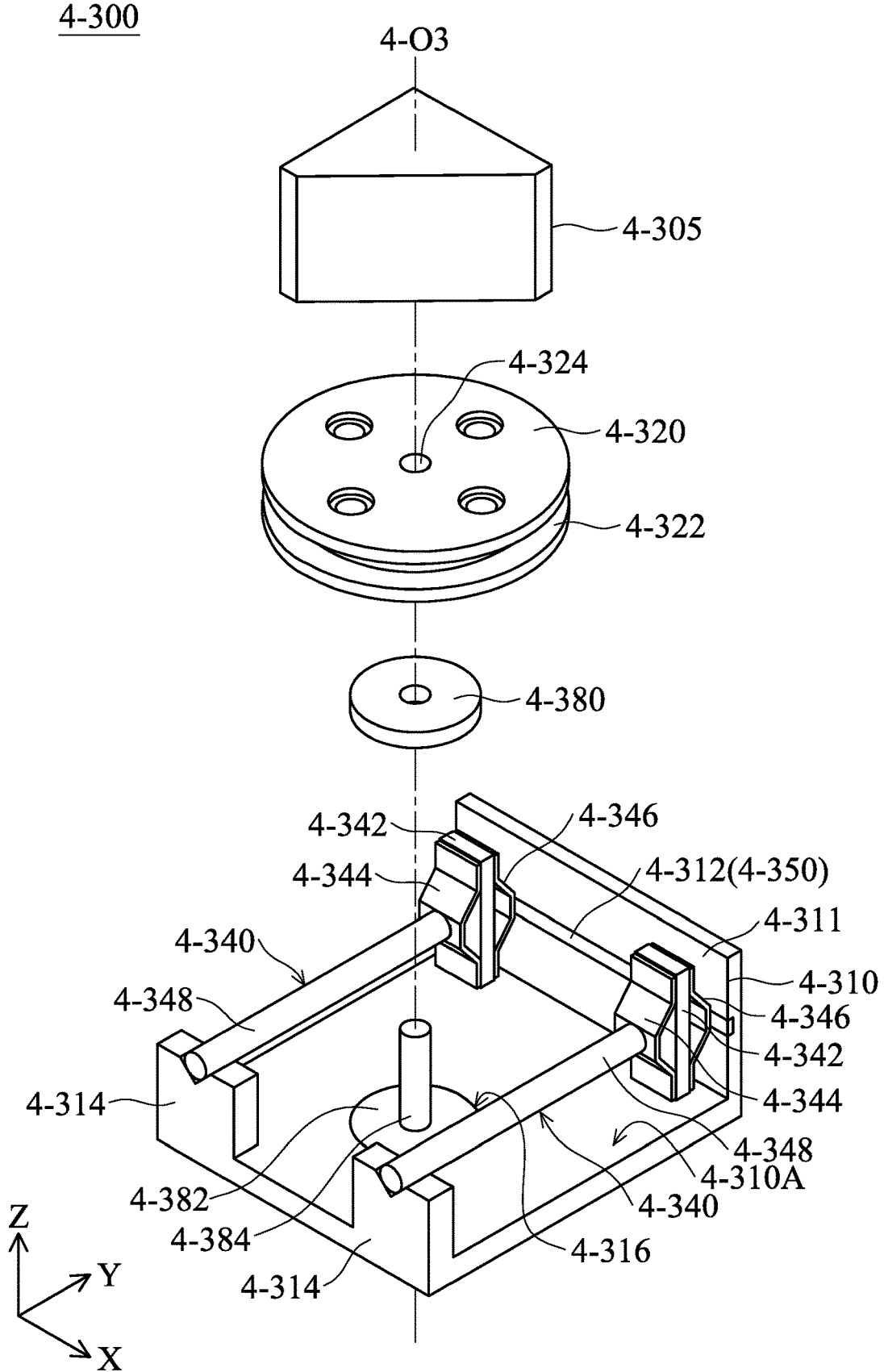
FIG. 46 is an exploded view of the optical element driving mechanism.
Figure 47A:
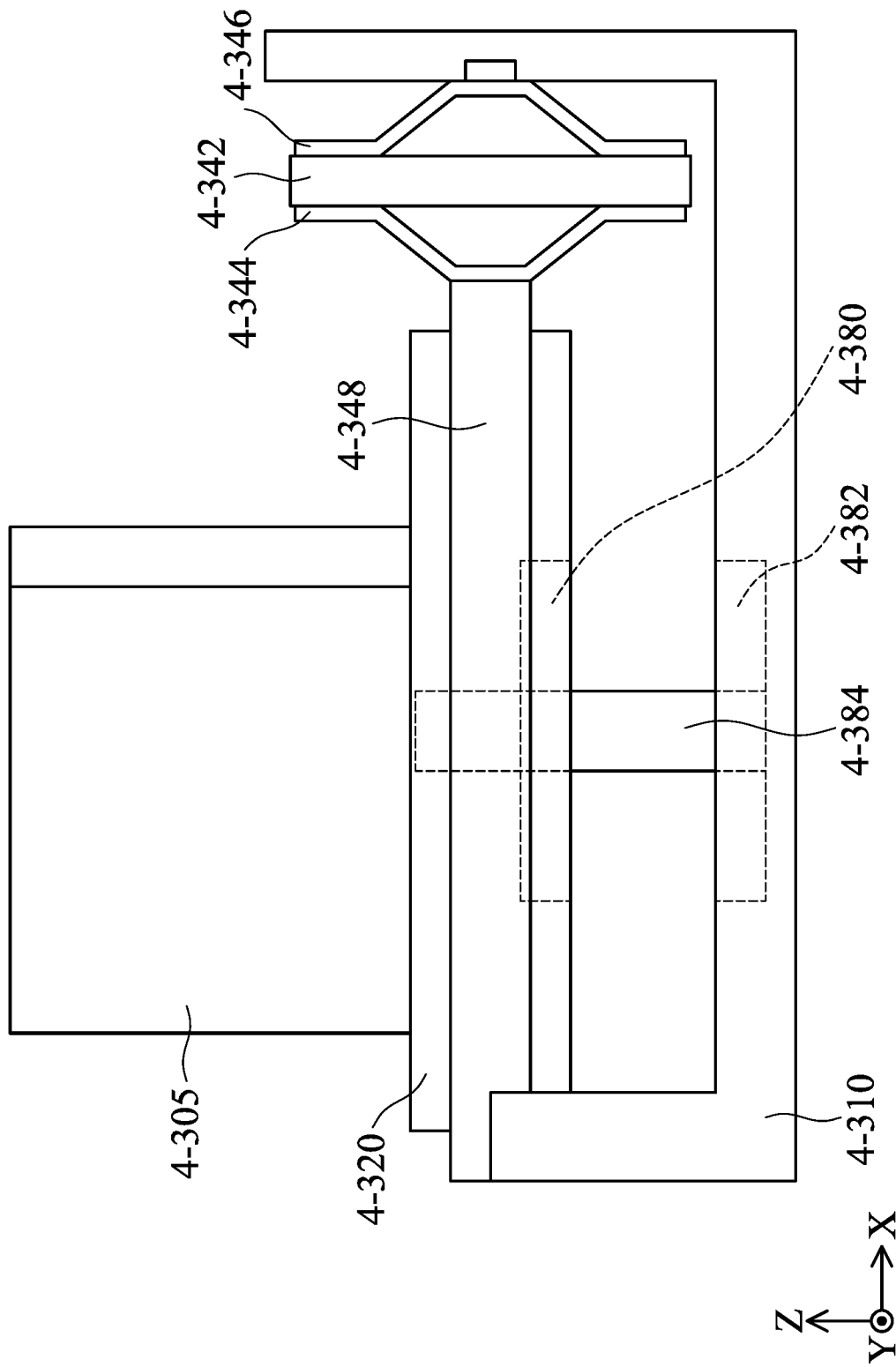
FIG. 47A and FIG. 47B are schematic views of the optical element driving mechanism when viewed in different directions.
Figure 47B:
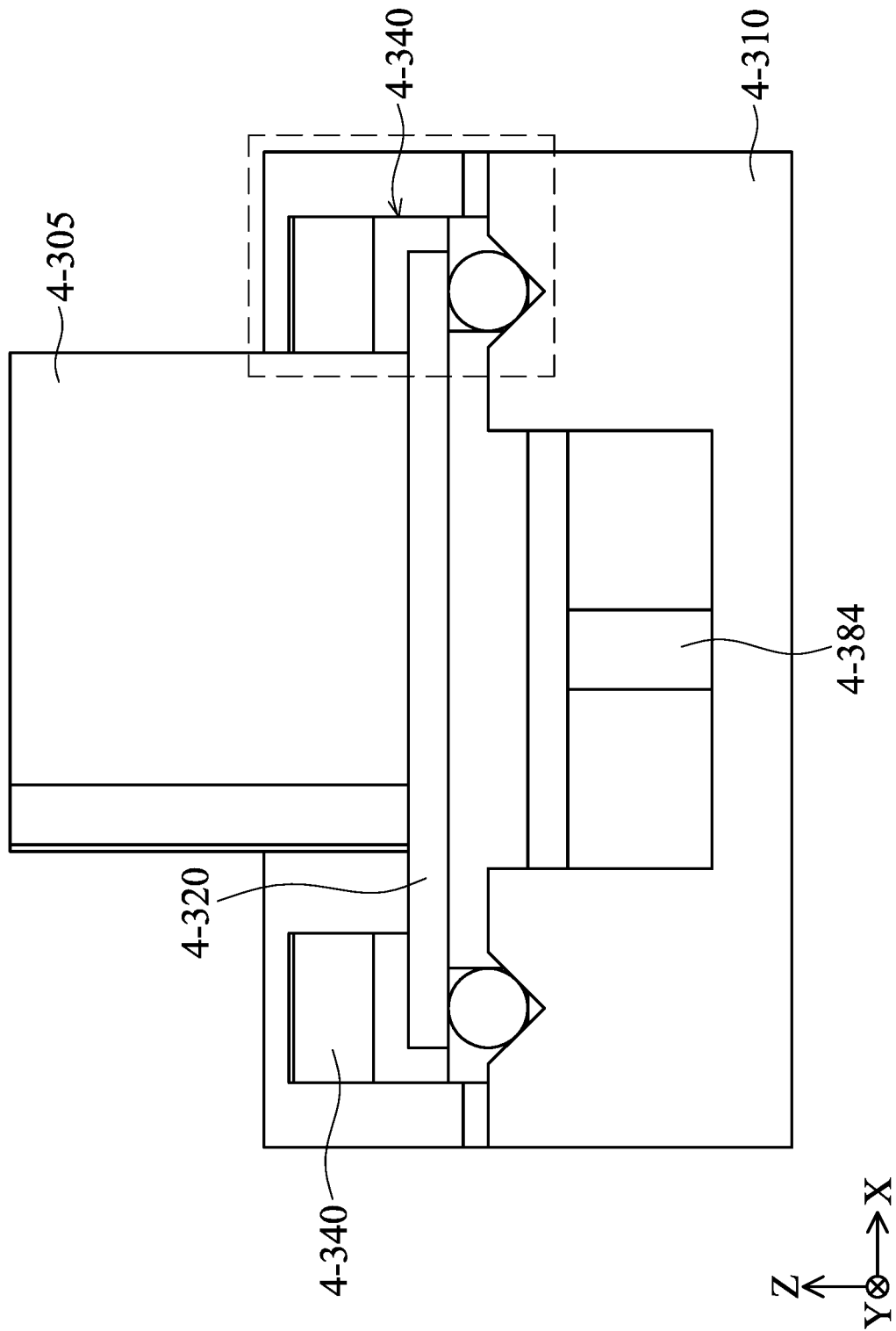
Figure 47C:
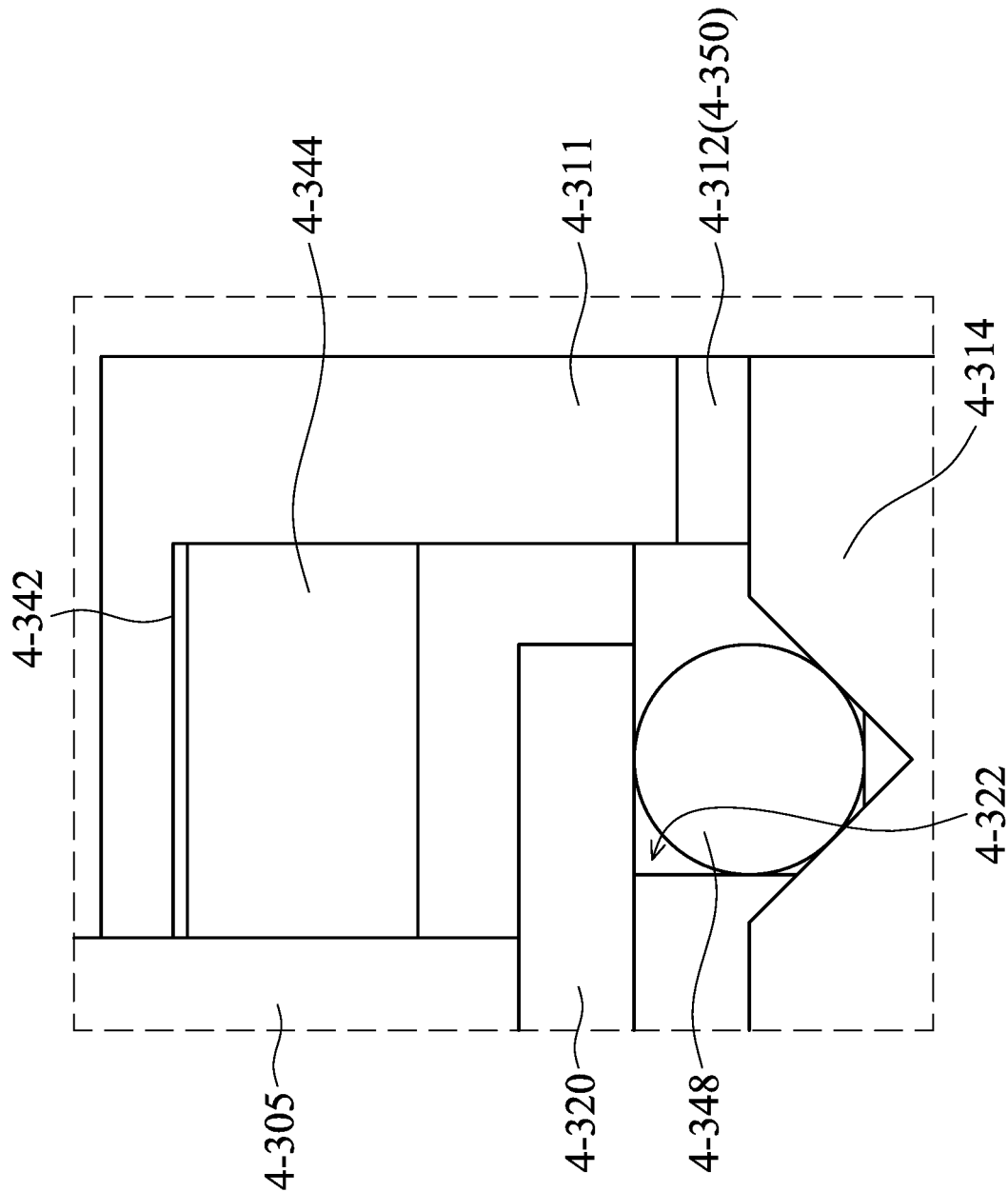
FIG. 47C is an enlarged view of FIG. 47B
Figure 47D:
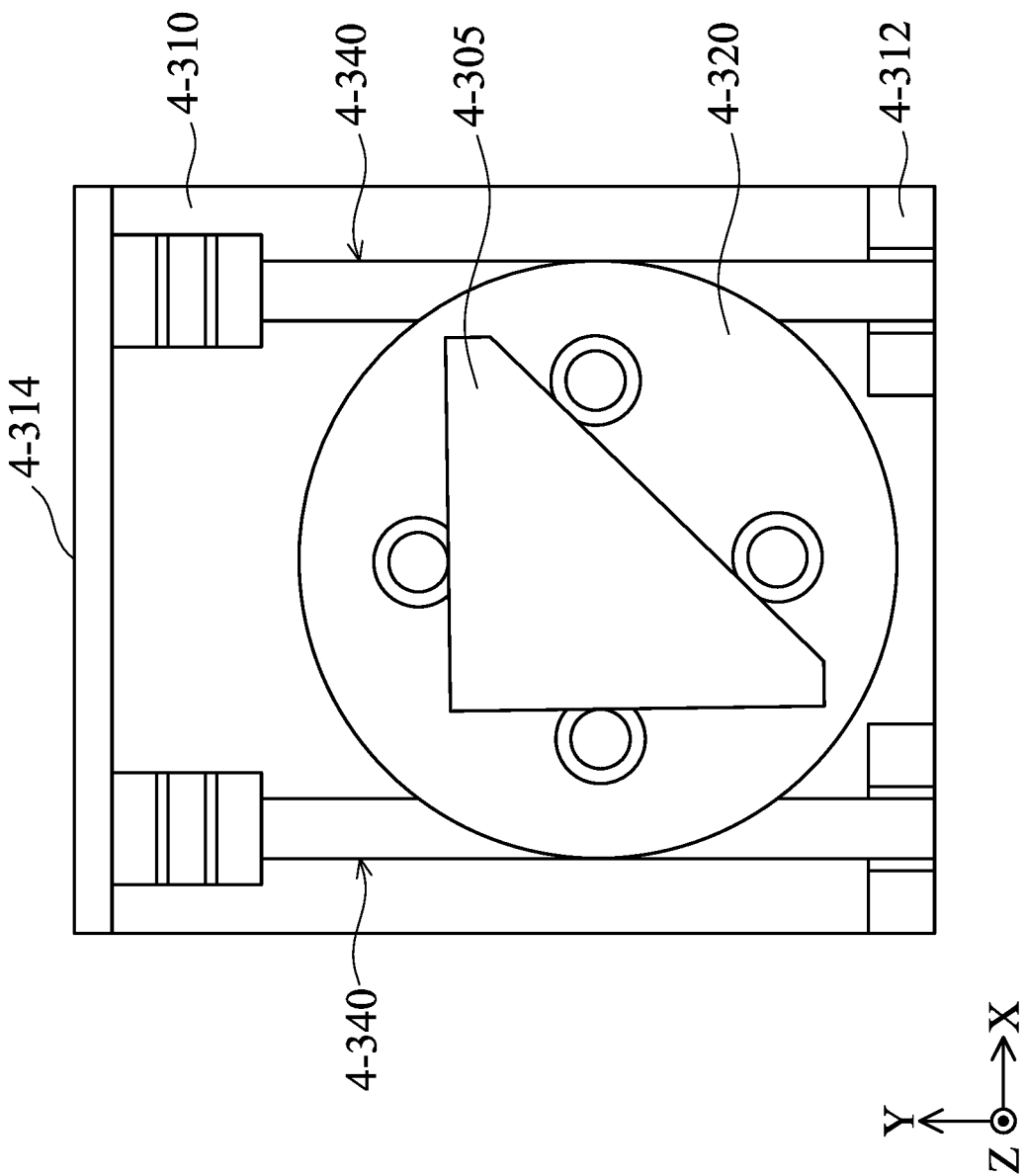
FIG. 47D is a top view of the optical element driving mechanism.

FIG. 45 is a schematic view of an optical element driving mechanism 4-300 in some embodiments of the present disclosure. FIG. 46 is an exploded view of the optical element driving mechanism 4-300. FIG. 47A and FIG. 47B are schematic views of the optical element driving mechanisms 4-300 when viewed from different directions, FIG. 47C is an enlarged view of FIG. 47B, and FIG. 47D is a top view of the optical element driving mechanism 4-300. The optical element driving mechanism 4-300 may be used to hold an optical element 4-305, and mainly includes a fixed portion 4-310, a movable portion 4-320, a driving assembly 4-340, a first magnetic element 4-380, a second magnetic element 4-382, and shaft 4-384. The optical element 4-305 may be, for example, a lens, a reflector, a prism, a beam splitter, an aperture, a camera module, or a depth sensor. The optical element driving mechanism 4-300 may drive the optical element 4-305 to rotate relative to the shaft 4-384.

In some embodiments, the driving assembly 4-340 may include a driving element 4-342, a first resilient element 4-344, a second resilient element 4-346, and a transmission element 4-348, the materials and functions of which are similar to the driving element 4-42, the first resilient element 4-44, the second resilient element 4-46, and the transmission element 4-48 of the driving assembly 4-40, respectively, which will not be repeated here. In addition, the first bonding element 4-43, the second bonding element 4-45, and the third bonding element 4-47 are omitted in the driving assembly 4-340 for simplicity, but it should be understood that the driving assembly 4-340 may also include similar elements.

The driving assembly 4-340 may be affixed to the fixed portion 4-310. Specifically, the fixed portion 4-310 may include a sidewall 4-311, the sidewall 4-311 may have a concave portion 4-312, and a bonding element 4-350 may be disposed in the concave portion 4-312 to fix the relative position between the driving assembly 4-340 and the fixed portion 4-310. In addition, the fixed portion 4-310 may further have a supporting portion 4-314, and an end of the transmission element 4-348 which is away from the sidewall 4-311 may be disposed on the supporting portion 4-314 to support the driving assembly 4-340. In this embodiment, the optical element driving mechanism 4-300 includes two driving assemblies 4-340, and the two driving assemblies 4-340 are both affixed to the fixed portion 4-310 by the bonding element 4-350 disposed in the same concave portion 4-312.

In addition, the fixed portion 4-310 may also include a concave part 4-316, and the first magnetic element 4-380 may be disposed in the concave part 4-316, so that the first magnetic element 4-380 may be affixed to the fixed portion 4-310. The second magnetic element 4-382 may be disposed on the movable portion 4-320, and is designed to be aligned with the first magnetic element 4-380 in the Z direction, so that the first magnetic element 4-380 and the second magnetic element 4-382 are attracted with each other. Thereby, a magnetic force may be generated between the first magnetic element 4-380 and the second magnetic element 4-382, so that the force may be applied to the movable portion 4-320, wherein the direction of the force is from the movable portion 4-320 to the fixed portion 4-310.

In some embodiments, a dustproof glue (not shown) may be provided on the surface 4-310A of the fixed portion 4-310, so as to collect debris that may be generated during the operation of the optical element driving mechanism 4-300, so the performance of the optical component drive mechanism 4-300 may be prevented from being influenced by the debris.

The movable portion 4-320 may have, for example, a circular shape, and a recess 4-322 may be formed on the outer surface of the movable portion 4-320 at the circumference, and the transmission element 4-348 of the driving assembly 4-340 may be disposed in the recess 4-322. Thereby, the transmission element 4-348 may be disposed on the movable portion 4-320 in a frictional contact. In addition, the circular movable portion 4-320 may have an opening 4-324 at the center. A rotating shaft 4-384 may extend in the direction of the main axis 4-03 and may pass through the first magnetic element 4-380, the second magnetic element 4-382, and the opening 4-324 to allow the movable portion 4-320 to rotate relative to the rotating shaft 4-384. Afterwards, according to the principle of the foregoing embodiment, the driving element 4-340 drives the movable portion 4-320 to rotate.

It should be noted that as shown in FIG. 47A and FIG. 47B, the transmission element 4-348 is exposed from the recess 4-322. In addition, the optical element driving mechanism 4-300 is illustrated as including two driving assemblies 4-340, and the transmission elements 4-348 of the two driving assemblies 4-340 may move in opposite directions. For example, if one of the transmission elements 4-348 moves in the Y direction, then the other transmission element 4-348 may move in the −Y direction to apply a torque to the movable portion 4-320 in the same direction and achieve a higher driving force. However, the present disclosure is not limited thereto. For example, it is possible to provide only one driving element 4-340 to achieve similar effects, and miniaturization may also be achieved.

In some embodiments, as shown in FIG. 47A, the rotation shaft 4-384 at least partially overlaps the movable portion 4-320 and the transmission element 4-348, and the first magnetic element 4-380, the second magnetic element 4-382, and the rotating shaft 4-384 also at least partially overlap each other when viewed in the Y direction. Thereby, the size of the optical element driving mechanism 4-300 in a specific direction may be reduced, and miniaturization may be achieved. In some embodiments, as shown in FIG. 47C, the driving element 4-342 is exposed from the first resilient element 4-344 when viewed in the Y direction.

It should be noted that since the first magnetic element 4-380 and the second magnetic element 4-382 apply a force on the movable portion 4-320 in a direction toward the fixed portion 4-310, the movable portion 4-320 may be prevented from falling out from the optical element driving mechanism 4-300 during operation. In addition, the position of the movable portion 4-320 in the Z direction may be limited by disposing the transmission element 4-348 in the recess 4-322 of the movable portion 4-320.

Figure 48:
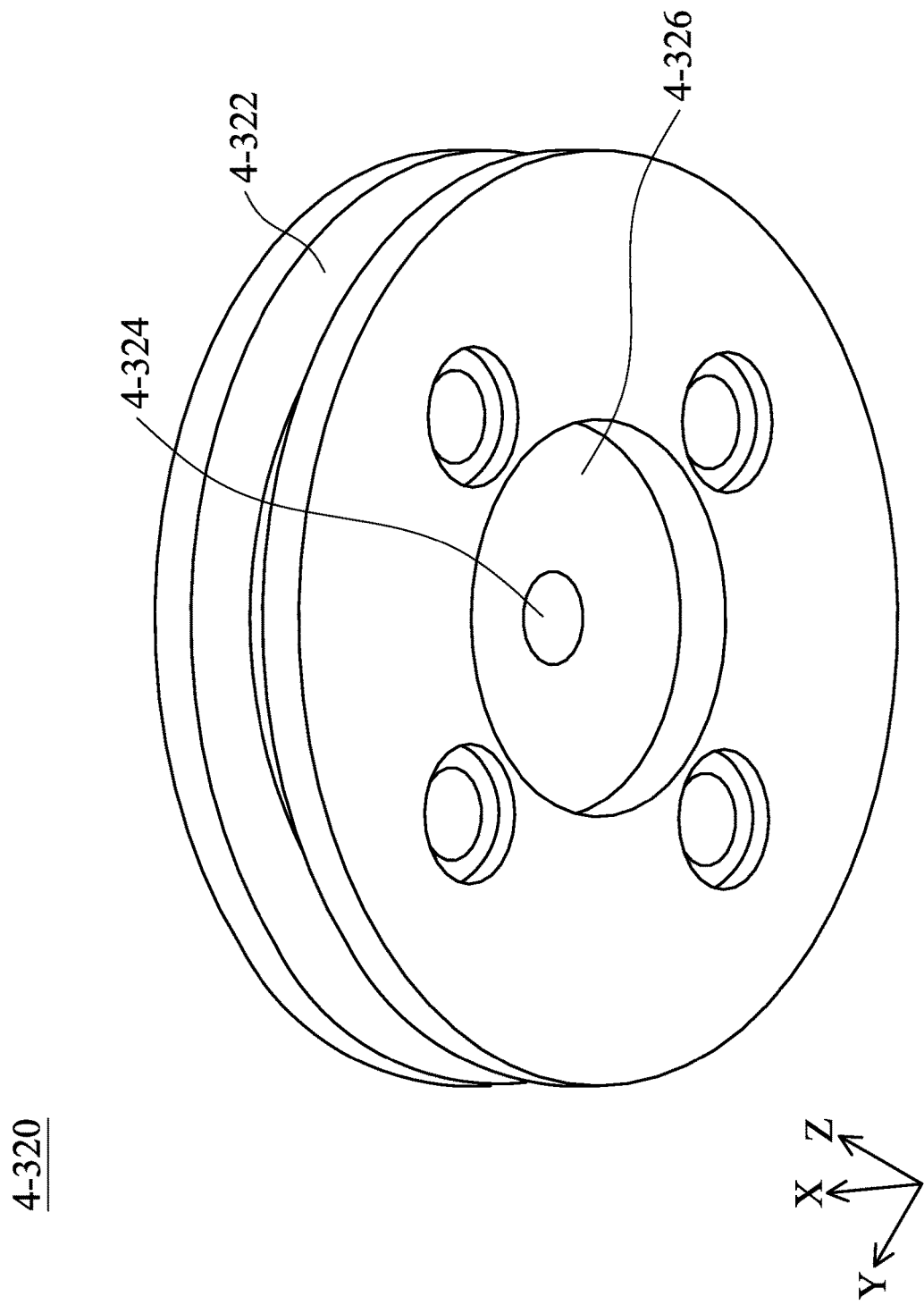
FIG. 48 is a schematic view of the movable portion.

FIG. 48 is a schematic view of the movable portion 4-320. The movable portion 4-320 may have a recessed structure 4-326 on the surface facing the fixed portion 4-310 for accommodating the second magnetic element 4-382.

Figure 49:
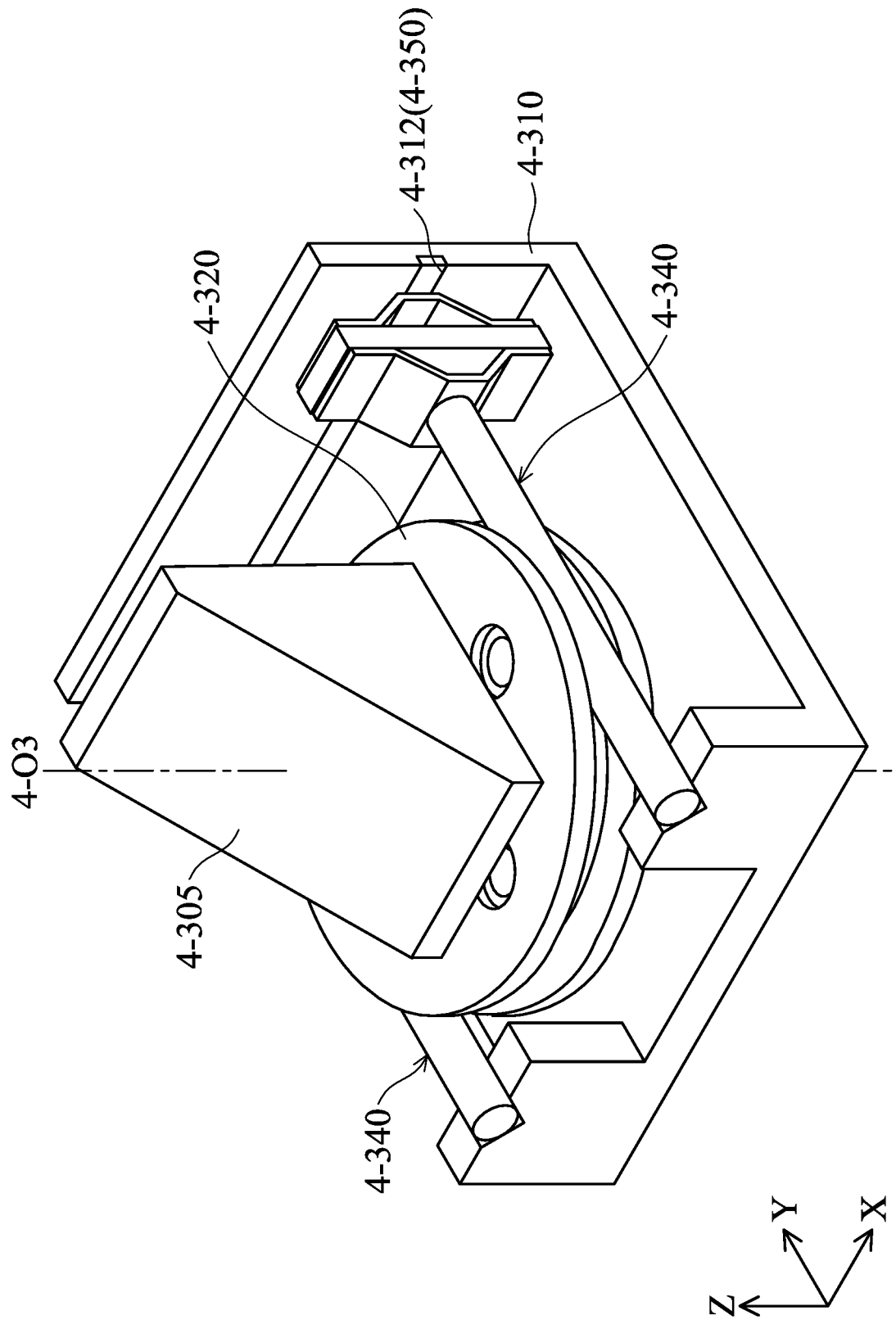
FIG. 49 is a schematic view of the optical element driving mechanism.

FIG. 49 is another design of the optical element driving mechanism. The optical element 4-305 may be disposed on the movable portion 4-320 in a manner different from that of FIG. 16, so that light from other directions may be processed.

In summary, an optical element driving mechanism is provided. The optical element driving mechanism includes a fixed portion, a movable portion, and a driving assembly. The fixed portion includes a main axis. The movable portion is movable relative to the fixed portion and is connected to an optical element. The driving assembly is used to drive the movable portion to move relative to the fixed portion. As a result, the optical element may move in desired directions to achieve desired functions.

Figure 50:
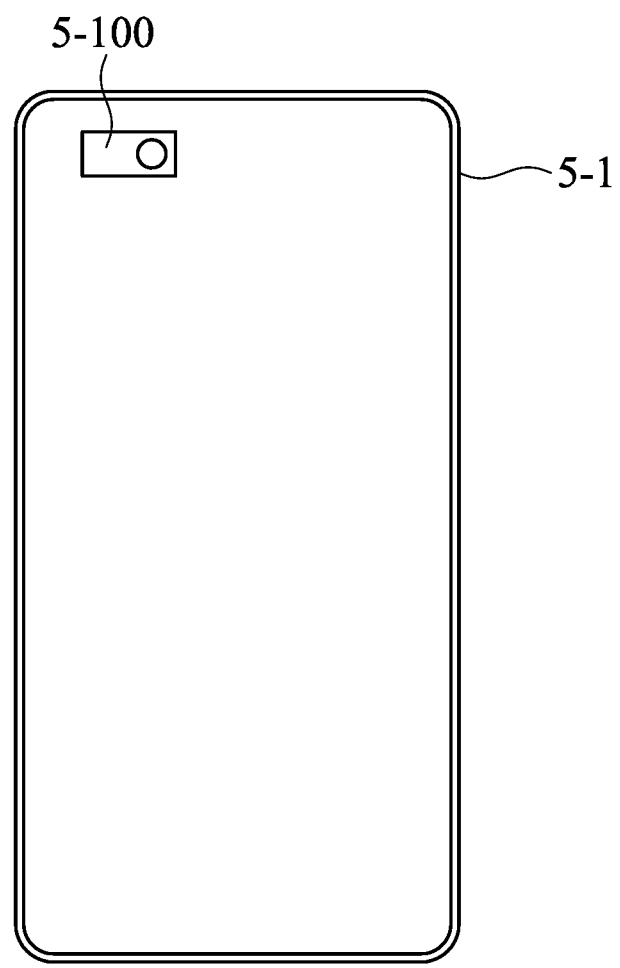
FIG. 50 is a schematic view of an electronic device according to some embodiments of the present disclosure.

FIG. 50 is a schematic diagram of an electronic device 5-1 according to some embodiments of the present disclosure. The electronic device 5-1 may be, for example, a mobile electronic device (e.g. mobile phone, tablet, notebook computer, etc.), and the electronic device 5-1 may have an optical element driving mechanism 5-100 to allow the electronic device 5-1 to take photographs.

Figure 51:
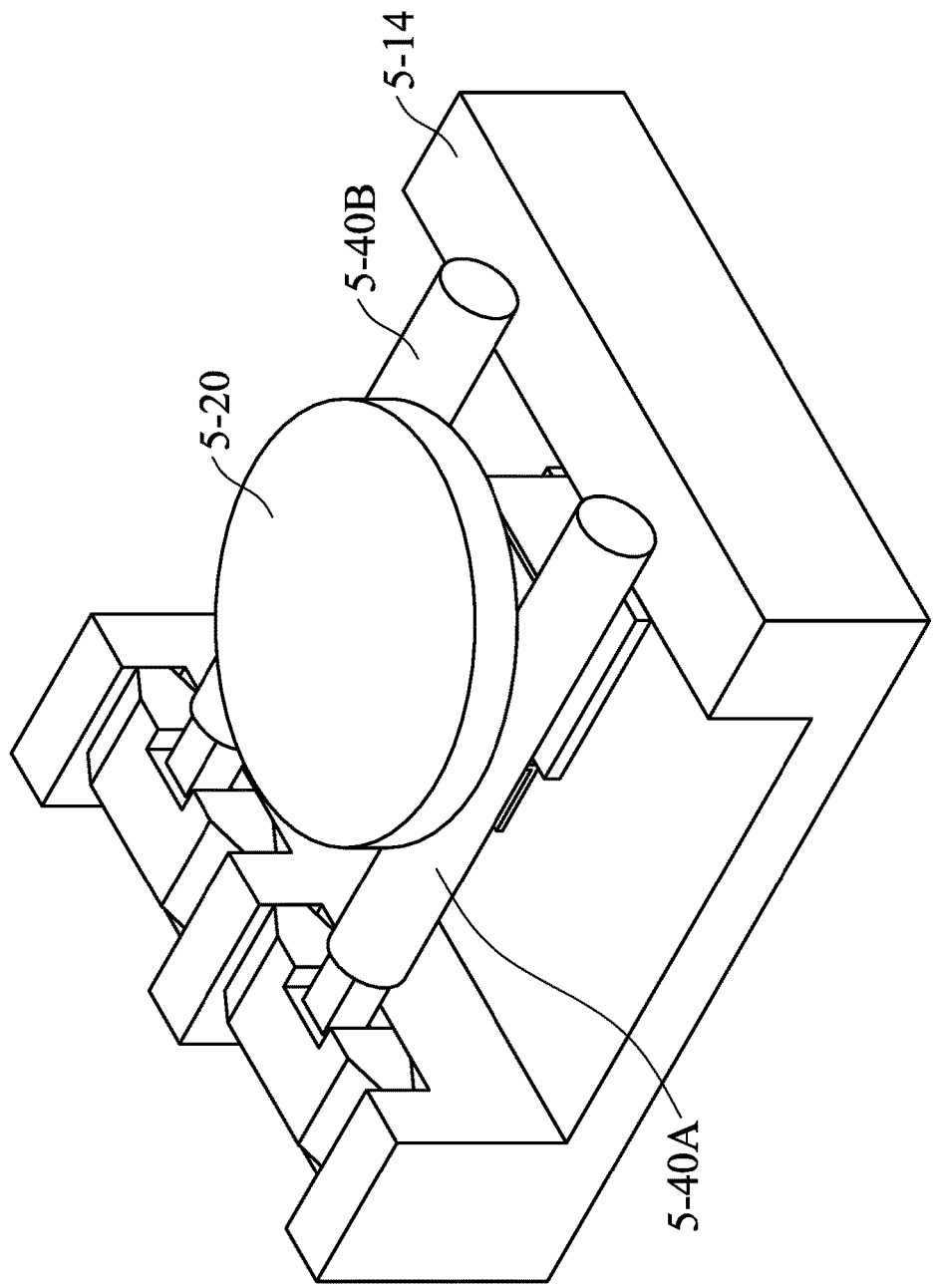
FIG. 51 is a schematic view of an optical element driving mechanism according to some embodiments of the present disclosure.
Figure 52:
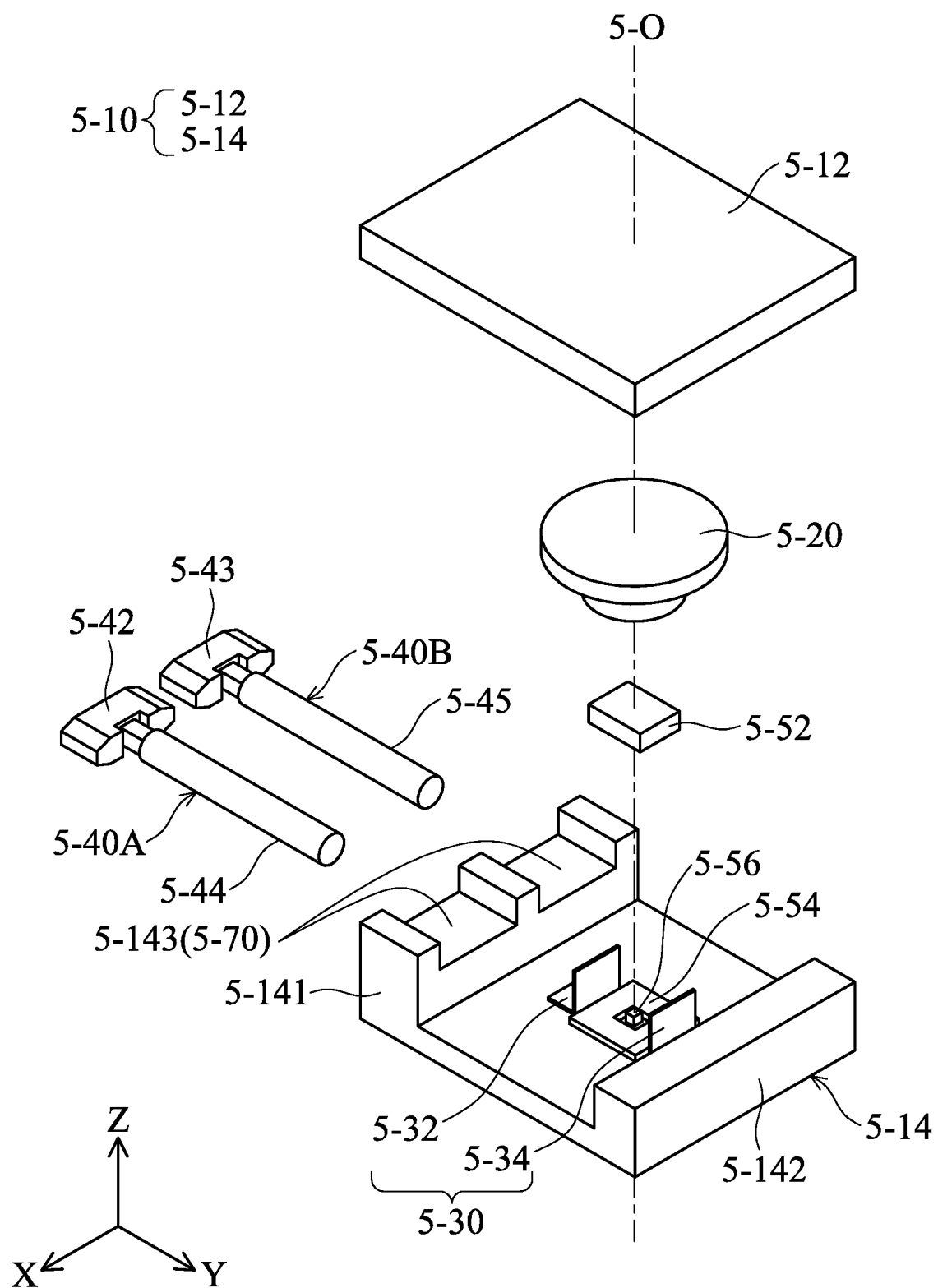
FIG. 52 is an exploded view of the optical element driving mechanism.
Figure 53:
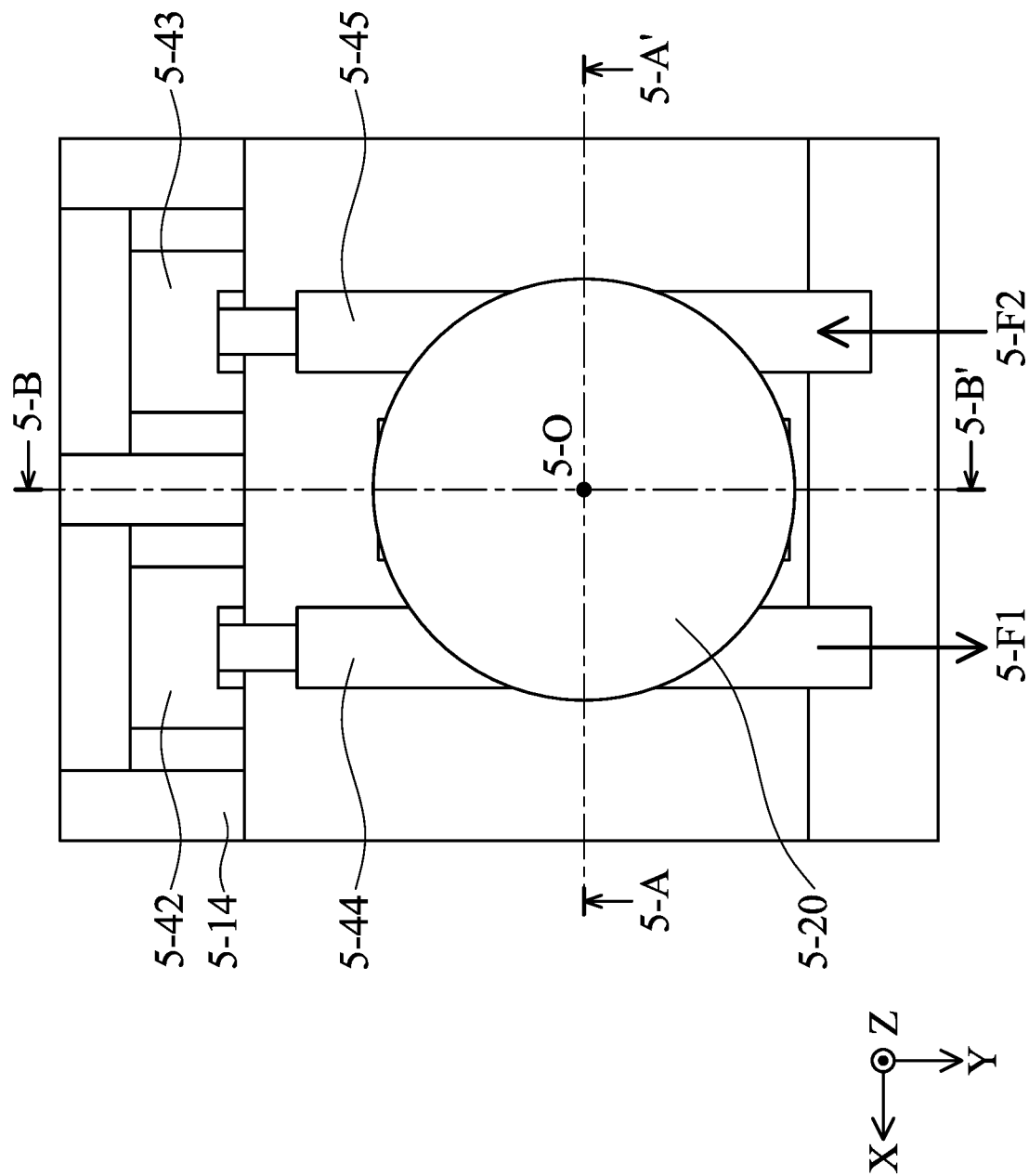
FIG. 53 is a top view of the optical element driving mechanism.
Figure 54A:
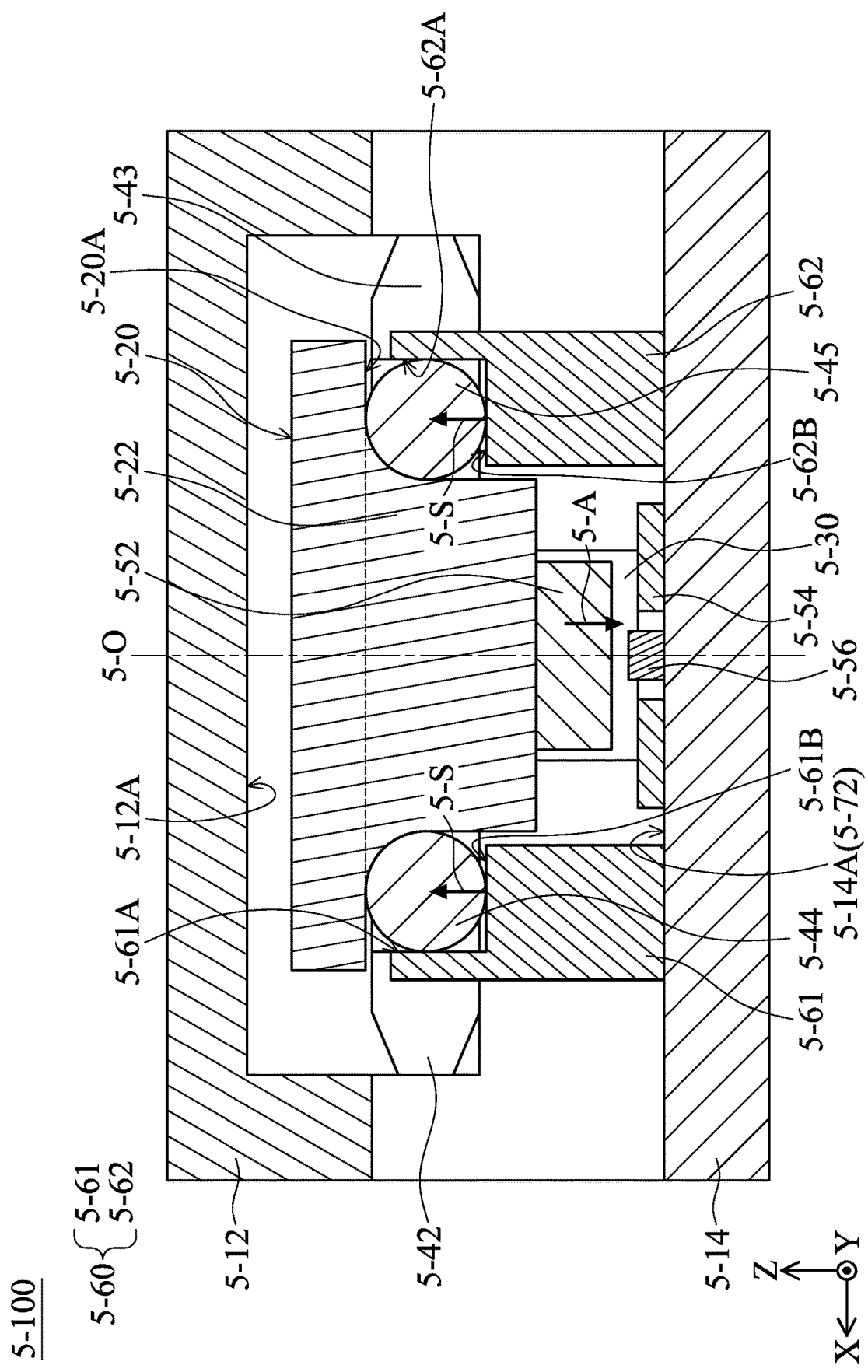
FIG. 54A is a cross-sectional view of the optical element driving mechanism taken along line 5-A-5-A' in FIG. 53.
Figure 54B:
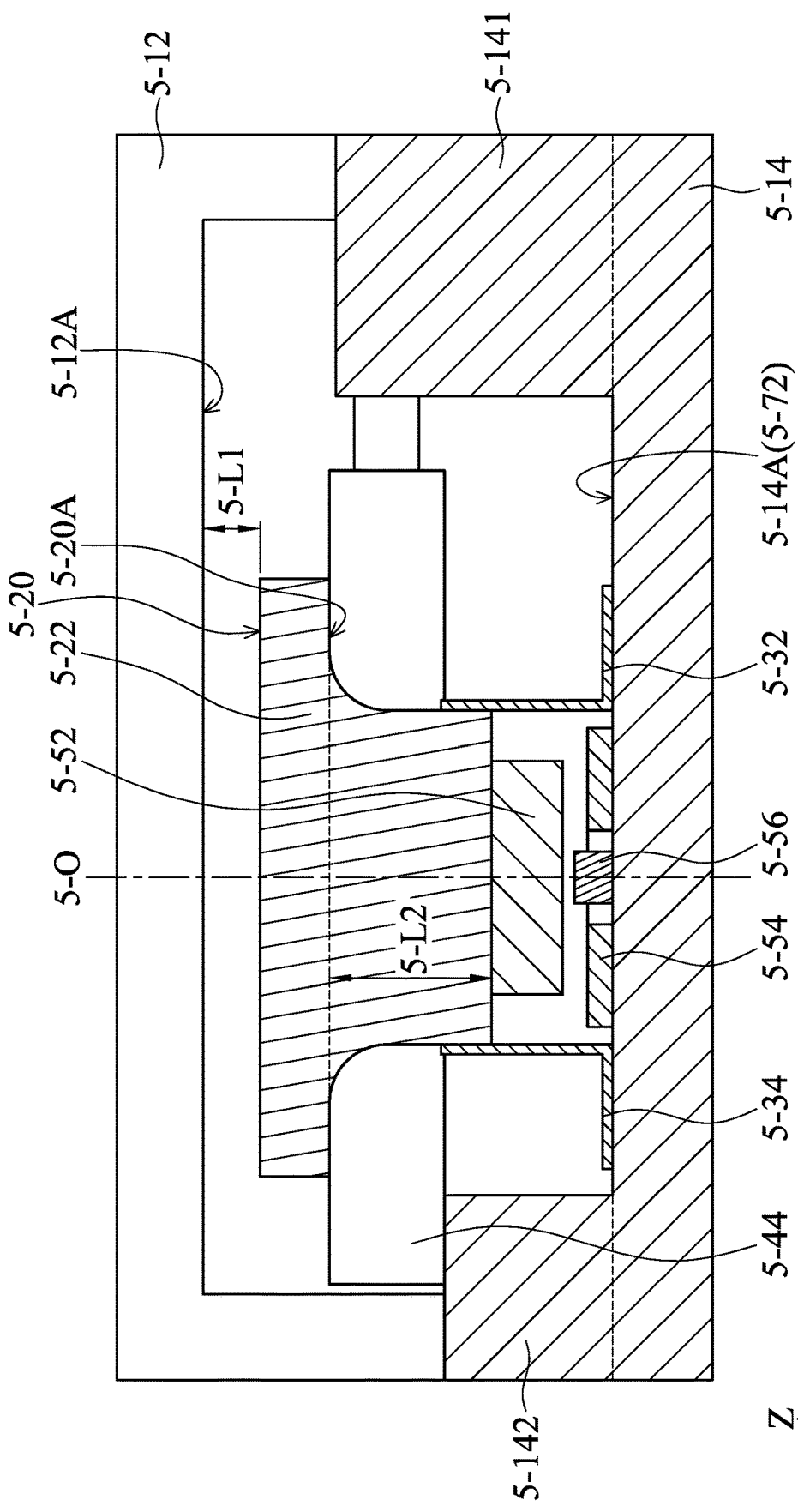
FIG. 54B is a cross-sectional view of the optical element driving mechanism taken along line 5-B-5-B' in FIG. 53.
Figure 55:
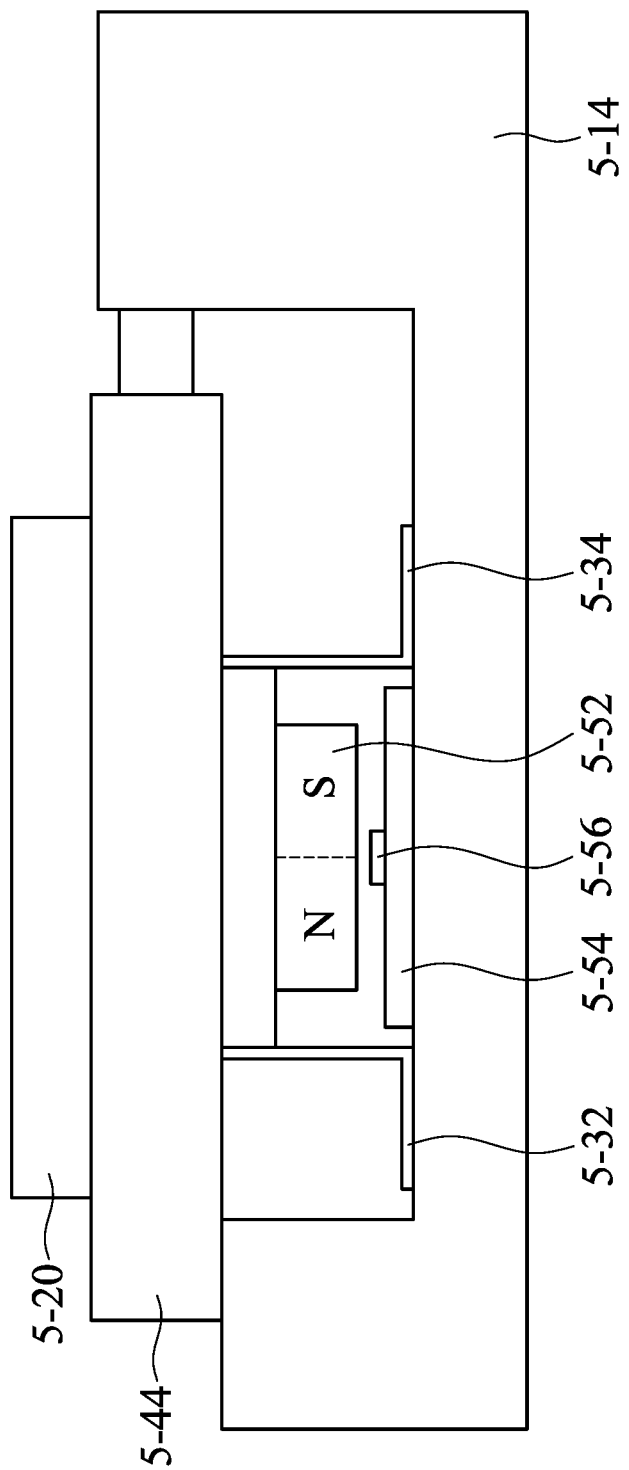
FIG. 55 is a side view of the optical element driving mechanism.

FIG. 51 is a schematic diagram of the optical element driving mechanism 5-100 in some embodiments of the present disclosure. FIG. 52 is an exploded view of the optical element driving mechanism 5-100. FIG. 53 is a top view of the optical element driving mechanism 5-100. FIG. 54A is a cross-sectional view of the optical element driving mechanism 5-100 illustrated along line 5-A-5-A' in FIG. 53. FIG. 54B is a cross-sectional view of the optical element driving mechanism 5-100 illustrated along line 5-B-5-B' in FIG. 53. FIG. 55 is a side view of the optical element driving mechanism 5-100, wherein the case 5-12 is omitted in FIG. 51. The optical element driving mechanism 5-100 may be used to hold an optical element (not shown), and may mainly include a case 5-12, a base 5-14, a movable portion 5-20, a movable portion 5-20, a pressure assembly 5-30, a driving assembly 5-40 (including a driving assembly 5-40A and a driving assembly 5-40B), a magnetic element 5-52, a magnetic permeable element 5-54, and a sensing element 5-56.

The aforementioned optical element may be, for example, a lens, a mirror, a prism, a beam splitter, an aperture, a camera module, or a depth sensor. The optical element driving mechanism 5-100 may be used to drive the optical element to rotate relative to the main axis 5-0.

The case 5-12 and the base 5-14 may be combined with each other to form a housing for the optical element driving mechanism 5-100, and may be collectively referred to as a fixed portion 5-10, and other elements may be disposed in the fixed portion 5-10. In addition, as shown in FIG. 54A, the case 5-12 has a positioning surface 5-12A facing the movable portion 5-20.

The pressure assembly 5-30 may be disposed on the base 5-14, and may include a first pressure element 5-32 and a second pressure element 5-34. The first pressure element 5-32 and the second pressure element 5-34 may have an L-shape, and may be formed of a resilient material (e.g. metal). As shown in FIG. 54B, a portion of the movable portion 5-20 may be disposed between the first pressure element 5-32 and the second pressure element 5-34, and the movable portion 5-20 is clamped by applying pressure to the movable portion 5-20 by the first pressure element 5-32 and the second pressure element 5-34. As a result, the movable range of the movable portion 5-20 may be limited, to let the movable portion 5-20 abuts the driving assembly 5-40. It should be noted that the first pressure element 5-32 and the second pressure element 5-34 are not completely fixed on the movable portion 5-20, but are disposed on the movable portion 5-20 in a frictional contact manner. Thereby, the movable portion 5-20 may still rotate relative to the main axis 5-0.

In some embodiments, the driving assembly 5-40A may include a first driving element 5-42 and a first transmission element 5-44, and the driving assembly 5-40B may include a second driving element 5-43 and a second transmission element 5-45. The driving assembly 5-40A and the driving assembly 5-40B may be affixed on the base 5-14. Specifically, the base 5-14 may include an extension portion 5-141 and a support portion 5-142, the extension portion 5-141 may have a recess 5-143. A bonding element 5-70 may be provided in the recess 5-143 to fix the relative position of the driving assembly 5-40A, the driving assembly 5-40B, and base 5-14. The element 5-70 may be adhesive, for example.

In addition, an end of the first transmission element 5-44 away from the support portion 5-142 may be disposed on the support portion 5-142 to support the driving assembly 5-40A and driving assembly 5-40B. The movable portion 5-20 at least partially in contact with the driving assembly 5-40A and the driving assembly 5-40B, and the driving assembly 5-40A and the driving assembly 5-40B connect the movable portion 5-20 and the fixed portion 5-10. In other words, the driving assembly 5-40A and the driving assembly 5-40B have an integrated structure rather than being formed of separate components.

The magnetic element 5-52 may be affixed on the movable portion 5-20, and the magnetic permeable element 5-54 may be affixed on the base 5-14. For example, the magnetic element 5-52 may be a magnet, and the magnetic permeable element 5-54 may include a magnetically permeable material. Thereby, a magnetic force in the −Z direction may be generated between the magnetic element 5-52 and the magnetic permeable element 5-54, and the force is applied on the movable portion 5-20.

As shown in FIG. 55, in some embodiments, the magnetic element 5-52 may include a plurality of magnetic poles arranged along a direction that is perpendicular to the main axis 5-0 (for example, the X direction). The magnetic poles include an N pole and an S pole, and the direction in which the N pole and the S pole are arranged (for example, the X direction) is not parallel to the main axis 5-0. In addition, the N pole and the S pole may also be arranged in the Y direction to allow the sensing element 5-56 detecting the magnetic field change of the magnetic element 5-52 when the movable portion 5-20 is moving.

In some embodiments, an opening may be provided on the magnetic permeable element 5-54, and the sensing element 5-56 may be disposed in the opening of the magnetic permeable element 5-54. As shown in FIG. 54A and FIG. 54B, when viewed along a direction that is perpendicular to the main axis 5-0, the sensing element 5-56 is disposed between the magnetic element 5-52 and the magnetic permeable element 5-54.

The sensing elements 5-56 may include a Hall sensor, a magnetoresistance effect sensor (MR Sensor), a giant magnetoresistance effect sensor (GMR Sensor), a tunneling magnetoresistance effect sensor (TMR Sensor), or a fluxgate sensor.

Thus, when the movable portion 5-20 is in motion, the sensing element 5-56 may sense the magnetic field change of the magnetic element 5-52, and then obtain position information of the movable portion 5-20. It should be noted that the magnetic permeable element 5-54 and the sensing element 5-56 correspond to an identical magnetic element 5-52 to reduce the number of required elements, and miniaturization may be achieved.

In some embodiments, as shown in FIG. 54A, a support assembly 5-60 (which includes a first support element 5-61 and a second support element 5-62) may be provided on the base 5-14, and provided at opposite sides of the movable portion 5-20. Thereby, a supporting force 5-S may be generated to support the driving assembly 5-40A and the driving assembly 5-40. An attracting force 5-A is generated by the magnetic element 5-52 and the magnetic permeable element 5-54, and the attracting force 5-A and the support force 5-S oriented in different directions. For example, in this embodiment, the attracting force 5-A is oriented in the −Z direction, and the support force 5-S is oriented in the Z direction, that is, the opposite direction.

The first supporting element 5-61 has a first support surface 5-61A (which is parallel to the main axis 5-0) and a second support surface 5-61B (which is perpendicular to the main axis 5-0), and the first support surface 5-61A and the second support surface 5-61B are facing the driving assembly 5-40A and are not parallel to each other. In addition, the second support element 5-62 has a third support surface 5-62A (which is parallel to the main axis 5-0) and a fourth support surface 5-62B (which is perpendicular to the main axis 5-0), and the third support surface 5-62A and the fourth support surface 5-62B face the driving assembly 5-40B and are not parallel to each other. In addition, the second support surface 5-61B and the positioning surface 5-12A face opposite directions.

As shown in FIG. 54A and FIG. 54B, the movable portion 5-20 has a moving contact surface 5-20A that in contact with the driving assembly 5-40A and the driving assembly 5-40B, and faces the pressure assembly 5-30, the driving assembly 5-40A, and the driving assembly 5-40B. The shortest distance between the movable portion 5-20 and the driving assembly 5-40A or the driving assembly 5-40B is less than the shortest distance between the movable portion 5-20 and the second support surface 5-61B. For example, the movable portion 5-20 directly in contact with the driving assembly 5-40A or the driving assembly 5-40B, rather than directly in contact with the second support surface 5-61B. The movable portion 5-20 has an extension portion 5-22 extending outward from the movable contact surface 5-20A, such as extending to the −Z direction. As shown in FIG. 54B, in the direction of the extending direction of the main axis 5-0, the shortest distance 5-L1 between the positioning surface 5-12A and the movable portion 5-20 is less than the maximum size 5-L2 of the support part 5-22. Therefore, the distance between the movable portion 5-20 and the case 5-12 may be reduced to achieve miniaturization.

In some embodiments, a dust-catching assembly 5-72 may be provided on the surface 5-14A of the base 5-14 to collect debris that may be generated during operation of the optical element driving mechanism 5-100 to avoid affecting the efficiency of the optical element drive mechanism 5-100. In some embodiments, the dust-catching assembly 5-72 may be provided on the entire surface 5-14A, or may be designed to surround the main axis 5-0, so when viewed along the direction of the main axis 5-0, the dust-catching assembly 5-72 may surround the main axis 5-0 to ensure that debris in all directions may be collected by the dust-catching assembly 5-72. The dust-catching assembly 5-72 may be, for example, an adhesive.

The movable portion 5-20 may have a circular shape, and the first transmission element 5-44 of the driving assembly 5-40A or the second transmission element 5-45 of the driving assembly 5-40B may be disposed on the movable portion 5-20 in friction contact.

In addition, the optical element driving mechanism 5-100 is illustrated as including a driving assembly 5-40A and a driving assembly 5-40B, and the first transmission element 5-44 of the driving assembly 5-40A and the second transmission element 5-45 of the driving assembly 5-40B may move in opposite directions. For example, if the first transmission element 5-44 moves to the Y direction, then the second transmission element 5-45 may move to the −Y direction to apply torque having identical direction to the movable portion 5-20 (relative to the main axis 5-0), so as to get a higher driving force.

It should be noted that since the magnetic element 5-52 and the magnetic permeable element 5-54 apply a force on the movable portion 5-20 toward the base 5-14, the movable portion 5-20 may be prevented from falling out from the optical element driving mechanism 5-100 during operation.

In some embodiments, the first driving element 5-42 or the second driving element 5-43 may be formed of piezoelectric materials. In other words, when an electric field (voltage) is applied to the surface of the first driving element 5-42 or the second driving element 5-43, the electric dipole moment of the first driving element 5-42 or the second driving element 5-43 may be elongated, and the first driving element 5-42 or the second driving element 5-43 will elongate in the direction of the electric field to resist the change. Therefore, electrical energy may be converted into mechanical energy.

In some embodiments, an electric field in the Y direction may be applied to the first driving element 5-42 or the second driving element 5-43, so that the first driving element 5-42 or the second driving element 5-43 may deform in the Y direction. Therefore, as shown in FIG. 53, the driving assembly 5-40A may apply a first driving force 5-F1, the driving assembly 5-40B may apply a second driving force 5-F2. The direction of the first driving force 5-F1 and the direction of the second driving he force 5-F2 are parallel to the first direction (Y direction), and the first direction is not parallel to the extending direction of the main axis 5-0 (Z direction). The direction of the first driving force 5-F1 and the direction of the second driving force 5-F2 do not intersect the main axis 5-0. Thereby, the first driving force 5-F1 and the second driving force 5-F2 may apply torques to the movable portion 5-20 relative to the main axis 5-0 to allow the movable portion 5-20 rotate relative to the main axis 5-0.

Figure 56F:
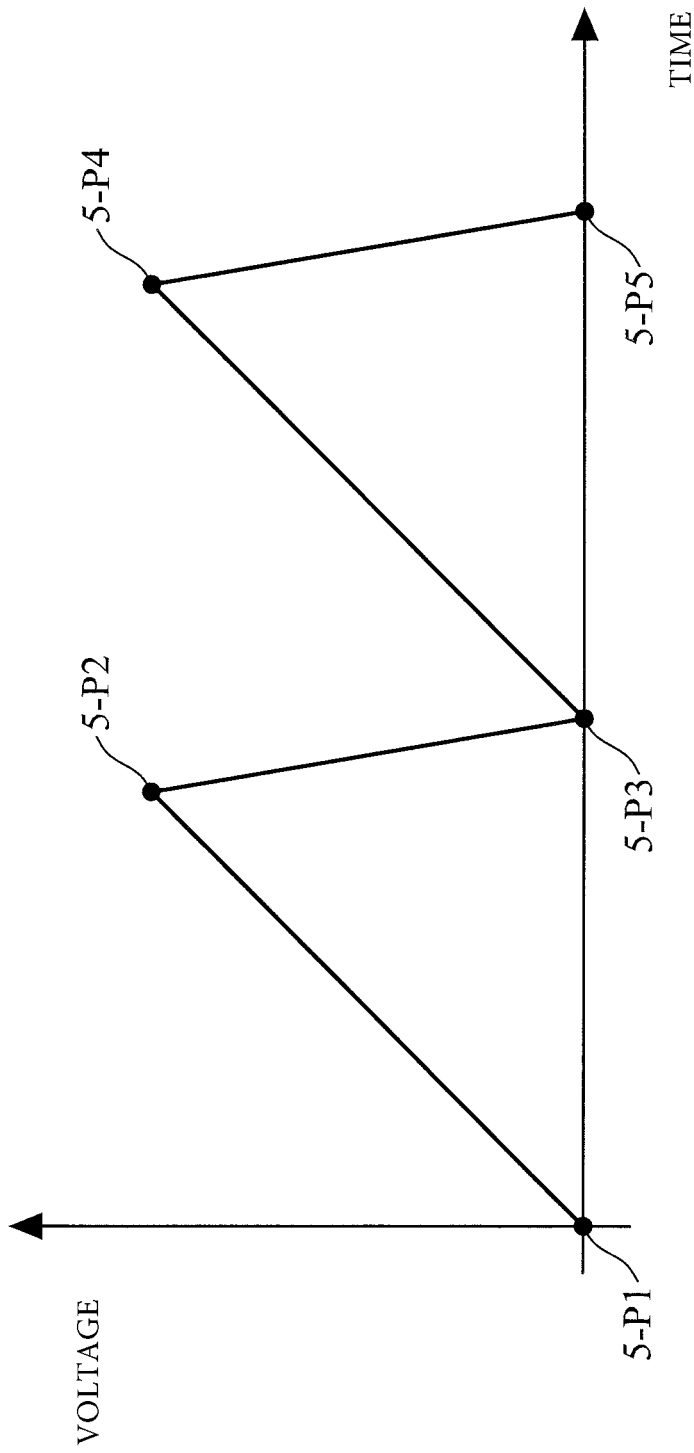
FIG. 56F is a schematic view of the relationship between the voltage applied to the driving assembly and time in the method.

FIG. 56A to FIG. 56E are schematic views of a method in which the driving assembly 5-40 drives a movable portion 5-20 to move in the Y direction, and FIG. 56F is a schematic view of the relationship between the voltage applied to the driving assembly 5-40 and time in the method. As shown in FIG. 56A, the movable portion 5-20 is movably disposed on the first transmission element 5-44 of the driving assembly 5-40, such as disposed on the first transmission element 5-44 by frictional contact. If the force applied on the first transmission element 5-44 is greater than the maximum static friction between the movable portion 5-20 and the first transmission element 5-44, the movable portion 5-20 may move relative to the first transmission element 5-44 in the extending direction of the first transmission element 5-44 (e.g. the Y direction in FIG. 56A to FIG. 56E).

The state of FIG. 56A corresponds to the point 5-P1 in FIG. 56F, in which no voltage is applied to the driving assembly 5-40. The movable portion 5-20 is at a starting position at this time. The distance between the movable portion 5-20 and the bottom of the first driving element 5-42 is 5-D1, and the height of the first driving element 5-42 in the Y direction at this time is 5-H1.

Next, as shown in FIG. 56B, a voltage (first electrical signal) is applied to the driving assembly 5-40 to increase the height of the first driving element 5-42 in the Y direction to a height 5-H2. In other words, the height 5-H2 is greater than the height 5-H1. As a result, the first transmission element 5-44 is also driven together and moves in the Y direction.

Since the movable portion 5-20 is disposed on the first transmission element 5-44 by frictional contact, a voltage with a slower increasing speed may be applied to the driving assembly 5-40 to make the force received by the movable portion 5-20 less than the maximum static friction between the movable portion 5-20 and the first transmission element 5-44, to allow the movable portion 5-20 and the first transmission element 5-44 to move together in the Y direction. At this time, the distance between the movable portion 5-20 and the bottom of the first driving element 5-42 is 5-D2, and the distance 5-D2 is greater than the distance 5-D1. The state at this time corresponds to the point 5-P2 in FIG. 56F.

Next, as shown in FIG. 56C, another voltage is applied to the driving assembly 5-40 to decrease the height of the driving element 5-42 in the Y direction to the height 5-H3, and the corresponding state at this time is the point 5-P3 in FIG. 56F. It should be noted that the changing direction of the applied voltage at this time is opposite to the changing direction of the applied voltage in the state of FIG. 56B, and the absolute value of the applied current in FIG. 56C (the differential of voltage with respect to time at this time, which is the slope between the point 5-P2 and the point 5-P3 in FIG. 56F) is greater than the absolute value of the applied current in FIG. 56B (the slope between the point 5-P1 and the point 5-P2 in FIG. 56F). In other words, the absolute value of the rate of change of the length of the driving element 5-42 at this time is greater than that in FIG. 56B, that is, the force received by the movable portion 5-20 will be greater than that in the state of FIG. 56B.

By designing the force applied on the movable portion 5-20 in the state of FIG. 56C to be greater than the maximum static friction force between the movable portion 5-20 and the first transmission element 5-44, the movable portion 5-20 may be allowed to move relative to the first transmission element 5-44. For example, at this time, the distance between the movable portion 5-20 and the bottom of the first driving element 5-42 is 5-D3, and the distance 5-D3 is greater than the distance 5-D1 in FIG. 56A, and is substantially equal to the distance 5-D2 in FIG. 56B. Thereby, the movable portion 5-20 may move in the Y direction.

In other words, the portion between the point 5-P1 and the point 5-P2 may be referred to as the first portion in which the electrical signal is increasing, and the portion between the point 5-P2 and the point 5-P3 may be referred to as the second portion in which the electrical signal is decreasing, and the absolute value of the slope of the first portion is different than the absolute value of the slope of the second portion.

FIG. 56D and FIG. 56E are similar to the states of FIG. 56B and FIG. 56C, wherein another voltage is applied to the driving assembly 5-40 in the state of FIG. 56D, so that the height of the driving element 5-42 in the X direction is increase to the height 5-H4. In the state of FIG. 56E, another voltage is applied to the driving assembly 5-40 to decrease the height of the driving element 5-42 in the X direction to the height 5-H5, wherein the height 5-H4 is greater than the height 5-H3, and the height 5-H5 is less than the height 5-H4. The state of FIG. 56D corresponds to the point 5-P4 in FIG. 56F, and the state of FIG. 56E corresponds to the point 5-P5 in FIG. 56F. The absolute value of the applied current in FIG. 56D is less than the absolute value of the applied current in FIG. 56E, that is, the absolute value of the slope between points 5-P3 and 5-P4 is less than the absolute value of the slope between points 5-P4 and 5-P5. In this way, the distance between the movable portion 5-20 and the bottom of the first driving element 5-42 may be changed to the distance 5-D4 (FIG. 56D) and the distance 5-D5 (FIG. 56E) in a similar manner as shown in FIG. 56B and FIG. 56C. The distance 5-D4 is greater than the distance 5-D3 in FIG. 56C, and the distance 5-D5 is substantially equal to the distance 5-D4. As a result, the movable portion 5-20 may further move in the Y direction. In other words, the first signal may include cycled signal.

Figure 57F:
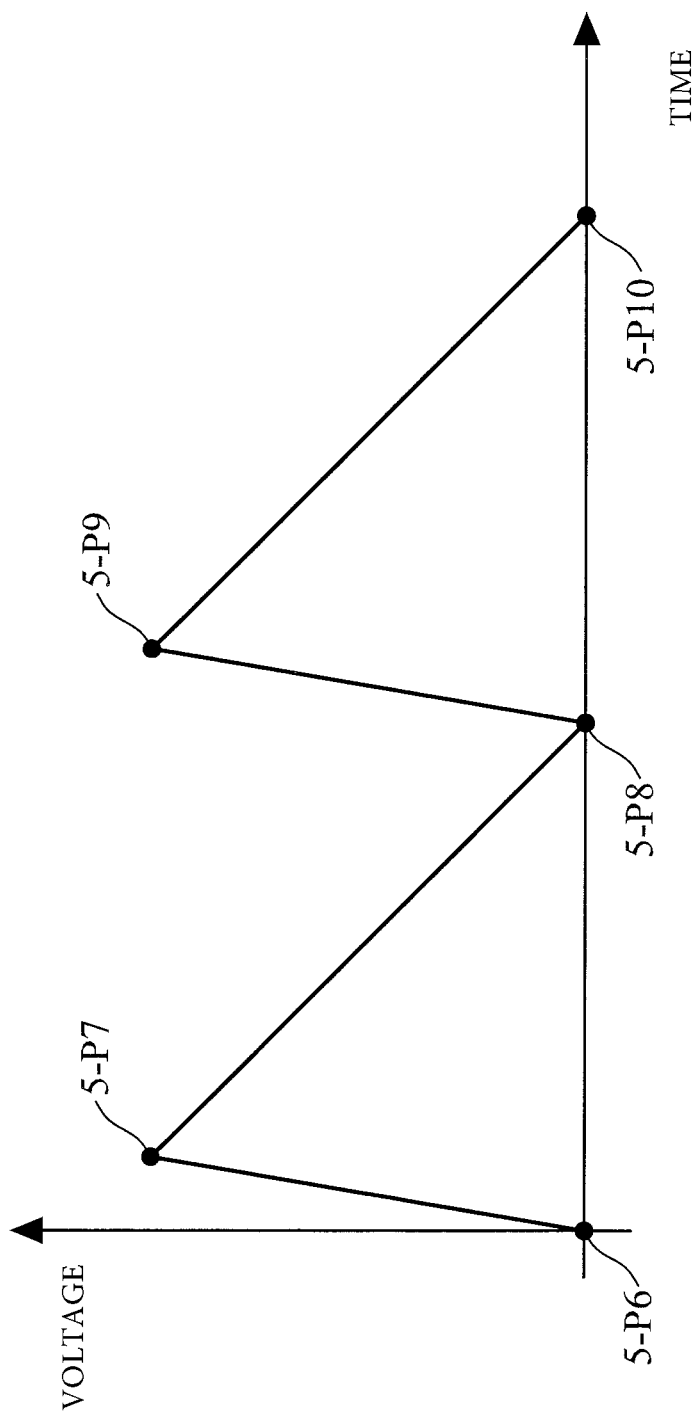
FIG. 57F is a schematic view of the relationship between the voltage applied to the driving assembly and time in the method.

FIG. 57A to FIG. 57E are schematic views of a method in which the movable portion 5-20 is driven by the driving assembly 5-40 in −Y direction, and FIG. 57F is a schematic view of the relationship between the voltage applied to the driving assembly 5-40 and the time in this method. As shown in FIG. 57A, the movable portion 5-20 is movably disposed on the first transmission element 5-44 of the driving assembly 5-40, such as disposed on the first transmission element 5-44 by frictional contact. If the force applied on the first transmission element 5-44 is greater than the maximum static friction between the movable portion 5-20 and the first transmission element 5-44, the movable portion 5-20 may be moved relative to the first transmission element 5-44 in the extending direction of the first transmission element 5-44 (the first direction, such as the −Y direction in FIG. 57A to FIG. 57E).

The state of FIG. 57A corresponds to the point 5-P6 in FIG. 57F, in which no voltage is applied to the driving assembly 5-40. The movable portion 5-20 is at a starting position at this time, the distance between the movable portion 5-20 and the bottom of the first driving element 5-42 is 5-D6, and the height of the driving element 5-42 in the Y direction at this time is 5-H6.

Next, as shown in FIG. 57B, a voltage (second electrical signal) is applied to the driving assembly 5-40 to increase the height of the first driving element 5-42 in the Y direction to the height 5-H7. In other words, the height 5-H6 is less than the height 5-H7. In this way, the first transmission element 5-44 will also be driven together to move in the Y direction.

Since the movable portion 5-20 is disposed on the first transmission element 5-44 by frictional contact, a more severe voltage may be applied to the driving assembly 5-40 to make the force received by the movable portion 5-20 greater than the maximum static friction between the movable portion 5-20 and the first transmission element 5-44, so as to allow the movable portion 5-20 move relative to the first transmission element 5-44 in the Y direction. For example, the distance between the movable portion 5-20 and the bottom of the first driving element 5-42 is 5-D7, and the distance 5-D7 is substantially equal to the distance 5-D6. The state at this time corresponds to the point 5-P7 in FIG. 57F.

Next, as shown in FIG. 57C, another voltage is applied to the driving assembly 5-40 to decrease the height of the driving element 5-42 in the Y direction to the height 5-H8, and the corresponding state at this time is the point 5-P8 in FIG. 57F. It should be noted that the changing direction of the applied voltage at this time is opposite to the changing direction of the applied voltage in the state of FIG. 57B, and the absolute value of the applied current in FIG. 57C (the differential of voltage with respect to time at this time, which is the slope between the point 5-P7 and the point 5-P8 in FIG. 57F) is less than the absolute value of the applied current in FIG. 57B (the slope between the point 5-P6 and the point 5-P7 in FIG. 57F). In other words, the absolute value of the rate of change of the height of the driving element 5-42 at this time is less than that in FIG. 57B, that is, the force received by the movable portion 5-20 will be less than that in the state of FIG. 57B.

By designing the force applied on the movable portion 5-20 in the state of FIG. 57C to be less than the maximum static friction force between the movable portion 5-20 and the first transmission element 5-44, the movable portion 5-20 may be allowed to move together with the first transmission element 5-44. For example, at this time, the distance between the movable portion 5-20 and the bottom of the first driving element 5-42 is 5-D8, and the distance 5-D8 is less than the distance 5-D6 in FIG. 57A and the distance 5-D7 in FIG. 57B. Thereby, the movable portion 5-20 may move in the −Y direction.

In other words, the portion between the point 5-P6 and the point 5-P7 may be referred to as the third portion in which the electrical signal is increasing, and the portion between the point 5-P7 and the point 5-P8 may be referred to as the fourth portion in which the electrical signal is decreasing, and the absolute value of the slope of the third portion is different than the absolute value of the slope of the fourth portion.

FIG. 57D and FIG. 57E are similar to the states of FIG. 57B and FIG. 57C, wherein another voltage is applied to the driving assembly 5-40 in the state of FIG. 57D, so that height of the driving element 5-42 in the X direction is increased to the height 5-H9. In the state of FIG. 57E, another voltage is applied to the driving assembly 5-40 to decrease the height of the driving element 5-42 in the X direction to the height 5-H10, wherein the height 5-H9 is greater than the height 5-H8, and the height 5-H10 is less than the height 5-H9. The state of FIG. 57D corresponds to the point 5-P9 in FIG. 57F, and the state of FIG. 57E corresponds to the point 5-P10 in FIG. 57F. The absolute value of the applied current in FIG. 57D is greater than the absolute value of the applied current in FIG. 57E, that is, the absolute value of the slope between points 5-P8 and 5-P9 is greater than the absolute value of the slope between points 5-P9 and 5-P10. In this way, the distance between the movable portion 5-20 and the bottom of the first driving element 5-42 may be changed to the distance 5-D9 (FIG. 57D) and the distance 5-D10 (FIG. 57E) in a similar manner as shown in FIG. 57B and FIG. 57C. The distance 5-D9 is substantially equal to the distance 5-D8 in FIG. 57C, and the distance 5-D10 is less than the distance 5-D9. As a result, the movable portion 5-20 may further move in the −Y direction.

The absolute value of the slope between the point 5-P1 and the point 5-P2, the absolute value of the slope between the point 5-P3 and the point 5-P4, the absolute value of the slope between the point 5-P6 and the point 5-P7, and the absolute value of the slope between the point 5-P8 and the point 5-P9 may be substantially identical. The absolute value of the slope between the point 5-P2 and the point 5-P3, the absolute value of the slope between the point 5-P4 and the point 5-P5, the absolute value of the slope between the point 5-P7 and the point 5-P8, and the absolute value of the slope between the point 5-P9 and the point 5-P10 may also be substantially identical. Therefore, the design of the optical element driving mechanism 5-100 may be simplified.

In other words, the absolute value of the slope of the first portion is less than the absolute value of the slope of the second portion, and the absolute value of the slope of the third portion is greater than the absolute value of the slope of the fourth portion. The absolute value of the slope of the first portion is substantially identical to the absolute value of the slope of the fourth portion, and the absolute value of the slope of the second portion is substantially identical to the absolute value of the slope of the third portion.

In some embodiments, the voltage on the Y axis in FIG. 56F or FIG. 57F may also be changed to current, that is, the driving assembly 5-40 also may be operated in the foregoing manner by changing the current, depending on design requirements.

It should be noted that the electrical signal may be applied to the driving assembly 4-40B to allow a second driving force 5-F2 generated by the driving assembly 4-40B. In some embodiments, the direction of the second driving force 5-F2 may be opposite to the direction of the first driving force 5-F1, and the direction of the second driving force 5-F2 does not intersect the main axis 5-0. For example, when the first electrical signal shown in FIG. 56F is applied to the driving assembly 4-40A, the second electrical signal shown in FIG. 57F may be applied to the driving assembly 4-40B to make the direction of the first driving force 5-F1 and the direction of the second driving force 5-F2 opposite.

By repeating the states of FIG. 56A to FIG. 56E or the states of FIG. 57A to FIG. 57E, the movable portion 5-20 may be moved to a specific position, thereby controlling the position of the movable portion 5-20 in the Y direction to allow the movable portion 5-20 rotate relative to the main axis 5-0. In some embodiments, the position of the movable portion 5-20 may be sensed by the sensing element 5-56, and the driving assembly 5-40A and the driving assembly 5-40B may be controlled by the sensed position signal to stop driving the driving assembly 5-40A and the driving assembly 5-40B when the movable portion 5-20 reaching the desired position, so that the movable portion 5-20 may move relative to the main axis.

In summary, an optical element driving mechanism is provided. The optical element driving mechanism includes a fixed portion, a movable portion, a driving assembly, and a pressure assembly. The movable portion has a main axis, moves relative to the fixed portion, and connects to an optical element. The driving assembly is used to drive the movable portion to move relative to the fixed portion. The pressure assembly is used to limit the movement of the movable portion to within a range. In this way, the optical element may be allowed to move in an appropriate direction to achieve various functions as required.

Figure 58:
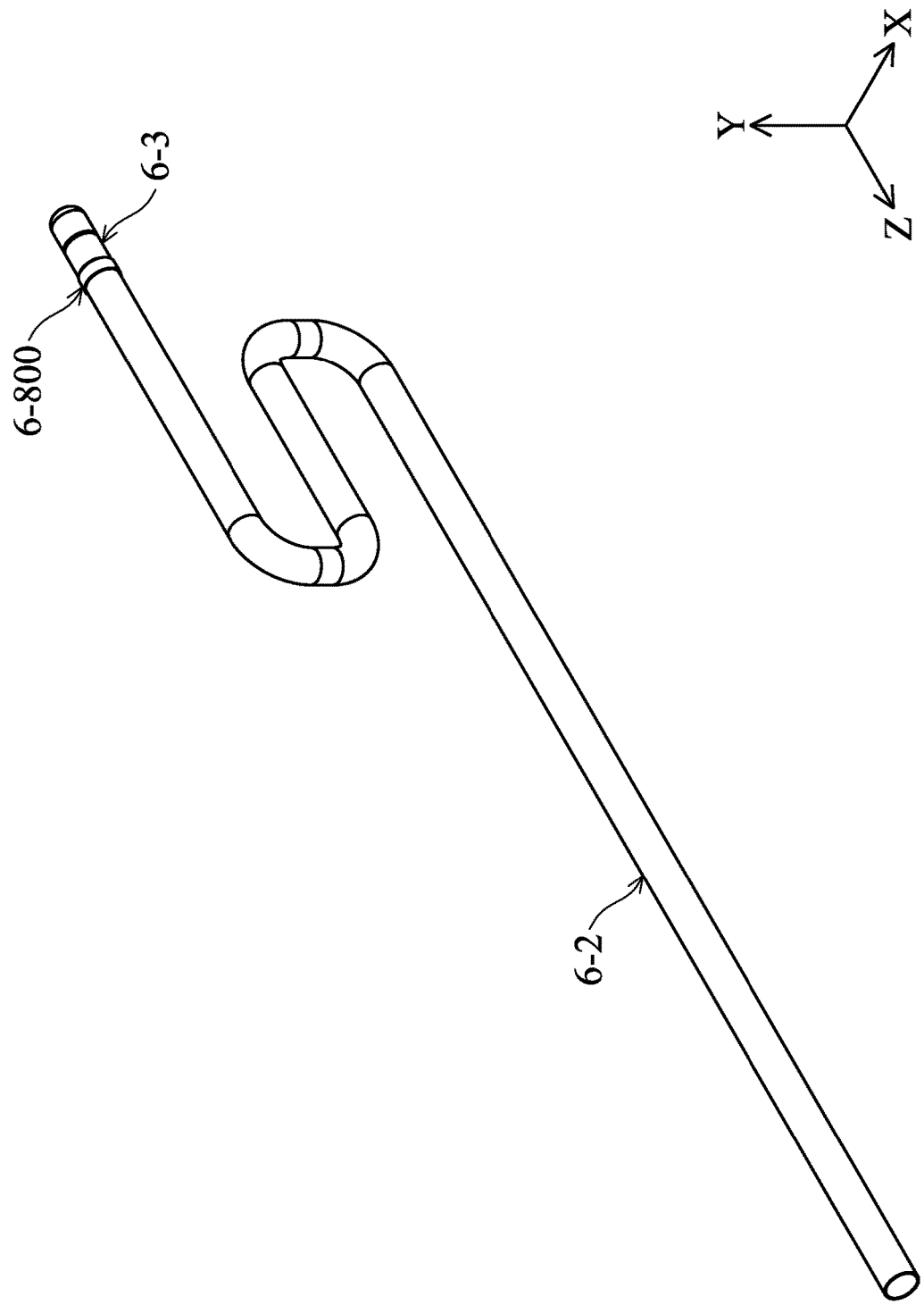
FIG. 58 is a schematic view of an optical system in some embodiments of the present disclosure.

FIG. 58 is a schematic view of an optical system 6-1 in some embodiments of the present disclosure. The optical system 6-1 may be, for example, a medical endoscope, and may mainly include a manipulating portion 6-2, a first optical module 6-3, and a second optical module 6-800. The manipulating portion 6-2 may have an elongated shape, and the first optical module 6-3 and the second optical module 6-800 may be disposed at an end of the manipulating portion 6-2 to reach into human body for capturing images. For example, the second optical module 6-800 may be disposed between the manipulating portion 6-2 and the first optical module 6-3, and may be electrically connected to an external circuit disposed in the manipulating portion 6-2. In some embodiments, the first optical module 6-3 and the second optical module 6-800 may be electrically insulating with each other.

Figure 59:
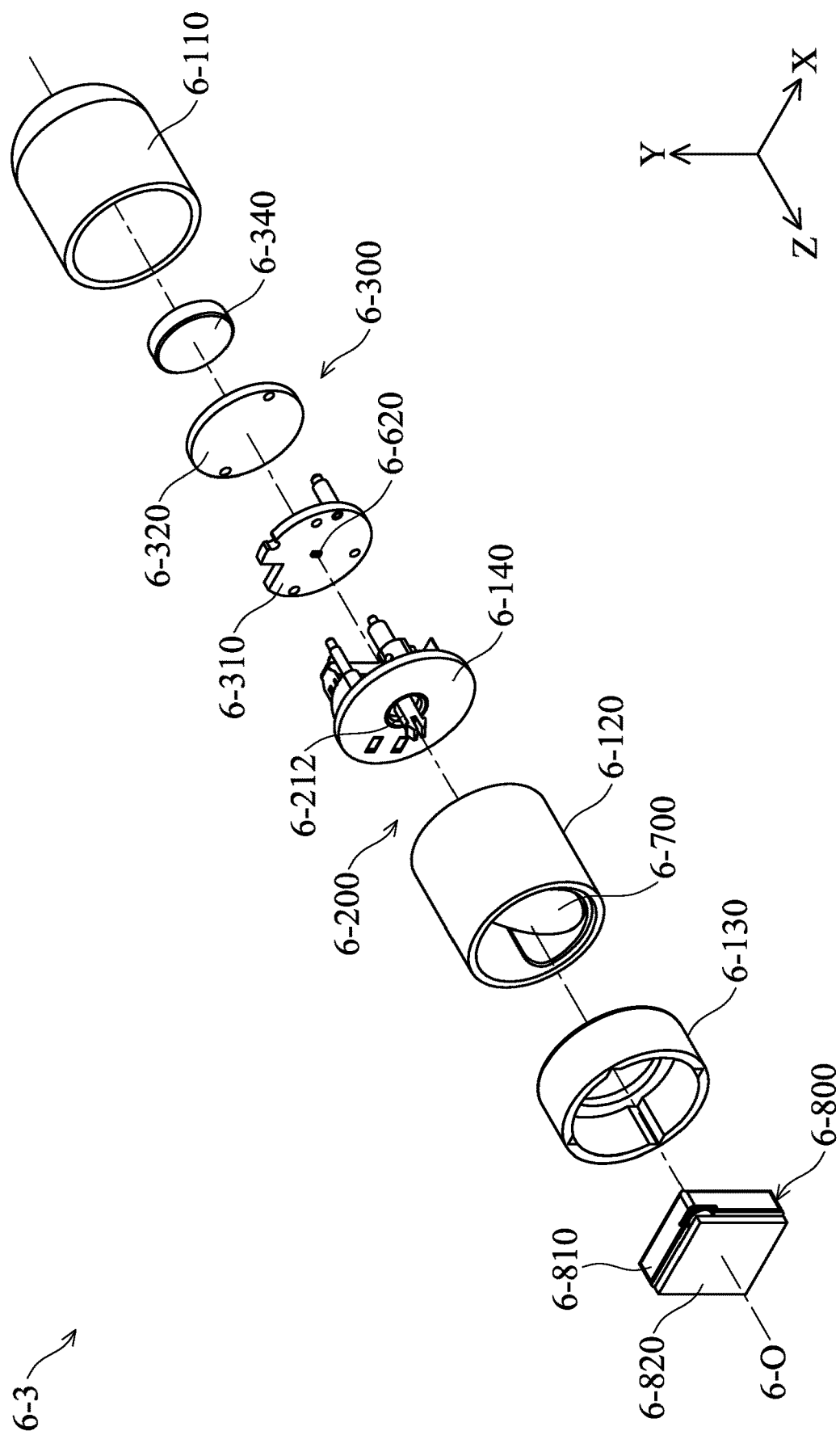
FIG. 59 is an exploded view of a first optical module and a second optical module.
Figure 60:
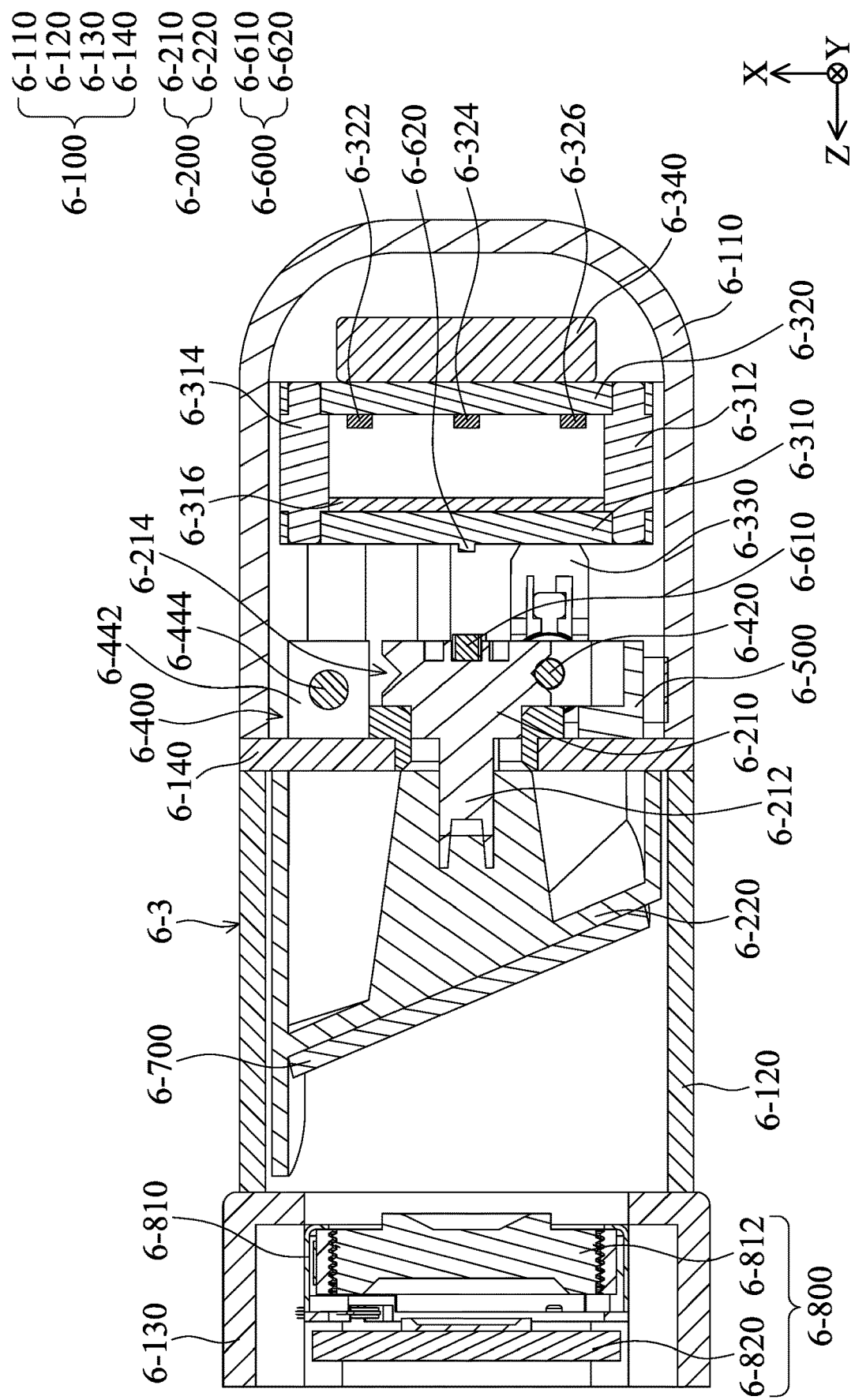
FIG. 60 is a cross-sectional view of the first optical module and the second optical module.

FIG. 59 is an exploded view of the first optical module 6-3 and the second optical module 6-800, and FIG. 60 is a cross-sectional view of the first optical module 6-3 and the second optical module 6-800. In some embodiments, the first optical module 6-3 mainly includes a fixed portion 6-100, a movable portion 6-200, a circuit assembly 6-300, and a driving assembly 6-400 that are arranged along a main axis 6-0. The movable portion 6-200 is used for connecting an optical element 6-700, and is movable relative to the fixed portion 6-100. The circuit assembly 6-300 is electrically connected to the driving assembly 6-400 to provide electrical power to the driving assembly 6-400. The driving assembly 6-400 is used for driving the movable portion 6-200 to move relative to the fixed portion 6-100.

In some embodiments, the fixed portion 6-100 may include a first case 6-110, a second case 6-120, a third case 6-130, and a blocking plate 6-140. The first case 6-110 may surround the circuit assembly 6-300, and the second case 6-120 may surround the optical element 6-700 and may include transparent materials, such as glass or plastic. As a result, light may pass through the second case 6-120 to reach the optical element 6-700.

The movable portion 6-200 may include a first movable element 6-210 and a second movable element 6-220, and the first movable element 6-210 and the second movable element 6-220 are movably disposed on the blocking plate 6-140. For example, the first movable element 6-210 may penetrate the blocking plate 6-140 and fix with the second movable element 6-220. As a result, the optical element 6-700 that is disposed on the movable portion 6-200 may rotate together with the movable portion 6-200 relative to the fixed portion 6-100, and the main axis 6-0 that extends in the Z direction (first direction) may act as the rotational axis. The blocking plate 6-140 may be positioned between the optical element 6-700 and the driving assembly 6-400. Furthermore, the first movable element 6-210 of the movable portion 6-200 may have a rotational shaft 6-212, wherein the rotational shaft 6-212 penetrates the blocking plate 6-140 and is fix on the second movable element 6-220.

As shown in FIG. 60, the circuit assembly 6-300 may include a first circuit element 6-310, a second circuit element 6-320, and a third circuit element 6-330. In some embodiments, the circuit assembly 6-300 may further include a first spacer 6-312, a second spacer 6-314, an interference-suppressing element 6-316, a control element 6-322, a wireless communication element 6-324, a passive electronic element, and a power source 6-340.

In some embodiments, the first circuit element 6-310 and the second circuit element 6-320 may arrange along the first direction (Z direction), and the first circuit element 6-310 and the second circuit element 6-320 may have plate-shape and may parallel with each other. Furthermore, as shown in FIG. 60, the first circuit element 6-310 is closer to the movable portion 6-200 than the second circuit element 6-320.

The first spacer 6-312 and the second spacer 6-314 may be disposed between the first circuit element 6-310 and the second circuit element 6-320 to separate the first circuit element 6-310 and the second circuit element 6-320. In other words, a gap is formed between the first circuit element 6-310 and the second circuit element. The interference-suppressing element 6-316 may be disposed on the first circuit element 6-310, and may be disposed between the first circuit element 6-310 and the second circuit element 6-320 to prevent the signal of the elements disposed on first circuit element 6-310 and the second circuit element 6-320 from interference. For example, the interference-suppressing element 6-316 may be disposed between a position sensing assembly 6-600 and the second circuit element 6-320.

The control element 6-322, the wireless communication element 6-324, the passive electronic element 6-326, and the power source 6-340 may be disposed on the second circuit element 6-320, but the present disclosure is not limited thereto. The positions of the elements may be adjusted based on actual requirement. The control element 6-322 may be used for controlling the driving assembly. The wireless communication element 6-324 may be used for controlling the first optical module 6-3 in a wireless manner, such as used for emitting a signal to an external apparatus. The passive electronic device 6-326 may be, for example, a capacitor, a resistor, or an inductor. The power source 6-340 may be, for example, a battery, and is used for providing power to the driving assembly 6-400.

The position sensing assembly 6-600 may be disposed in the first optical module 6-3 to detect the movement of the movable portion 6-200 relative to the fixed portion. For example, the position sensing assembly 6-600 may include a magnetic element 6-610 and a position sensor 6-620. The magnetic element 6-610 may be, for example, a magnet, and may be disposed on the movable portion. The position sensor 6-620 may be disposed on the first circuit element 6-310 and opposite the magnetic element 6-610. For example, the magnetic element 6-610 and the position sensor 6-620 may arrange in the Z direction. As a result, when the magnetic element 6-610 moving with the movable portion 6-200, the position sensor 6-620 may detect the magnetic field change caused by the movement of the magnetic element 6-610 to get the position of the movable portion 6-200.

FIG. 61A to FIG. 65 are schematic views of some element of the first optical module 6-3. As shown in FIG. 61A to FIG. 65, the driving assembly 6-400 may mainly include a driving source 6-410, a transmission element 6-420, and a pressing assembly 6-440.

The driving source 6-410 may be affixed on the transmission element 6-420, such as affixed on the transmission element 6-420 by a first bonding element 6-432. In some embodiments, the driving source may include a first piezoelectric element 6-412, a second piezoelectric element 6-414, and a resilient element 6-416. The resilient element 6-416 may be disposed between the first piezoelectric element 6-412 and the second piezoelectric element 6-414, and may be affixed on the first piezoelectric element 6-412 and the second piezoelectric element 6-414. In other words, the second bonding element 5-434 may be disposed on opposite sides of the resilient element 6-416. However, the present disclosure is not limited thereto. For example, in some embodiments, the second piezoelectric element 6-414 and the second bonding element 6-434 disposed between the second piezoelectric element 6-414 and the resilient element 6-416 may be omitted, depending on design requirement. Furthermore, the third circuit element 6-330 may be electrically connected to the driving assembly 6-400 and the first circuit element 6-310 to allow the electronic elements disposed on the first circuit element 6-310 provide electrical signal to the driving assembly 6-400.

In some embodiments, the first piezoelectric element 6-412 and the second piezoelectric element 6-414 may be formed form piezoelectric materials. In other words, is an electrical field (voltage) is applied on the surface of the first piezoelectric element 6-412 or the second piezoelectric element 6-414m the electric dipole moment of the first piezoelectric element 6-412 or the second piezoelectric element 6-414 may be elongated, and the first piezoelectric element 6-412 or the second piezoelectric element 6-414 may be elongated along the electric field to resist the change. As a result, electric energy may be converted into mechanical energy. In some embodiments, the first piezoelectric element 6-412 or the second piezoelectric element 6-414 may deform to move the transmission element 6-420 in Y direction or −Y direction.

The pressing assembly 6-440 may include a pressing element 6-442 and an adjusting element 6-444. The pressing element 6-442 may be, for example, a metal spring sheet having resilient structure. An end of the pressing element 6-442 may be disposed on the adjusting element 6-444, and another end of the pressing element 6-442 may be disposed on a second column 6-144 extending from the blocking plate 6-140.

Figure 61A:
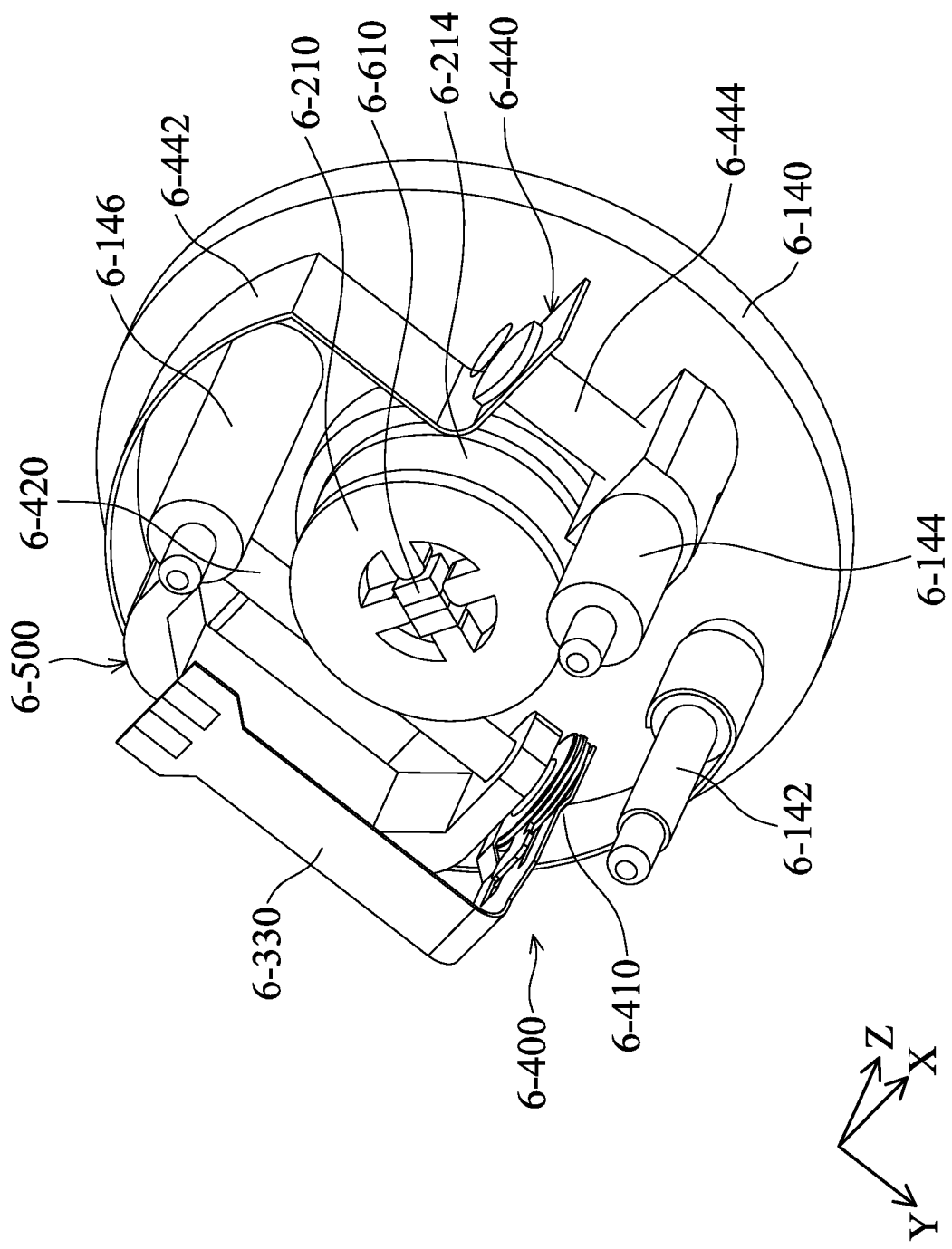
FIG. 61A and FIG. 61B are schematic views of some elements of the first optical module.
Figure 61B:
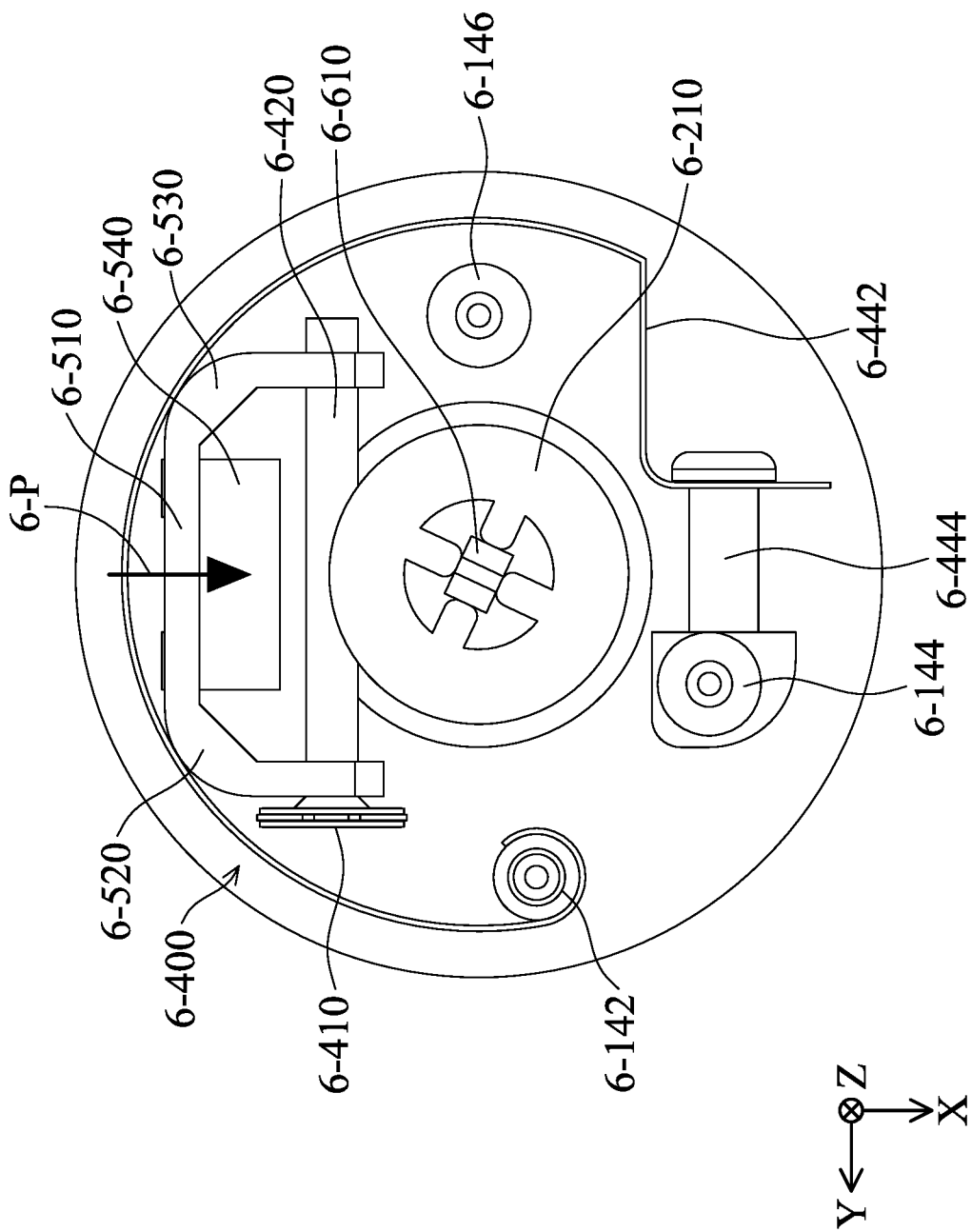
Figure 62:
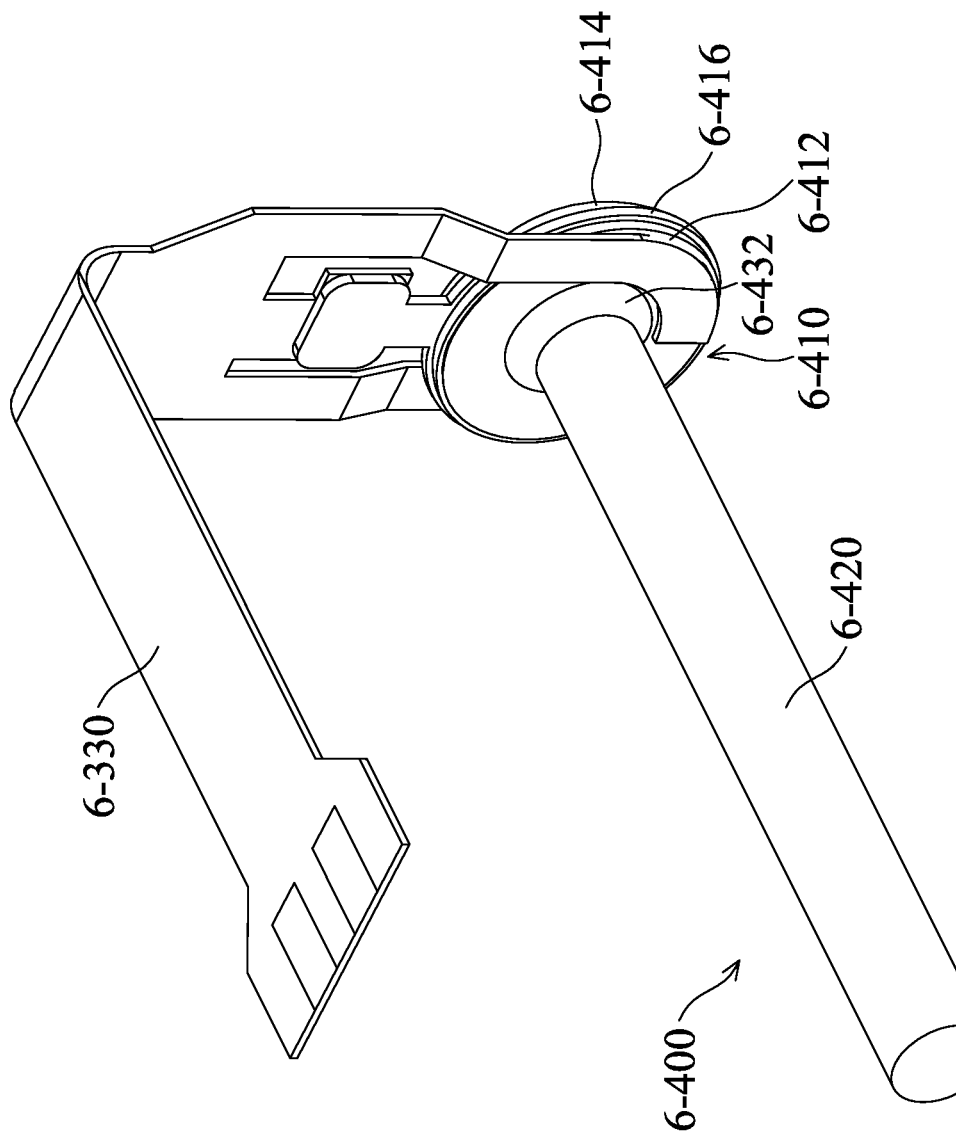
FIG. 62 to FIG. 65 are schematic views of some elements of the first optical module.
Figure 63:
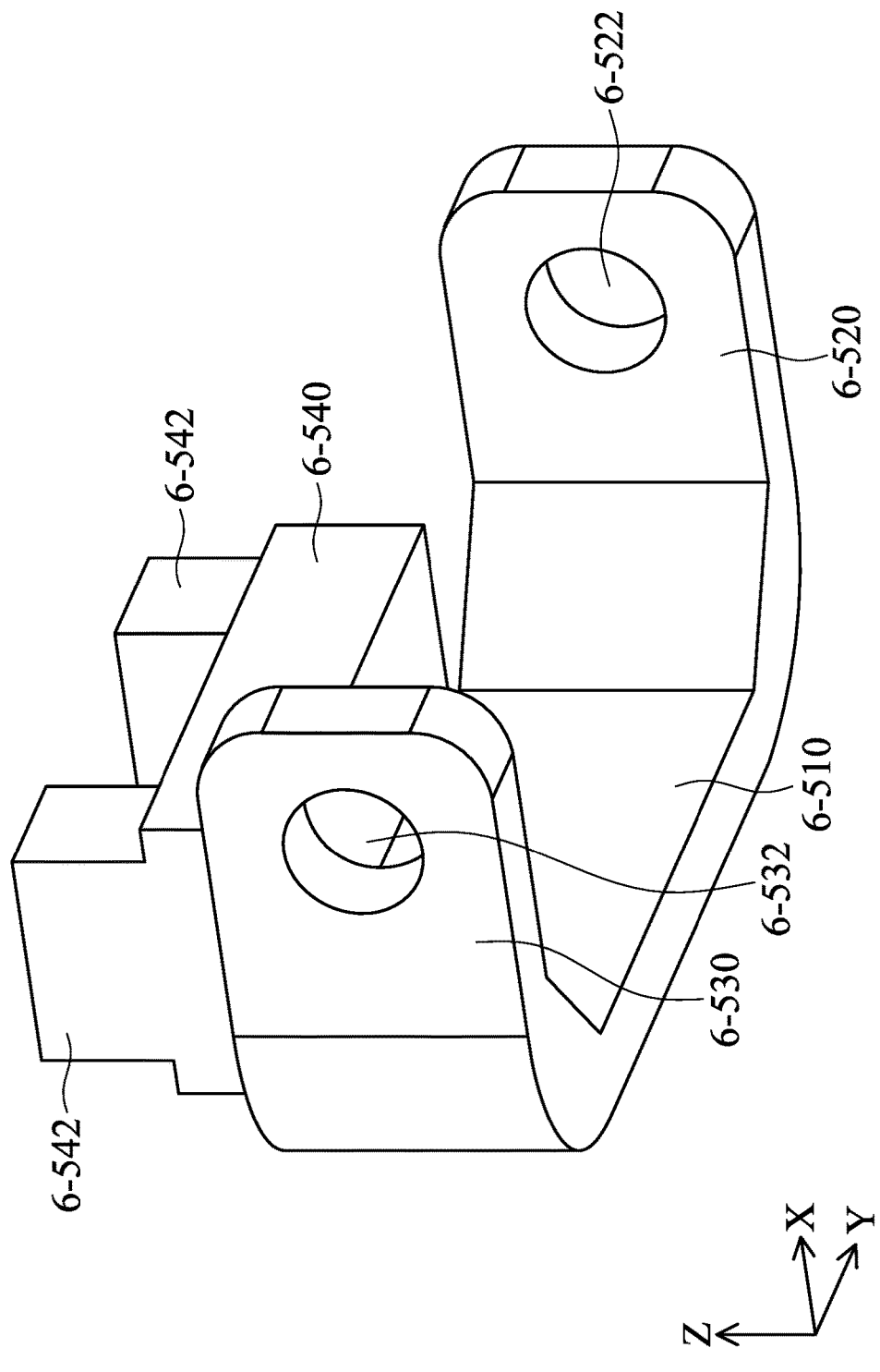

Moreover, the first optical module 6-3 further includes a frame 6-500. For example, FIG. 63 is a schematic view of the frame 6-500. The frame 6-500 mainly includes a main body 6-510, a first leaning portion 6-520, a second leaning portion 6-530, and a protruding portion 6-540. The first leaning portion 6-520 may have a first through hole 6-522. The second leaning portion 6-530 may have a second through hole 6-532. The protruding portion 6-540 may have a pair of protruding structures 6-542. The first leaning portion 6-520 and the second leaning portion 6-530 may correspond to the pressing assembly 6-440. For example, as shown in FIG. 61B, the first leaning portion 6-520 and the second leaning portion 6-530 may in direct contact with the pressing element 6-442 to allow pressure 6-P applied by the pressing element 6-442 to the frame 6-500 through the first leaning portion 6-520 and the second leaning portion 6-530. The direction of the pressure 6-P is not parallel to the first direction, such as oriented to the −Y direction.

The first leaning portion 6-520 and the second leaning portion 6-5350 are arranged parallel to the extending direction of the transmission element 6-420 (X direction/second direction). In some embodiments, the adjusting element 6-444 is disposed on first column 6-142 extending from the blocking plate 6-140. The adjusting element 6-444 may have a thread structure to lock on the first column 6-142, and may be used for adjusting the relative position of the adjusting element 6-444 and the first column 6-142, so as to adjust the amount or direction of the pressure 6-P.

Furthermore, a third column 6-146 may be disposed on the blocking plate 6-140. The first column 6-142, the second column 6-144, and the third column 6-146 may penetrate the first circuit element 6-310 to fix the relative position between the blocking plate 6-140 and the first circuit element 6-310.

Figure 64:
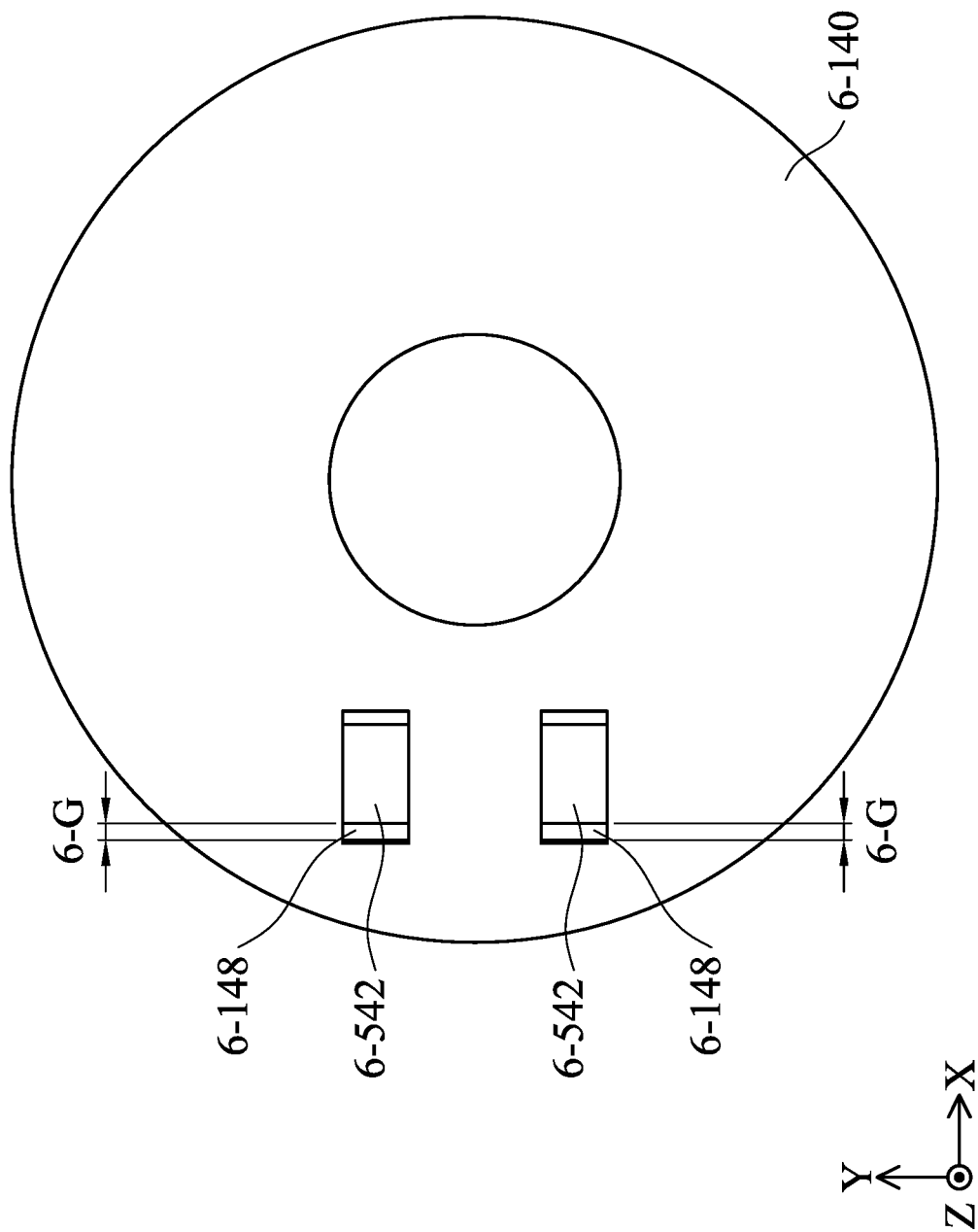

In some embodiments, as shown in FIG. 64, two protruding structures 6-542 may be disposed in accommodating structure 6-148 of the blocking plate 6-140. In Y direction, a gap 6-G may be formed between the sidewall of the protruding structure 6-542 and the sidewall of the accommodating structure 6-148, so that the frame 6-500 is allowed to move in Y direction relative to the blocking plate 6-140 rather than affixed on the blocking plate 6-140. When viewed along the extension direction of the protruding structure 6-542 (i.e. Z direction), the accommodating structure 6-148, the gap 6-G, and the protruding structure 6-542 are arranged along the direction of the pressure 6-P (i.e. Y direction).

Figure 65:
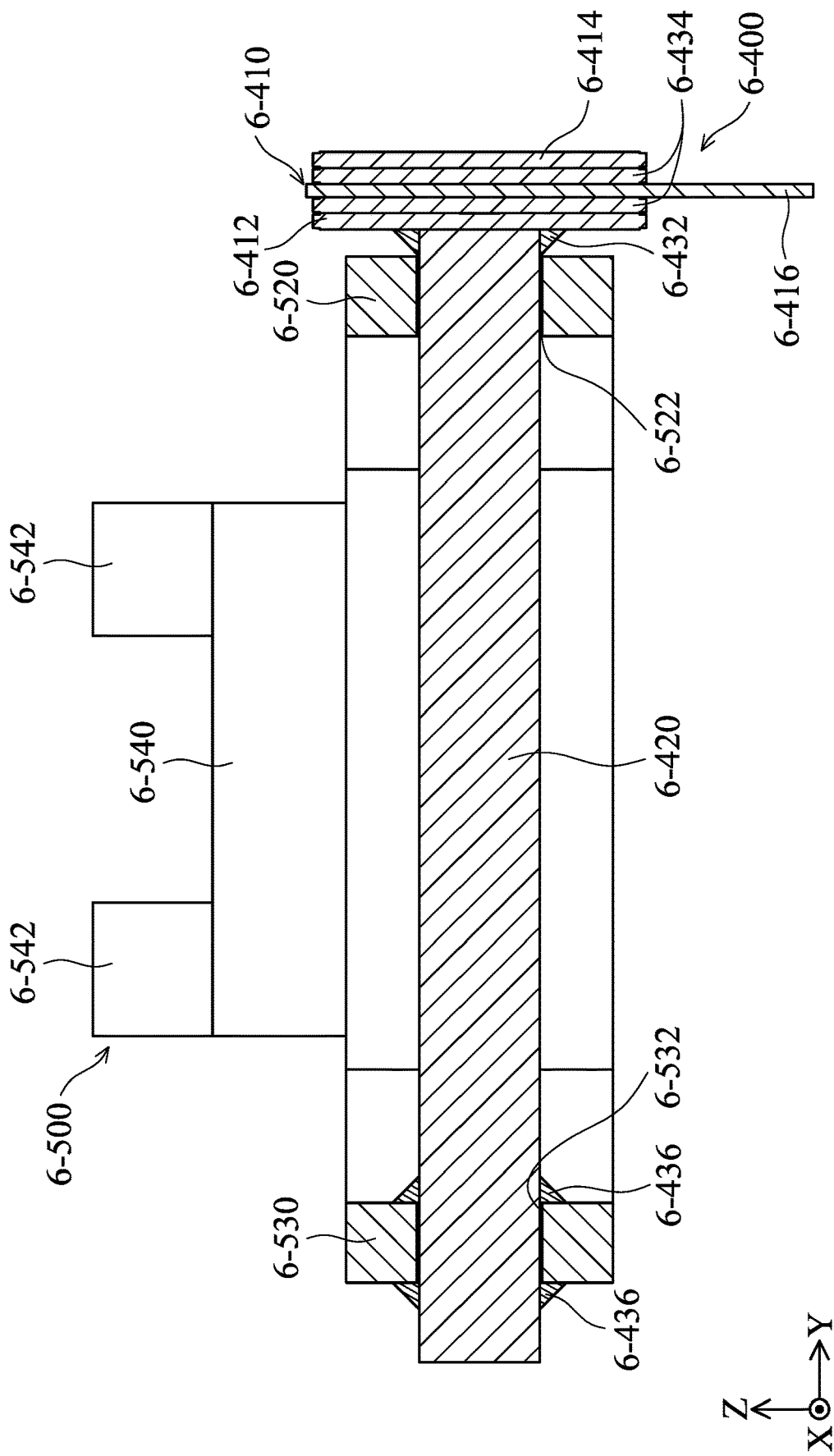

Moreover, as shown in FIG. 65, the transmission element 6-420 may be disposed on the frame 6-500. For example, the transmission element 6-420 may penetrate the first through hole 6-522 and the second through hole 6-532, and a third bonding element 6-436 may be provided between the transmission element 6-420 and the second through hole 6-532 to bond the transmission element 6-420 and the second through hole 6-532. Therefore, the transmission element 6-420 may move together with the frame 6-500. Although the first through hole 6-522 and the second through hole 6-532 are designed on the frame 6-500, depending on design requirement, the first through hole 6-522 and the second through hole 6-532 may be replaced by other structures that the transmission element 6-420 may be disposed therein, such as recesses.

In some embodiments, the Young's modulus of the first transmission element 6-432 is greater than the Young's modulus of the second transmission element 6-434, and the Young's modulus of the second transmission element 6-434 is greater than the Young's modulus of the third transmission element 6-436. In other words, the Young's modulus of the first transmission element 6-432 is greater than the Young's modulus of the third transmission element 6-436.

Furthermore, the relative positions of the driving source 6-410 and the transmission element 6-420 that are bonded by the first bonding element 6-432 may be fixed, and the relative positions of the first piezoelectric element 6-412, the second piezoelectric element 6-414, and the resilient element 6-416 that are bonded by the second bonding element 6-434 and the relative positions of the transmission element 6-420 and the frame 6-500 may be changed, so that the transmission element 6-420 is allowed to move in X direction.

The driving assembly 6-400 may be used for rotate the movable portion 6-200 relative to the fixed portion 6-100, and the main axis 6-0 acts as the rotational axis. For example, as shown in FIG. 61A, the transmission element 6-420 of the driving assembly 6-400 may be disposed in the recess 6-214 of the first movable element 6-210 by friction contact. In other words, the maximum static friction between the transmission element 6-420 and the first movable element 6-210 fixes their relative position.

The pressure 6-P applied by the pressing assembly 6-440 to the transmission element 6-420 through the frame 6-500 may be adjusted to adjust the friction between the transmission element 6-420 and the first movable element 6-210. Furthermore, the transmission element 6-420 may be moved by the driving source in Y direction, so if a first electrical signal that is weaker is provided to the driving source 6-410, the moving speed of the transmission element 6-420 will be slower as well. Therefore, the force between the transmission element 6-420 and the first movable element 6-210 will not be greater than their maximum static friction, and the first movable element 6-210 may move together with the transmission element 6-420. In other words, the first movable element 6-210 may rotate relative to the main axis 6-0.

Afterwards, if a stronger second electrical signal is provided to the driving source, the moving speed of the transmission element 6-420 may be higher to let the force between transmission element 6-420 and the first movable element 6-210 greater than their maximum static friction. As a result, the transmission element 6-420 may move relative to the first movable element 6-210. In other words, when the transmission element 6-420 moves in Y direction, the first movable element 6-210 does not rotate with the transmission element 6-420.

Figure 66A:
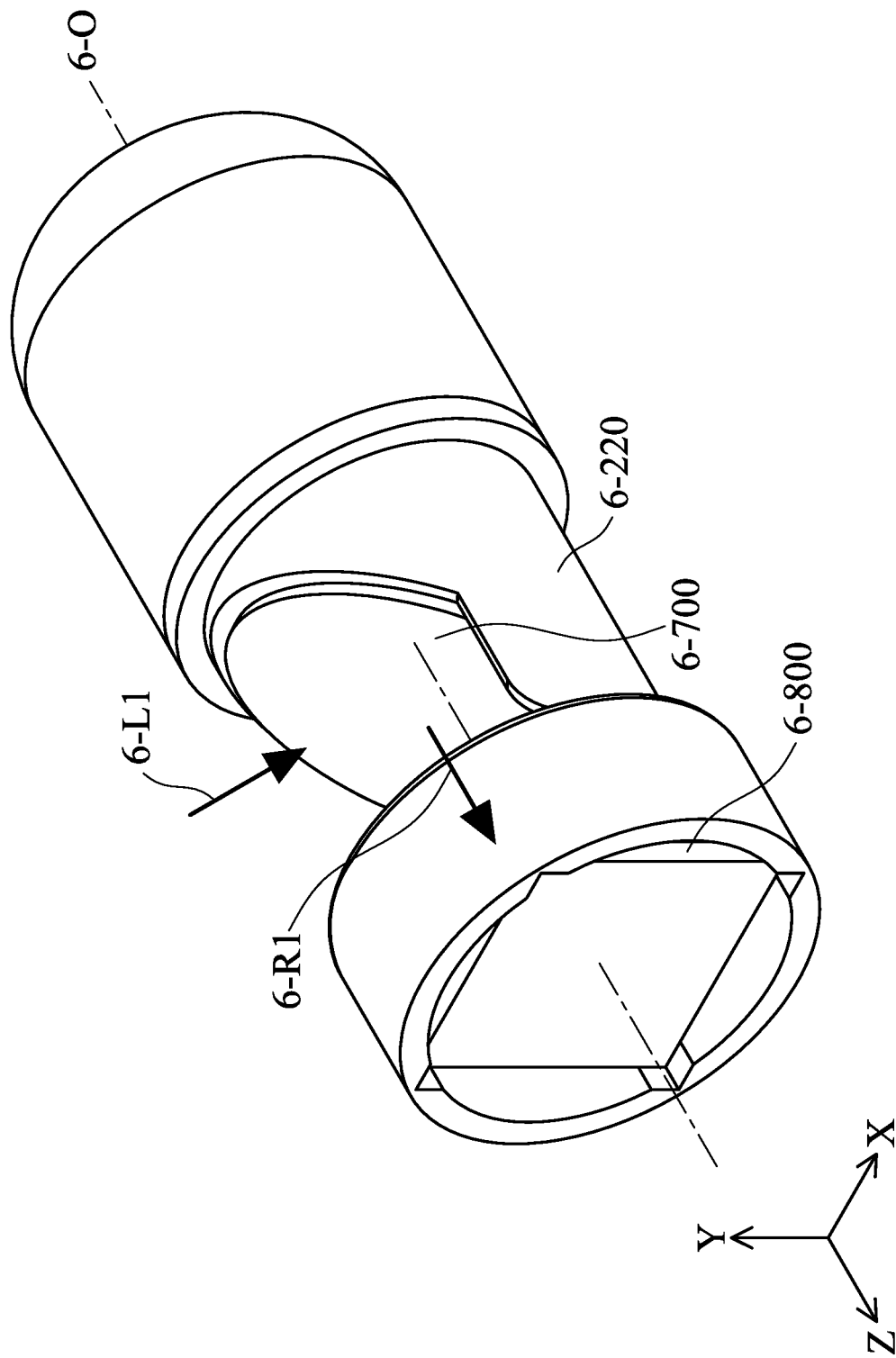
FIG. 66A and FIG. 66B are schematic views of the first optical module and the second optical module.
Figure 66B:
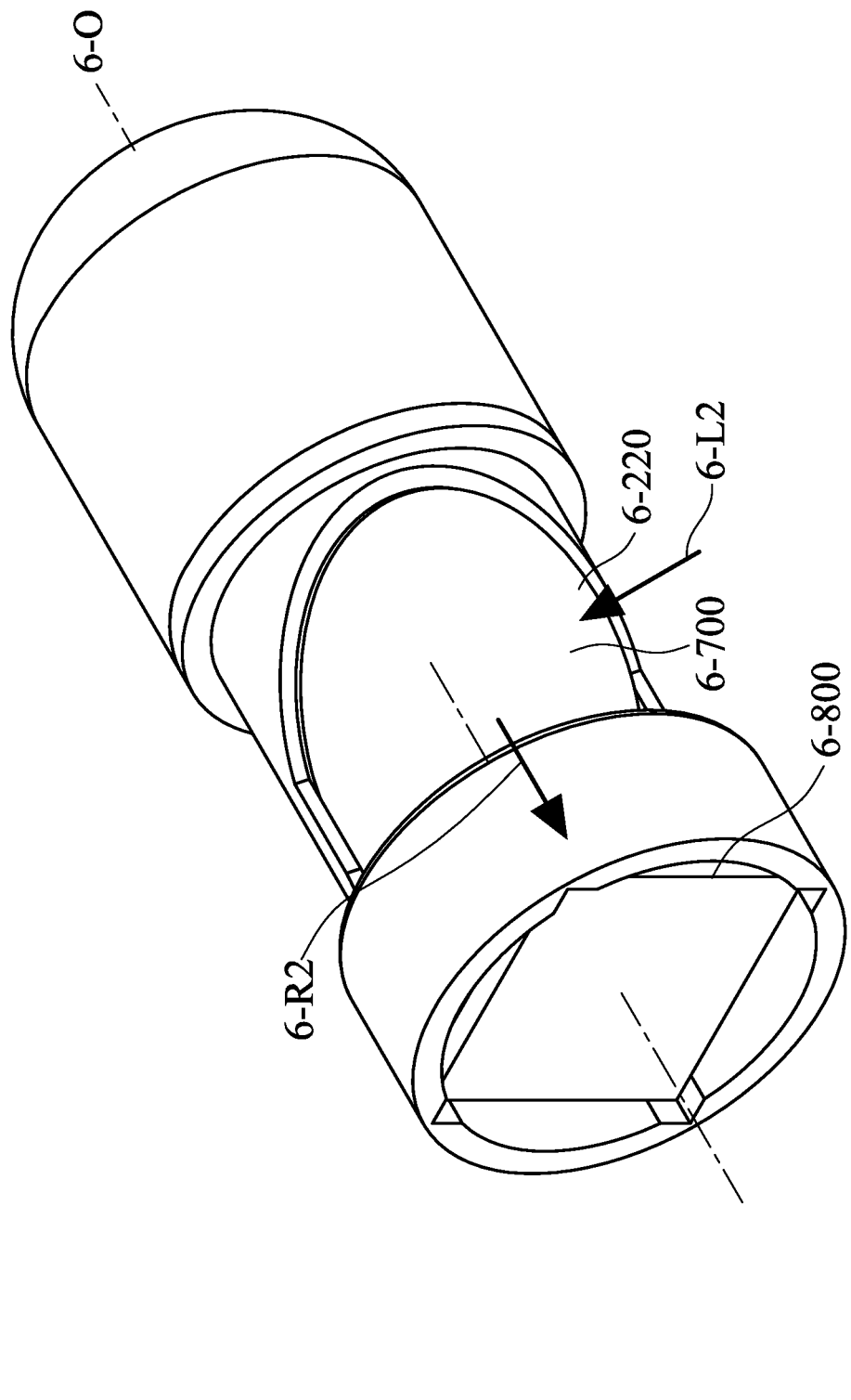

The first movable element 6-210 may keep rotate in a specific direction by repeating the aforementioned steps, so that the optical element 6-700 which is disposed on the second movable portion 6-220 may rotate accordingly. For example, FIG. 66A and FIG. 66B are schematic views of the first optical module 6-3 and the second optical module 6-800, wherein the second case 6-120 is omitted. In some embodiments, the optical element 6-700 may be a mirror or a prism for reflecting an incident light, so that the optical axis of the incident light may be changed from an incident direction to an exit direction, and the incident direction is not parallel to the exit direction.

It should be noted that the main axis 6-0 acts as the rotational axis of the rotation of the second movable element 6-220 and the optical element 6-700, so that incident light 6-L1 and incident light 6-L2 to the optical element 6-700 are received by the optical element 6-700, wherein the directions of the incident light 6-L1 and incident light 6-L2 are different. Afterwards, the incident light 6-L1 and the incident light 6-L2 are reflected to be reflected light 6-R1 and reflected light 6-R2, respectively. The reflected light 6-R1 and the reflected light 6-R2 enter the second optical module to allow incident light with different directions to be caught by the second optical module 6-800.

Referring back to FIG. 60, the second optical module 6-800 may be disposed in the third case 6-130, and the second optical module 6-800 may include a driving module 6-810 and a photosensitive element 6-820. The second case 6-120 does not overlap the second optical module 6-800 when viewed in a direction that is perpendicular to the first direction (Z direction). A lens 6-812 may be provided in the driving module 6-810, and the lens 6-812 and the photosensitive element 6-820 are arranged along the exit direction (Z direction). The driving module 6-810 may move the lens 6-812 in X, Y, and Z directions, so that the light passing through the lens 6-812 may be focused on the photosensitive element 6-820. Afterwards, the signal received by the photosensitive element 6-820 is transmitted to the external electronic devices through the circuit in the manipulating portion 6-2. In some embodiments, the second optical module 6-800 is electrically isolated from the power source 6-340.

It should be noted that although the first optical module 6-3 and the second optical module 6-800 of the optical system 6-1 are taken as examples in this embodiment, the present disclosure is not limited to be used for medical endoscopes. For example, the combination of the first optical module 6-3 and the second optical module 6-800 may be used in other electronic devices, such as mobile phones, laptops, cameras, aerial cameras, etc., to catch images in different directions.

In summary, an optical system is provided. The optical system includes a first optical module. The first optical module includes a fixed portion, a movable portion, a driving assembly, and a circuit assembly. The movable portion is movably connected to the fixed portion, and the movable portion is used to connect to an optical element. The driving assembly is used to drive the movable portion to move relative to the fixed portion. The circuit assembly is electrically connected to the driving assembly. As a result, images in different directions may be captured.

Figure 67:
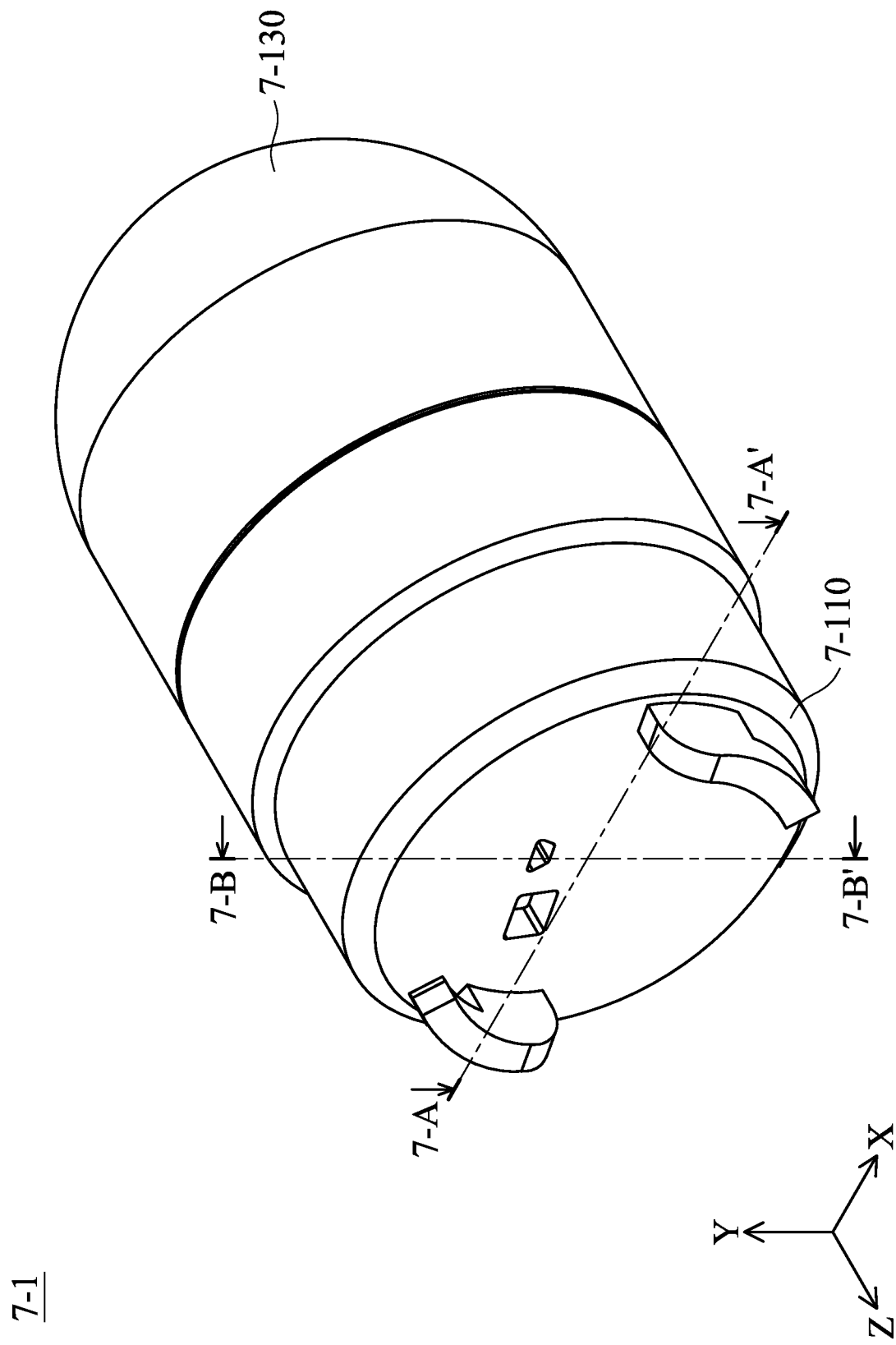
FIG. 67 is a schematic view of an optical system in some embodiments of the present disclosure.
Figure 68:
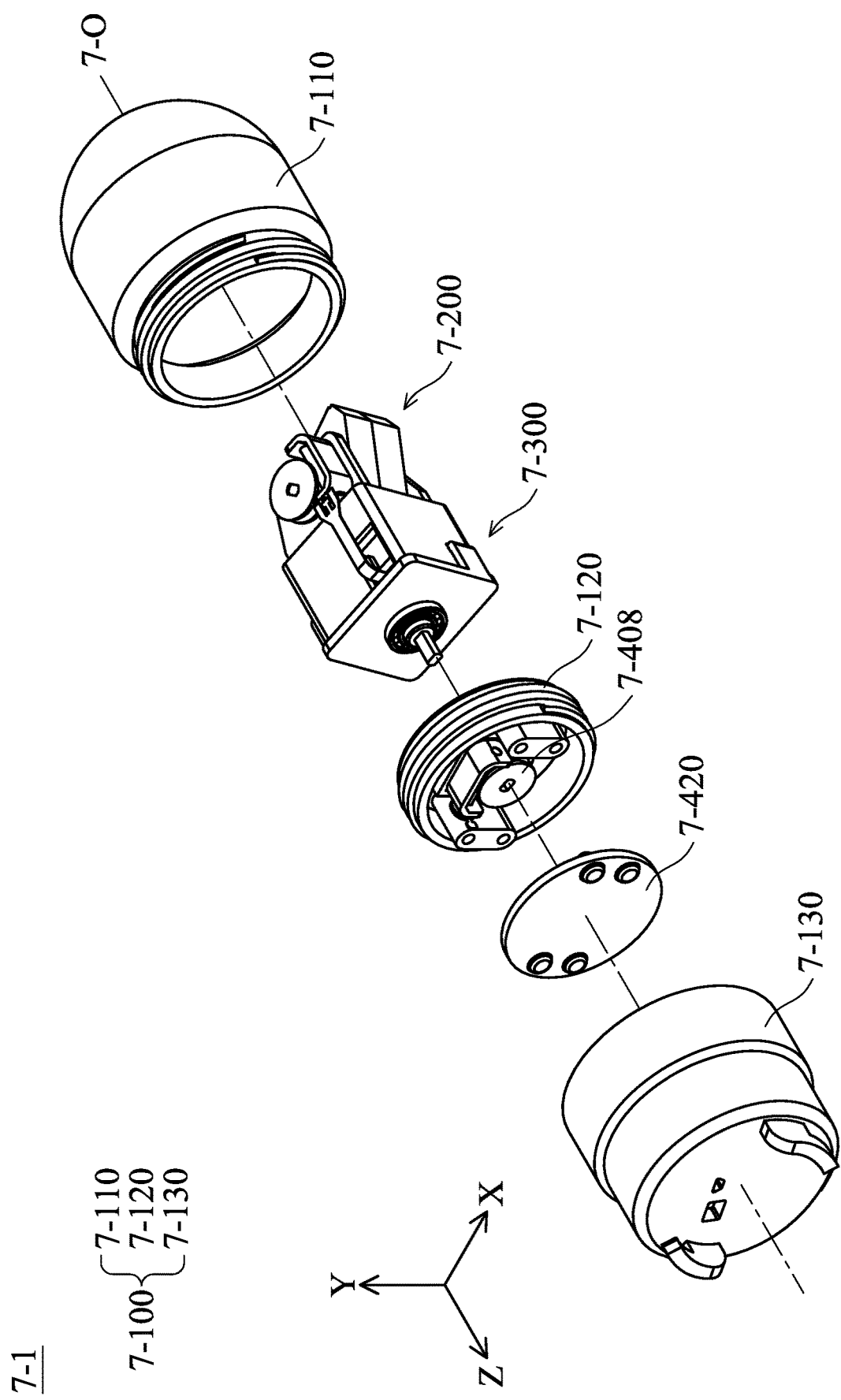
FIG. 68 is an exploded view of the optical system.
Figure 69A:
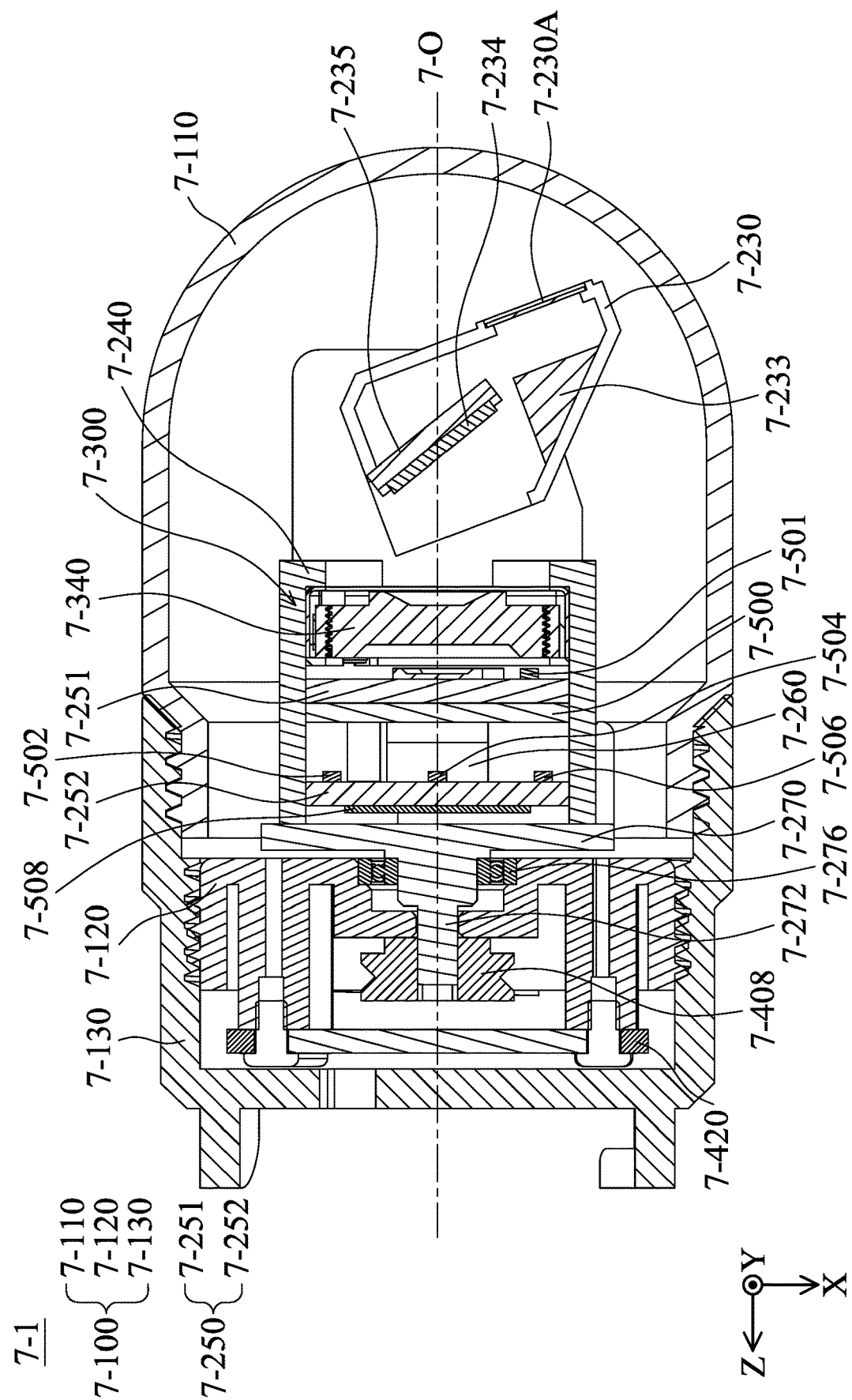
FIG. 69A and FIG. 69B are cross-sectional views illustrated along the line 7-A-7-A' and 7-B-7-B' in FIG. 67, respectively.
Figure 69B:
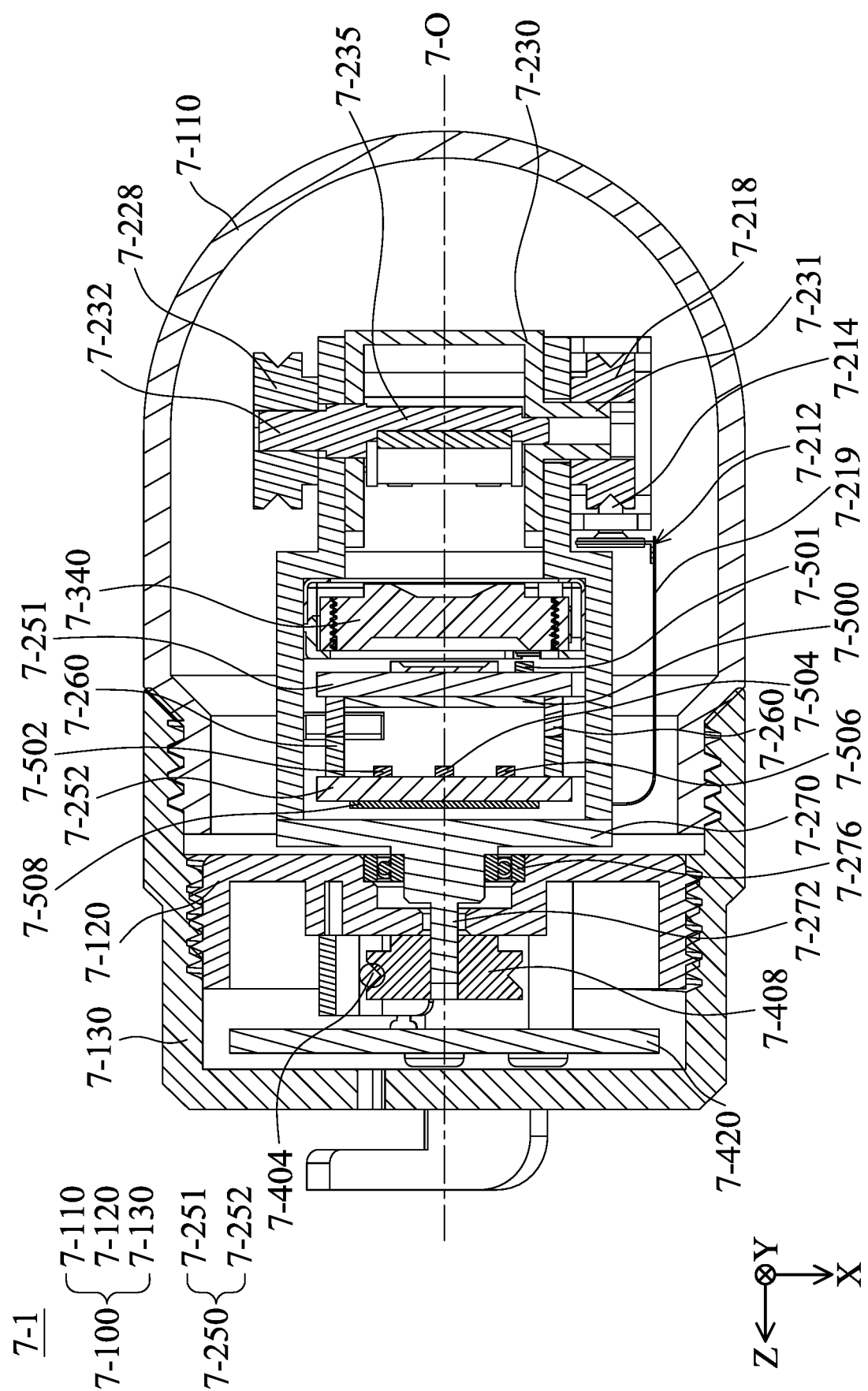

FIG. 67 is a schematic view of an optical system 7-1 in some embodiments of the present disclosure. FIG. 68 is an exploded view of the optical system 7-1. FIG. 69A and FIG. 69B are cross-sectional views illustrated along the line 7-A-7-A' and the line 7-B-7-B' in FIG. 67, respectively, wherein the line 7-A-7-A' and the line 7-B-7-B' are perpendicular. The optical system 7-1 mainly includes a fixed portion 7-100 (which includes a first fixed portion 7-110, a second fixed portion 7-120, a third fixed portion 7-130), a first optical module 7-200, a second optical module 7-300 and other elements (described later) arranged in a main axis 7-0.

The fixed portion 7-100 may act as the housing of the optical system 7-1, and the first optical module 7-200 and the second optical module 7-300 may be disposed in the fixed portion 7-100. For example, the first fixed portion 7-110 and the second fixed portion 7-120 may be locked on the third fixed portion 7-130, and the second fixed portion 7-120 may be disposed between the first fixed portion 7-110 and the third fixed portion 7-130.

In some embodiments, the material of the third fixed portion 7-130 may include transparent material (e.g., glass or plastic), and external light may pass through the third fixed portion 7-130, and the first optical module 7-200 may adjust the path of the light to allow the light reach the second optical module 7-300. As a result, light from different directions may be detected by the optical system 7-1.

Figure 70:
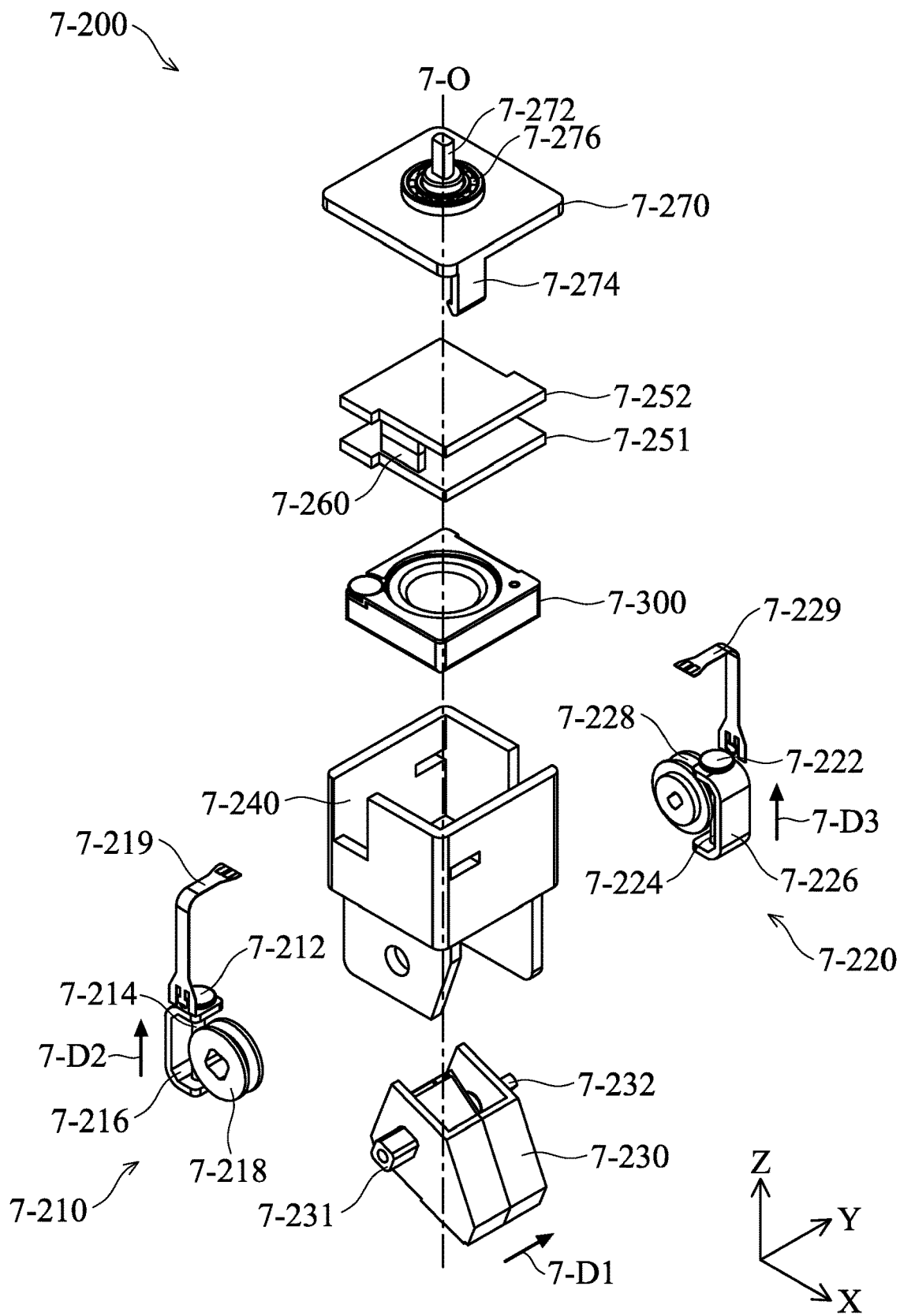
FIG. 70 is an exploded view of a first optical module and an second optical module.
Figure 71A:
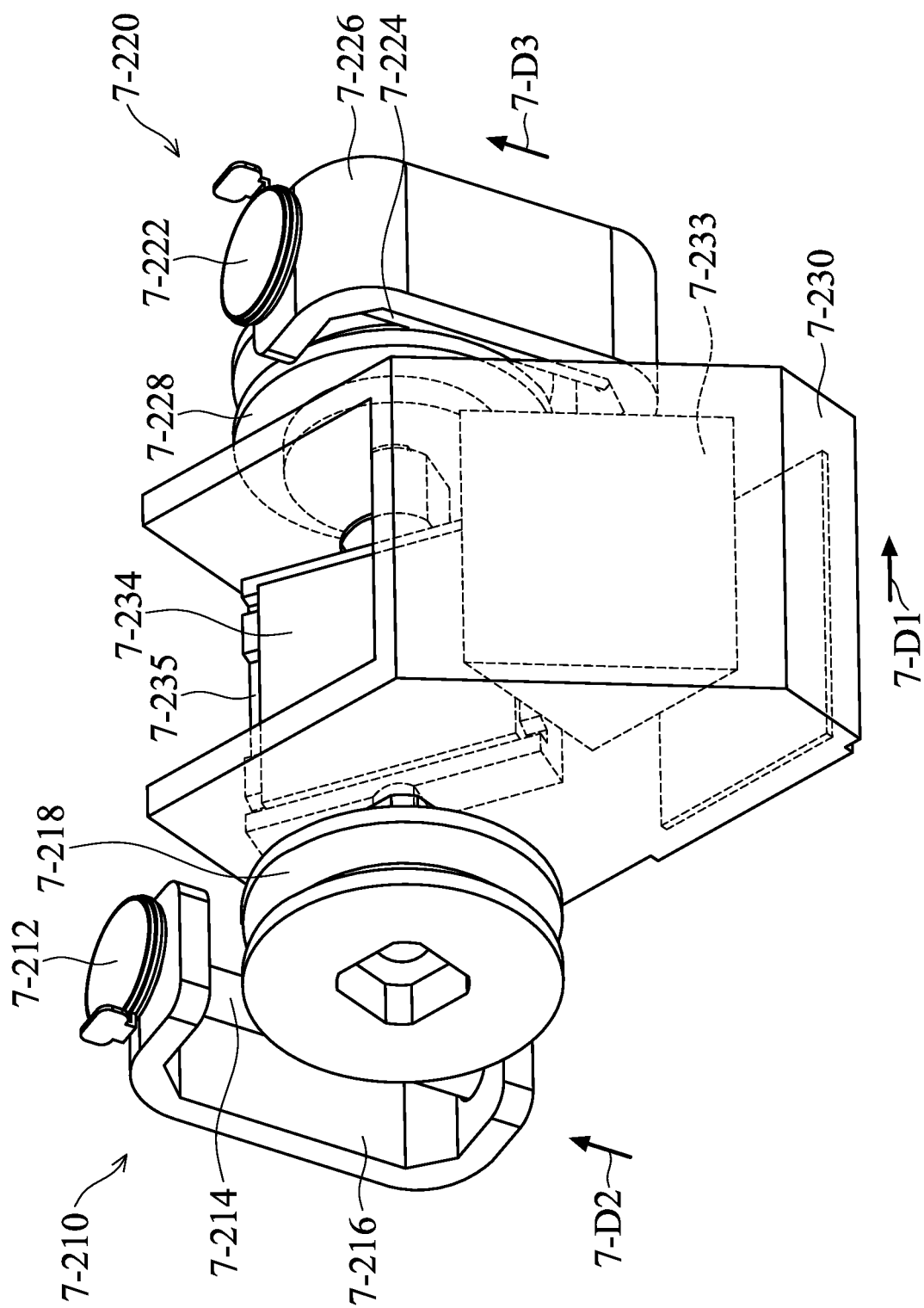
FIG. 71A is a perspective view of some elements of the optical module.

FIG. 70 is an exploded view of the first optical module 7-200 and the second optical module 7-300. FIG. 71A is a perspective view of some elements of the first optical module 7-200. The first optical module 7-200 mainly includes a first driving assembly 7-210, a second driving assembly 7-220, a first case 7-230, a second case 7-240, a circuit assembly 7-250 (which includes a first circuit element 7-251 and a second circuit element 7-252), a spacer 7-260, and a top cover 7-270.

The first driving assembly 7-210 and the second driving assembly 7-220 may be disposed on opposite sides of the first case 7-230. The first driving assembly 7-210 mainly includes a first driving source 7-212, a first transmission element 7-214, a first frame 7-216, and a first movable portion 7-218. The second driving assembly 7-220 mainly includes a second driving source 7-222, a second transmission element 7-224, a second frame 7-226, and a second movable portion 7-228. Furthermore, a first optical element 7-233, a second optical element 7-234, and a holding portion 7-235 may be disposed in the first case 7-230. The first case 7-230 may be connected to the first movable portion 7-218 through a first rotational shaft, and the holding portion 7-235 is movably disposed in the first case 7-230 and connected to the second movable portion 7-228 through a second rotational shaft. The first optical element 7-233 is affixed on the first case 7-230, and the second optical element 7-234 is affixed on the holding portion 7-235. Moreover, as shown in FIG. 69A, the first case 7-230 may have a light opening 7-230A, and light is allowed to enter the first case 7-230 through the light opening 7-230A.

The first case 7-230 may be disposed on the second case 7-240, and may rotate relative to the second case 7-240 by the first rotational shaft 7-231 and the second rotational shaft 7-232. A space may form between the second case 7-240 and the top cover 7-270, and the second optical module 7-300, the first circuit element 7-251, and the second circuit element 7-252 may be disposed in the space.

In some embodiments, the first circuit element 7-251 and the second circuit element 7-252 may be, for example, circuit boards, and the first circuit element 7-251 and the second circuit element 7-252 may arranged along the main axis 7-0 (sixth direction 7-D6, which will be described later). The first circuit element 7-251 and the second circuit element 7-252 may be plate-shaped and parallel each other. Furthermore, as shown in FIG. 70, the first circuit element 7-251 is closer than the second optical module 7-300 than the second circuit element 7-252.

The spacer 7-260 may be disposed between the first circuit element 7-251 and the second circuit element 7-252 to separate the first circuit element 7-251 and the second circuit element 7-252. In other words, a gap is formed between the first circuit element 7-251 and the second circuit element. The interference-suppressing element 7-500 (FIG. 69A and FIG. 69B) may be disposed on the first circuit element 7-251, and may be disposed between the first circuit element 7-251 and the second circuit element 7-252 to prevent the signal of the elements disposed on first circuit element 7-251 and the second circuit element 7-252 from interference. For example, the interference-suppressing element 7-500 may be disposed between a position sensor 7-501 and the second circuit element 7-252.

A control element 7-502, a wireless communication element 7-504, a passive electronic element 7-506, and a power source 7-508 may be disposed on the second circuit element 7-252, but the present disclosure is not limited thereto. The positions of the elements may be adjusted based on actual requirement. The control element 7-502 may be used for controlling the driving assembly. The wireless communication element 7-504 may be used for controlling the optical system 7-1 in a wireless manner, such as used for emitting a signal to an external apparatus. The passive electronic element 7-506 may be, for example, a capacitor, a resistor, or an inductor. The power source 7-508 may be, for example, a battery, and is used for providing power to the first driving assembly 7-210, the second driving assembly 7-220, and the fourth driving assembly 7-350.

In some embodiments, a third rotational shaft 7-272 may extend from the top cover 7-270 and be disposed in the third movable portion 7-408, so that the top cover 7-270 may move together with the third movable portion 7-408. The embodiments that the top cover 7-270 moves together with the third movable portion 7-408 will be described later. Furthermore, a bearing 7-276 may be disposed on the third rotational shaft 7-272 to reduce the rotational friction. In some embodiments, a snap 7-274 may be designed on the top cover 7-270, and an opening 7-242 may be designed on the second case 7-240, so that the top cover 7-270 may be affixed on the second case 7-240 by disposing the snap 7-274 in the opening 7-242.

In some embodiments, as shown in FIG. 70, a first direction 7-D1 may be defined as the extending direction of the first rotational shaft 7-231, a second direction 7-D2 may be defined as the extending direction of the first transmission element 7-214, and a third direction 7-D3 may be defined as the extending direction of the second transmission element 7-224. The second direction 7-D2 may be parallel to the third direction 7-D3.

Figure 71B:
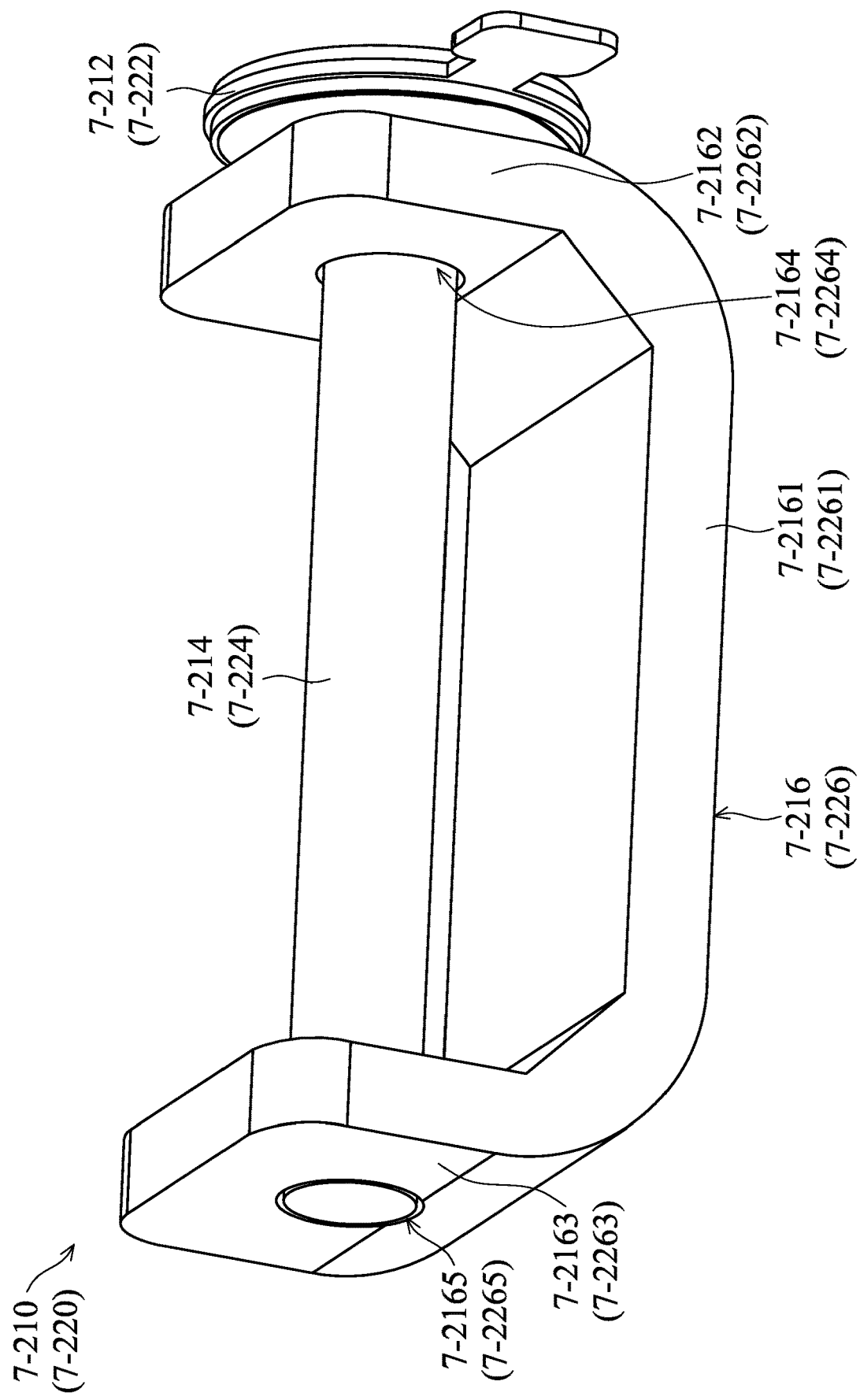
FIG. 71B is a schematic view of the first driving assembly or the second driving assembly.
Figure 71C:
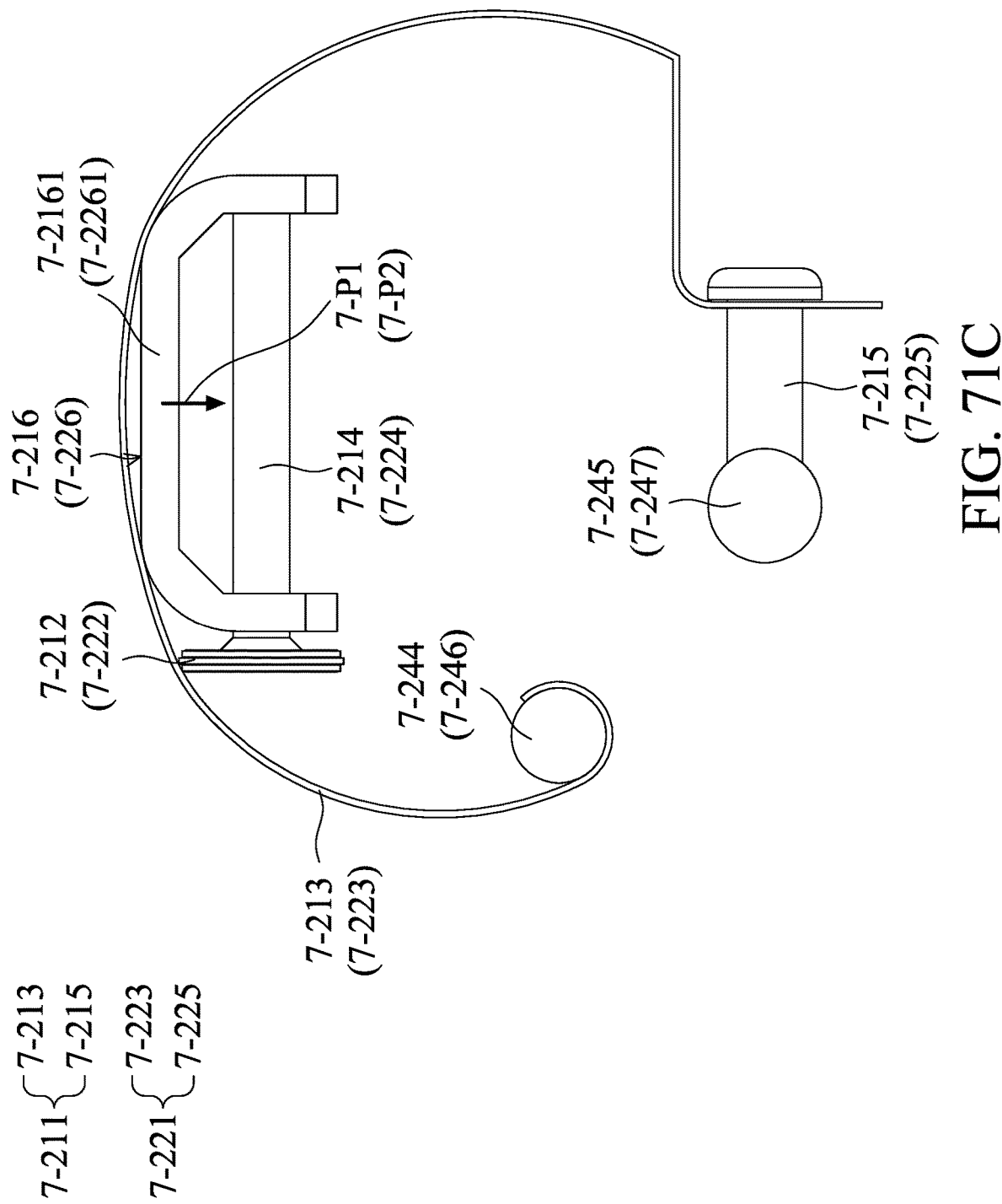
FIG. 71C is a top view of the first driving assembly or the second driving assembly.

FIG. 71B is a schematic view of the first driving assembly 7-210 or the second driving assembly 7-220. FIG. 71C is a top view of the first driving assembly 7-210 or the second driving assembly 7-220, and an additional first pressing assembly 7-211 or a second pressing 7-221 is illustrated in FIG. 71C.

The first frame 7-216 mainly includes a first main body 7-2161, and a first leaning portion 7-2162 and a second leaning portion 7-2163 extending from the first main body 7-2161. The first leaning portion 7-2162 may have a first through hole 7-2164. The second leaning portion 7-2163 may have a second through hole 7-2165. The first leaning portion 7-2162 and the second leaning portion 7-2163 may correspond to the first pressing assembly 7-211.

For example, as shown in FIG. 71C, the first leaning portion 7-2162 and the second leaning portion 7-2163 may in direct contact with the first pressing element 7-213 to allow a first pressure 7-P1 applied by the first pressing element 7-213 to the first frame 7-216 through the first leaning portion 7-2162 and the second leaning portion 7-2163. The direction of the first pressure 7-P1 is not parallel to the first direction 7-D1, so that the first driving assembly 7-210 and the first movable portion 7-218 are arranged in the direction of the first pressure 7-P1.

The first leaning portion 7-2162 and the second leaning portion 7-2163 are arranged parallel to the extending direction of the first transmission element 7-214. In some embodiments, the first pressing element 7-213 is disposed on a first column 7-244 extending from the first case 7-230 and disposed on the first adjusting element 7-215. The first adjusting element 7-215 is disposed on a second column 7-245 extending from the first case 7-230. The first adjusting element 7-215 may have thread to lock on the second column 7-245, and may be used for adjusting the relative position of the first adjusting element 7-215 and the second column 7-245, so as to adjust the amount or direction of the first pressure 7-P1.

Figure 71D:
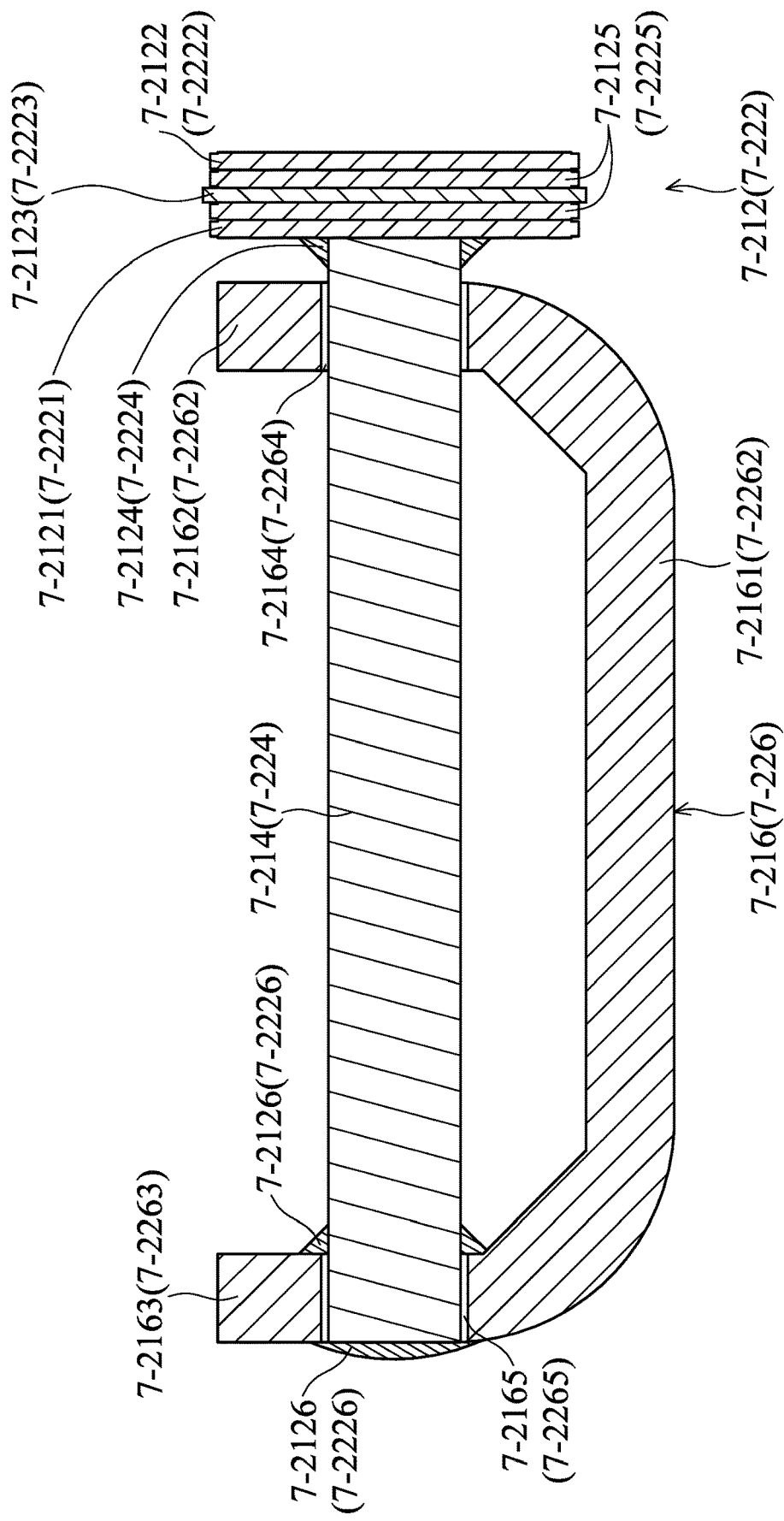
FIG. 71D is a cross-sectional view of the first driving assembly or the second driving assembly.

FIG. 71D is a cross-sectional view of the first driving assembly 7-210 or the second driving assembly. As shown in FIG. 71D, the first driving source 7-212 may be affixed on the first transmission element 7-214, such as affixed on the first transmission element 7-214 by a first bonding element 7-2124. In some embodiments, the first driving source 7-212 may include a first piezoelectric element 7-2121, a second piezoelectric element 7-2122, and a first resilient element 7-2123. The first resilient element 7-2123 may be disposed between the first piezoelectric element 7-2121 and the second piezoelectric element 7-2122, and may be affixed on the first piezoelectric element 7-2121 and the second piezoelectric element 7-2122. In other words, the second bonding element 7-2125 may be disposed on opposite sides of the first resilient element 7-2123.

However, the present disclosure is not limited thereto. For example, in some embodiments, the second piezoelectric element 7-2122 and the second bonding element 7-2125 disposed between the second piezoelectric element 7-2122 and the first resilient element 7-2123 may be omitted, depending on design requirement. Furthermore, a first circuit 7-219 (FIG. 70) may be electrically connected to the first driving assembly 7-210 and the first circuit element 7-251 to allow the electronic elements disposed on the first circuit element 7-251 provide electrical signal to the first driving assembly 7-210.

In some embodiments, the first piezoelectric element 7-2121 and the second piezoelectric element 7-2122 may be formed form piezoelectric materials. In other words, if an electrical field (voltage) is applied on the surface of the first piezoelectric element 7-2121 or the second piezoelectric element 7-2122, the electric dipole moment of the first piezoelectric element 7-2121 or the second piezoelectric element 7-2122 may be elongated, and the first piezoelectric element 7-2121 or the second piezoelectric element 7-2122 may be elongated along the electric field to resist the change. As a result, electric energy may be converted into mechanical energy. In some embodiments, the first piezoelectric element 7-2121 or the second piezoelectric element 7-2122 may deform to move the first transmission element 7-214 in the second direction 7-D2.

Moreover, as shown in FIG. 71C and FIG. 71D, the first transmission element 7-214 may be disposed on the first frame 7-216. For example, the first transmission element 7-214 may penetrate the first through hole 7-2164 and the second through hole 7-2165, and a third bonding element 7-2126 may be provided between the first transmission element 7-214 and the second through hole 7-2165 to bond the first transmission element 7-214 and the second through hole 7-2165. Therefore, the first transmission element 7-214 may move together with the first frame 7-216. Although the first through hole 7-2164 and the second through hole 7-2165 are designed on the first frame 7-216, depending on design requirement, the first through hole 7-2164 and the second through hole 7-2165 may be replaced by other structures that the first transmission element 7-214 may be disposed therein, such as recesses.

In some embodiments, the Young's modulus of the first bonding element 7-2124 is greater than the Young's modulus of the second bonding element 7-2125, and the Young's modulus of the second bonding element 7-2125 is greater than the Young's modulus of the third bonding element 7-2126. In other words, the Young's modulus of the first bonding element 7-2124 is greater than the Young's modulus of the third bonding element 7-2126.

For example, the relative positions of the first driving source 7-212 and the first transmission element 7-214 that are bonded by the first bonding element 7-2124 may be fixed, and the relative positions of the first piezoelectric element 7-2121, the second piezoelectric element 7-2122, and the first resilient element 7-2123 that are bonded by the second bonding element 7-2125 and the relative positions of the first transmission element 7-214 and the first frame 7-216 that are bonded by the third bonding element 7-2126 may be changed, so that the first transmission element 7-214 is allowed to move in the second direction 7-D2.

The second frame 7-226 mainly includes a second main body 7-2261, and a third leaning portion 7-2262 and a fourth leaning portion 7-2263 extending from the second main body 7-2261. The third leaning portion 7-2262 may have a third through hole 7-2264. The fourth leaning portion 7-2263 may have a fourth through hole 7-2265. The third leaning portion 7-2262 and the fourth leaning portion 7-2263 may correspond to the second pressing assembly 7-221.

For example, as shown in FIG. 71C, the third leaning portion 7-2262 and the fourth leaning portion 7-2263 may in direct contact with the second pressing element 7-223 to allow a second pressure 7-P2 applied by the second pressing element 7-223 to the second frame 7-226 through the third leaning portion 7-2262 and the fourth leaning portion 7-2263. The direction of the second pressure 7-P2 is not parallel to the first direction 7-D1, so that the second driving assembly 7-220 and the second movable portion 7-228 are arranged in the direction of the second pressure 7-P2.

The third leaning portion 7-2262 and the fourth leaning portion 7-2263 are arranged parallel to the extending direction of the second transmission element 7-224. In some embodiments, the second pressing element 7-223 is disposed on a third column 7-246 extending from the first case 7-230 and disposed on the second adjusting element 7-225. The second adjusting element 7-225 is disposed on a fourth column 7-247 extending from the first case 7-230. The second adjusting element 7-225 may have thread to lock on the fourth column 7-247, and may be used for adjusting the relative position of the second adjusting element 7-225 and the fourth column 7-247, so as to adjust the amount or direction of the second pressure 7-P2.

As shown in FIG. 71D, the second driving source 7-222 may be affixed on the second transmission element 7-224, such as affixed on the second transmission element 7-224 by a fourth bonding element 7-2224. In some embodiments, the second driving source 7-222 may include a third piezoelectric element 7-2221, a fourth piezoelectric element 7-2222, and a second resilient element 7-2223. The second resilient element 7-2223 may be disposed between the third piezoelectric element 7-2221 and the fourth piezoelectric element 7-2222, and may be affixed on the third piezoelectric element 7-2221 and the fourth piezoelectric element 7-2222. In other words, the fifth bonding element 7-2225 may be disposed on opposite sides of the second resilient element 7-2223.

However, the present disclosure is not limited thereto. For example, in some embodiments, the fourth piezoelectric element 7-2222 and the fifth bonding element 7-2225 disposed between the fourth piezoelectric element 7-2222 and the second resilient element 7-2223 may be omitted, depending on design requirement. Furthermore, a second circuit 7-229 (FIG. 70) may be electrically connected to the second driving assembly 7-220 and the first circuit element 7-251 to allow the electronic elements disposed on the first circuit element 7-251 provide electrical signal to the second driving assembly 7-220.

In some embodiments, the third piezoelectric element 7-2221 and the fourth piezoelectric element 7-2222 may be formed form piezoelectric materials. In other words, if an electrical field (voltage) is applied on the surface of the third piezoelectric element 7-2221 or the fourth piezoelectric element 7-2222, the electric dipole moment of the third piezoelectric element 7-2221 or the fourth piezoelectric element 7-2222 may be elongated, and the third piezoelectric element 7-2221 or the fourth piezoelectric element 7-2222 may be elongated along the electric field to resist the change. As a result, electric energy may be converted into mechanical energy. In some embodiments, the third piezoelectric element 7-2221 or the fourth piezoelectric element 7-2222 may deform to move the second transmission element 7-224 in the third direction 7-D3.

Moreover, as shown in FIG. 71C and FIG. 71D, the second transmission element 7-224 may be disposed on the second frame 7-226. For example, the second transmission element 7-224 may penetrate the third through hole 7-2264 and the fourth through hole 7-2265, and a sixth bonding element 7-2226 may be provided between the second transmission element 7-224 and the fourth through hole 7-2265 to bond the second transmission element 7-224 and the fourth through hole 7-2265. Therefore, the second transmission element 7-224 may move together with the second frame 7-226. Although the third through hole 7-2264 and the fourth through hole 7-2265 are designed on the second frame 7-226, depending on design requirement, the third through hole 7-2264 and the fourth through hole 7-2265 may be replaced by other structures that the second transmission element 7-224 may be disposed therein, such as recesses.

In some embodiments, the Young's modulus of the fourth bonding element 7-2224 is greater than the Young's modulus of the fifth bonding element 7-2225, and the Young's modulus of the fifth bonding element 7-2225 is greater than the Young's modulus of the sixth bonding element 7-2226. In other words, the Young's modulus of the fourth bonding element 7-2224 is greater than the Young's modulus of the sixth bonding element 7-2226.

For example, the relative positions of the second driving source 7-222 and the second transmission element 7-224 that are bonded by the fourth bonding element 7-2224 may be fixed, and the relative positions of the third piezoelectric element 7-2221, the fourth piezoelectric element 7-2222, and the second resilient element 7-2223 that are bonded by the fifth bonding element 7-2225 and the relative positions of the second transmission element 7-224 and the second frame 7-226 that are bonded by the sixth bonding element 7-2226 may be changed, so that the second transmission element 7-224 is allowed to move in the third direction 7-D3.

The first driving assembly 7-210 may be used for rotate the first case 7-230 relative to the fixed portion 7-100, and the first rotational shaft 7-230 that is disposed on the first movable portion 7-218 acts as the rotational axis. For example, as shown in FIG. 71A, the first transmission element 7-214 of the first driving assembly 7-210 may be disposed in the recess of the first movable portion 7-218 by friction contact. In other words, the maximum static friction between the first transmission element 7-214 and the first movable portion 7-218 fixes their relative position.

The second driving assembly 7-220 may be used for rotate the holding portion 7-235 relative to the fixed portion 7-100, and the second rotational shaft 7-232 that is disposed on the second movable portion 7-228 acts as the rotational axis. For example, as shown in FIG. 71A, the second transmission element 7-224 of the second driving assembly 7-220 may be disposed in the recess of the second movable portion 7-228 by friction contact. In other words, the maximum static friction between the second transmission element 7-224 and the second movable portion 7-228 fixes their relative position.

The first pressure 7-P1 applied by the first pressing assembly 7-211 to the first transmission element 7-214 through the first frame 7-216 may be adjusted to adjust the friction between the first transmission element 7-214 and the first movable portion 7-218. Furthermore, the first transmission element 7-214 may be moved by the first driving source 7-212, so if a first electrical signal that is weaker is provided to the first driving source 7-212, the moving speed of the first transmission element 7-214 will be slower as well. Therefore, the force between the first transmission element 7-214 and the first movable portion 7-218 will not be greater than their maximum static friction, and the first movable portion 7-218 may move together with the first transmission element 7-214. In other words, the first movable portion 7-218 may rotate relative to the first rotational shaft 7-231.

Afterwards, if a stronger second electrical signal is provided to the first driving source 7-212, the moving speed of the first transmission element 7-214 may be higher to let the force between first transmission element 7-214 and the first movable portion 7-218 greater than their maximum static friction. As a result, the first transmission element 7-214 may move relative to the first movable portion 7-218. In other words, when the first transmission element 7-214 moves, the first movable portion 7-218 does not rotate with the first transmission element 7-214.

The first movable portion 7-218 may rotate in a specific direction by repeating the aforementioned steps, so that the first optical element 7-233 which is disposed on the first case 7-230 may rotate accordingly. Moreover, the secpmd movable portion 7-228 may rotate in a specific direction by repeating the aforementioned steps, so that the second optical element 7-234 which is disposed on the holding portion 7-235 may rotate accordingly based on similar principle.

A first driving force may be generated by the first driving source 7-212, a second driving force may be generated by the second driving source 7-222, and the direction of the first driving force (second direction 7-D2) is parallel to the direction of the second driving force (third direction 7-D3). Therefore, the first optical element 7-233 and the second optical element 7-234 may rotate about the first rotational shaft 7-231 and the second rotational shaft 7-232, respectively. The rotation of the first optical element 7-233 and the second optical element 7-234 may be independently controlled by the first driving assembly 7-210 and the second driving assembly 7-220 to further adjust the light path incident on the first optical element 7-233 and the second optical element 7-234.

Figure 71E:
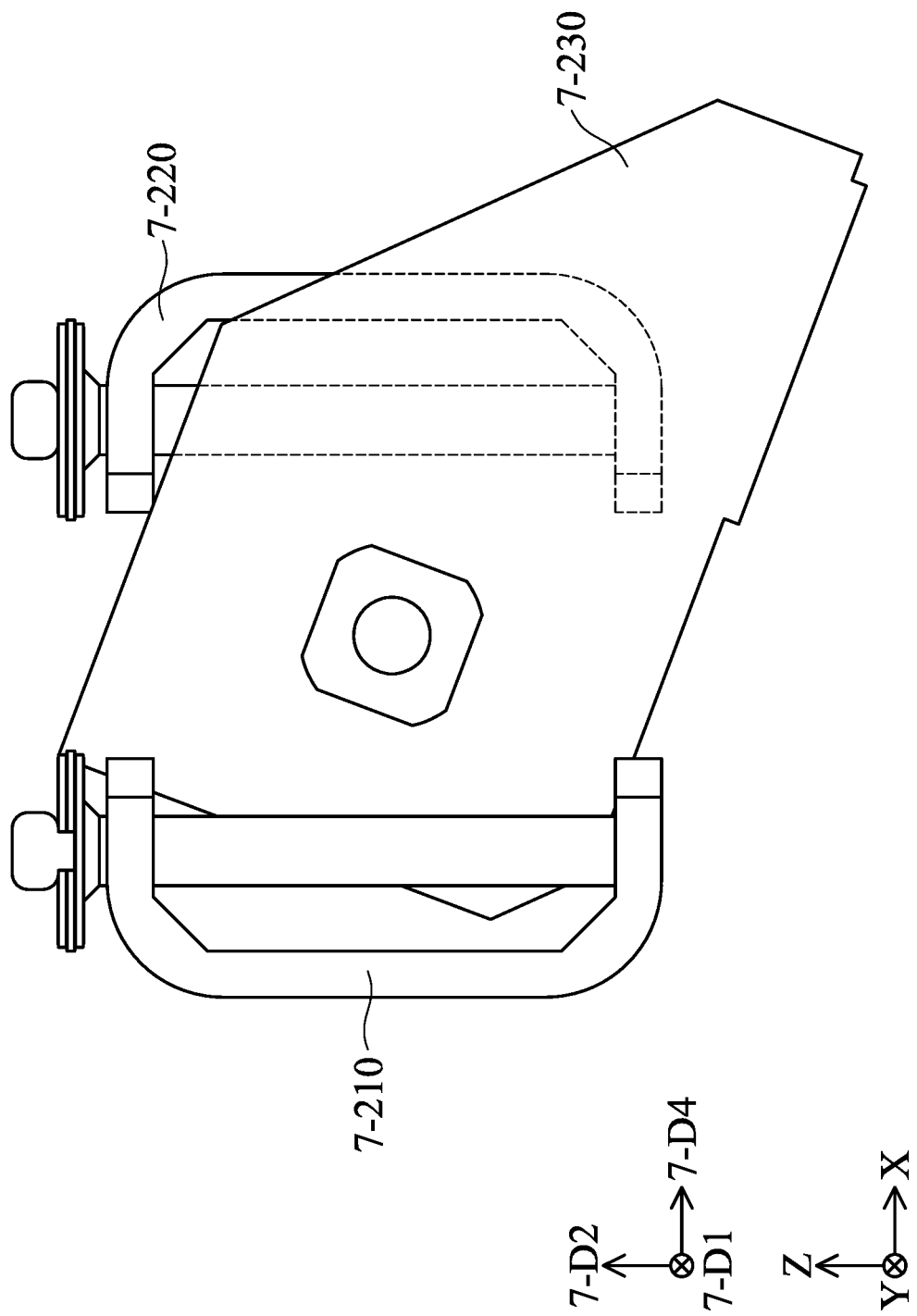
FIG. 71E is a schematic view of the first driving assembly, the second driving assembly, and the first case when viewed in a first direction.
Figure 71F:
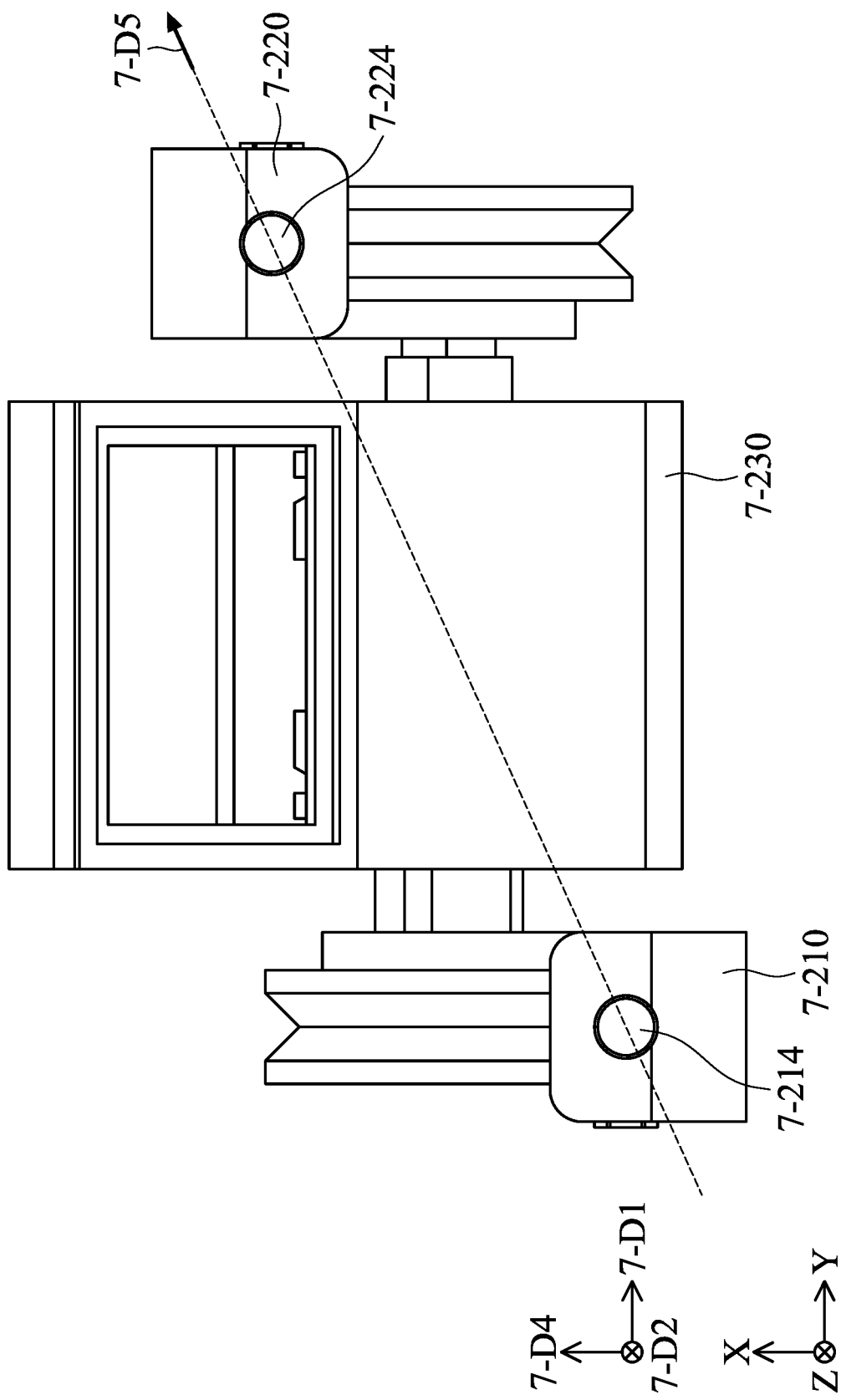
FIG. 71F is a schematic view of the first driving assembly, the second driving assembly, and the first case when viewed in a second direction.
Figure 71G:
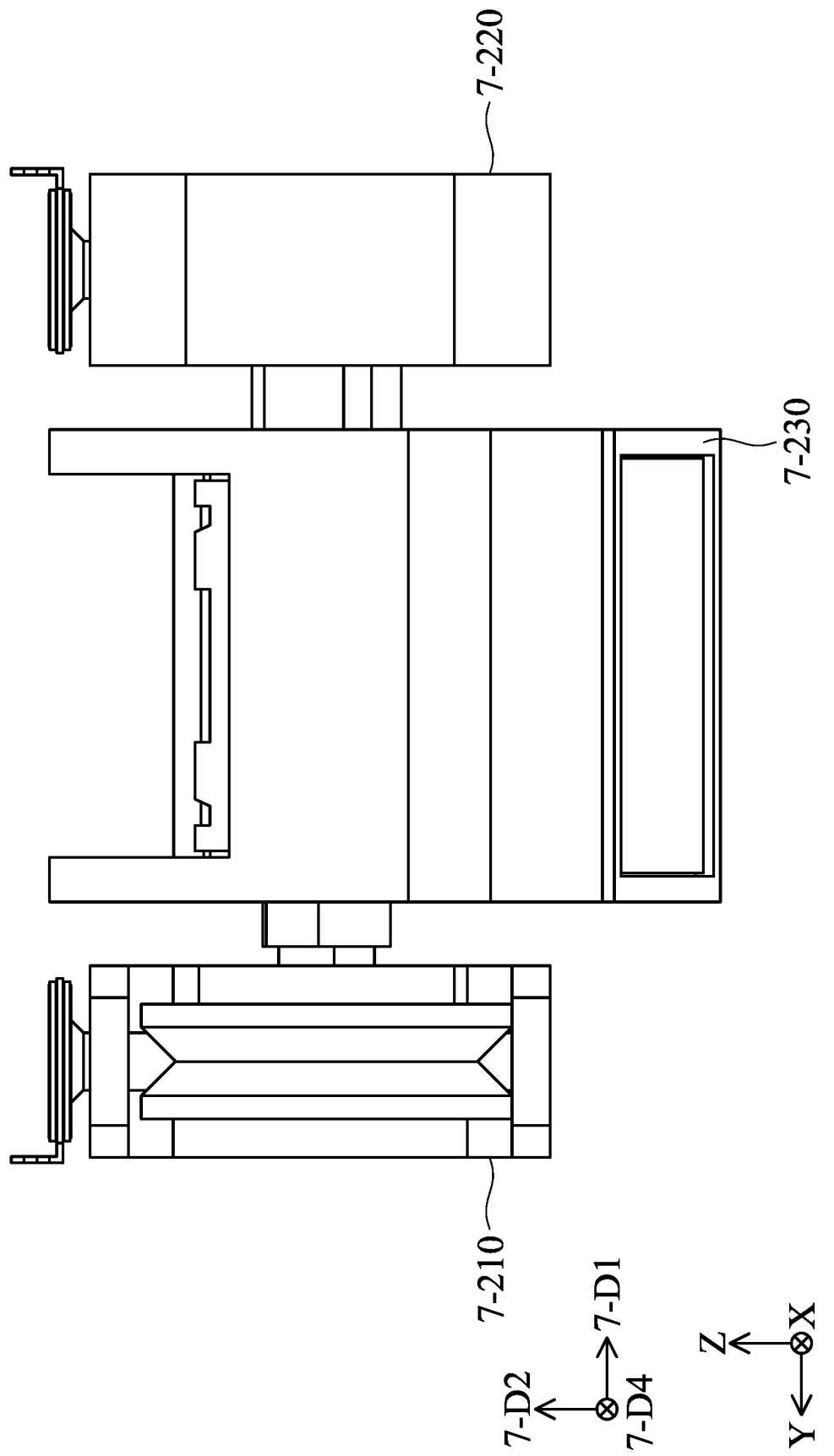
FIG. 71G is a schematic view of the first driving assembly, the second driving assembly, and the first case when viewed in a fourth direction.

In some embodiments, a direction that is perpendicular to the aforementioned first direction 7-D1, second direction 7-D2 may be defined as a fourth direction 7-D4. FIG. 71E is a schematic view of the first driving assembly 7-210, the second driving assembly 7-220, and the first case 7-230 when viewed along the first direction 7-D1. FIG. 71F is a schematic view of the first driving assembly 7-210, the second driving assembly 7-220, and the first case 7-230 when viewed along the second direction 7-D2. FIG. 71G is a schematic view of the first driving assembly 7-210, the second driving assembly 7-220, and the first case 7-230 when viewed along the fourth direction 7-D4. As shown in FIG. 71E to FIG. 71G, when viewed along the first direction 7-D1, the second direction 7-D2, and the fourth direction 7-D4, the first driving assembly 7-210 and the second driving assembly 7-220 does not overlap each other.

In addition, as shown in FIG. 71F, when viewed along the second direction 7-D2, the first transmission element 7-214 of the first driving assembly 7-210 and the second transmission element 7-224 of the second driving assembly 7-220 are arranged in a fifth direction 7-D5. In other words, the connection direction of the center of the first transmission element 7-214 and the second transmission element 7-224 is the fifth direction 7-D5. The fifth direction 7-D5 is not parallel to the first direction 7-D1, the second direction 7-D2, the third direction 7-D3, and the fourth direction 7-D4, and is not perpendicular to the first direction 7-D1 and the fourth direction 7-D4. In addition, the first case 7-230 is also aligned with the first driving assembly 7-210 and the second driving assembly 7-220 in the fifth direction 7-D5. Thereby, the size of the optical system 7-1 in a specific direction may be reduced to achieve miniaturization.

In some embodiments, a position sensing assembly (not shown) may be provided to sense the movement of the first movable portion 7-218 or the second movable portion 7-228 relative to the fixed portion 7-100. For example, a sensing magnet may be provided on the first movable portion 7-218 or the second movable portion 7-228, and a sensing element may be provided on the first circuit element 7-251. The first driving assembly 7-210 or the second driving assembly 7-220 may be controlled by the sensed position signal, so as to stop driving the first driving assembly 7-210 or the second driving assembly 7-220 when the first movable part 7-218 or the second movable part 7-228 reaches the desired position. The aforementioned sensing element may include a Hall sensor, a Magnetoresistance Effect sensor (MR Sensor), a Giant Magnetoresistance Effect sensor (GMR Sensor), a Tunneling Magnetoresistance Effect sensor (TMR Sensor), or a Fluxgate sensor.

Figure 72:
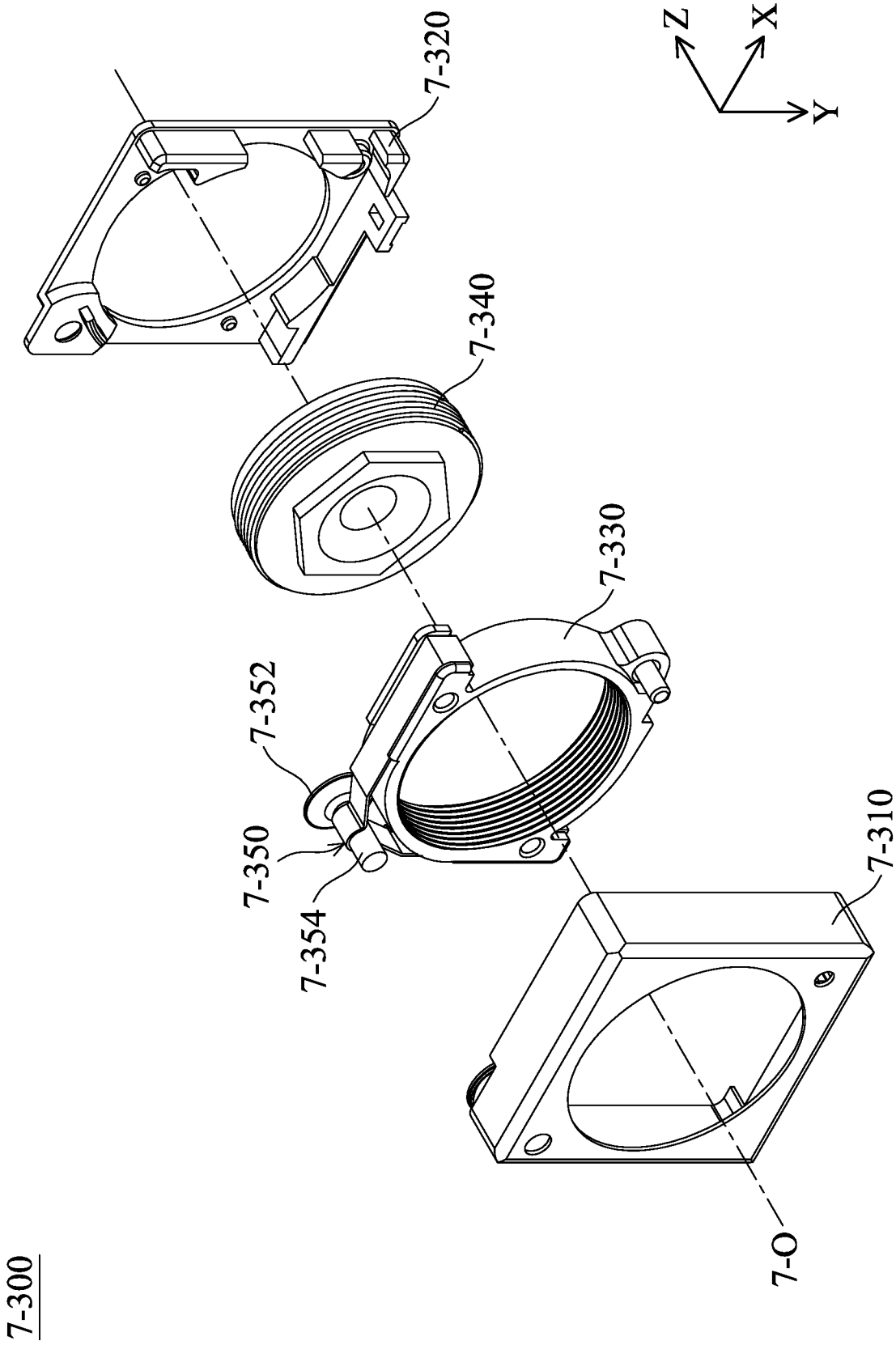
FIG. 72 is an exploded view of the second optical module.

FIG. 72 is an exploded view of the second optical module 7-300. The second optical module 7-300 may include a case 7-310, a base 7-320, a holder 7-330, a lens 7-340, and a fourth driving assembly 7-350. As shown in FIG. 72, the case 7-310 and the base 7-320 may be combined with each other to form a housing of the second optical module 7-300. The holder 7-330 may be disposed between the case 7-310 and the base 7-320, and the lens 7-340 may be affixed (e.g., locked) on the holder 7-330. The fourth driving assembly 7-350 may include a fourth driving source 7-352 and a fourth transmission element 7-354. The structure and operation principle of the fourth driving assembly 7-350 is similar to the foregoing first driving assembly 7-210 and second driving assembly 7-220, and will not be repeated here.

The fourth transmission element 7-352 may be disposed on the holder 7-330 by frictional contact. Thereby, the bearing 7-330 may be driven to move in the direction of the main axis 7-0 by the fourth driving assembly 7-350, and the lens 7-340 is driven together to move in the direction of the main axis 7-0 to achieve auto focus (AF).

Figure 73A:
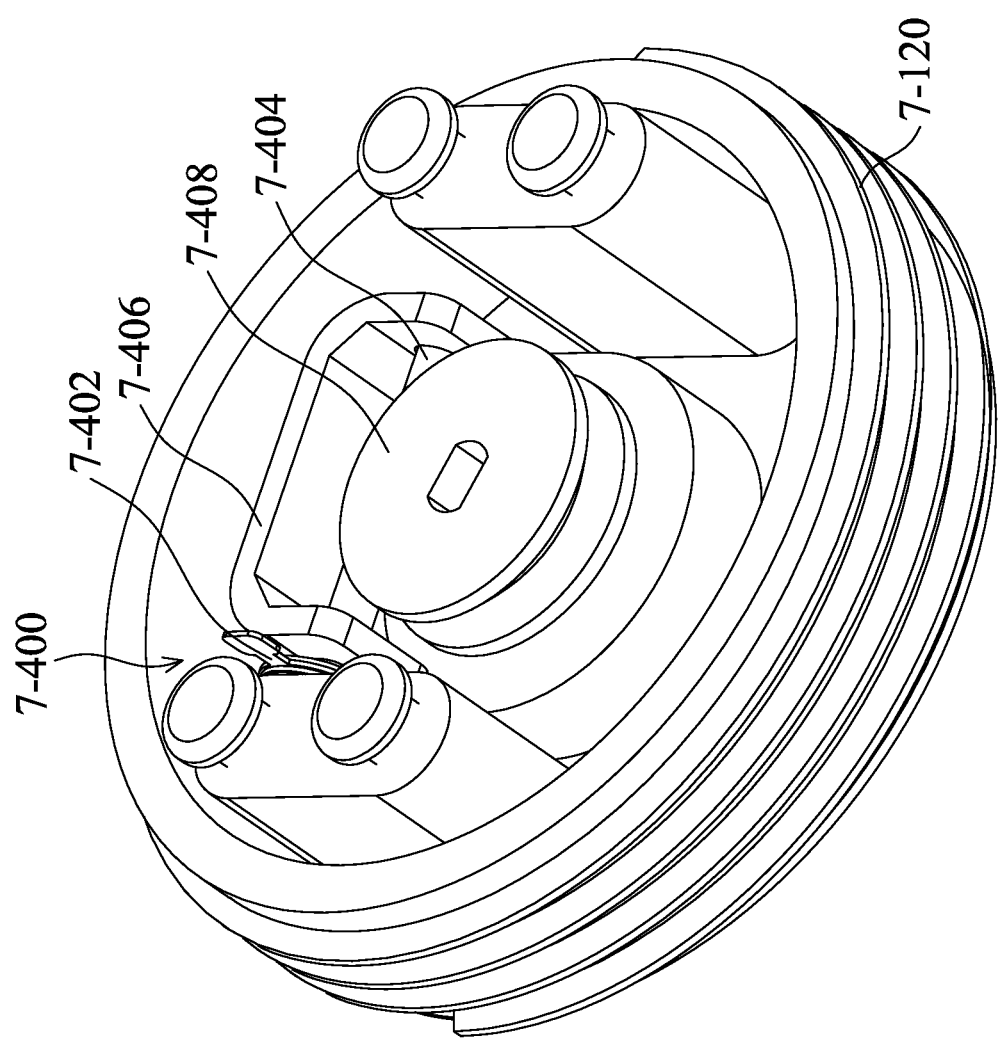
FIG. 73A is a schematic view of some elements of the optical system.
Figure 73B:
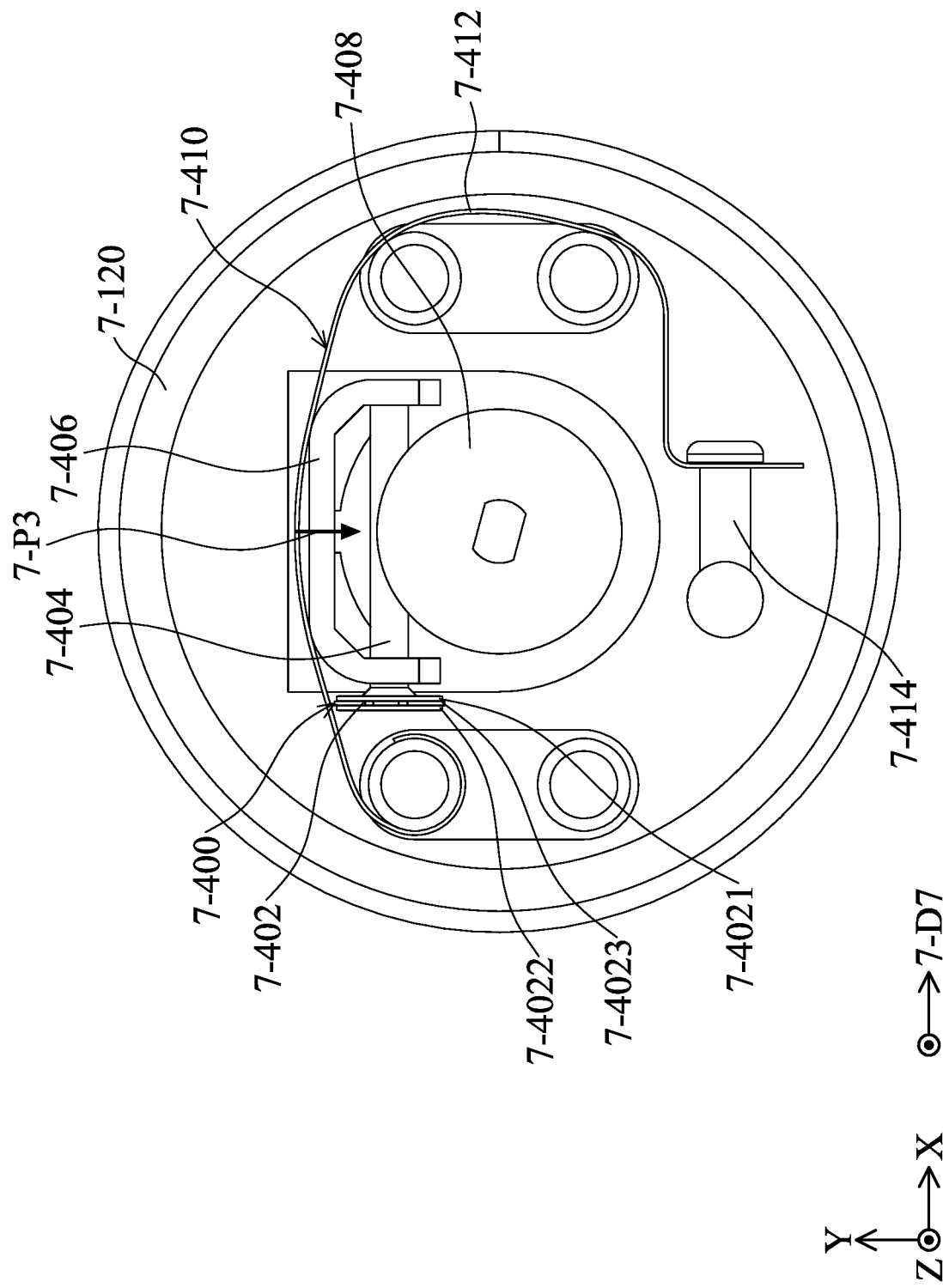
FIG. 73B is a top view of some elements of the optical system.

FIG. 73A is a schematic view of the second fixed portion 7-120, and the third driving assembly 7-400 and the third movable portion 7-404 disposed on the second fixed portion 7-120. FIG. 73B is a top view of the aforementioned elements, in which a third pressing assembly 7-410 is shown in FIG. 73B, and is omitted in FIG. 73A for simplicity.

The structure of the third driving assembly 7-400 may be similar to the aforementioned first driving assembly 7-210 or the second driving assembly 7-220. For example, the third driving assembly 7-400 may also include a third driving source 7-402, a third transmission element 7-404, a third frame 7-406. The third driving source 7-402 may include a combination of a fifth piezoelectric element 7-4021, a sixth piezoelectric element 7-4022, and a third resilient element 7-4023. The third driving source 7-402 is used to generate a third driving force toward the extending direction of the third transmission element 7-404. The details of the positional relationship will not be repeated here.

The third driving assembly 7-400 is used to drive the third movable portion 7-408 to rotate relative to the second fixed portion 7-120 with a rotation axis extending in a sixth direction 7-D6. The direction in which the third transmission element 7-404 extends may be defined as the seventh direction 7-D7, where the sixth direction 7-D6 is not parallel to the seventh direction 7-D7.

In addition, the third pressing assembly 7-410 may include a third pressing element 7-412 and a third adjusting element 7-414, the principle of which is similar as the first pressing assembly 7-211 or the second pressing assembly 7-221 and will not be repeated here. The third pressing assembly 7-410 may apply a third pressure 7-P3 to the third driving assembly 7-400, and the third driving assembly 7-400 and the third movable portion 7-408 are arranged along the direction of the third pressure 7-P3.

Figure 74:
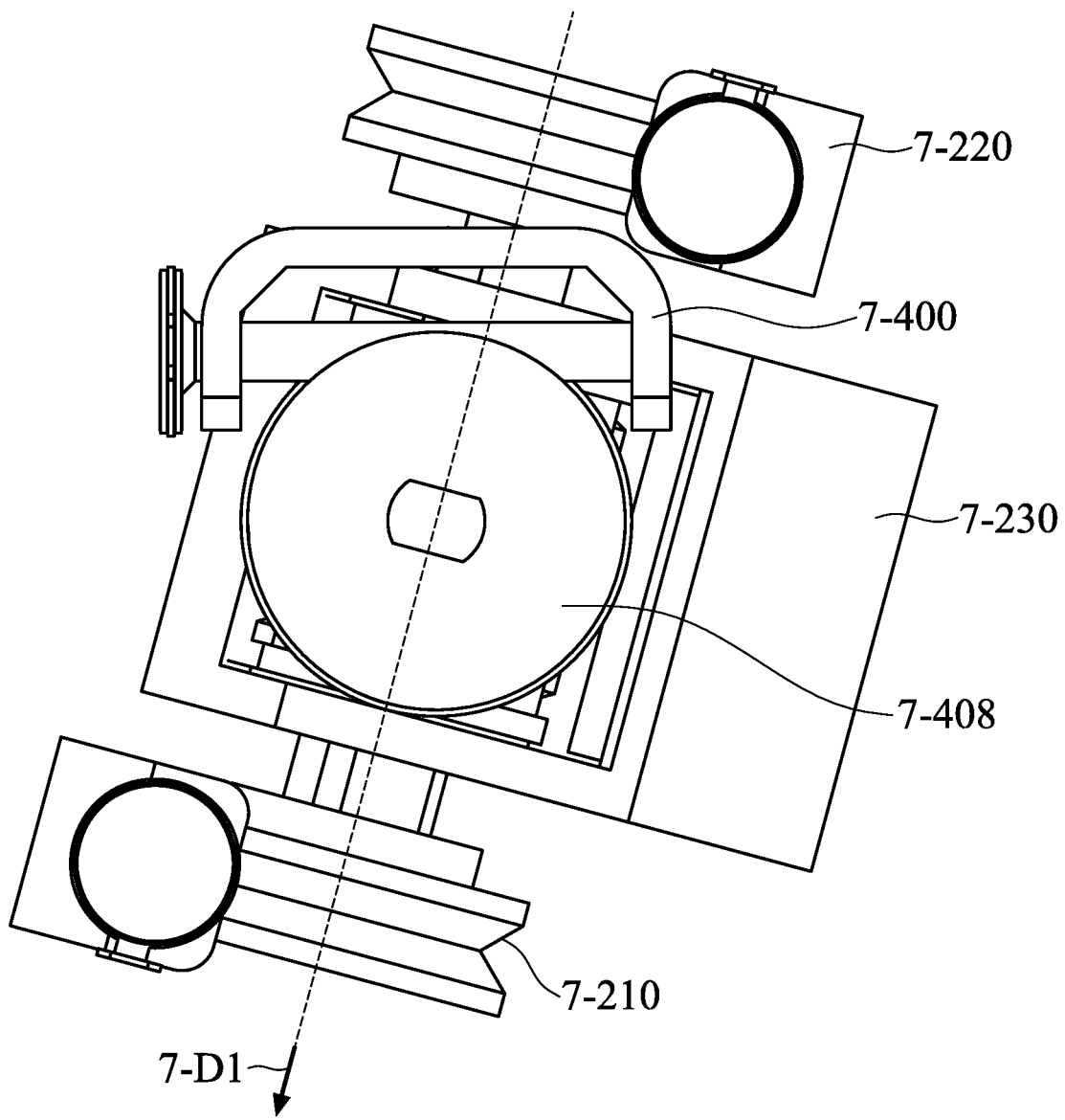
FIG. 74 is a schematic view of some elements of the optical system when viewed in a sixth direction.

As shown in FIG. 73B, the direction of the third pressure 7-P3 is not parallel to the sixth direction 7-D6. In addition, FIG. 74 is a schematic view of some elements of the optical system 7-1 when viewed from the sixth direction 7-D6. As shown in FIG. 74, the first direction 7-D1 and the sixth direction 7-D6 are not parallel. In other words, the directions of the rotation axes of the first movable portion 7-218 and the third movable portion 7-408 are different.

In addition, in some embodiments, a plane parallel to both the first direction 7-D1 and the seventh direction 7-D7 may be defined as an imaginary plane (not shown), and the imaginary plane is perpendicular to the sixth direction 7-D6. As shown in FIG. 74, when viewed along the sixth direction 7-D6, the third driving assembly 7-400 and the first driving assembly 7-210 do not overlap each other, and the third driving assembly 7-400 and the second driving assembly 7-220 do not overlap each other. Therefore, the size of the optical system 7-1 in a specific direction may be reduced to achieve miniaturization.

Refer back to FIG. 69A and FIG. 69B. The third rotational shaft 7-272 on the top cover 7-270 may be disposed in the third movable portion 7-408 to allow the third driving assembly 7-400 rotate the top cover 7-270 and the second housing 7-240 fixed to the top cover 7-270 along the main axis 7-0 through the third movable portion 7-408. The first driving assembly 7-210 and the second driving assembly 7-220 disposed on the second case 7-240 are also driven to rotate together, that is, the first driving assembly 7-210 and the second driving assembly 7-220 may move relative to the third driving assembly 7-400. In some embodiments, a position sensor (not shown) may be provided to sense the movement of the third movable portion 7-408 relative to the second fixed portion 7-120.

In addition, a third circuit element 7-420 may be provided on the second fixed portion 7-120. The third circuit element 7-420 may be, for example, a circuit board, which may be electrically connected to the third driving assembly 7-400. A position sensing element (not shown) may be provided on the third circuit element 7-420, and a sensed magnet (not shown) may be provided on the third movable portion 7-408 to sense the position of the third movable portion 7-408 by sensing the magnetic field change of the sensed magnet, so as to control the third driving assembly 7-400.

Figure 75A:
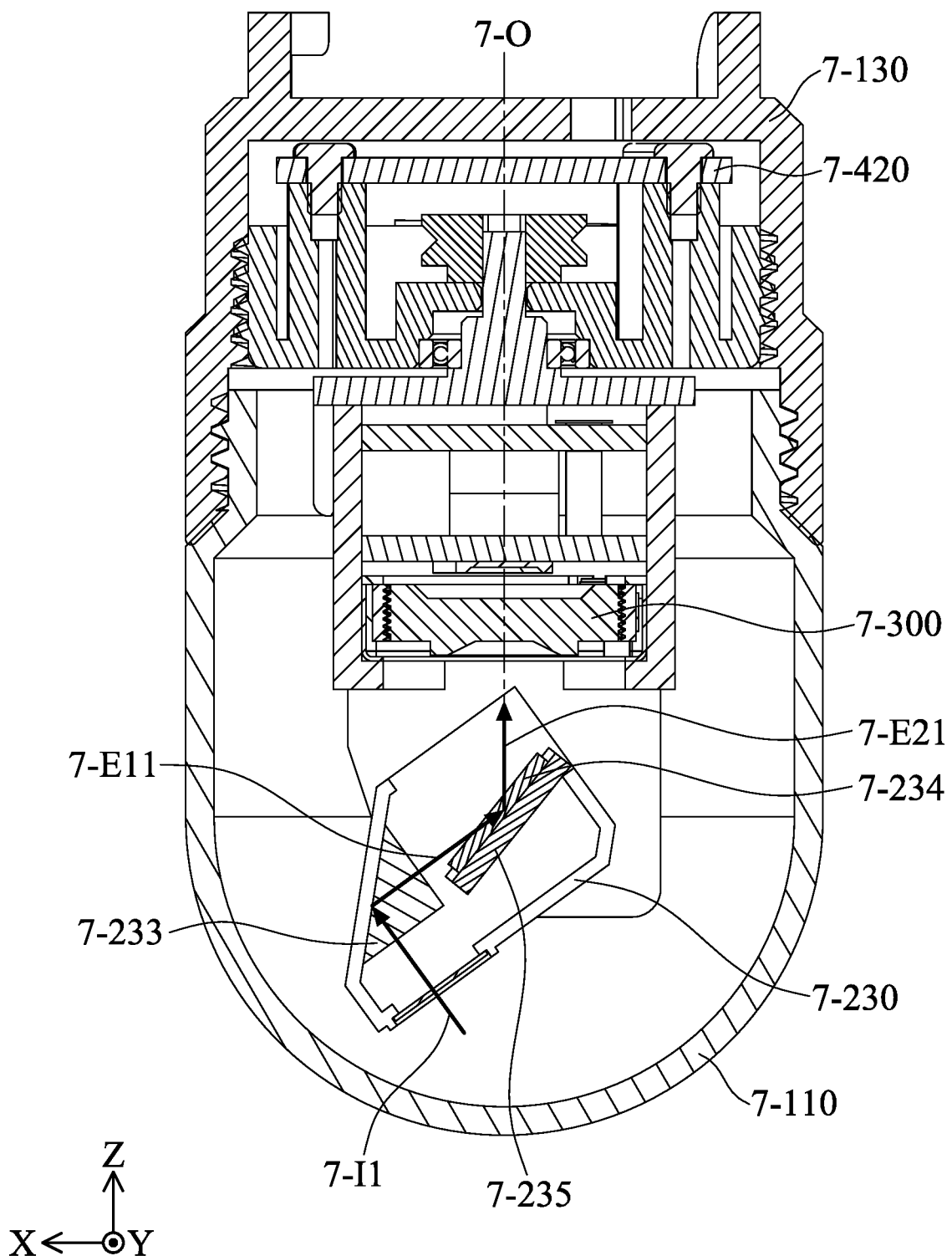
FIG. 75A, FIG. 75B, and FIG. 75C are schematic views showing the operation of the optical system.
Figure 75B:
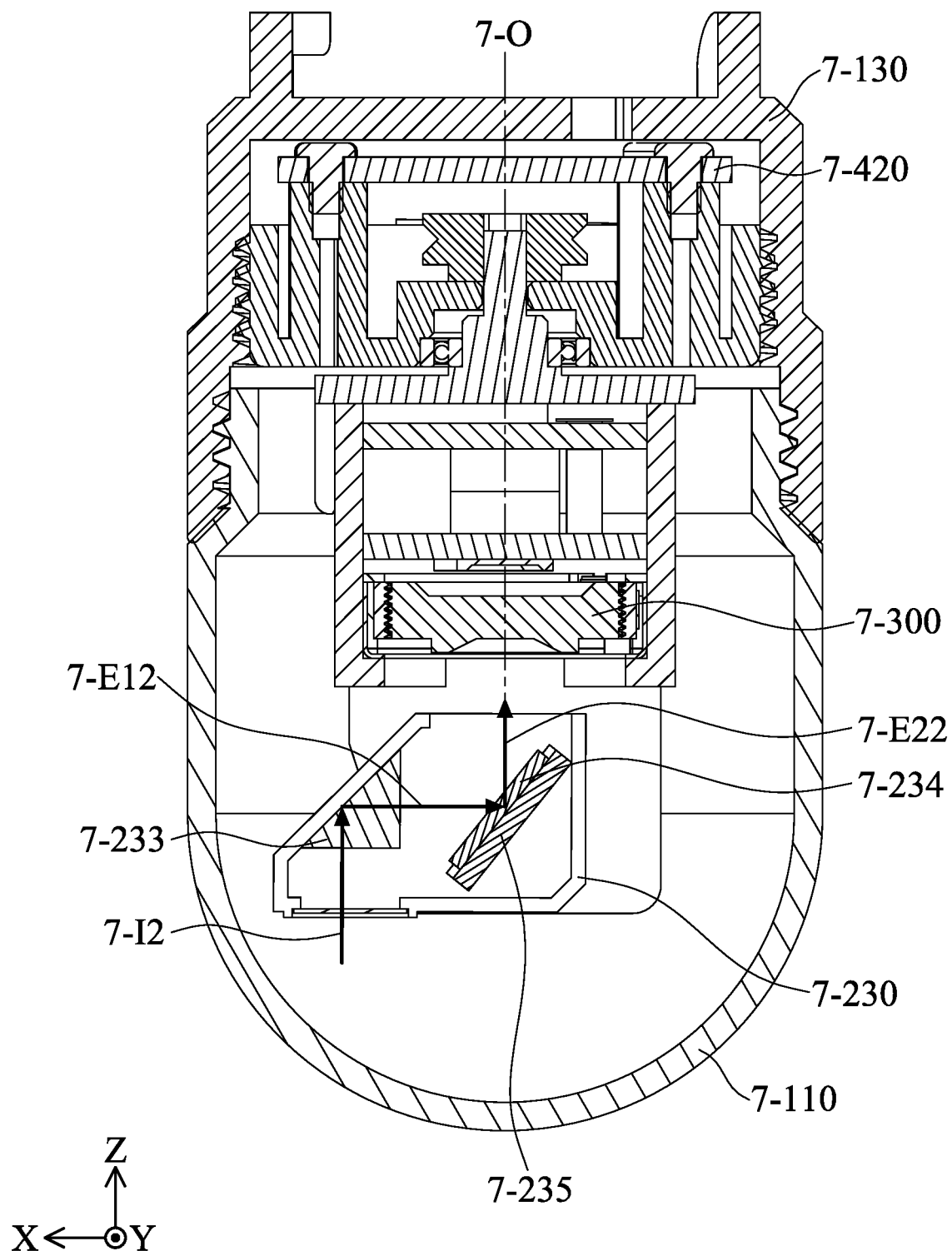
Figure 75C:
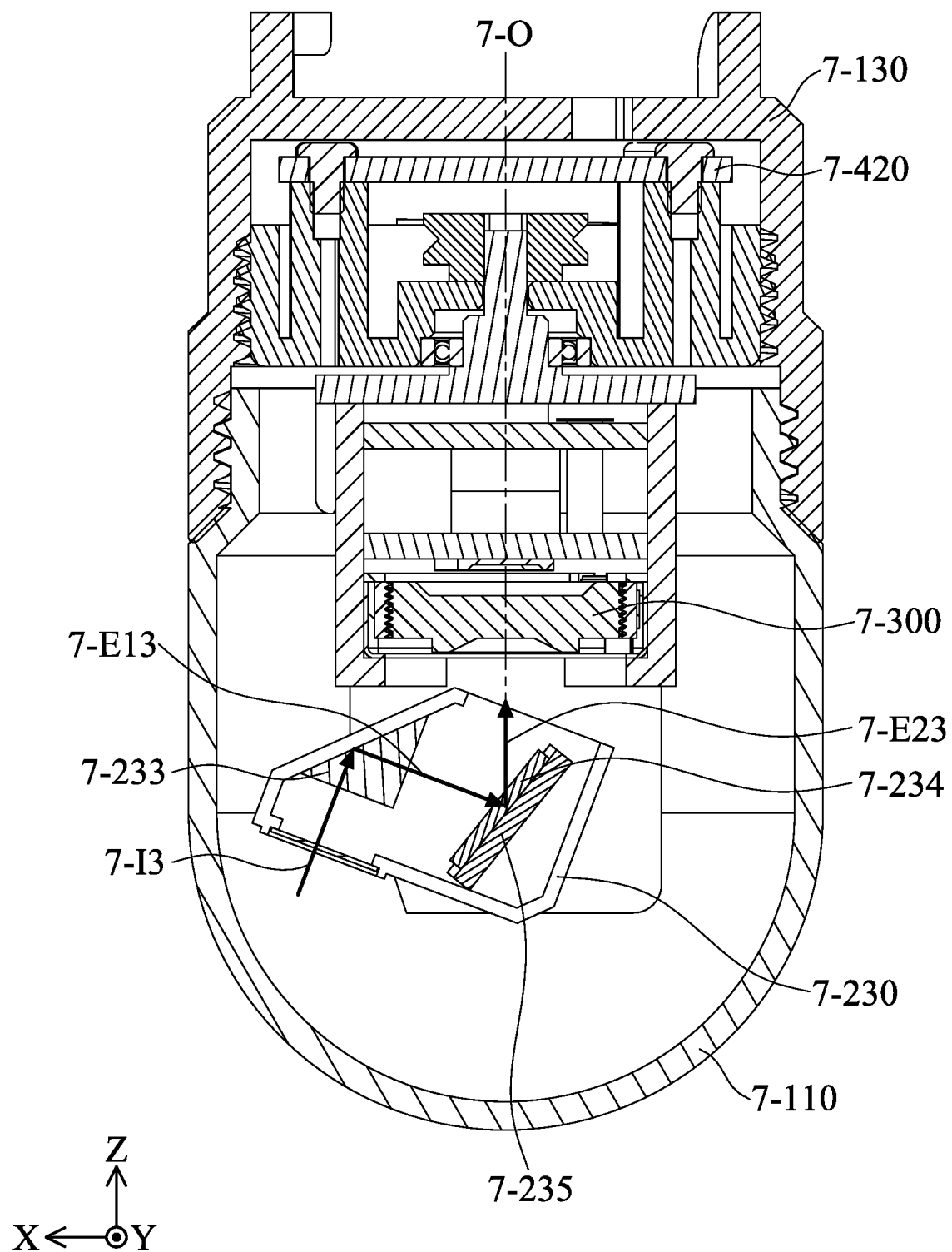

FIG. 75A, FIG. 75B, and FIG. 75C are schematic views when the optical system 7-1 is in operation. The first optical element 7-233 is used to adjust the optical axis of the incident light from an incident direction to a first exit direction, where the incident direction is not parallel to the first exit direction. The second optical element 7-234 is used to adjust the optical axis of the incident light from the first exit direction to a second exit direction, and the first exit direction and the second exit direction are not parallel.

For example, as shown in FIG. 75A, the first optical element 7-233 is used to adjust the optical axis of the incident light from an incident direction 7-I1 to a first exit direction 7-E11, the incident direction 7-I1 is not parallel to the first exit direction 7-E11. The second optical element 7-234 is used to adjust the optical axis of the incident light from the first exit direction 7-E11 to a second exit direction 7-E21. The first exit direction 7-E11 is not parallel to the second exit direction 7-E21.

Next, when the direction of the incident light changes, as shown in FIG. 75B, the first optical element 7-233 is used to adjust the optical axis of the incident light from an incident direction 7-I2 to a first exit direction 7-E12, the incident direction 7-I2 is not parallel to the first exit direction 7-E12. The second optical element 7-234 is used to adjust the optical axis of the incident light from the first exit direction 7-E12 to a second exit direction 7-E22, and the first exit direction 7-E12 and the second exit direction 7-E22 are not parallel.

Afterwards, when the direction of the incident light is further changed, as shown in FIG. 75C, the first optical element 7-233 is used to adjust the optical axis of the incident light from an incident direction 7-I3 to a first exit direction 7-E13, and the incident direction 7-I3 is not parallel to the first exit direction 7-E13. The second optical element 7-234 is used to adjust the optical axis of the incident light from the first exit direction 7-E13 to a second The exit direction 7-E23, and the first exit direction 7-E13 and the second exit direction 7-E23 are not parallel.

It should be noted that, as shown in FIG. 75A, FIG. 75B, and FIG. 75C, the second exit directions 7-E21, 7-E22, or 7-E23 in the foregoing state are all oriented to the same direction. In other words, parallel to the main axis 7-0. The lens 7-340 and the third circuit element 7-420 (photosensitive element) are arranged along the second exit directions 7-E21, 7-E22, or 7-E23. The second exit direction 7-E21, 7-E22, or 7-E23 are not parallel to the first direction 7-D1, and the second exit directions 7-E21, 7-E22, or 7-E23 and the second direction 7-D2 are parallel. In this way, external light may be reflected by the first optical module 7-200 to the second optical module 7-300, so that the second optical module 7-300 may receive images from all directions. Afterwards, the first optical module 7-200 and the second optical module 7-300 may rotate relative to the main axis 7-0 via the third driving assembly 7-400, so that the optical system 7-1 may capture images in more directions.

In summary, an optical system is provided. The optical system includes a first optical module. The first optical module includes a first fixed portion, a first movable portion, a first driving assembly, and a circuit assembly. The first movable portion is used for connecting to a first optical element, and the first movable portion is movably connected to the fixed portion. The first driving assembly is used for driving the first movable portion to move relative to the first fixed portion. The circuit assembly is electrically connected to the first driving assembly. As a result, the optical system may capture images from different directions, and miniaturization may be achieved.

Although embodiments of the present disclosure and their advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
   a first optical module, comprising:
      a fixed portion;
      a movable portion movably connected to the fixed portion, wherein the movable portion is used for connecting to an optical element;
      a driving assembly used for moving the movable portion relative to the fixed portion; and
      a circuit assembly electrically connected to the driving assembly;
      a pressing assembly for applying pressure to the driving assembly, wherein the driving assembly and the movable portion are arranged in a direction of the pressure, and the direction of the pressure is not parallel to a first direction;
   wherein the pressing assembly comprises:
      a pressing element that is resilient; and
      an adjusting element for adjusting the value or the direction of the pressure, wherein the adjusting element comprises a thread structure.

2. The optical system as claimed in claim 1, wherein the driving assembly is used for rotating the movable portion relative to the fixed portion, a rotational axis of the movable portion extends in the first direction, and the driving assembly comprises:
   a driving source for generating a first driving force, comprising:
      a first piezoelectric element;
      a resilient element disposed on the first piezoelectric element; and
      a transmission element for transmitting the first driving force, wherein the transmission element has an elongated shape and extends in a second direction, and the first direction and the second direction are not parallel.

3. The optical system as claimed in claim 2, wherein the first optical module further comprises a frame, the driving assembly is disposed on the frame, and the frame comprises:
   a main body;

a first leaning portion disposed on the main body and corresponding to the pressure assembly;

a second leaning portion disposed on the main body and corresponding to the pressure assembly;

a first through hole positioned on the first leaning portion, wherein at least a portion of the transmission element is accommodated in the first through hole; and a second through hole positioned on the second leaning portion.

4. The optical system as claimed in claim 3, wherein at least a portion of the transmission element is accommodated in the second through hole, and the first leaning portion and the second leaning portion are arranged in a direction that is parallel to the second direction.

5. The optical system as claimed in claim 4, wherein the frame is movably connected to the fixed portion, the frame comprises a protruding structure and an accommodating structure, the protruding structure is disposed on the main body, and at least a portion of the protruding structure is accommodated in the accommodating structure.

6. The optical system as claimed in claim 5, wherein a gap is formed between the protruding structure and the accommodating structure, and the accommodating structure, the gap, and the protruding structure are arranged in the direction of the pressure.

7. The optical system as claimed in claim 6, wherein the first optical module further comprises:

a first bonding element, wherein the transmission element is connected to the driving source via the first bonding element;

a second bonding element, wherein the resilient element is connected to the first piezoelectric element via the second bonding element; and a third bonding element, wherein the transmission element is connected to the frame via the third bonding element.

8. The optical system as claimed in claim 7, wherein the Young's modulus of the first bonding element is greater than the Young's modulus of the second bonding element, and the Young's modulus of the first bonding element is greater than the Young's modulus of the third bonding element.

9. The optical system as claimed in claim 8, wherein the Young's modulus of the second bonding element is greater than the Young's modulus of the third bonding element.

10. The optical system as claimed in claim 9, wherein the first optical module further comprises a position sensing assembly for detecting the movement of the movable portion relative to the fixed portion, and the position sensing assembly is at least partially disposed on the circuit assembly.

11. The optical system as claimed in claim 10, wherein the circuit assembly comprises:

a first circuit element electrically connected to the driving assembly;

a second circuit element, wherein the first circuit element and the second circuit element are arranged in the first direction.

12. The optical system as claimed in claim 11, wherein the circuit assembly further comprises:

a control element disposed on the second circuit element, wherein the control element is used for controlling the driving assembly;

a power source disposed on the second circuit element, wherein the power source is used for providing power;

a wireless communication element disposed on the second circuit element, wherein the wireless communication element is used for emitting a signal to an external apparatus;

a passive element disposed on the second circuit element;

a first spacer disposed between the first circuit element and the second circuit element; and an interference-suppressing element disposed between the position sensing assembly and the second circuit element, and disposed between the first circuit element and the second circuit element.

13. The optical system as claimed in claim 12, wherein the first circuit element and the second circuit element are plate-shaped and parallel to each other, a gap is formed between the first circuit element and the second circuit element, and the first circuit element is closer to the movable portion than the second circuit element.

14. The optical system as claimed in claim 13, wherein the fixed portion comprises:

a blocking plate disposed between the optical element and the driving assembly, wherein the movable portion comprises a rotational axis penetrating the blocking plate;

a first case surrounding the circuit assembly; and a second case surrounding the optical element, wherein the second case comprises transparent material, the optical element is used for adjusting the direction of an optical axis of incident light from an incident direction to an exit direction, and the incident direction is not parallel to the exit direction.

15. The optical system as claimed in claim 14, further comprising a second optical module corresponding to the first optical module, wherein the second optical module comprises:

a lens; and a photosensitive element corresponding to the lens, wherein the lens and the photosensitive element are arranged in the exit direction, and the exit direction is parallel to the first direction.

16. The optical system as claimed in claim 15, wherein the optical element is positioned between the second optical module and the driving assembly, and the driving assembly is positioned between the second optical module and the circuit assembly.

17. The optical system as claimed in claim 16, wherein the second case does not overlap the second optical module when viewed in a direction that is perpendicular to the first direction.

18. The optical system as claimed in claim 17, wherein the second optical module is electrically connected to an external circuit, the second optical module is electrically isolated from the circuit assembly, and the second optical module is electrically isolated from the power source.

* * * * *